(12) United States Patent
Henry et al.

(10) Patent No.: US 8,467,986 B2
(45) Date of Patent: *Jun. 18, 2013

(54) DRIVE TECHNIQUES FOR A DIGITAL FLOWMETER

(75) Inventors: Manus P. Henry, Oxford (GB); Mayela E. Zamora, Oxford (GB)

(73) Assignee: Invensys Systems, Inc., Foxboro, MA (US)

( * ) Notice: Subject to any disclaimer, the term of this patent is extended or adjusted under 35 U.S.C. 154(b) by 273 days.
This patent is subject to a terminal disclaimer.

(21) Appl. No.: 12/852,008

(22) Filed: Aug. 6, 2010

(65) Prior Publication Data
US 2011/0035166 A1    Feb. 10, 2011

Related U.S. Application Data

(63) Continuation-in-part of application No. 12/367,203, filed on Feb. 6, 2009, now Pat. No. 7,904,256, which is a continuation of application No. 11/458,251, filed on Jul. 18, 2006, now Pat. No. 7,505,854, which is a continuation of application No. 11/168,568, filed on Jun. 29, 2005, now Pat. No. 7,146,280, which is a continuation of application No. 10/402,131, filed on Mar. 31, 2003, now Pat. No. 6,950,760, which is a continuation-in-part of application No. 10/400,922, filed on Mar. 28, 2003, now abandoned, application No. 12/852,008, which is a continuation-in-part of application No. 11/930,936, filed on Oct. 31, 2007, now Pat. No. 8,000,906, which is a continuation of application No. 11/555,033, filed on Oct. 31, 2006, now Pat. No. 7,571,062, which is a continuation of application No. 11/130,233, filed on May 17, 2005, now Pat. No. 7,136,761, which is a continuation of application No. 10/637,620, filed on Aug. 11, 2003, now Pat. No. 6,917,887, which is a continuation of application No. 09/931,057, filed on Aug. 17, 2001, now Pat. No. 6,754,594, which is a continuation of application No. 09/111,739, filed on Jul. 8, 1998, now Pat. No. 6,311,136.

(60) Provisional application No. 60/066,554, filed on Nov. 26, 1997, provisional application No. 60/368,153, filed on Mar. 29, 2002.

(51) Int. Cl.
*G01F 1/00* (2006.01)
*G01F 1/12* (2006.01)
*G06F 19/00* (2011.01)

(52) U.S. Cl.
USPC .............. 702/100; 73/861.355; 73/861.356; 702/45; 702/54

(58) Field of Classification Search
USPC ......... 702/45–57, 100, 104–106; 73/861.355, 73/861.356, 861.357; 600/528
See application file for complete search history.

(56) References Cited

U.S. PATENT DOCUMENTS

| 3,956,682 A | 5/1976 | Van Dyck |
| RE29,383 E | 9/1977 | Gallatin et al. |

(Continued)

FOREIGN PATENT DOCUMENTS

| EP | 0 696 726 | 2/1996 |
| EP | 0 698 783 | 2/1996 |

(Continued)

OTHER PUBLICATIONS

A.F. Skea, "Effects of Gas Leaks in Oil Flow on Single-Phase Flowmeters", *Flow Measurement and Instrumentation*, vol. 10, pp. 146-150 (1999).

(Continued)

*Primary Examiner* — John H Le
(74) *Attorney, Agent, or Firm* — Edward S. Jermolowicz

(57) ABSTRACT

Drive techniques for a digital flowmeter are described. The drive techniques account for delays caused during digital signal processing of sensor signals that correspond to a motion of a flowtube, as well as drive signals that impart motion to the flowtube. Such delays may be caused by a variety of factors, including delays associated with analog/digital conversion of the signals and/or filtering of the signals. The techniques include open-loop techniques and closed-loop techniques, which can be used separately or together during the start-up and operation of the digital flowmeter.

6 Claims, 91 Drawing Sheets

U.S. PATENT DOCUMENTS

| | | | |
|---|---|---|---|
| 4,187,721 A | 2/1980 | Smith | |
| 4,358,822 A | 11/1982 | Sanchez | |
| RE31,450 E | 11/1983 | Smith | |
| 4,419,898 A | 12/1983 | Zanker et al. | |
| 4,422,338 A | 12/1983 | Smith | |
| 4,491,025 A | 1/1985 | Smith et al. | |
| 4,688,418 A | 8/1987 | Cheung et al. | |
| 4,727,746 A | 3/1988 | Mikasa et al. | |
| 4,757,390 A | 7/1988 | Mehrgardt et al. | |
| 4,773,257 A | 9/1988 | Aslesen et al. | |
| 4,782,711 A | 11/1988 | Pratt | |
| 4,801,897 A | 1/1989 | Flecken | |
| 4,817,448 A | 4/1989 | Hargarten et al. | |
| 4,823,614 A | 4/1989 | Dahlin | |
| 4,852,395 A | 8/1989 | Kolpak | |
| 4,852,409 A | 8/1989 | Herzl | |
| 4,852,410 A | 8/1989 | Corwon et al. | |
| 4,879,911 A | 11/1989 | Zolock | |
| 4,891,991 A | 1/1990 | Mattar et al. | |
| 4,895,030 A | 1/1990 | Bergamini et al. | |
| 4,911,006 A | 3/1990 | Hargarten et al. | |
| 4,911,020 A | 3/1990 | Thompson | |
| 4,934,195 A | 6/1990 | Hussain | |
| 4,934,196 A | 6/1990 | Romano | |
| 4,996,871 A | 3/1991 | Romano | |
| 5,027,662 A | 7/1991 | Titlow et al. | |
| 5,029,482 A | 7/1991 | Liu et al. | |
| 5,050,439 A | 9/1991 | Thompson | |
| 5,052,231 A | 10/1991 | Christ et al. | |
| 5,054,313 A | 10/1991 | Fitzgerald et al. | |
| 5,054,326 A | 10/1991 | Mattar | |
| 5,218,869 A | 6/1993 | Pummer | |
| 5,228,327 A | 7/1993 | Bruck | |
| 5,259,250 A | 11/1993 | Kolpak | |
| 5,271,281 A | 12/1993 | Mattar et al. | |
| 5,295,084 A | 3/1994 | Arunachalam et al. | |
| 5,301,557 A | 4/1994 | Cage et al. | |
| 5,321,991 A | 6/1994 | Kalotay | |
| 5,343,764 A | 9/1994 | Mattar et al. | |
| 5,347,874 A | 9/1994 | Kalotay et al. | |
| 5,400,653 A | 3/1995 | Kalotay et al. | |
| 5,429,002 A | 7/1995 | Coleman | |
| 5,469,748 A | 11/1995 | Kalotay | |
| 5,497,665 A | 3/1996 | Cage et al. | |
| 5,497,666 A | 3/1996 | Patten et al. | |
| 5,535,632 A | 7/1996 | Kolpak | |
| 5,555,190 A | 9/1996 | Derby et al. | |
| 5,570,300 A | 10/1996 | Henry et al. | |
| 5,578,764 A | 11/1996 | Yokoi et al. | |
| 5,594,180 A | 1/1997 | Carpenter et al. | |
| 5,648,616 A | 7/1997 | Keel | |
| 5,654,502 A | 8/1997 | Dutton | |
| 5,687,100 A | 11/1997 | Buttler et al. | |
| 5,732,193 A | 3/1998 | Aberson | |
| 5,734,112 A | 3/1998 | Bose et al. | |
| 5,774,378 A | 6/1998 | Yang | |
| 5,804,741 A | 9/1998 | Freeman | |
| 5,877,954 A | 3/1999 | Klimasauskas et al. | |
| 5,905,206 A | 5/1999 | Herwig et al. | |
| 5,926,096 A | 7/1999 | Mattar et al. | |
| 5,969,264 A | 10/1999 | Rivkin | |
| 6,073,495 A | 6/2000 | Stadler | |
| 6,092,429 A | 7/2000 | Cunningham et al. | |
| 6,185,470 B1 | 2/2001 | Pado et al. | |
| 6,301,973 B1 | 10/2001 | Smith | |
| 6,309,342 B1 | 10/2001 | Blazey et al. | |
| 6,311,136 B1 | 10/2001 | Henry et al. | |
| 6,318,156 B1 | 11/2001 | Dutton et al. | |
| 6,318,186 B1 | 11/2001 | Smith et al. | |
| 6,327,914 B1 | 12/2001 | Dutton | |
| 6,378,354 B1 | 4/2002 | Sharp | |
| 6,505,131 B1* | 1/2003 | Henrot | 702/54 |
| 6,505,519 B2 | 1/2003 | Henry et al. | |
| 6,507,791 B2 | 1/2003 | Henry et al. | |
| 6,551,251 B2 | 4/2003 | Zuckerwar et al. | |
| 6,564,619 B2 | 5/2003 | Dutton et al. | |
| 6,754,594 B2 | 6/2004 | Henry et al. | |
| 6,917,887 B2 | 7/2005 | Henry et al. | |
| 6,950,760 B2 | 9/2005 | Henry et al. | |
| 7,136,761 B2 | 11/2006 | Henry et al. | |
| 7,571,062 B2 | 8/2009 | Henry et al. | |
| 7,904,256 B2* | 3/2011 | Henry et al. | 702/45 |
| 2002/0019710 A1 | 2/2002 | Henry et al. | |
| 2002/0033043 A1 | 3/2002 | Dutton et al. | |
| 2002/0038186 A1 | 3/2002 | Henry et al. | |
| 2002/0133307 A1 | 9/2002 | Maginnis | |
| 2004/0031328 A1 | 2/2004 | Henry et al. | |
| 2005/0209794 A1 | 9/2005 | Henry et al. | |
| 2007/0124090 A1 | 5/2007 | Henry et al. | |
| 2010/0107778 A1 | 5/2010 | Henry et al. | |

FOREIGN PATENT DOCUMENTS

| | | |
|---|---|---|
| EP | 0 702 212 | 3/1996 |
| EP | 0 827 096 | 3/1998 |
| EP | 0 919 793 | 6/1999 |
| WO | 93/21505 | 10/1993 |
| WO | 98/20306 | 5/1998 |
| WO | 00/10059 | 2/2000 |
| WO | 02/08703 | 1/2002 |

OTHER PUBLICATIONS

David Spitzer; "Mass Flowmeters"; *Industries Flow Measurement*, Chapter 12; pp. 197-210; 1990.

E. Luntta et al., "Neural Network Approach to Ultrasonic Flow Measurements", *Flow Measurement and Instrumentation*, vol. 10, pp. 35-43, 1999.

European Search Report issued in European Patent Application No. EP 04021672, mailed Jul. 10, 2007, 3 pages.

J. Hemp et al.; "On the Theory and Performance of Coriolis Mass Flowmeters"; *Proceedings of the International Conference on Mass Flow Measurement Direct and Indirect*; IBC Technical Services; 40 pages; Feb. 1989.

J.T. Grumski et al., "Performance of a Coriolis-type Mass Flow Meter in the Measurement of Two-phase (air-liquid) Mixtures", ASME Fluid Engineering Division Publication FED, vol. 17, pp. 75-84, 1984.

Joseph DeCarlo; "True Mass-Flow Measurement"; *Fundamentals of Flow Measurement*, Unit 11-2; pp. 208-220; 1984.

Kutin, Jože, et al., "Phase-Locking Control of the Coriolis Meter's Resonance Frequency Based on Virtual Instrumentation," *Sensors and Actuators* A 104 (2003), pp. 86-93.

M. Henry et al., "The Implications of Digital Communications on Sensor Validation", Report No. QUEL 1912/92, University of Oxford, Department of Engineering Science, Apr. 1992.

M.P. Henry et al., "A New Approach to Sensor Validation", Improving Analyser Performance, IMC, Mar. 17, 1992.

M.P. Henry et al., "A Self-Validating Digital Coriolis Mass-flow Meter" (1); overview, 1999.

M.P. Henry et al., "A standard Interface for Self-Validating Sensors", Report No. QUEL 1884/91, University of Oxford, Department of Engineering Science, Sep. 1991.

M.P. Henry et al., "Signal processing, Data Handling and Communications: The Case for Measurement Validation", Mar. 1992.

M.P. Henry et al., "The Self-Validating Sensor: Rationale Definitions and Examples", Control Engineering Practice, 1 (4), pp. 585-610, 1993.

M.P. Henry, "Self-Validation Improves Coriolis Meter", Control Engineering, 42 (6), pp. 81-86 (1995).

Merriam-Webster's Collegiate Dictionary, Tenth Edition, 1998, p. 747.

R.P. Liu et al., "A Neural Network to Correct Mass Flow Errors Caused by Two Phase Flow in a Digital Coriolis Mass Flow Meter". Engineering Science Department, Oxford University, Flow Measurement and Instrumentation, vol. 12, No. 1, Mar. 2001.

Wood, et al., "A Phase-Locked Loop for Driving Vibrating Tube Densimeters," Rev. Sci. Instrum., vol. 60, No. 3, Mar. 1989, pp. 493-494.

Combined Search and Examination Report under Sections 17 and 18(3), dated Jul. 20, 2005, for UK Application No. GB 0512421.9.

* cited by examiner

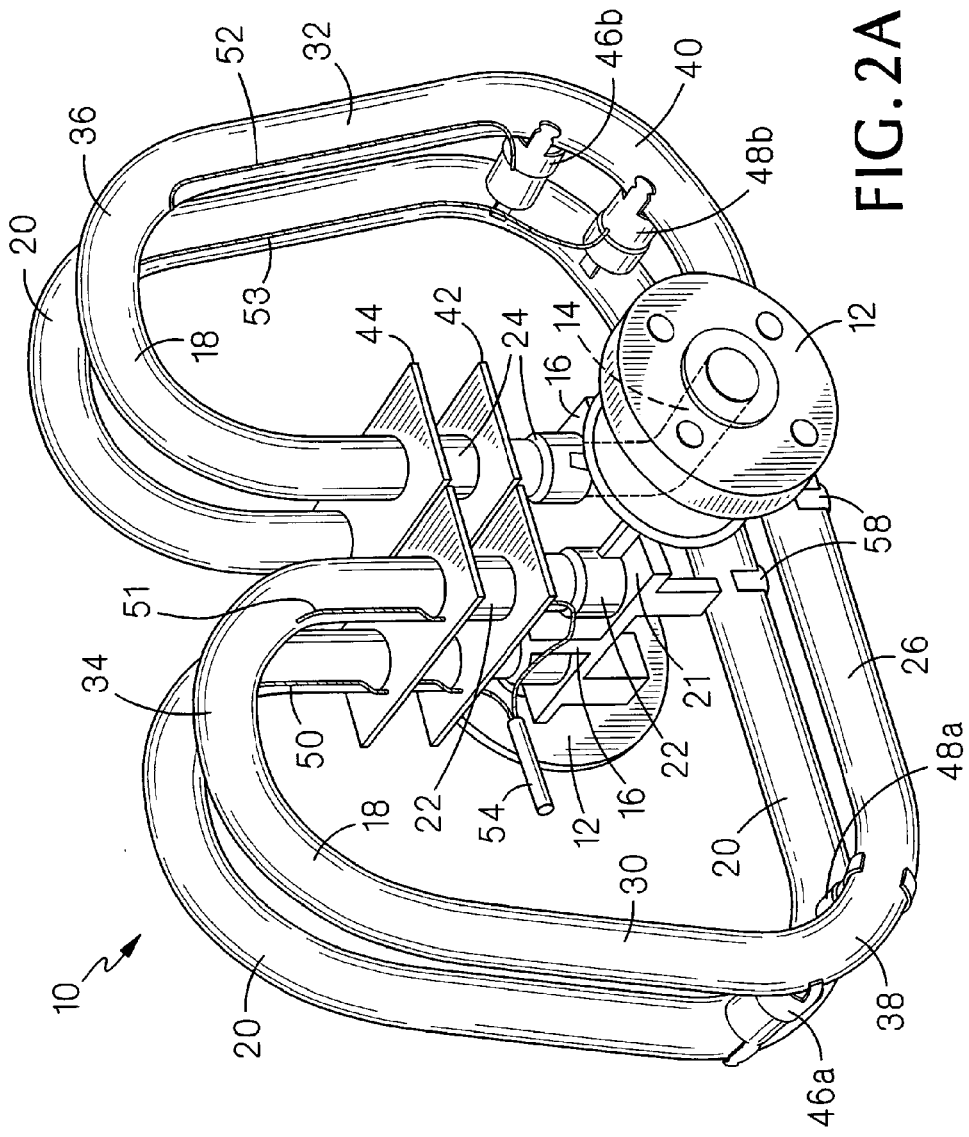

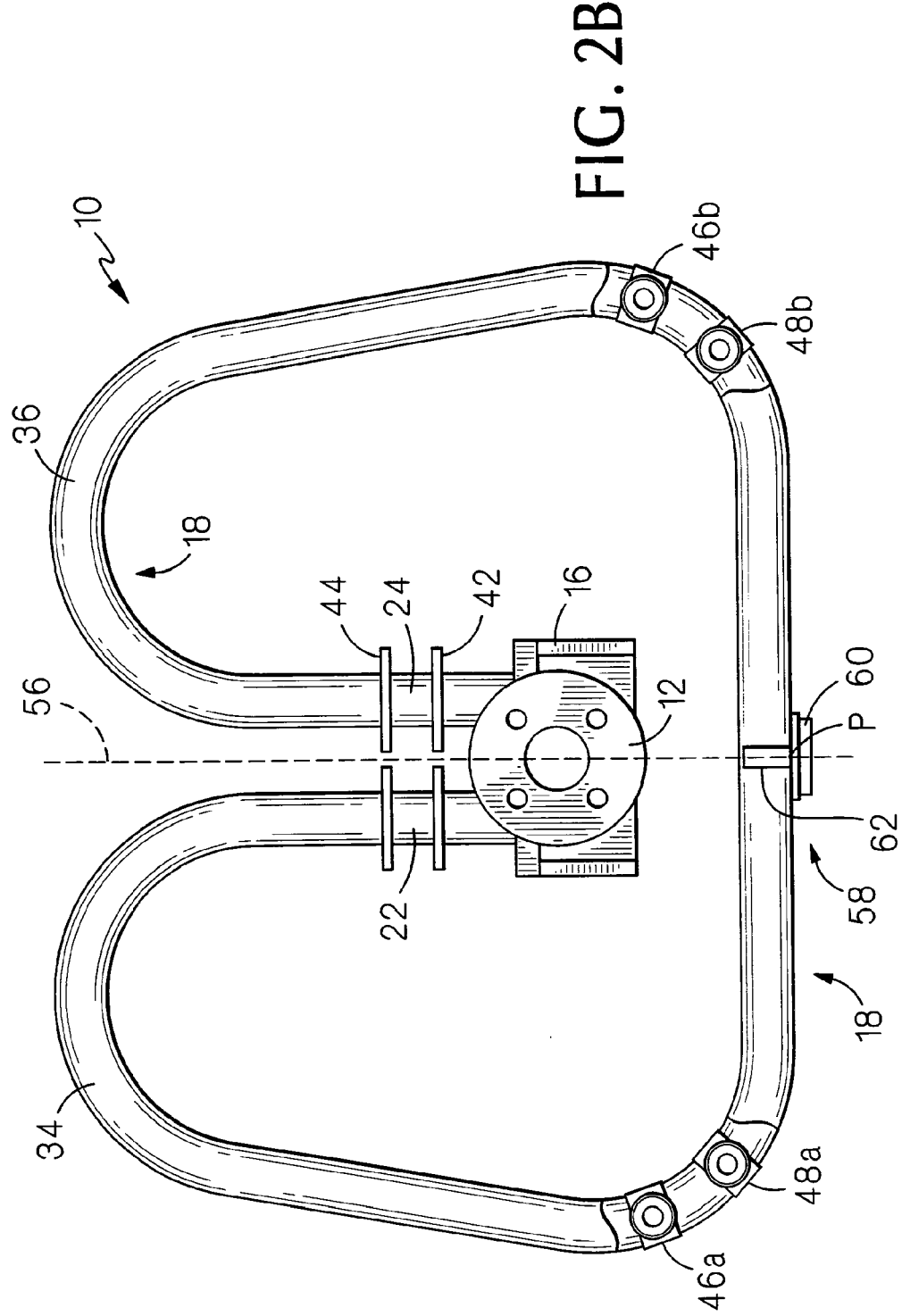

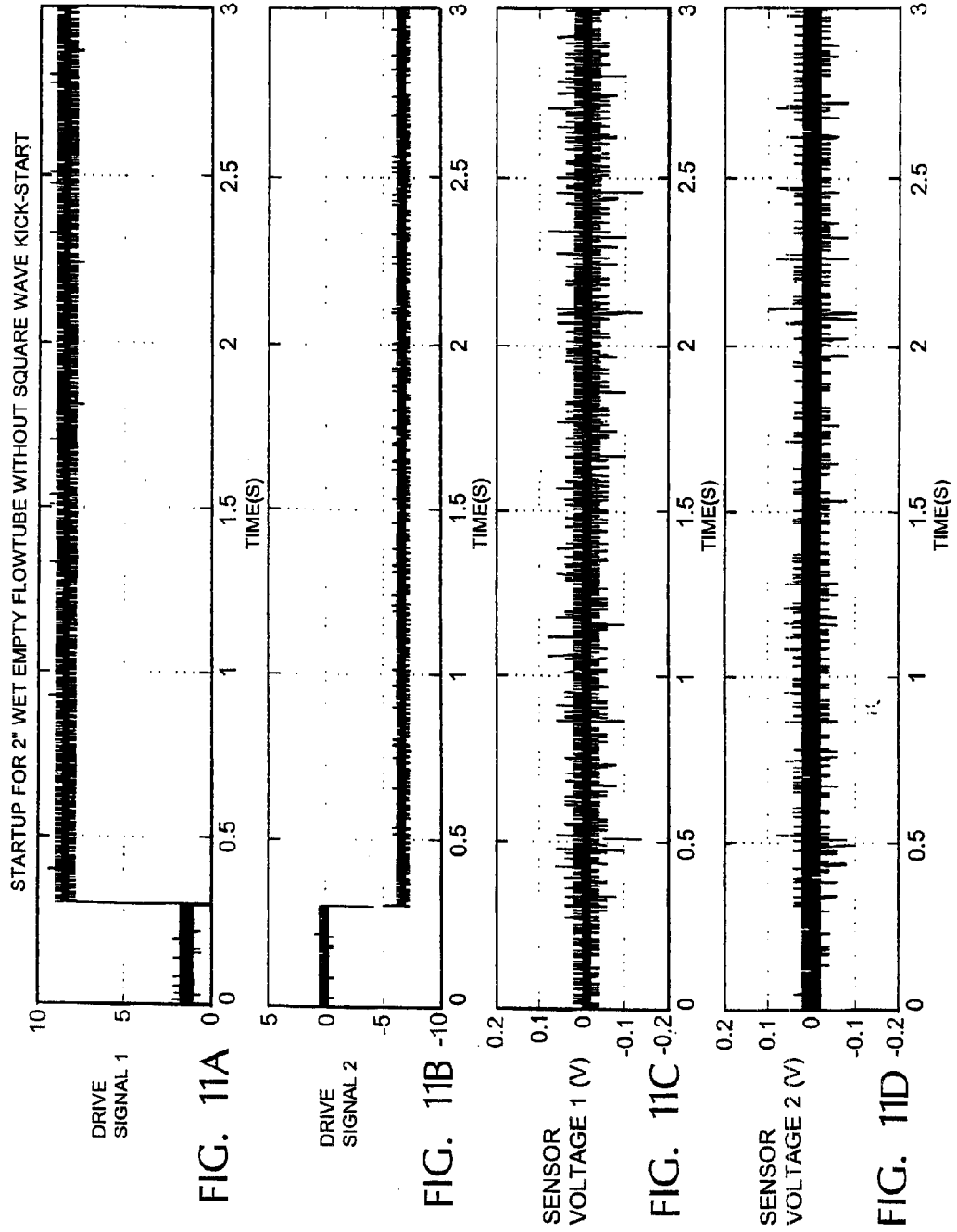

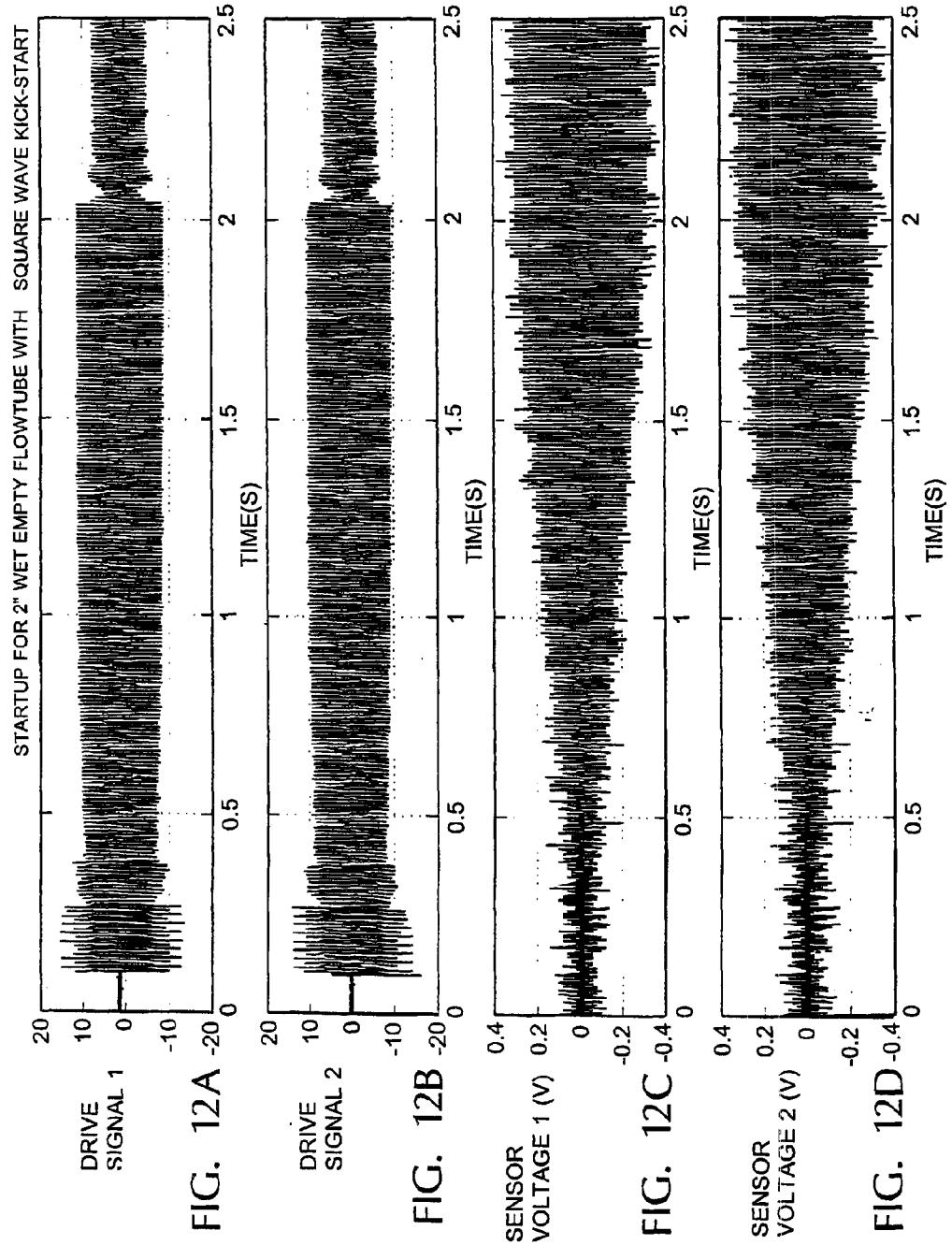

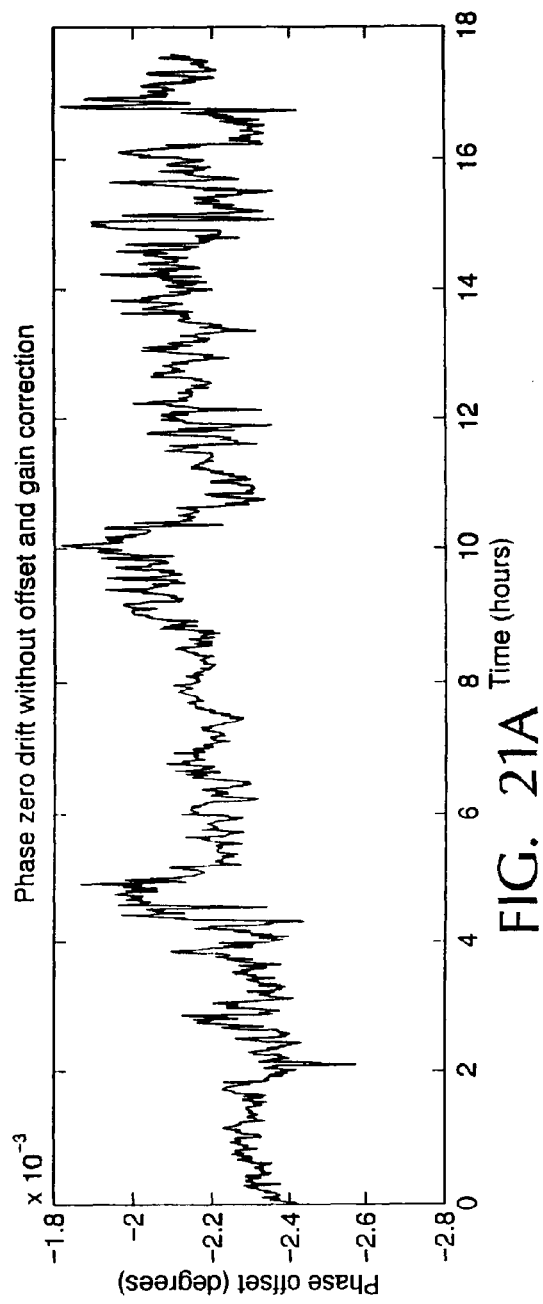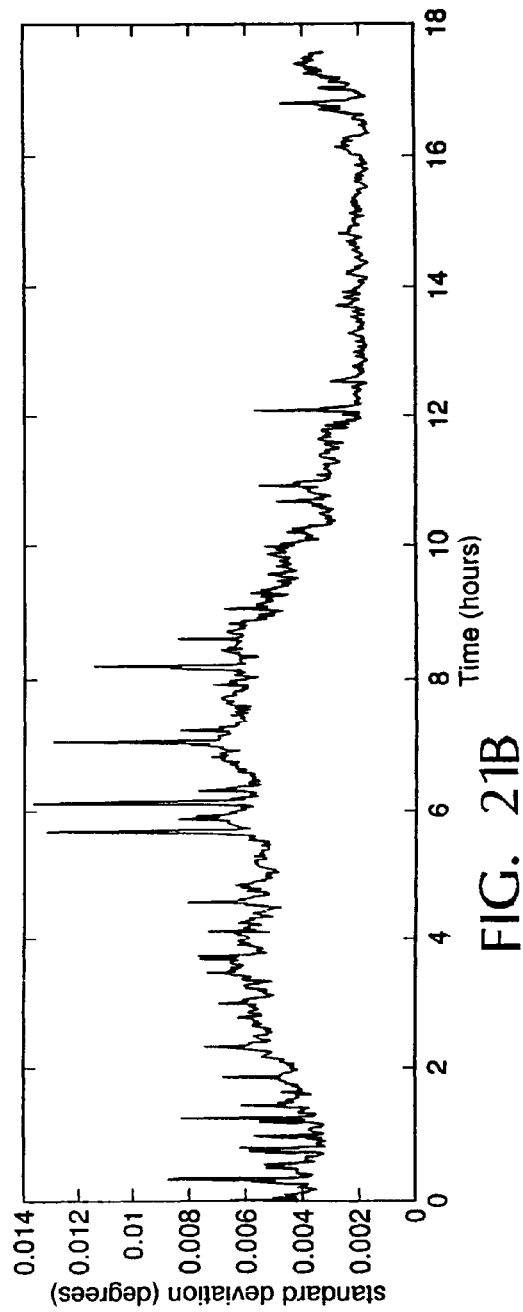

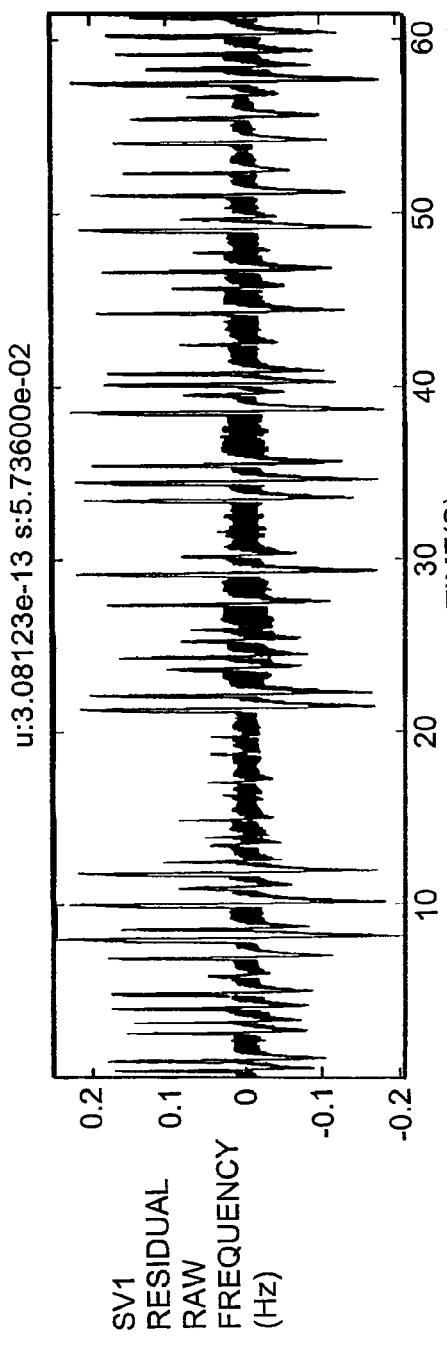
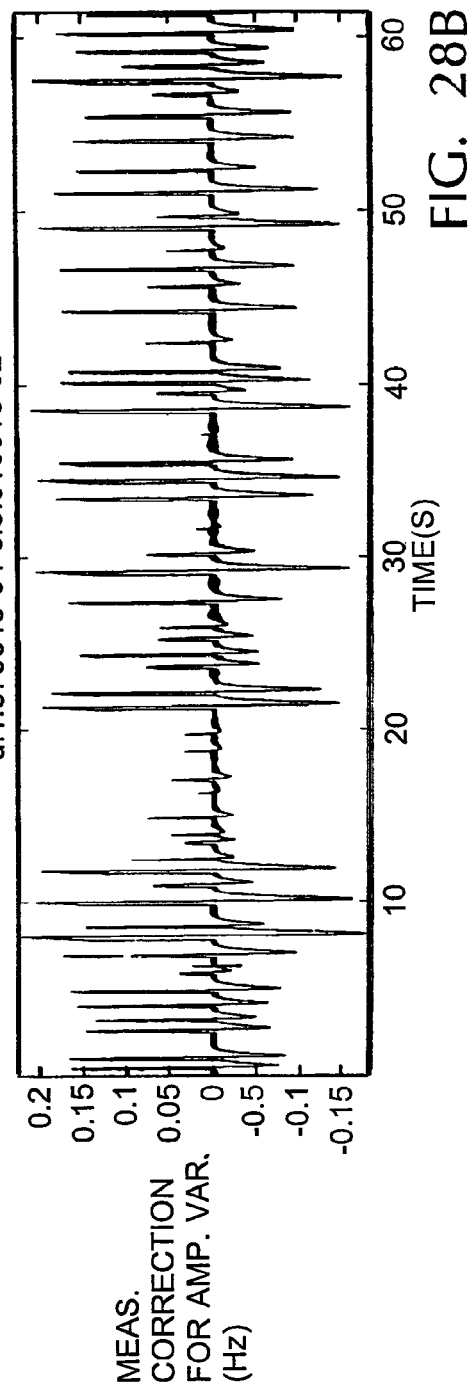
FIG. 28A
FIG. 28B

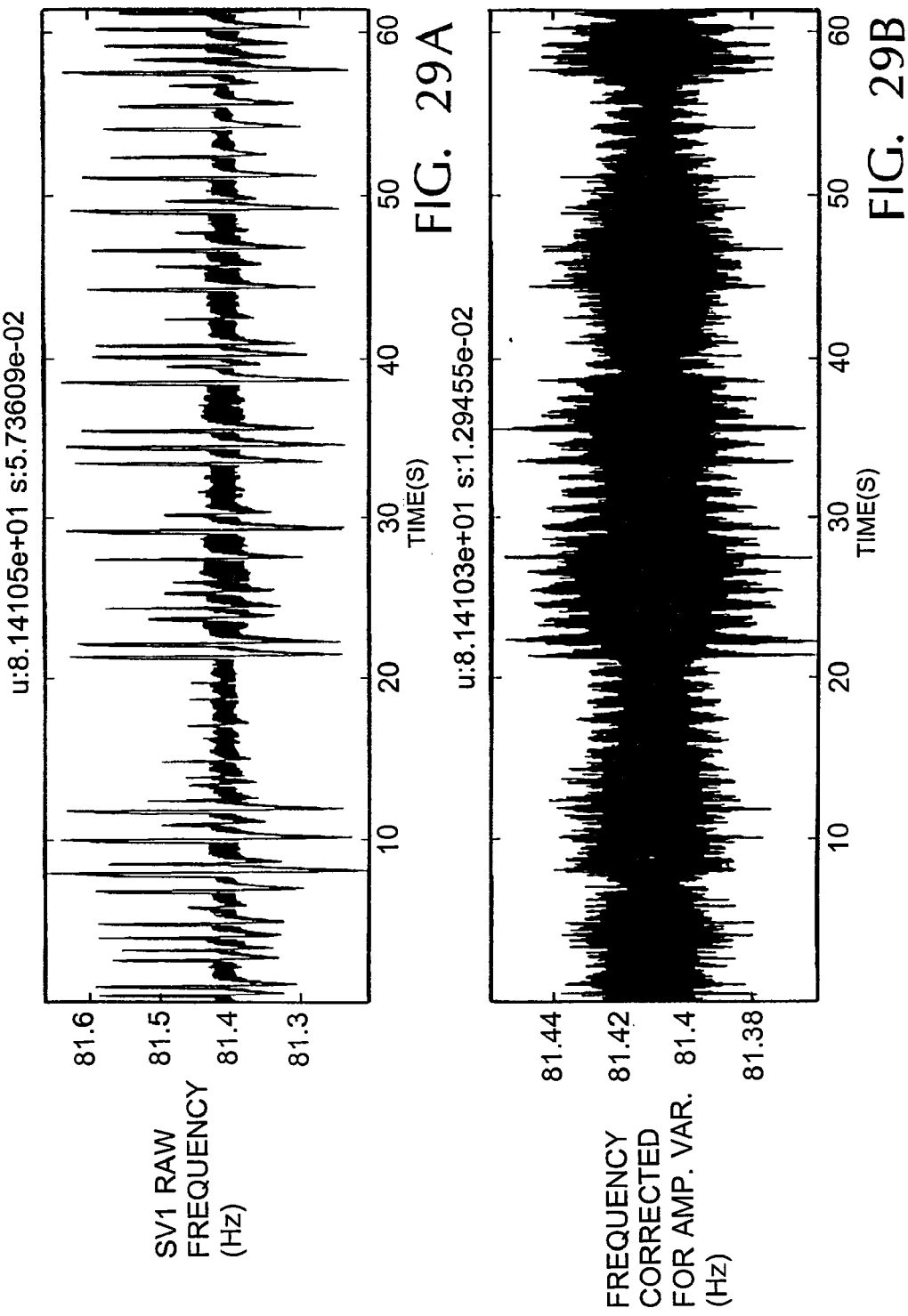

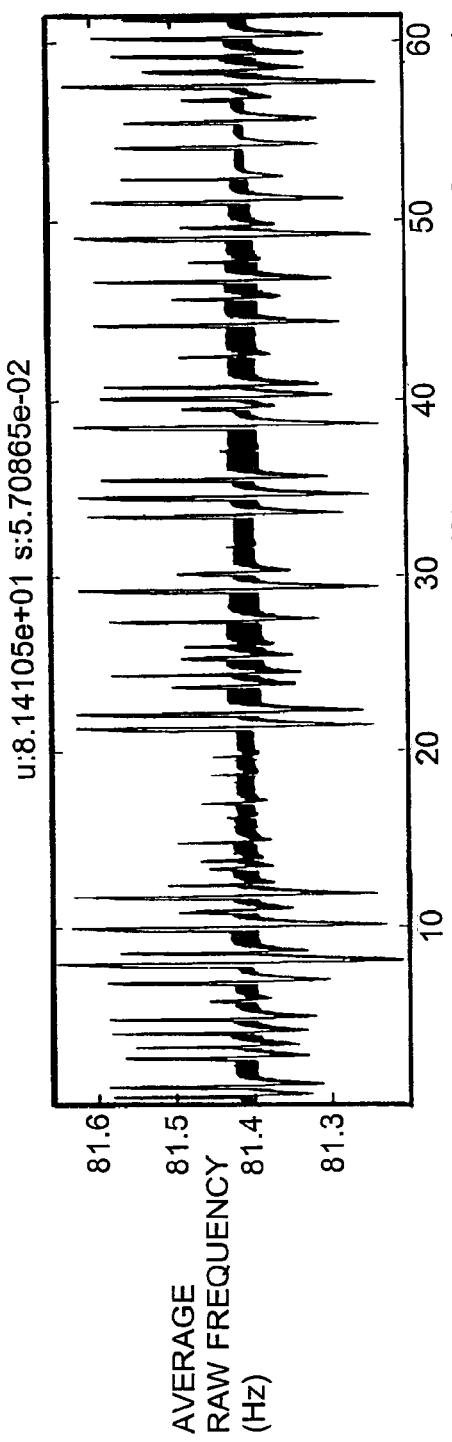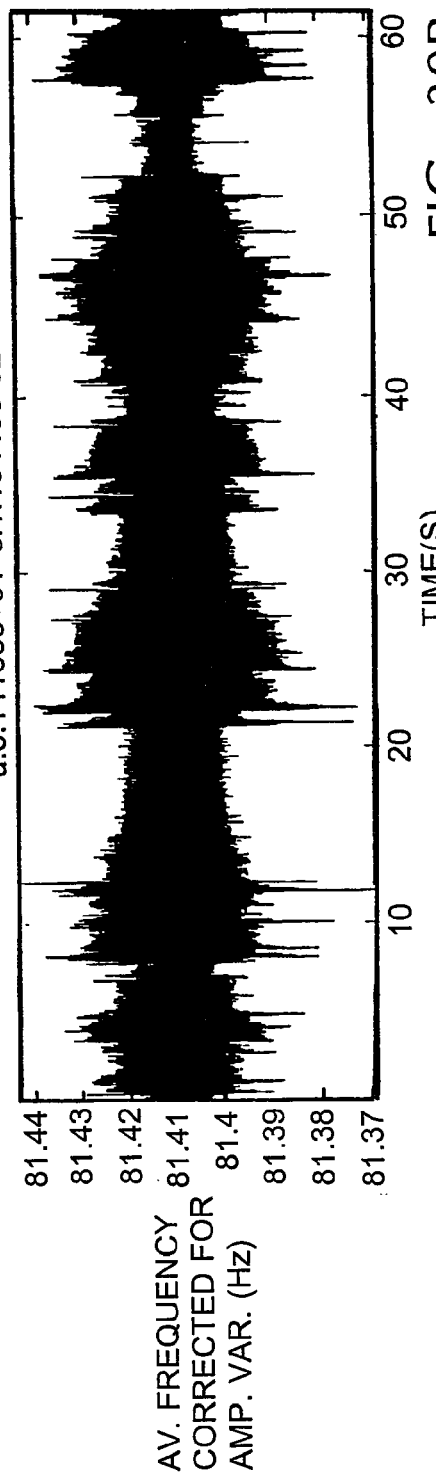

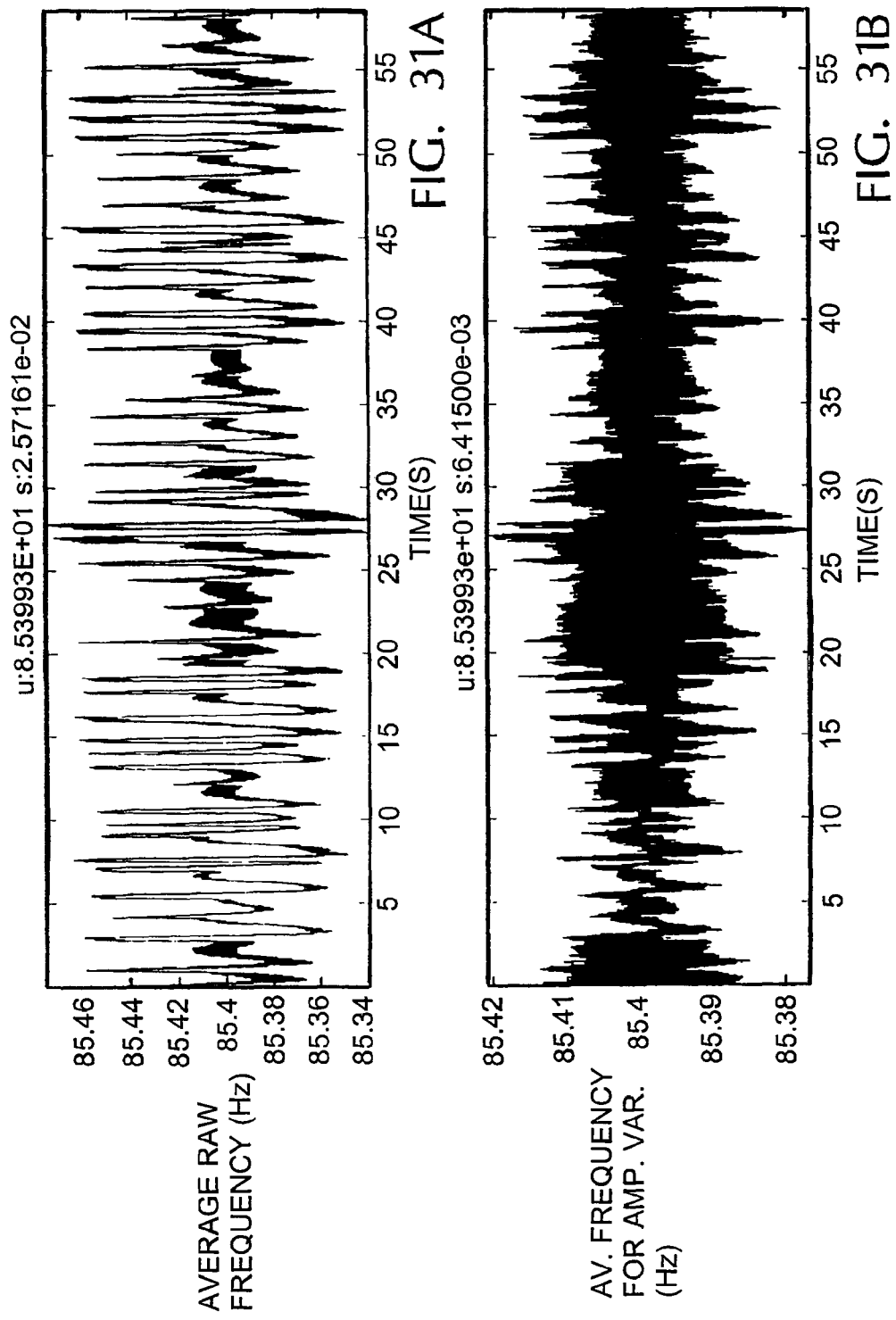

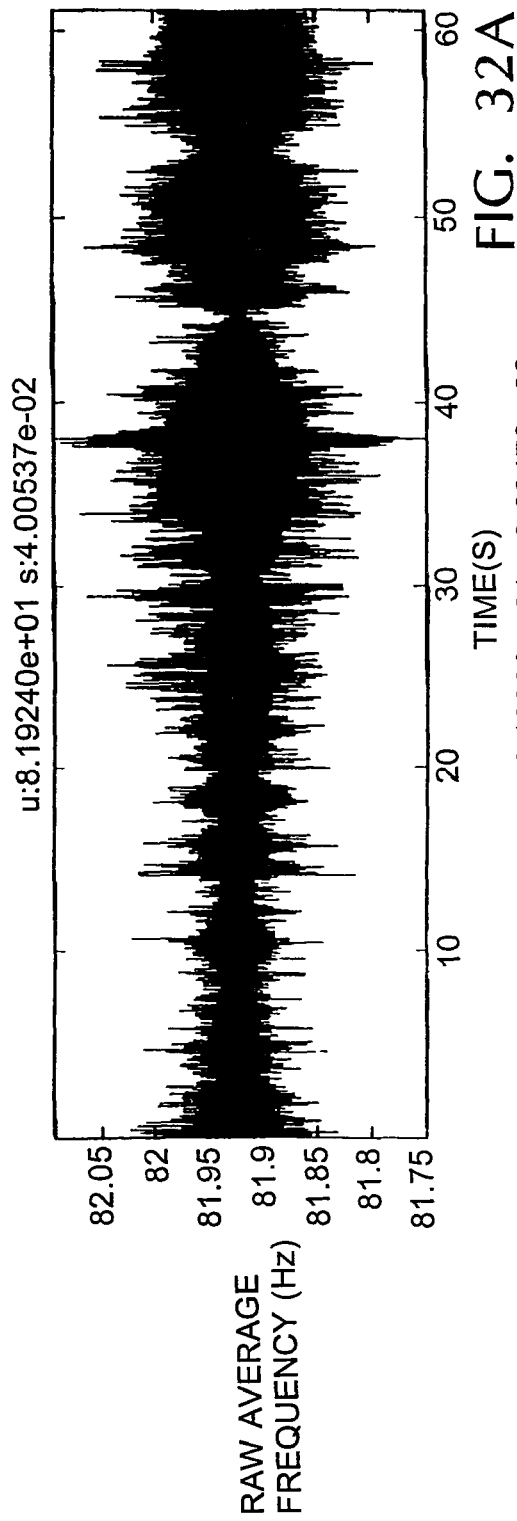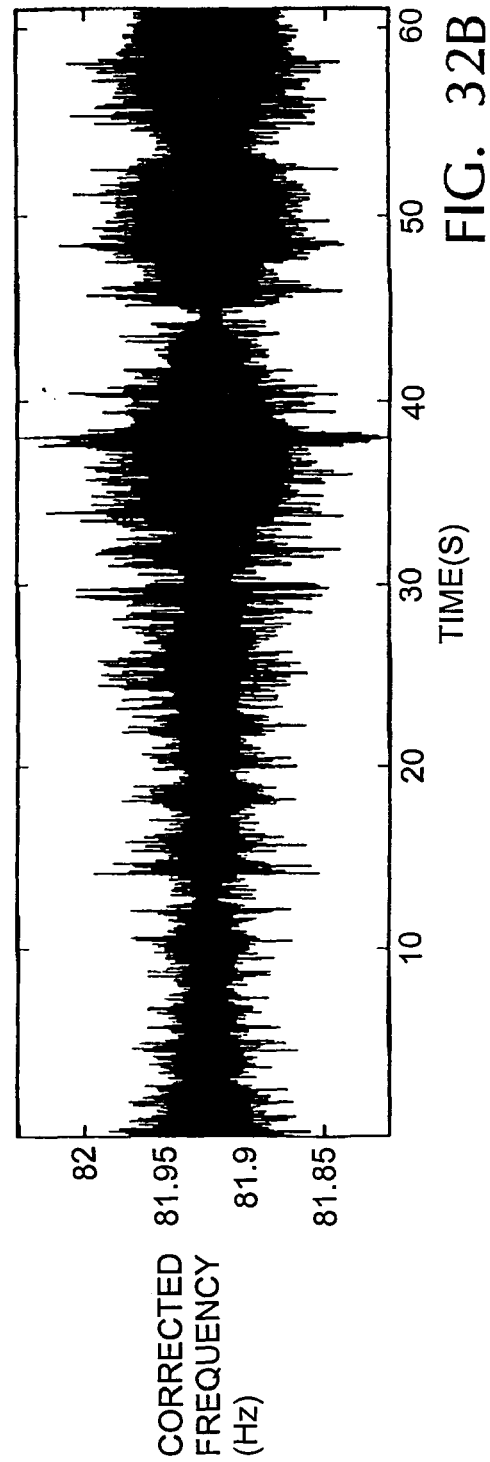

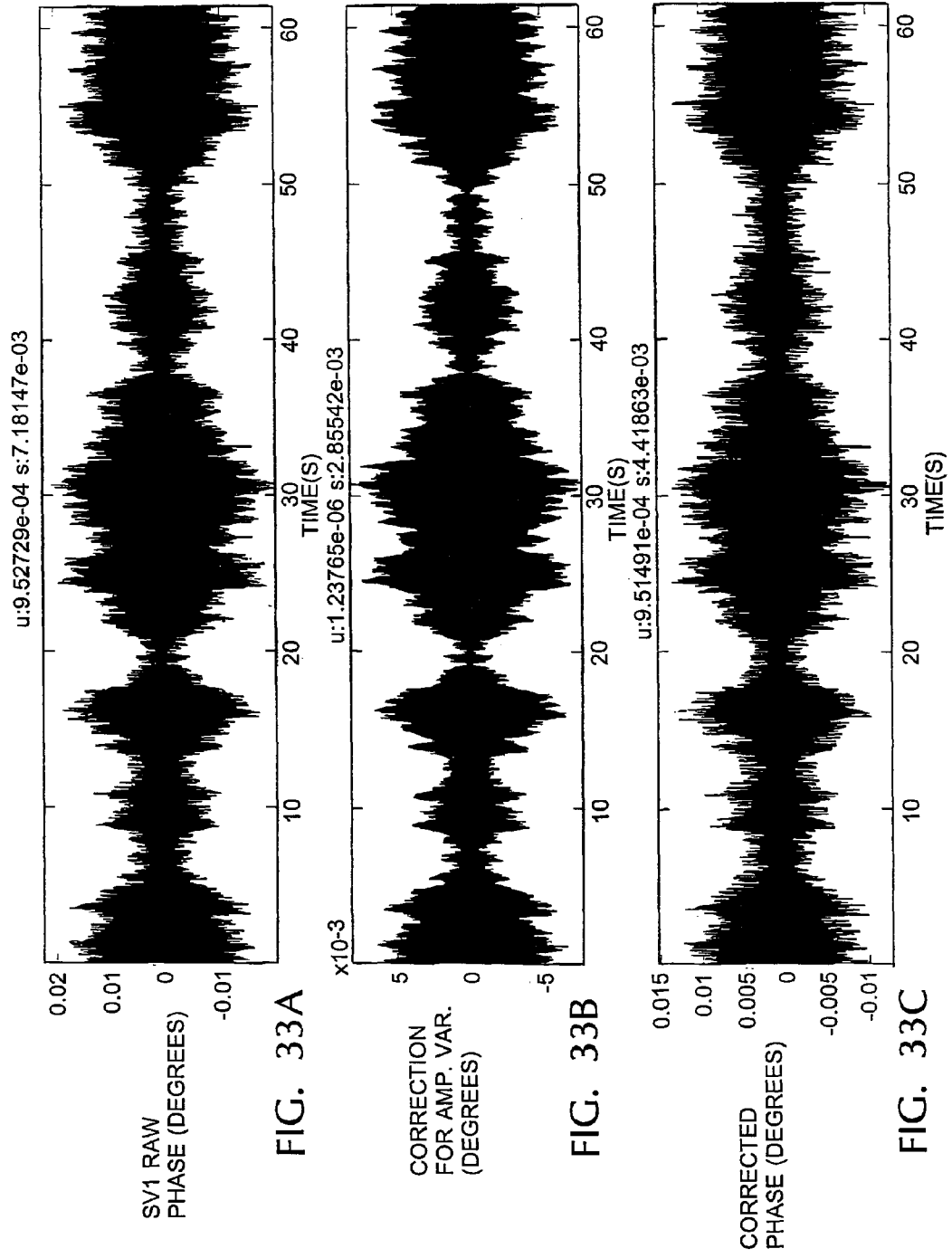

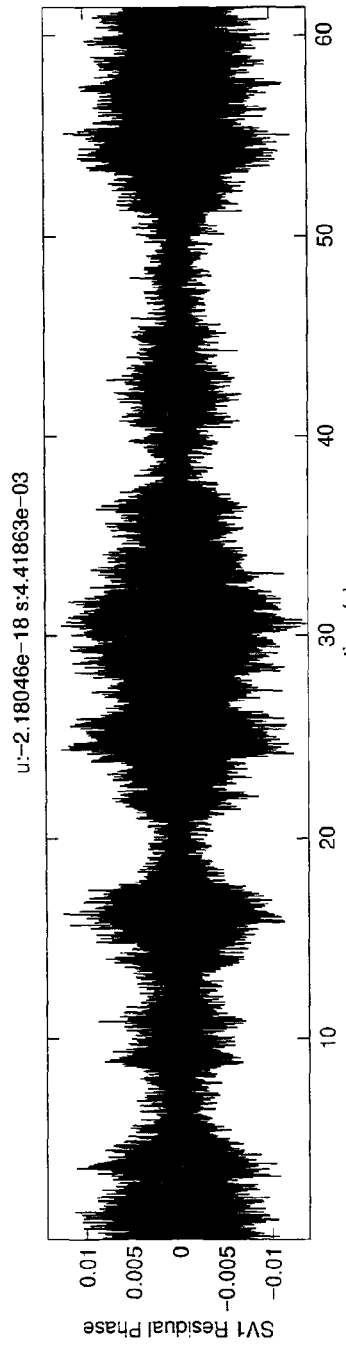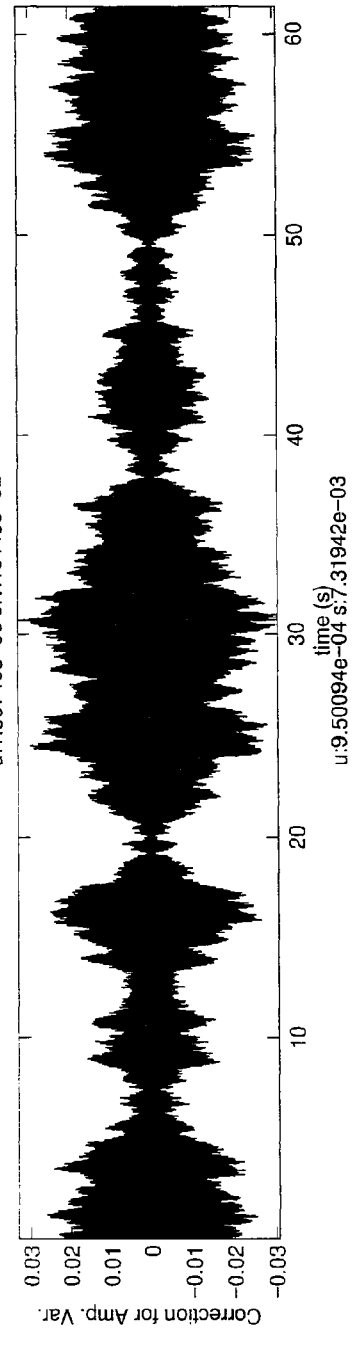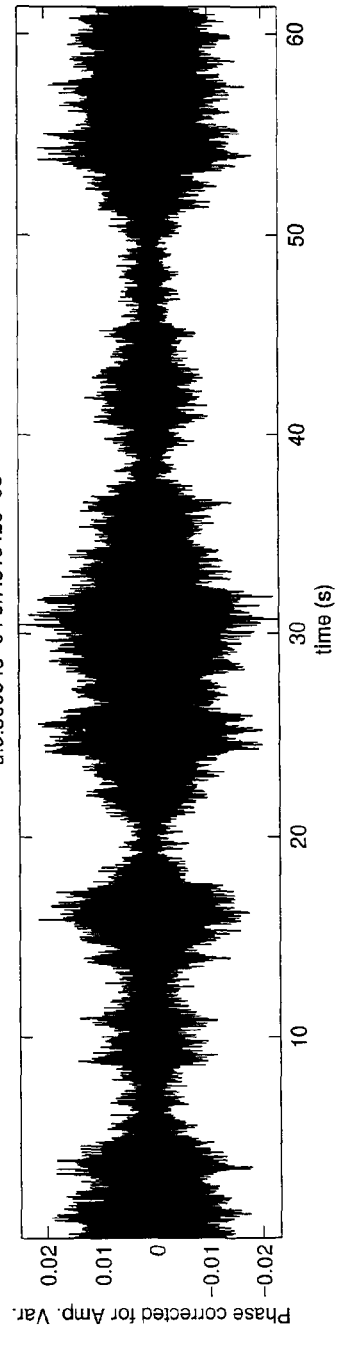

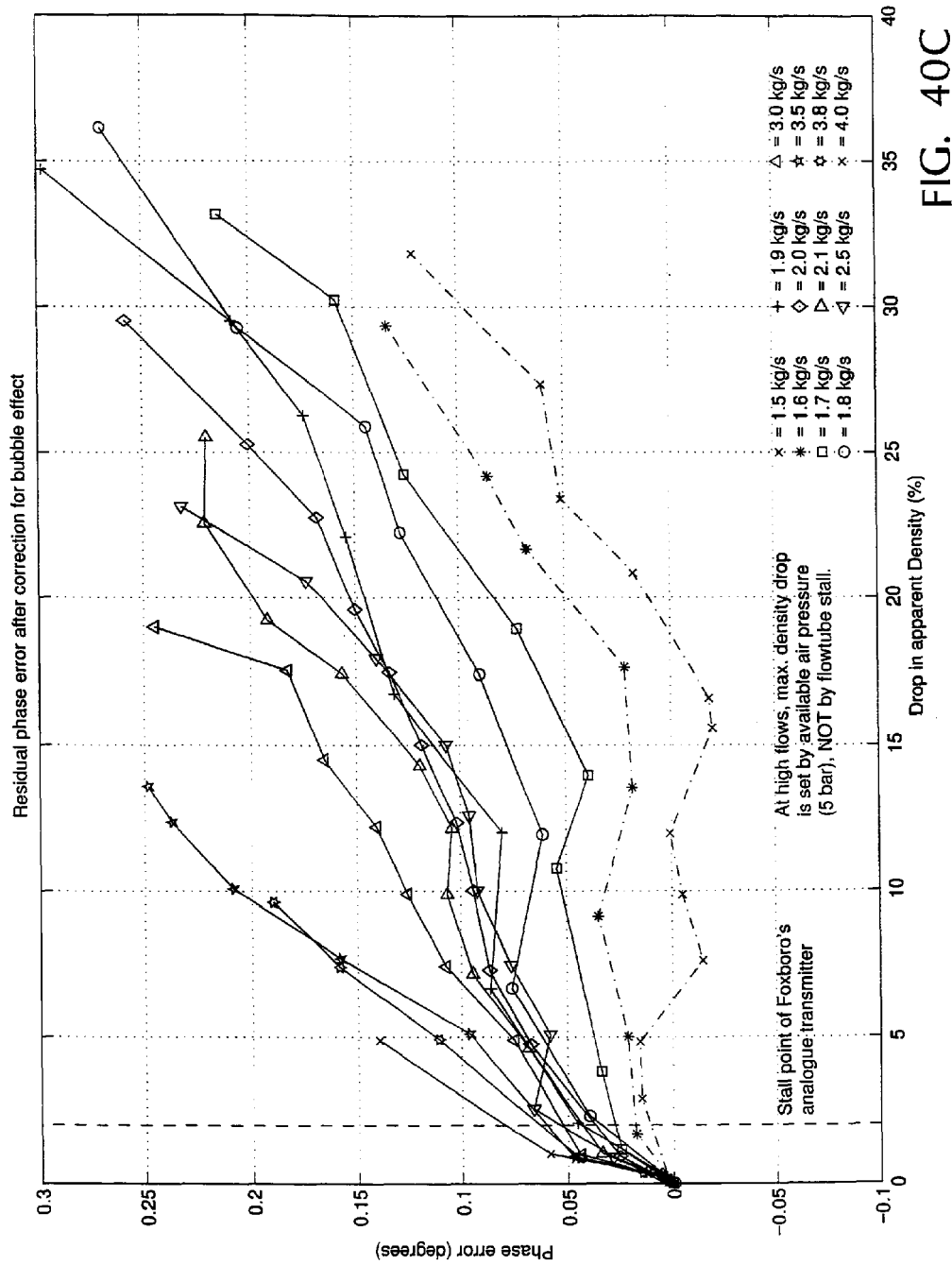

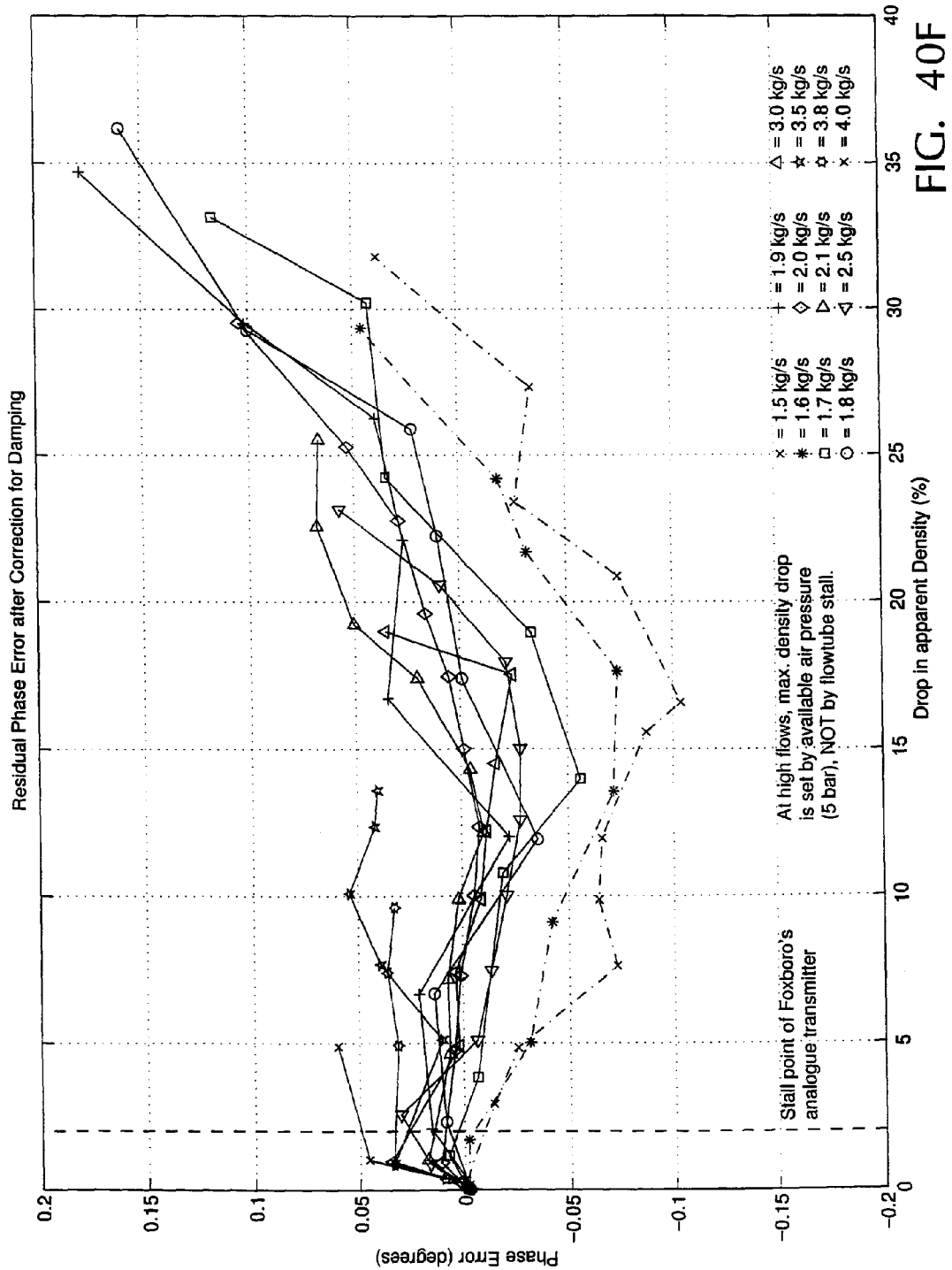

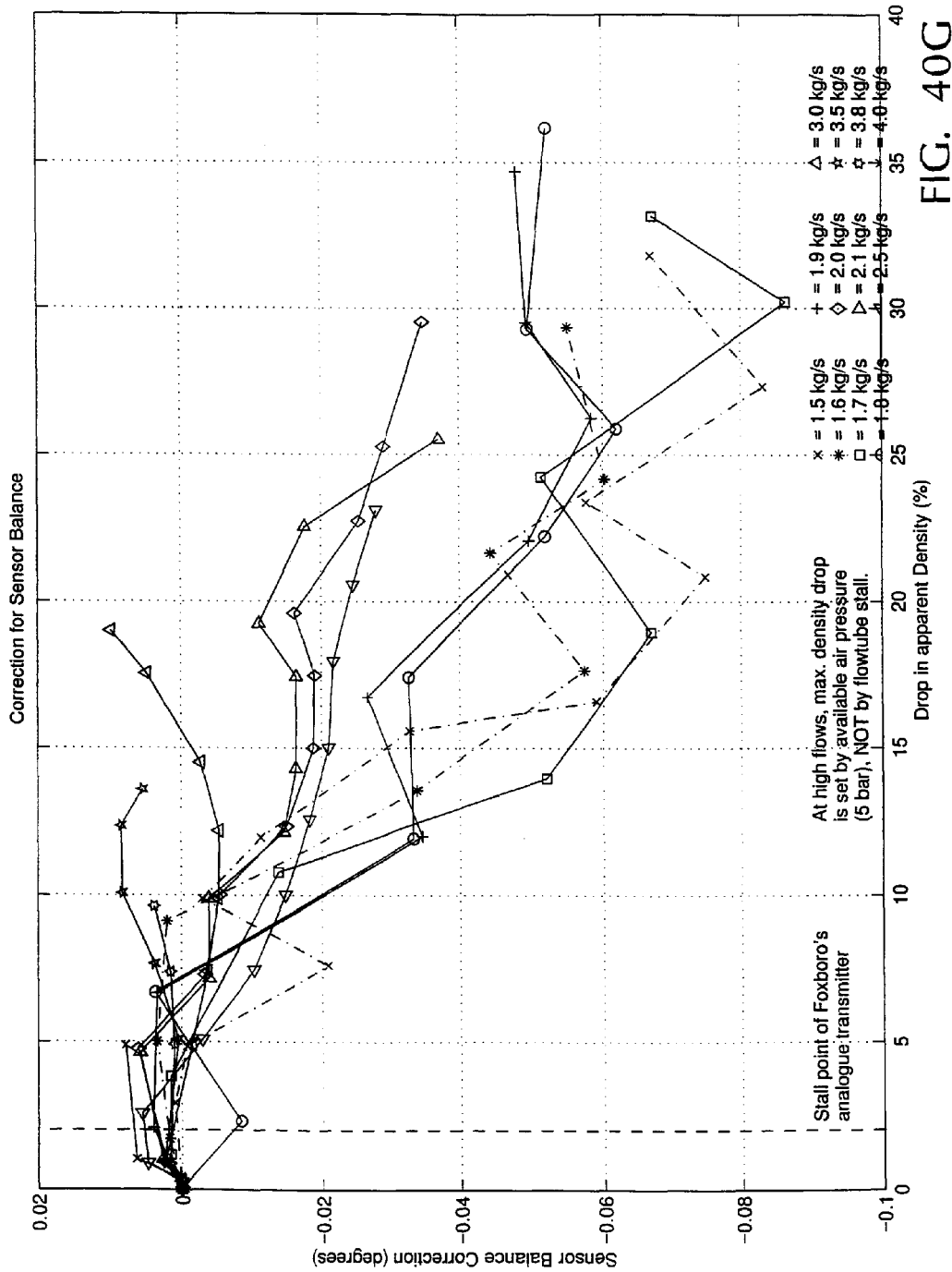

FPGA

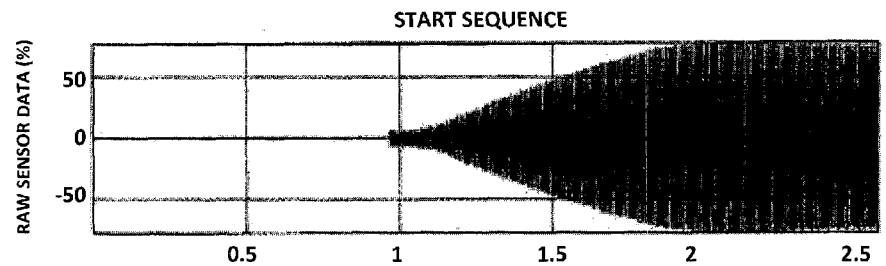
FIG. 65A
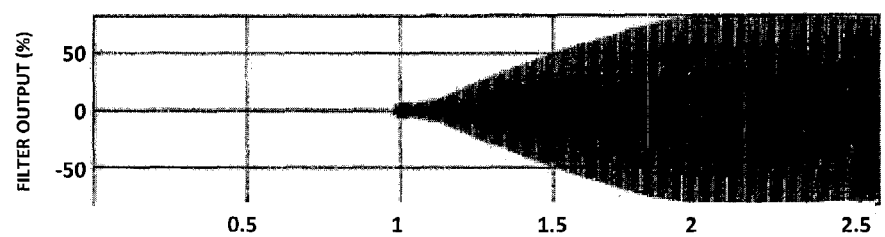
FIG. 65B
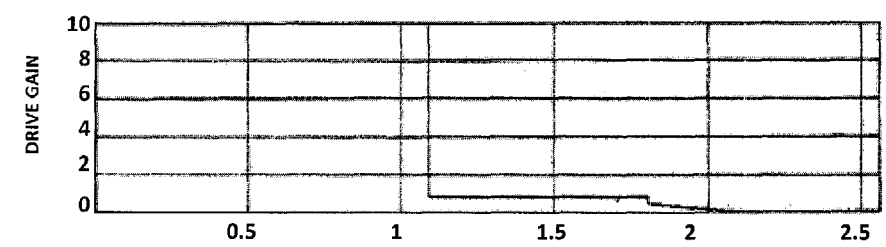
FIG. 65C
FIG. 65D
FIG. 65E
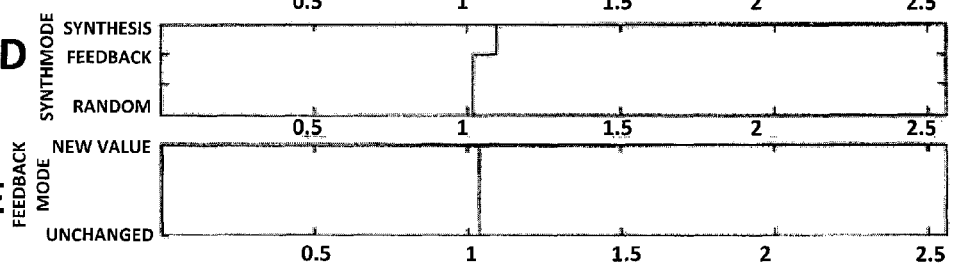
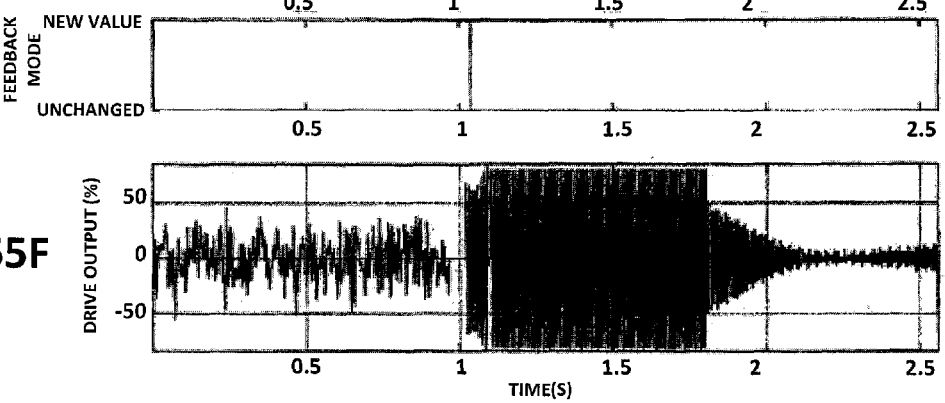
FIG. 65F

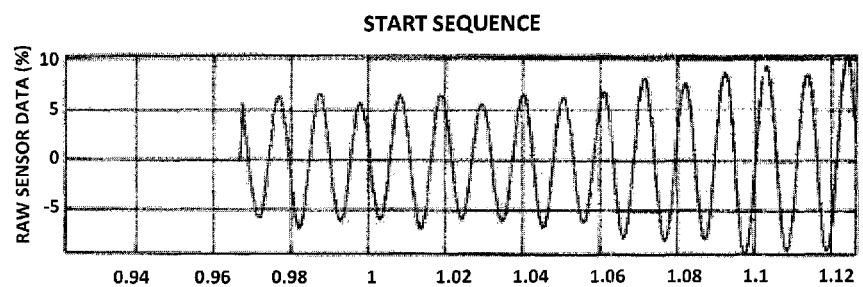
FIG. 66A
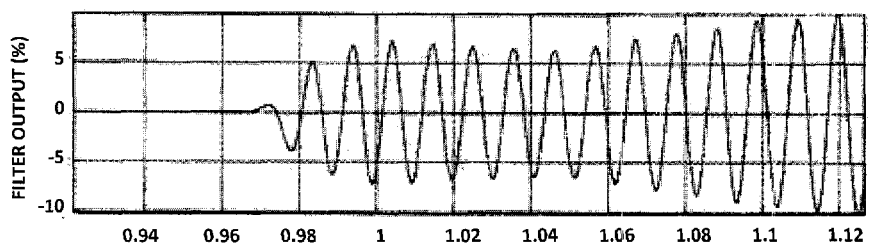
FIG. 66B
FIG. 66C
FIG. 66D
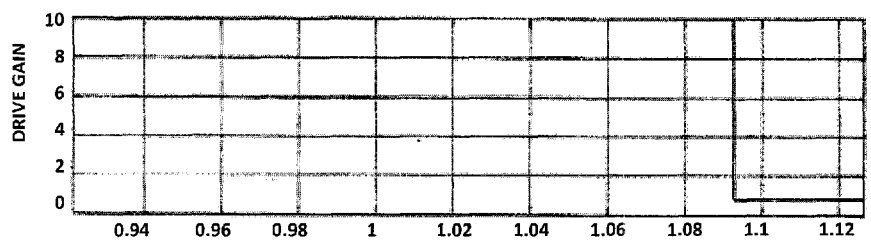
FIG. 66E
FIG. 66F
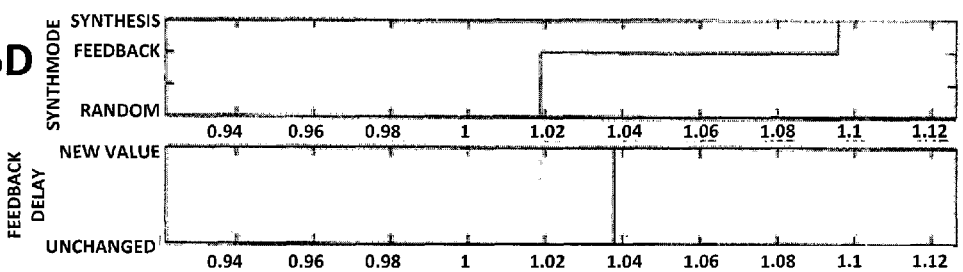
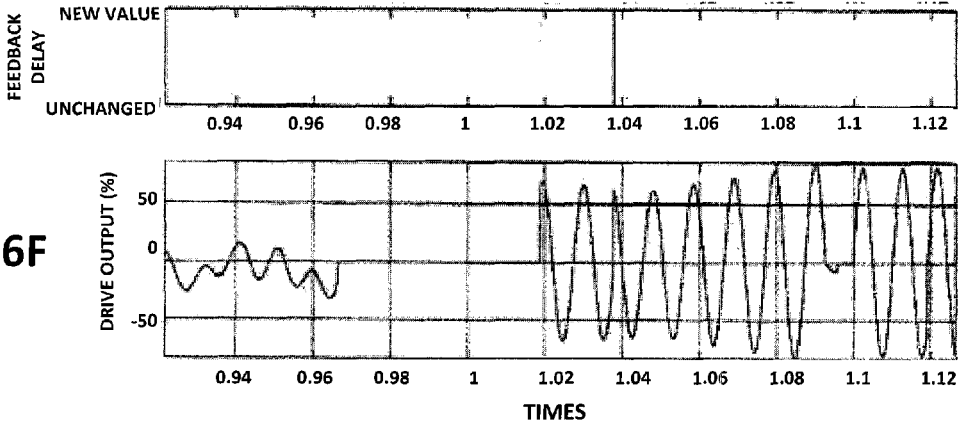

DRIVE TECHNIQUES FOR A DIGITAL FLOWMETER

CROSS-REFERENCE TO RELATED APPLICATIONS

This application is a continuation-in-part application of U.S. application Ser. No. 12/367,203, filed Feb. 6, 2009, titled STARTUP TECHNIQUES FOR A DIGITAL FLOWMETER, which is a continuation of U.S. application Ser. No. 11/458,251, filed Jul. 18, 2006, titled STARTUP TECHNIQUES FOR A DIGITAL FLOWMETER, now U.S. Pat. No. 7,505,854, which is a continuation of U.S. patent application Ser. No. 11/168,568, filed Jun. 29, 2005, titled STARTUP AND OPERATIONAL TECHNIQUES FOR A DIGITAL FLOWMETER, now U.S. Pat. No. 7,146,280, which is a continuation U.S. application Ser. No. 10/402,131, filed on Mar. 31, 2003, titled STARTUP AND OPERATIONAL TECHNIQUES FOR A DIGITAL FLOWMETER, now U.S. Pat. No. 6,950,760, which is a continuation-in-part application of U.S. application Ser. No. 10/400,922, filed on Mar. 28, 2003, now abandoned. Both U.S. application Ser. No. 10/402,131 and U.S. application Ser. No. 10/400,922 claim priority to U.S. Provisional Application Ser. No. 60/368,153, filed Mar. 29, 2002. This application is also a continuation-in-part application of U.S. application Ser. No. 11/930,936, filed Oct. 31, 2007, titled DIGITAL FLOWMETER, which is a continuation of U.S. application Ser. No. 11/555,033, filed Oct. 31, 2006, now U.S. Pat. No. 7,571,062, titled DIGITAL FLOWMETER, which is a continuation of U.S. application Ser. No. 11/130,233, filed May 17, 2005, now U.S. Pat. No. 7,136,761, titled DIGITAL FLOWMETER, which is a continuation of U.S. application Ser. No. 10/637,620, filed Aug. 11, 2003, now U.S. Pat. No. 6,917,887, titled DIGITAL FLOWMETER, which is a continuation of U.S. application Ser. No. 09/931,057, filed Aug. 17, 2001, now U.S. Pat. No. 6,754,594, titled DIGITAL FLOWMETER, which is a continuation of U.S. application Ser. No. 09/931,002, filed Aug. 17, 2001, now U.S. Pat. No. 6,507,791, titled DIGITAL FLOWMETER, which is a continuation of U.S. application Ser. No. 09/111,739, filed on Jul. 8, 1998, now U.S. Pat. No. 6,311,136, titled DIGITAL FLOWMETER, which claims priority from U.S. Provisional Application Ser. No. 60/066,554, filed on Nov. 26, 1997.

TECHNICAL FIELD

The disclosure relates to flowmeters.

BACKGROUND

Flowmeters provide information about materials being transferred through a conduit. For example, mass flowmeters provide a direct measurement of the mass of material being transferred through a conduit. Similarly, density flowmeters, or densitometers, provide a measurement of the density of material flowing through a conduit. Mass flowmeters also may provide a measurement of the density of the material.

Coriolis-type mass flowmeters are based on the Coriolis effect, in which material flowing through a rotating conduit becomes a radially traveling mass that is affected by a Coriolis force and therefore experiences an acceleration. Many Coriolis-type mass flowmeters induce a Coriolis force by sinusoidally oscillating a conduit about a pivot axis orthogonal to the length of the conduit. In such mass flowmeters, the Coriolis reaction force experienced by the traveling fluid mass is transferred to the conduit itself and is manifested as a deflection or offset of the conduit in the direction of the Coriolis force vector in the plane of rotation.

Energy is supplied to the conduit by a driving mechanism that applies a periodic force to oscillate the conduit. One type of driving mechanism is an electromechanical driver that imparts a force proportional to an applied current. In an oscillating flowmeter, the applied current is periodic, and is generally sinusoidal. The period of the input current may be chosen so that the motion of the conduit matches a resonant mode of vibration of the conduit, which generally reduces the energy needed to sustain oscillation. An oscillating flowmeter may use a feedback loop in which a sensor signal that carries instantaneous frequency and phase information related to oscillation of the conduit is amplified and fed back to the conduit using the electromechanical driver. Other types of driving mechanisms, such as an electromechanical driver that imparts a force proportional to an applied voltage, also may be used.

Many conventional flowmeters are essentially analog devices in which a sensor signal frequency and phase information are amplified, for example by an analog op-amp, before being fed back into the electromechanical driver. In such flowmeters, there may be little or no phase delay between the signal(s) being sensed at the conduit and the driving signal being applied to the conduit at the other end of the feedback loop. Such analog flowmeters may be prone to the introduction of high harmonics of a desired oscillation frequency, particularly during start-up operations when an estimated drive signal is applied to the conduit to begin the feedback loop described above. Moreover, analog flowmeters may be prone to gain saturation of the op amp, which may occur during "two-phase flow" through the conduit (e.g., an air pocket or entrained air in a flow of liquid) and which can lead to a damping effect on the conduit, or a stalling of the entire oscillation process. Finally, analog flowmeters may be prone to typical shortcomings of analog circuitry, e.g., relatively low precision and high noise measurements.

In contrast to analog flowmeters, digital flowmeters also exist. For example, U.S. Pat. No. 6,311,136 and U.S. Pat. No. 6,507,791, which are hereby incorporated by reference, disclose the use of a digital flowmeter and related technology. Such digital flowmeters may have various advantages over analog flowmeters; for example, they may be more precise in their measurements, with less noise, and may be capable of enabling a wide range of positive and negative gains at the driver circuitry. Such digital flowmeters are thus advantageous in a variety of settings. For example, U.S. Pat. No. 6,505,519 discloses the use of a wide gain range, and/or the use of negative gain, to prevent stalling and to more accurately exercise control of the flowtube, even during difficult conditions such as two-phase flow.

SUMMARY

This disclosure relates to a digital flowmeter, such as a digital mass flowmeter, that uses a control and measurement system to control oscillation of the conduit and to generate mass flow and density measurements. Sensors connected to the conduit supply signals to the control and measurement system. The control and measurement system processes the signals to produce a measurement of mass flow and uses digital signal processing to generate a signal for driving the conduit. The drive signal then is converted to a force that induces oscillation of the conduit.

The digital mass flowmeter provides a number of advantages over traditional, analog approaches. From a control perspective, use of digital processing techniques permits the application of precise, sophisticated control algorithms that, relative to traditional analog approaches, provide greater responsiveness, accuracy and adaptability.

The digital control system also permits the use of negative gain in controlling oscillation of the conduit. Thus, drive signals that are 180° out of phase with conduit oscillation may be used to reduce the amplitude of oscillation. The practical implications of this are important, particularly in high and variable damping situations where a sudden drop in damping can cause an undesirable increase in the amplitude of oscillation. One example of a variable damping situation is when aeration occurs in the material flowing through the conduit.

The ability to provide negative feedback also is important when the amplitude of oscillation is controlled to a fixed setpoint that can be changed under user control. With negative feedback, reductions in the oscillation setpoint can be implemented as quickly as increases in the setpoint. By contrast, an analog meter that relies solely on positive feedback must set the gain to zero and wait for system damping to reduce the amplitude to the reduced setpoint.

From a measurement perspective, the digital mass flowmeter can provide high information bandwidth. For example, a digital measurement system may use analog-to-digital converters operating at eighteen bits of precision and sampling rates of 55 kHz. The digital measurement system also may use sophisticated algorithms to filter and process the data, and may do so starting with the raw data from the sensors and continuing to the final measurement data. This permits extremely high precision, such as, for example, phase precision to five nanoseconds per cycle. Digital processing starting with the raw sensor data also allows for extensions to existing measurement techniques to improve performance in non-ideal situations, such as by detecting and compensating for time-varying amplitude, frequency, and zero offset.

The control and measurement improvements interact to provide further improvements. For example, control of oscillation amplitude is dependent upon the quality of amplitude measurement. Under normal conditions, the digital mass flowmeter may maintain oscillation to within twenty parts per million of the desired setpoint. Similarly, improved control has a positive benefit on measurement. Increasing the stability of oscillation will improve measurement quality even for meters that do not require a fixed amplitude of oscillation (i.e., a fixed setpoint). For example, with improved stability, assumptions used for the measurement calculations are likely to be valid over a wider range of conditions.

The digital mass flowmeter also permits the integration of entirely new functionality (e.g., diagnostics) with the measurement and control processes. For example, algorithms for detecting the presence of process aeration can be implemented with compensatory action occurring for both measurement and control if aeration is detected.

Other advantages of the digital mass flowmeter result from the limited amount of hardware employed, which makes the meter simple to construct, debug, and repair in production and in the field. Quick repairs in the field for improved performance and to compensate for wear of the mechanical components (e.g., loops, flanges, sensors and drivers) are possible because the meter uses standardized hardware components that may be replaced with little difficulty, and because software modifications may be made with relative ease. In addition, integration of diagnostics, measurement, and control is simplified by the simplicity of the hardware and the level of functionality implemented in software. New functionality, such as low power components or components with improved performance, can be integrated without a major redesign of the overall control system.

In one general aspect, a digital flowmeter includes a vibratable conduit, a driver connected to the conduit and operable to impart motion to the conduit, and a sensor connected to the conduit and operable to sense the motion of the conduit. A control and measurement system connected to the driver and the sensor includes circuitry that receives a sensor signal from the sensor, generates a drive signal based on the sensor signal using digital signal processing, supplies the drive signal to the driver, and generates a measurement of a property of material flowing through the conduit based on the signal from the sensor.

Embodiments may include one or more of the following features. The meter may include a second sensor connected to the conduit and operable to sense the motion of the conduit. In this case, the control and measurement system is connected to the second sensor and receives a second sensor signal from the second sensor, generates the drive signal based on the first and second sensor signals, and generates the measurement of the property of material flowing through the conduit based on the first and second sensor signals. The control and measurement system may digitally combine the first and second sensor signals and generate the drive signal based on the combination of the sensor signals.

The control and measurement system may generate different drive signals for the two drivers. The drive signals may have, for example, different frequencies or amplitudes.

The digital flowmeter also may include circuitry for measuring current supplied to the driver. The circuitry may include a resistor in series with the driver and an analog-to-digital converter in parallel with the resistor and configured to measure a voltage across the resistor, to convert the measured voltage to a digital value, and to supply the digital value to the control and measurement system.

The digital flowmeter also may include a first pressure sensor connected to measure a first pressure at an inlet to the conduit and a second pressure sensor connected to measure a second pressure at an outlet of the conduit. Analog-to-digital converters may be connected and configured to convert signals produced by the first pressure sensor and the second pressure sensor to digital values and to supply the digital values to the control and measurement system. Temperature sensors may be connected to measure temperatures at the inlet and outlet of the conduit.

The control and measurement system may generate the measurement of the property by estimating a frequency of the first sensor signal, calculating a phase difference using the first sensor signal, and generating the measurement using the calculated phase difference. The control and measurement system may compensate for amplitude differences in the sensor signals by adjusting the amplitude of one of the sensor signals. For example, the control and measurement system may multiply the amplitude of one of the sensor signals by a ratio of the amplitudes of the sensor signals.

When the sensor signal is generally periodic, the control and measurement system may process the sensor signal in sets. Each set may include data for a complete cycle of the periodic sensor signal, and consecutive sets may include data for overlapping cycles of the periodic sensor signal. The control and measurement system may estimate an end point of a cycle using a frequency of a previous cycle.

The control and measurement system may analyze data for a cycle to determine whether the cycle merits further processing. For example, the system may determine that a cycle does not merit further processing when data for the cycle does not conform to expected behavior for the data, where the expected behavior may be based on one or more parameters of a previous cycle. In one implementation, the system determines that a cycle does not merit further processing when a frequency for the cycle differs from a frequency for the previous cycle by more than a threshold amount. The system may determine whether the frequencies differ by comparing values at certain points in the cycle to values that would occur if the frequency for the cycle equaled the frequency for the previous cycle.

The control and measurement system may determine a frequency of the sensor signal by detecting zero-crossings of the sensor signal and counting samples between zero crossings. The system also may determine a frequency of the sensor signal using an iterative curve fitting technique.

The control and measurement system may determine an amplitude of the sensor signal using Fourier analysis, and may use the determined amplitude in generating the drive signal.

The control and measurement system may determine a phase offset for each sensor signal and may determine the phase difference by comparing the phase offsets. The system also may determine the phase difference using Fourier analysis. The control and measurement system may determine a frequency, amplitude and phase offset for each sensor signal, and may scale the phase offsets to an average of the frequencies of the sensor signals. The control and measurement system may calculate the phase difference using multiple approaches and may select a result of one of the approaches as the calculated phase difference.

The control and measurement system may combine the sensor signals to produce a combined signal and may generate the drive signal based on the combined signal. For example, the control and measurement system may sum the sensor signals to produce the combined signal and may generate the drive signal by applying a gain to the combined signal.

In general, the control and measurement system may initiate motion of the conduit by using a first mode of signal generation to generate the drive signal, and may sustain motion of the conduit using a second mode of signal generation to generate the drive signal. The first mode of signal generation may be synthesis of a periodic signal having a desired property, such as a desired initial frequency of conduit vibration, and the second mode of signal generation may use a feedback loop including the sensor signal.

In other instances, the first mode of signal generation may include use of a feedback loop including the sensor signal and the second mode of signal generation may include synthesis of a periodic signal having a desired property. For example, the control and measurement system may generate the drive signal by applying a large gain to the combined signal to initiate motion of the conduit and generating a periodic signal having a phase and frequency based on a phase and frequency of a sensor signal as the drive signal after motion has been initiated. The desired property of the synthesized signal may be a frequency and a phase corresponding to a frequency and a phase of the sensor signal.

The control and measurement system generates an adaptable, periodic drive signal. For example, the meter may include positive and negative direct current sources connected between the control and measurement system and the driver, and the control and measurement system may generate the drive signal by switching the current sources on and off at intervals having a phase and frequency based on the sensor signal. The control and measurement system may generate the drive signal by synthesizing a sine wave having a property corresponding to a property of the sensor signal, such as a phase and a frequency corresponding to a phase and a frequency of the sensor signal.

The control and measurement system may digitally generate a gain for use in generating the drive signal based on one or more properties of the sensor signal. For example, the control and measurement system may digitally generate the gain based on an amplitude of the sensor signal.

The driver may be operable to impart an oscillating motion to the conduit. The control and measurement system also may digitally implement a PI control algorithm to regulate the amplitude of conduit oscillation. The control and measurement system also may digitally generate the drive signal based on the sensor signal so as to maintain an amplitude of oscillation of the conduit at a user-controlled value. In support of this, the control and measurement system may generate a negative drive signal that causes the driver to resist motion of the conduit when the amplitude of oscillation exceeds the user-controlled value and a positive drive signal that causes the driver to impart motion to the conduit when the amplitude of oscillation is less than the user-controlled value.

The control and measurement system may include a controller that generates a gain signal based on the sensor signal and a multiplying digital-to-analog converter connected to the controller to receive the gain signal and generate the drive signal based on the gain signal.

When the digital flowmeter includes a second sensor connected to the conduit and operable to sense the motion of the conduit, the control and measurement system may include a controller that generates the measurement, a first analog-to-digital converter connected between the first sensor and the controller to provide a first digital sensor signal to the controller, and a second analog-to-digital converter connected between the second sensor and the controller to provide a second digital sensor signal to the controller. The controller may combine the digital sensor signals to produce a combined signal and to generate a gain signal based on the first and second digital sensor signals. The control and measurement system also may include a multiplying digital-to-analog converter connected to receive the combined signal and the gain signal from the controller to generate the drive signal as a product of the combined signal and the gain signal.

The control and measurement system may selectively apply a negative gain to the sensor signal to reduce motion of the conduit.

The control and measurement system also may compensate for zero offset in the sensor signal. The zero offset may include a component attributable to gain variation and a component attributable to gain nonlinearity, and the control and measurement system may separately compensate for the two components. The control and measurement system may compensate for zero offset by generating one or more correction factors and modifying the sensor signal using the correction factors.

The control and measurement system may calculate phase offsets for the first and second sensor signals. The phase offset may be defined as a difference between a zero-crossing point of a sensor signal and a point of zero phase for a component of the sensor signal corresponding to a fundamental frequency of the sensor signal. The control and measurement system may combine the calculated phase offsets to produce a phase difference.

The control and measurement system may generate the measurement of the property by estimating a frequency of the first sensor signal, estimating a frequency of the second sensor signal, with the frequency of the second sensor signal being different from the frequency of the first sensor signal, and calculating a phase difference between the sensor signals using the estimated frequencies.

When the sensor is a velocity sensor, the control and measurement system may estimate a frequency, amplitude, and phase of the sensor signal, and may correct the estimated frequency, amplitude, and phase to account for performance differences between a velocity sensor and an absolute position sensor. Instead of controlling the apparent amplitude of oscillation (i.e., the velocity of oscillation when the sensor is a velocity sensor), the system may control the true amplitude by dividing the sensor signal by the estimated frequency. This correction should provide improved amplitude control and noise reduction.

The control and measurement system may estimate a first parameter of the sensor signal, determine a rate of change of a second parameter, and correct the estimated first parameter based on the determined rate of change. For example, the system may correct an estimated frequency, amplitude, or phase of the sensor signal based on a determined rate of change of the frequency or amplitude of oscillation of the conduit. The system may perform separate corrections for each sensor signal.

The digital flowmeter may be a mass flowmeter and the property of material flowing through the conduit may be a mass flow rate. The digital flowmeter also may be a densitometer and the property of material flowing through the conduit may be a density of the material.

The control and measurement system may account for effects of aeration in the conduit by determining an initial mass flow rate, determining an apparent density of material flowing through the conduit, comparing the apparent density to a known density of the material to determine a density difference, and adjusting the initial mass flow rate based on the density difference to produce an adjusted mass flow rate. The system may further account for effects of aeration in the conduit by adjusting the adjusted mass flow rate to account for effects of damping. To further account for effects of aeration in the conduit, the system may adjust the adjusted mass flow rate based on differences between amplitudes of the first and second sensor signals.

The vibratable conduit may include two parallel planar loops. The sensor and driver may be connected between the loops.

The meter may include a power circuit that receives power on only a single pair of wires. The power circuit provides power to the digital control and measurement system and to the driver, and the digital control and measurement system is operable to transmit the measurement of the property of material flowing through the conduit on the single pair of wires. The power circuit may include a constant output circuit that provides power to the digital control and measurement system and drive capacitor that is charged by excess power from the two wires. The digital control and measurement system may discharge the drive capacitor to power the driver, and may monitor a charge level of the drive capacitor and discharge the drive capacitor after a charge level of the capacitor reaches a threshold level. The digital control and measurement system also may discharge the drive capacitor periodically and to perform bidirectional communications on the pair of wires.

The control and measurement system may collect a first data set for a period of the periodic signal and process the first data set to generate the drive signal and the measurement. The system may collect a second data set for a subsequent period of the sensor signal simultaneously with processing the first data set. The period corresponding to the first data set may overlap the period corresponding to the second data set.

The control and measurement system may control the drive signal to maintain an amplitude of the sensor signal at a fixed setpoint, reduce the fixed setpoint when the drive signal exceeds a first threshold level, and increase the fixed setpoint when the drive signal is less than a second threshold level and the fixed setpoint is less than a maximum permitted value for the setpoint. The first threshold level may be 95% or less of a maximum permitted drive signal.

The control and measurement system may perform an uncertainty analysis on the measurement. In this case, the control and measurement system may transmit the measurement and results of the uncertainty analysis to the control system.

The control and measurement system may use digital processing to adjust a phase of the drive signal to compensate for a time delay associated with the sensor and components connected between the sensor and the driver.

According to one general aspect, a first signal is input at a flowmeter, where the first signal corresponding to a vibration of a flowtube. A delay of the first signal that is associated with a digital element associated with the flowmeter is compensated for, and a second signal is output from the flowmeter that corresponds to the vibration of the flowtube.

Implementations may include one or more of the following features. For example, in inputting the first signal, a first sensor signal and a second sensor signal may be input, and the first signal may be calculated as a weighted sum of the first sensor signal and the second sensor signal.

The vibration may be at a natural resonant frequency of the flowtube. The digital element may include at least one of an analog-to-digital and digital-to-analog converter, and/or a filter. The filter may be implemented as a software filter, and may be an elliptical filter implemented in a software routine.

In compensating for the delay of the first signal, the first signal may be buffered at a buffer and the buffer may store a first cycle and a second cycle of the first signal. A value may be selected from the first cycle of the first signal, and the value may be output from the buffer. In this case, outputting the second signal from the flowmeter may include initiating a third signal beginning with the value, passing the third signal through the digital element, and outputting the second signal from the digital element.

In inputting the first signal, the first signal may be filtered to obtain a filtered signal, wherein the filtered signal may substantially reduce components of the first signal having a frequency outside of a pre-determined range from a resonant frequency of the flowtube. In this case, the components may include harmonics of the first signal. Also, the second signal may be synthesized to be in phase with the first signal, perhaps as a sine wave or a plurality of sinewaves having individually-controlled characteristics.

In compensating for the delay of the first signal, a first pre-determined marker on the filtered signal may be detected, an actual frequency of the filtered signal may be calculated, based on samples associated with the filtered signal, and a total wait time for outputting the second signal may be waited, where the total wait time may be based on the actual frequency. The first pre-determined marker may be a negative-to-positive zero-crossing of the filtered signal. Waiting the total wait time may include calculating a count number of samples of the filtered signal, detecting a second pre-determined marker on the filtered signal, and waiting the count number after the second marker. The second pre-determined marker may be a negative-to-positive zero-crossing of the filtered signal.

Waiting the total wait time may include calculating a count number of samples of the filtered signal, and waiting the count number after the first marker. Outputting the second signal from the flowmeter may include waiting the total wait time, and synthesizing the second signal.

In compensating for the delay of the first signal, the second signal may be input from an output of the flowmeter to an input of the flowmeter, the second signal may be compared to the first signal to determine a phase difference between the second signal and the first signal, and a revised second signal may be output from the flowmeter that is adjusted from the second signal, based on the phase difference. In this case, the first signal may include a first sensor signal associated with a first sensor and a second sensor signal associated with a second sensor, and the second signal may include a first drive signal associated with a first driver and a second drive signal associated with a second driver. In comparing the second signal to the first signal, the first sensor signal and the first drive signal may be received at a first multiplexer, a first multiplexed signal may be output from the first multiplexer, the second sensor signal and the second drive signal may be received at a second multiplexer, a second multiplexed signal may be output from the second multiplexer, and the first multiplexed signal and the second multiplexed signal may be compared, to thereby determine the phase difference.

In inputting the first signal at the flowmeter, measurements associated with a material within the flowtube may be computed in parallel with the compensating for the delay of the first signal.

According to another general aspect, a digital flowmeter includes a vibratable flowtube, a sensor connected to the flowtube and operable to relay information about a motion of the flowtube by way of a sensor signal, a driver connected to the flowtube and operable to impart motion to the flowtube by way of a drive signal, and a digital control and measurement system connected to the driver and the sensor, the digital control and measurement system comprising circuitry to maintain the sensor signal and the drive signal substantially in phase with one another.

Implementations may include one or more of the following features. For example, the sensor signal may include a weighted sum of a first sensor signal and a second sensor signal. The digital control and measurement system may include analog-to-digital or digital-to-analog converters, or a filter.

The digital control and measurement system may include a buffer operable to store a first cycle and a second cycle of the sensor signal, and a processor operable to select a value from the first cycle of the sensor signal. In this case, the digital control and measurement system may be further operable to initiate a digital drive signal beginning with the value, convert the digital drive signal to an analog drive signal, and output the analog drive signal as the drive signal.

A filter operable to filter the sensor signal to obtain a filtered signal may be included, wherein the filtered signal does not include signals having a frequency outside of a pre-determined range from a resonant frequency of the flowtube. In this case, the digital control and measurement system may be further operable to synthesize the drive signal as a sine wave.

Further, the digital control and measurement system may be further operable to detect a first pre-determined marker on the filtered signal, calculate an actual frequency of the filtered signal, based on samples associated with the filtered signal, and wait a total wait time for outputting the second signal, based on the actual frequency. In this case, the first pre-determined marker may be a negative-to-positive zero-crossing of the filtered signal.

The digital control and measurement system may determine the total wait time by calculating a count number of cycles of the filtered signal, detecting a second pre-determined marker on the filtered signal, and waiting the count number after the second marker. In this case, the second pre-determined marker is a negative-to-positive zero-crossing of the filtered signal.

The digital control and measurement system may be operable to compare the sensor signal and the drive signal, to thereby determine a phase difference therebetween, and may be operable to cause the driver to apply the drive signal with a phase altered by an amount determined by the phase difference. In this case, the digital control and measurement system may include a multiplexer that is operable to input the sensor signal and the drive signal and output a combined signal, wherein the combined signal may be analyzed by the digital control and measurement system to determine the phase difference.

According to another general aspect, a digital flowmeter includes a vibratable flowtube, a driver connected to the flowtube and operable to impart motion to the flowtube by way of an analog drive signal, a sensor connected to the flowtube and operable to sense a motion of the flowtube by way of an analog sensor signal, and a digital transmitter connected to the sensor and the driver, the digital transmitter including a digital component and operable to perform signal processing related to the analog sensor signal and the analog drive signal, wherein the signal processing compensates for a delay associated with the digital component to ensure that the analog sensor signal and the analog drive signal are substantially in phase with one another.

Implementations may include one or more of the following features. For example, the digital transmitter may include an analog-to-digital converter operable to convert the analog sensor signal into a first digital signal, and a digital-to-analog converter operable to convert a second digital signal into the analog drive signal. In this case, the digital transmitter may include a digital controller operable to input the first digital signal, perform the signal processing thereon, and output the second digital signal.

The digital controller further may include a buffer operable to buffer the first digital signal, and the signal processing may include selecting a value of the first digital signal from the buffer for outputting as a beginning of the second digital signal. The digital controller may include a filter operable to filter the analog sensor signal, and the digital transmitter may include a synthesizer operable to synthesize the second digital signal. In this case, the digital transmitter may be operable to determine a filter delay associated with the filter, and the synthesizer may be operable to synthesize the second digital signal with a timing that reflects the filter delay.

The digital transmitter may be operable to compare the analog sensor signal and the analog drive signal, to thereby determine a phase difference therebetween, and may be further operable to cause the driver to alter a phase of the analog drive signal by an amount determined by the phase difference.

The details of one or more implementations are set forth in the accompanying drawings and the description below. Other features will be apparent from the description and drawings, and from the claims.

DESCRIPTION OF DRAWINGS

FIGS. 2A and 2B are perspective and side views of mechanical components of a mass flowmeter.

FIGS. 11A-11D, 12A-12D, and 13A-13D illustrate drive and sensor voltages at system startup.

FIGS. 21A and 21B are graphs of phase measurements.

FIGS. 27A-35E are graphs illustrating application of the procedure of FIG. 29.

FIGS. 40A-40H are graphs illustrating correction for aeration.

FIGS. 65A-65F describe a start sequence for one implementation of a digital flowmeter as applied to a bent flowtube.

FIGS. 66A-66F illustrate the start sequence of FIGS. 65A-65F in more detail.

Like reference symbols in the various drawings indicate like elements.

DETAILED DESCRIPTION

Figure 1:
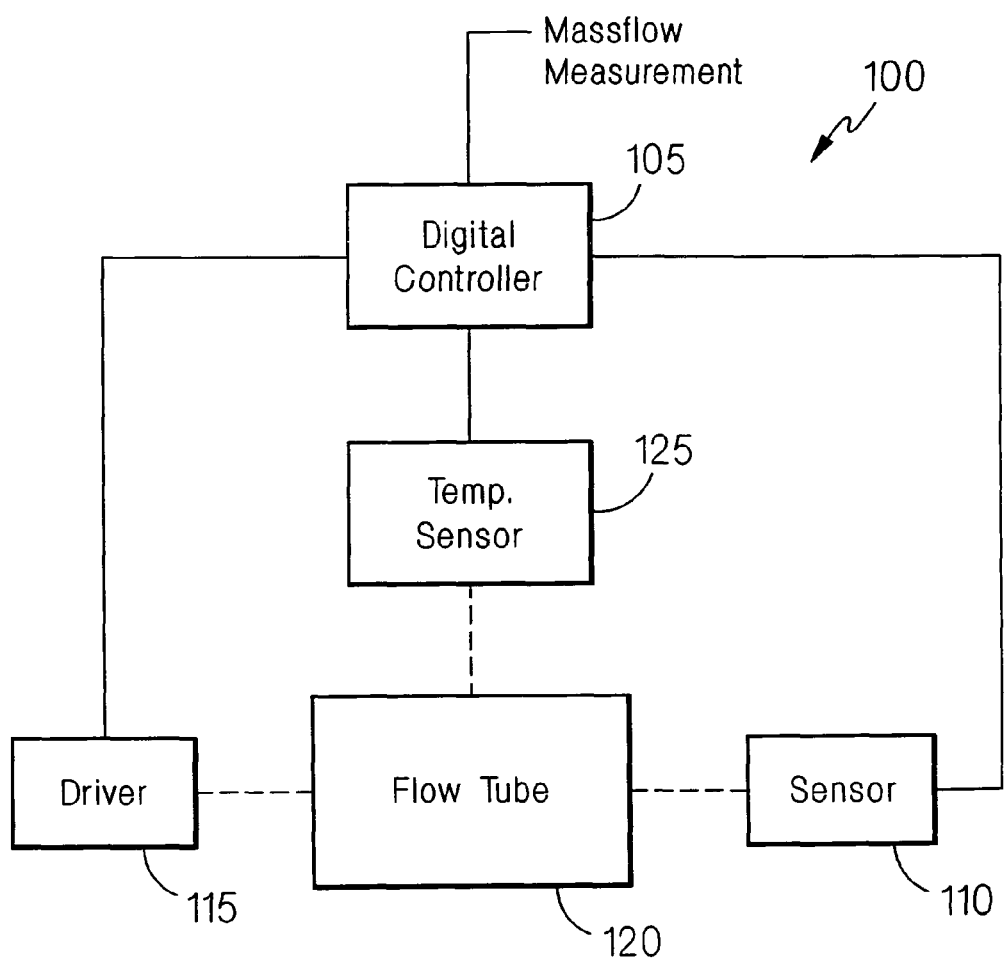
FIG. 1 is a block diagram of a digital mass flowmeter.

Referring to FIG. 1, a digital mass flowmeter 100 includes a digital controller 105, one or more motion sensors 110, one or more drivers 115, a conduit 120 (also referred to as a flowtube), and a temperature sensor 125. The digital controller 105 may be implemented using one or more of, for example, a processor, a field-programmable gate array, an ASIC, other programmable logic or gate arrays, or programmable logic with a processor core. The digital controller generates a measurement of mass flow through the conduit 120 based at least on signals received from the motion sensors 110. The digital controller also controls the drivers 115 to induce motion in the conduit 120. This motion is sensed by the motion sensors 110.

Mass flow through the conduit 120 is related to the motion induced in the conduit in response to a driving force supplied by the drivers 115. In particular, mass flow is related to the phase and frequency of the motion, as well as to the temperature of the conduit. The digital mass flowmeter also may provide a measurement of the density of material flowing through the conduit. The density is related to the frequency of the motion and the temperature of the conduit. Many of the described techniques are applicable to a densitometer that provides a measure of density rather than a measure of mass flow.

The temperature in the conduit, which is measured using the temperature sensor 125, affects certain properties of the conduit, such as its stiffness and dimensions. The digital controller compensates for these temperature effects. The temperature of the digital controller 105 affects, for example, the operating frequency of the digital controller. In general, the effects of controller temperature are sufficiently small to be considered negligible. However, in some instances, the digital controller may measure the controller temperature using a solid state device and may compensate for effects of the controller temperature.

A. Mechanical Design

In one implementation, as illustrated in FIGS. 2A and 2B, the conduit 120 is designed to be inserted in a pipeline (not shown) having a small section removed or reserved to make room for the conduit. The conduit 120 includes mounting flanges 12 for connection to the pipeline, and a central manifold block 16 supporting two parallel planar loops 18 and 20 that are oriented perpendicularly to the pipeline. An electromagnetic driver 46 and a sensor 48 are attached between each end of loops 18 and 20. Each of the two drivers 46 corresponds to a driver 115 of FIG. 1, while each of the two sensors 48 corresponds to a sensor 120 of FIG. 1.

The drivers 46 on opposite ends of the loops are energized with current of equal magnitude but opposite sign (i.e., currents that are 180° out-of-phase) to cause straight sections 26 of the loops 18, 20 to rotate about their co-planar perpendicular bisector 56, which intersects the tube at point P (FIG. 2B). Repeatedly reversing (e.g., controlling sinusoidally) the energizing current supplied to the drivers causes each straight section 26 to undergo oscillatory motion that sweeps out a bow tie shape in the horizontal plane about line 56-56, the axis of symmetry of the loop. The entire lateral excursion of the loops at the lower rounded turns 38 and 40 is small, on the order of 1/16 of an inch for a two foot long straight section 26 of a pipe having a one inch diameter. The frequency of oscillation is typically about 80 to 90 Hertz.

B. Conduit Motion

Figure 3C:
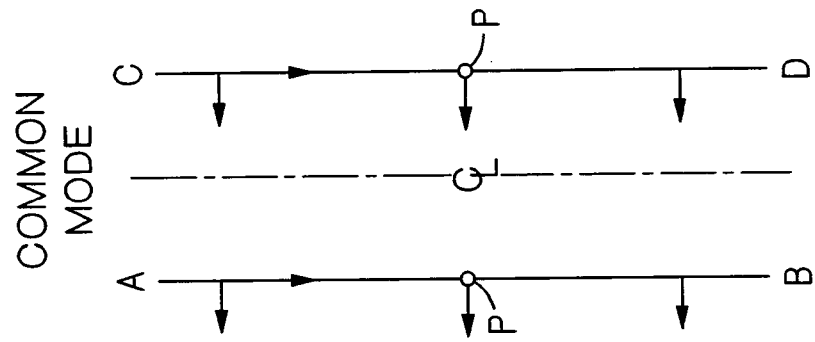
FIGS. 3A-3C are schematic representations of three modes of motion of the flowmeter of FIG. 1.
Figure 3B:
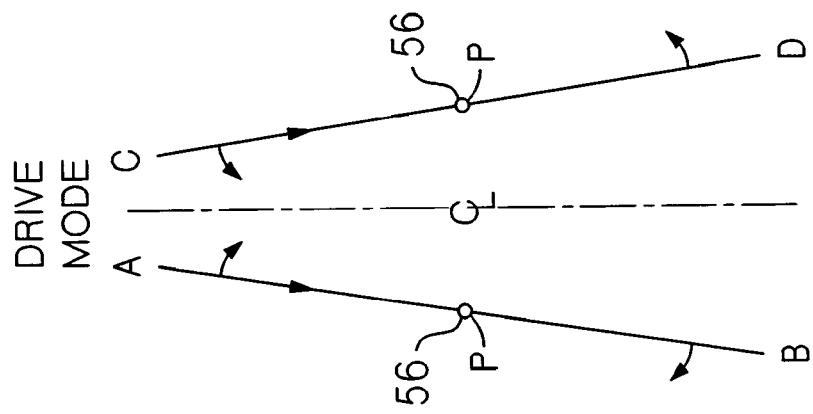
Figure 3A:
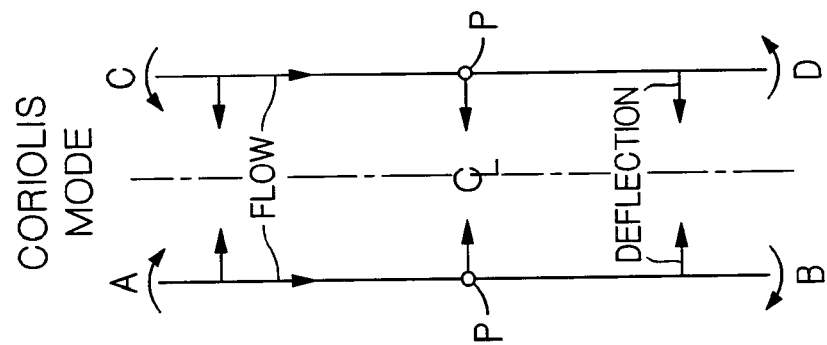

The motion of the straight sections of loops 18 and 20 are shown in three modes in FIGS. 3A, 3B and 3C. In the drive mode shown in FIG. 3B, the loops are driven 180° out-of-phase about their respective points P so that the two loops rotate synchronously but in the opposite sense. Consequently, respective ends such as A and C periodically come together and go apart.

The drive motion shown in FIG. 3B induces the Coriolis mode motion shown in FIG. 3A, which is in opposite directions between the loops and moves the straight sections 26 slightly toward (or away) from each other. The Coriolis effect is directly related to mvW, where m is the mass of material in a cross section of a loop, v is the velocity at which the mass is moving (the volumetric flow rate), W is the angular velocity of the loop ($W=W_o \sin \omega t$), and mv is the mass flow rate. The Coriolis effect is greatest when the two straight sections are driven sinusoidally and have a sinusoidally varying angular velocity. Under these conditions, the Coriolis effect is 90° out-of-phase with the drive signal.

FIG. 3C shows an undesirable common mode motion that deflects the loops in the same direction. This type of motion might be produced by an axial vibration in the pipeline in the embodiment of FIGS. 2A and 2B because the loops are perpendicular to the pipeline.

The type of oscillation shown in FIG. 3B is called the antisymmetrical mode, and the Coriolis mode of FIG. 3A is called the symmetrical mode. The natural frequency of oscillation in the antisymmetrical mode is a function of the torsional resilience of the legs. Ordinarily the resonant frequency of the antisymmetrical mode for conduits of the shape shown in FIGS. 2A and 2B is higher than the resonant frequency of the symmetrical mode. To reduce the noise sensitivity of the mass flow measurement, it is desirable to maximize the Coriolis force for a given mass flow rate. As noted above, the loops are driven at their resonant frequency, and the Coriolis force is directly related to the frequency at which the loops are oscillating (i.e., the angular velocity of the loops). Accordingly, the loops are driven in the antisymmetrical mode, which tends to have the higher resonant frequency.

Other implementations may include different conduit designs. For example, a single loop or a straight tube section may be employed as the conduit.

C. Electronic Design

The digital controller 105 determines the mass flow rate by processing signals produced by the sensors 48 (i.e., the motion sensors 110) located at opposite ends of the loops. The signal produced by each sensor includes a component corresponding to the relative velocity at which the loops are driven by a driver positioned next to the sensor and a component corresponding to the relative velocity of the loops due to Coriolis forces induced in the loops. The loops are driven in the antisymmetrical mode, so that the components of the sensor signals corresponding to drive velocity are equal in magnitude but opposite in sign. The resulting Coriolis force is in the symmetrical mode so that the components of the sensor signals corresponding to Coriolis velocity are equal in magnitude and sign. Thus, differencing the signals cancels out the Coriolis velocity components and results in a difference that is proportional to the drive velocity. Similarly, summing the signals cancels out the drive velocity components and results in a sum that is proportional to the Coriolis velocity, which, in turn, is proportional to the Coriolis force. This sum then may be used to determine the mass flow rate.

1. Analog Control System

Figure 4:
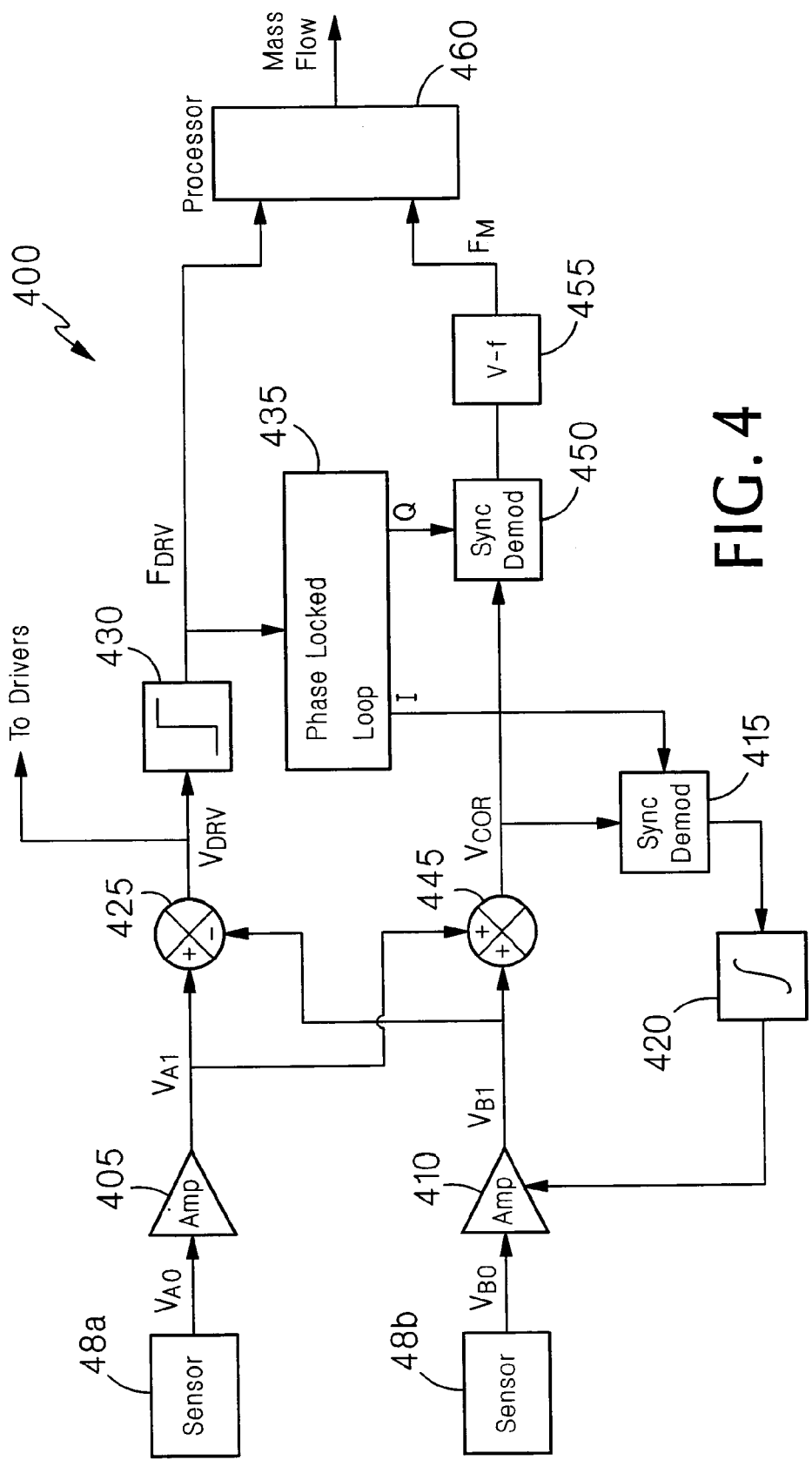
FIG. 4 is a block diagram of an analog control and measurement circuit.

The digital mass flowmeter 100 provides considerable advantages over traditional, analog mass flowmeters. For use in later discussion, FIG. 4 illustrates an analog control system 400 of a traditional mass flowmeter. The sensors 48 each produce a voltage signal, with signal $V_{A0}$ being produced by sensor 48a and signal $V_{B0}$ being produced by sensor 48b. $V_{A0}$ and $V_{B0}$ correspond to the velocity of the loops relative to each other at the positions of the sensors. Prior to processing, signals $V_{A0}$ and $V_{B0}$ are amplified at respective input amplifiers 405 and 410 to produce signals $V_{A1}$ and $V_{B1}$. To correct for imbalances in the amplifiers and the sensors, input amplifier 410 has a variable gain that is controlled by a balance signal coming from a feedback loop that contains a synchronous demodulator 415 and an integrator 420.

At the output of amplifier 405, signal $V_{A1}$ is of the form:

$$V_{A1} = V_D \sin \omega t + V_C \cos \omega t,$$

and, at the output of amplifier 410, signal $V_{B1}$ is of the form:

$$V_{B1} = -V_D \sin \omega t + V_C \cos \omega t,$$

where $V_D$ and $V_C$ are, respectively, the drive voltage and the Coriolis voltage, and $\omega$ is the drive mode angular frequency.

Voltages $V_{A1}$ and $V_{B1}$ are differenced by operational amplifier 425 to produce:

$$V_{DRV} = V_{A1} - V_{B1} = 2 V_D \sin \omega t,$$

where $V_{DRV}$ corresponds to the drive motion and is used to power the drivers. In addition to powering the drivers, $V_{DRV}$ is supplied to a positive going zero crossing detector 430 that produces an output square wave $F_{DRV}$ having a frequency corresponding to that of $V_{DRV}$ ($\omega = 2\pi F_{DRV}$). $F_{DRV}$ is used as the input to a digital phase locked loop circuit 435. $F_{DRV}$ also is supplied to a processor 440.

Voltages $V_{A1}$ and $V_{B1}$ are summed by operational amplifier 445 to produce:

$$V_{COR}=V_{A1}+V_{B1}=2V_C \cos \omega t,$$

where $V_{COR}$ is related to the induced Coriolis motion.

$V_{COR}$ is supplied to a synchronous demodulator 450 that produces an output voltage $V_M$ that is directly proportional to mass by rejecting the components of $V_{COR}$ that do not have the same frequency as, and are not in phase with, a gating signal Q. The phase locked loop circuit 435 produces Q, which is a quadrature reference signal that has the same frequency ($\omega$) as $V_{DRV}$ and is 90° out of phase with $V_{DRV}$ (i.e., in phase with $V_{COR}$). Accordingly, synchronous demodulator 450 rejects frequencies other than $\omega$ so that $V_M$ corresponds to the amplitude of $V_{COR}$ at $\omega$. This amplitude is directly proportional to the mass in the conduit.

$V_M$ is supplied to a voltage-to-frequency converter 455 that produces a square wave signal $F_M$ having a frequency that corresponds to the amplitude of $V_M$. The processor 440 then divides $F_M$ by $F_{DRV}$ to produce a measurement of the mass flow rate.

Digital phase locked loop circuit 435 also produces a reference signal I that is in phase with $V_{DRV}$ and is used to gate the synchronous demodulator 415 in the feedback loop controlling amplifier 410. When the gains of the input amplifiers 405 and 410 multiplied by the drive components of the corresponding input signals are equal, the summing operation at operational amplifier 445 produces zero drive component (i.e., no signal in phase with $V_{DRV}$) in the signal $V_{COR}$. When the gains of the input amplifiers 405 and 410 are not equal, a drive component exists in $V_{COR}$. This drive component is extracted by synchronous demodulator 415 and integrated by integrator 420 to generate an error voltage that corrects the gain of input amplifier 410. When the gain is too high or too low, the synchronous demodulator 415 produces an output voltage that causes the integrator to change the error voltage that modifies the gain. When the gain reaches the desired value, the output of the synchronous modulator goes to zero and the error voltage stops changing to maintain the gain at the desired value.

2. Digital Control System

Figure 5:
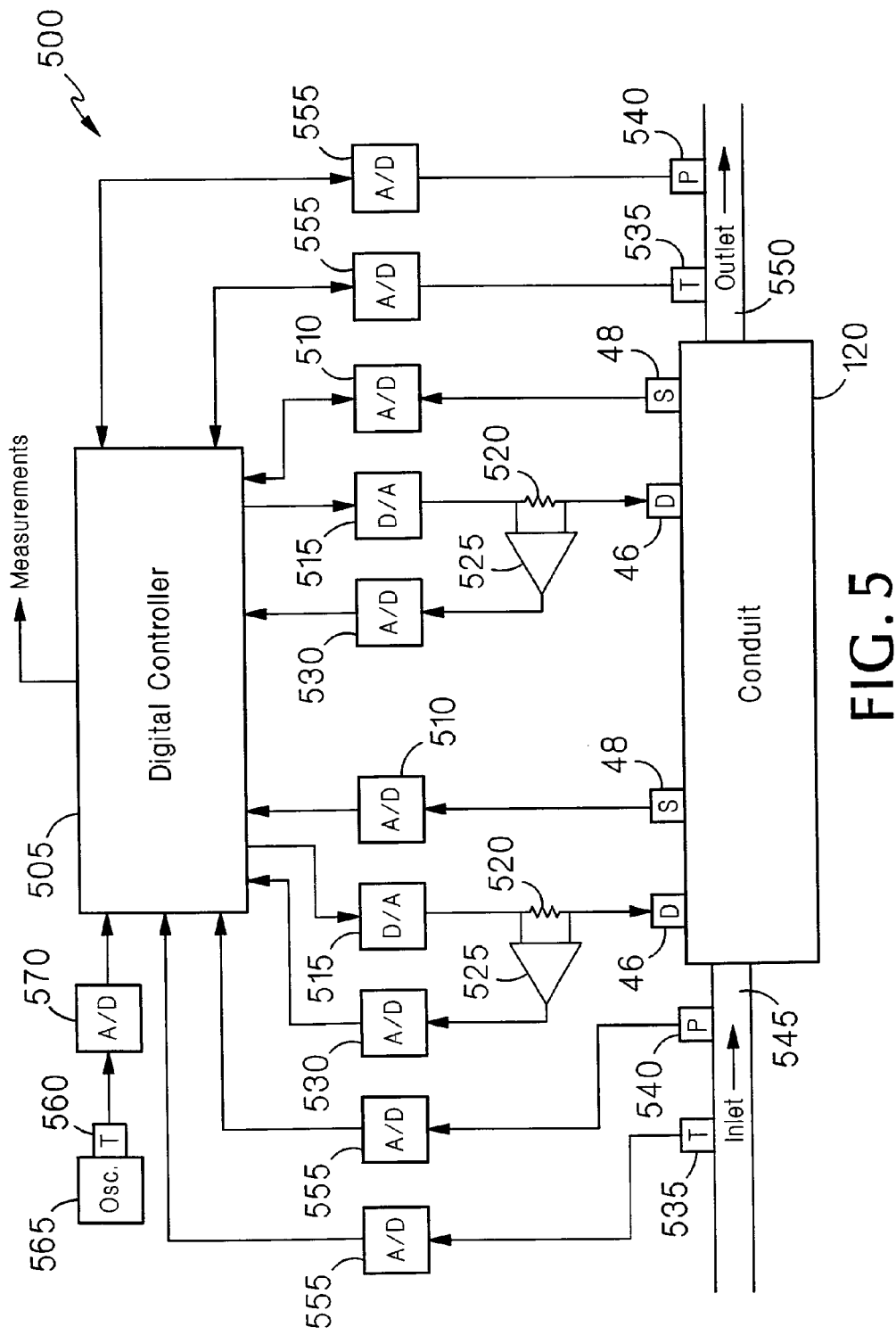
FIG. 5 is a block diagram of a digital mass flowmeter.

FIG. 5 provides a block diagram of an implementation 500 of the digital mass flowmeter 100 that includes the conduit 120, drivers 46, and sensors 48 of FIGS. 2A and 2B, along with a digital controller 505. Analog signals from the sensors 48 are converted to digital signals by analog-to-digital ("A/D") converters 510 and supplied to the controller 505. The A/D converters may be implemented as separate converters, or as separate channels of a single converter.

Digital-to-analog ("D/A") converters 515 convert digital control signals from the controller 505 to analog signals for driving the drivers 46. The use of a separate drive signal for each driver has a number of advantages. For example, the system may easily switch between symmetrical and antisymmetrical drive modes for diagnostic purposes. In other implementations, the signals produced by converters 515 may be amplified by amplifiers prior to being supplied to the drivers 46. In still other implementations, a single D/A converter may be used to produce a drive signal applied to both drivers, with the drive signal being inverted prior to being provided to one of the drivers to drive the conduit 120 in the antisymmetrical mode.

High precision resistors 520 and amplifiers 525 are used to measure the current supplied to each driver 46. A/D converters 530 convert the measured current to digital signals and supply the digital signals to controller 505. The controller 505 uses the measured currents in generating the driving signals.

Temperature sensors 535 and pressure sensors 540 measure, respectively, the temperature and the pressure at the inlet 545 and the outlet 550 of the conduit. A/D converters 555 convert the measured values to digital signals and supply the digital signals to the controller 505. The controller 505 uses the measured values in a number of ways. For example, the difference between the pressure measurements may be used to determine a back pressure in the conduit. Since the stiffness of the conduit varies with the back pressure, the controller may account for conduit stiffness based on the determined back pressure.

An additional temperature sensor 560 measures the temperature of the crystal oscillator 565 used by the A/D converters. An A/D converter 570 converts this temperature measurement to a digital signal for use by the controller 505. The input/output relationship of the A/D converters varies with the operating frequency of the converters, and the operating frequency varies with the temperature of the crystal oscillator. Accordingly, the controller uses the temperature measurement to adjust the data provided by the A/D converters, or in system calibration.

Figure 6:
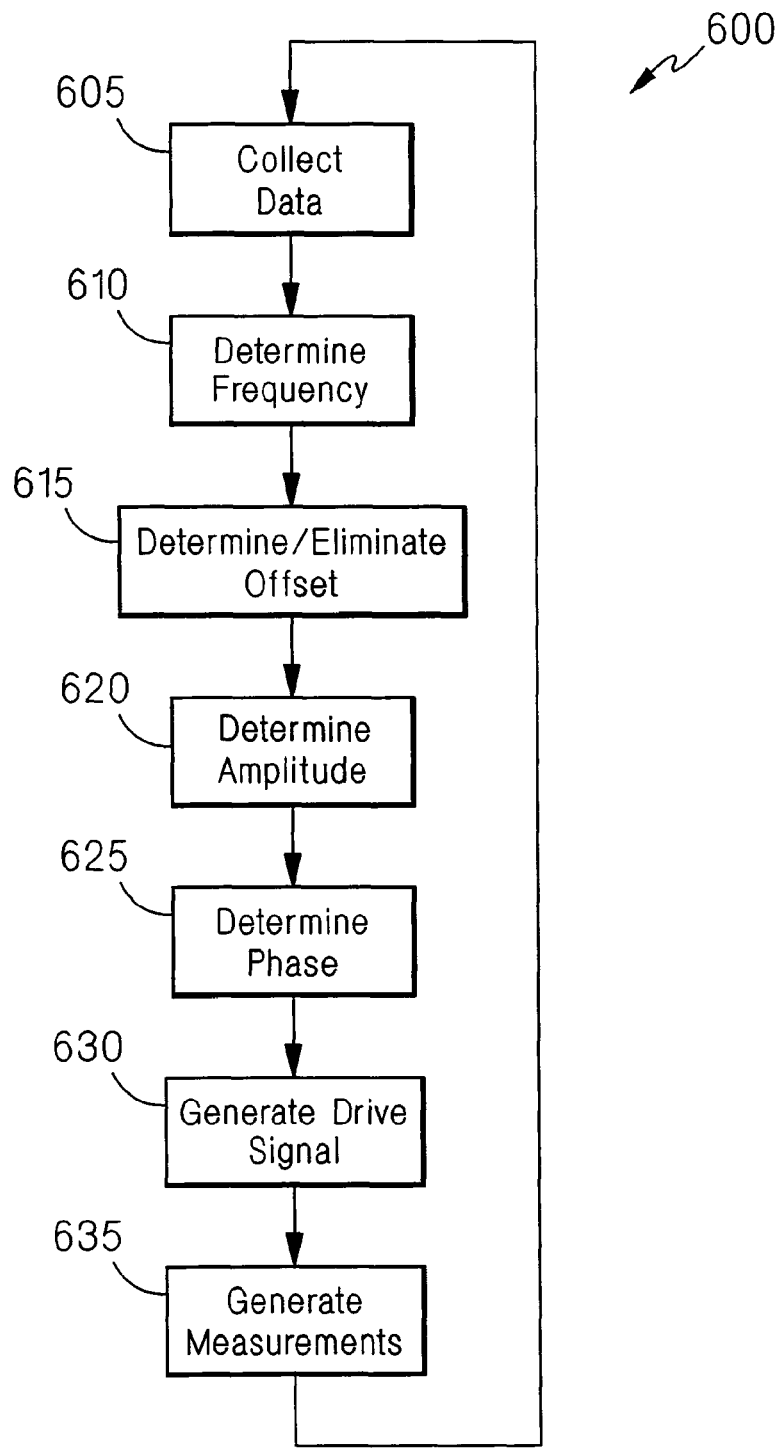
FIG. 6 is a flow chart showing operation of the meter of FIG. 5.

In the implementation of FIG. 5, the digital controller 505 processes the digitized sensor signals produced by the A/D converters 510 according to the procedure 600 illustrated in FIG. 6 to generate the mass flow measurement and the drive signal supplied to the drivers 46. Initially, the controller collects data from the sensors (step 605). Using this data, the controller determines the frequency of the sensor signals (step 610), eliminates zero offset from the sensor signals (step 615), and determines the amplitude (step 620) and phase (step 625) of the sensor signals. The controller uses these calculated values to generate the drive signal (step 630) and to generate the mass flow and other measurements (step 635). After generating the drive signals and measurements, the controller collects a new set of data and repeats the procedure. The steps of the procedure 600 may be performed serially or in parallel, and may be performed in varying order.

Because of the relationships between frequency, zero offset, amplitude, and phase, an estimate of one may be used in calculating another. This leads to repeated calculations to improve accuracy. For example, an initial frequency determination used in determining the zero offset in the sensor signals may be revised using offset-eliminated sensor signals. In addition, where appropriate, values generated for a cycle may be used as starting estimates for a following cycle.

FIG. 5 provides a general description of the hardware included in a digital flowmeter. A more detailed description of a specific hardware implementation is provided in the attached appendix, which is incorporated by reference.

a. Data Collection

For ease of discussion, the digitized signals from the two sensors will be referred to as signals $SV_1$ and $SV_2$, with signal $SV_1$ coming from sensor 48a and signal $SV_2$ coming from sensor 48b. Although new data is generated constantly, it is assumed that calculations are based upon data corresponding to one complete cycle of both sensors. With sufficient data buffering, this condition will be true so long as the average time to process data is less than the time taken to collect the data. Tasks to be carried out for a cycle include deciding that the cycle has been completed, calculating the frequency of the cycle (or the frequencies of $SV_1$ and $SV_2$), calculating the amplitudes of $SV_1$ and $SV_2$, and calculating the phase difference between $SV_1$ and $SV_2$. In some implementations, these calculations are repeated for each cycle using the end point of the previous cycle as the start for the next. In other implementations, the cycles overlap by 180° or other amounts (e.g., 90°) so that a cycle is subsumed within the cycles that precede and follow it.

Figure 7A:
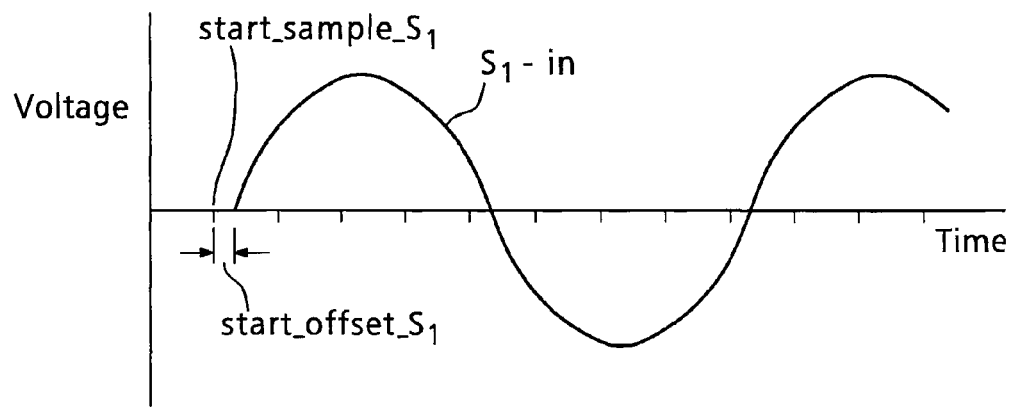
FIGS. 7A and 7B are graphs of sensor data.
Figure 7B:
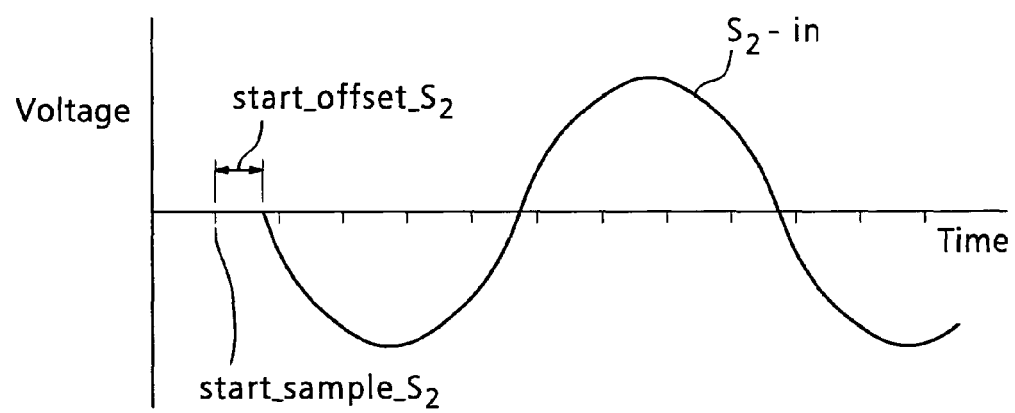

FIGS. 7A and 7B illustrate two vectors of sampled data from signals $SV_1$ and $SV_2$, which are named, respectively, sv1_in and sv2_in. The first sampling point of each vector is known, and corresponds to a zero crossing of the sine wave represented by the vector. For sv1_in, the first sampling point is the zero crossing from a negative value to a positive value, while for sv2_in the first sampling point is the zero crossing from a positive value to a negative value.

An actual starting point for a cycle (i.e., the actual zero crossing) will rarely coincide exactly with a sampling point. For this reason, the initial sampling points (start_sample_SV1 and start_sample_SV2) are the sampling points occurring just before the start of the cycle. To account for the difference between the first sampling point and the actual start of the cycle, the approach also uses the position (start_offset_SV1 or start_offset_SV2) between the starting sample and the next sample at which the cycle actually begins.

Since there is a phase offset between signals $SV_1$ and $SV_2$, sv1_in and sv2_in may start at different sampling points. If both the sample rate and the phase difference are high, there may be a difference of several samples between the start of sv1_in and the start of sv2_in. This difference provides a crude estimate of the phase offset, and may be used as a check on the calculated phase offset, which is discussed below. For example, when sampling at 55 kHz, one sample corresponds to approximately 0.5 degrees of phase shift, and one cycle corresponds to about 800 sample points.

When the controller employs functions such as the sum (A+B) and difference (A−B), with B weighted to have the same amplitude as A, additional variables (e.g., start_sample_sum and start_offset_sum) track the start of the period for each function. The sum and difference functions have a phase offset halfway between $SV_1$ and $SV_2$.

In one implementation, the data structure employed to store the data from the sensors is a circular list for each sensor, with a capacity of at least twice the maximum number of samples in a cycle. With this data structure, processing may be carried out on data for a current cycle while interrupts or other techniques are used to add data for a following cycle to the lists.

Processing is performed on data corresponding to a full cycle to avoid errors when employing approaches based on sine-waves. Accordingly, the first task in assembling data for a cycle is to determine where the cycle begins and ends. When nonoverlapping cycles are employed, the beginning of the cycle may be identified as the end of the previous cycle. When overlapping cycles are employed, and the cycles overlap by 180°, the beginning of the cycle may be identified as the midpoint of the previous cycle, or as the end_point of the cycle preceding the previous cycle.

The end of the cycle may be first estimated based on the parameters of the previous cycle and under the assumption that the parameters will not change by more than a predetermined amount from cycle to cycle. For example, five percent may be used as the maximum permitted change from the last cycle's value, which is reasonable since, at sampling rates of 55 kHz, repeated increases or decreases of five percent in amplitude or frequency over consecutive cycles would result in changes of close to 5,000 percent in one second.

By designating five percent as the maximum permissible increase in amplitude and frequency, and allowing for a maximum phase change of 5° in consecutive cycles, a conservative estimate for the upper limit on the end of the cycle for signal $SV_1$ may be determined as:

$$\text{end\_sample\_SV1} \leq \text{start\_sample\_SV1} + \frac{365}{360} * \frac{\text{sample\_rate}}{\text{est\_freq} * 0.95}$$

where start_sample_SV1 is the first sample of sv1_in, sample_rate is the sampling rate, and est_freq is the frequency from the previous cycle. The upper limit on the end of the cycle for signal $SV_2$ (end_sample_SV2) may be determined similarly.

After the end of a cycle is identified, simple checks may be made as to whether the cycle is worth processing. A cycle may not be worth processing when, for example, the conduit has stalled or the sensor waveforms are severely distorted. Processing only suitable cycles provides considerable reductions in computation.

One way to determine cycle suitability is to examine certain points of a cycle to confirm expected behavior. As noted above, the amplitudes and frequency of the last cycle give useful starting estimates of the corresponding values for the current cycle. Using these values, the points corresponding to 30°, 150°, 210° and 330° of the cycle may be examined. If the amplitude and frequency were to match exactly the amplitude and frequency for the previous cycle, these points should have values corresponding to est_amp/2, est_amp/2, −est_amp/2, and −est_amp/2, respectively, where est_amp is the estimated amplitude of a signal (i.e., the amplitude from the previous cycle). Allowing for a five percent change in both amplitude and frequency, inequalities may be generated for each quarter cycle. For the 30° point, the inequality is $$\text{sv1\_in}\left(\text{start\_sample\_SV1} + \frac{30}{360} * \frac{\text{sample\_rate}}{\text{est\_freq} * 1.05}\right) > 0.475 * \text{est\_amp\_SV}$$

The inequalities for the other points have the same form, with the degree offset term (x/360) and the sign of the est_amp_SV1 term having appropriate values. These inequalities can be used to check that the conduit has vibrated in a reasonable manner.

Measurement processing takes place on the vectors sv1_in(start:end) and sv2_in(start:end) where:

start=min(start_sample_SV1,start_sample_SV2), and end=max(end_sample_SV1,end_sample_SV2).

The difference between the start and end points for a signal is indicative of the frequency of the signal.

b. Frequency Determination

The frequency of a discretely-sampled pure sine wave may be calculated by detecting the transition between periods (i.e., by detecting positive or negative zero-crossings) and counting the number of samples in each period. Using this method, sampling, for example, an 82.2 Hz sine wave at 55 kHz will provide an estimate of frequency with a maximum error of 0.15 percent. Greater accuracy may be achieved by estimating the fractional part of a sample at which the zero-crossing actually occurred using, for example, start_offset_SV1 and start_offset_SV2. Random noise and zero offset may reduce the accuracy of this approach.

Figure 8A:
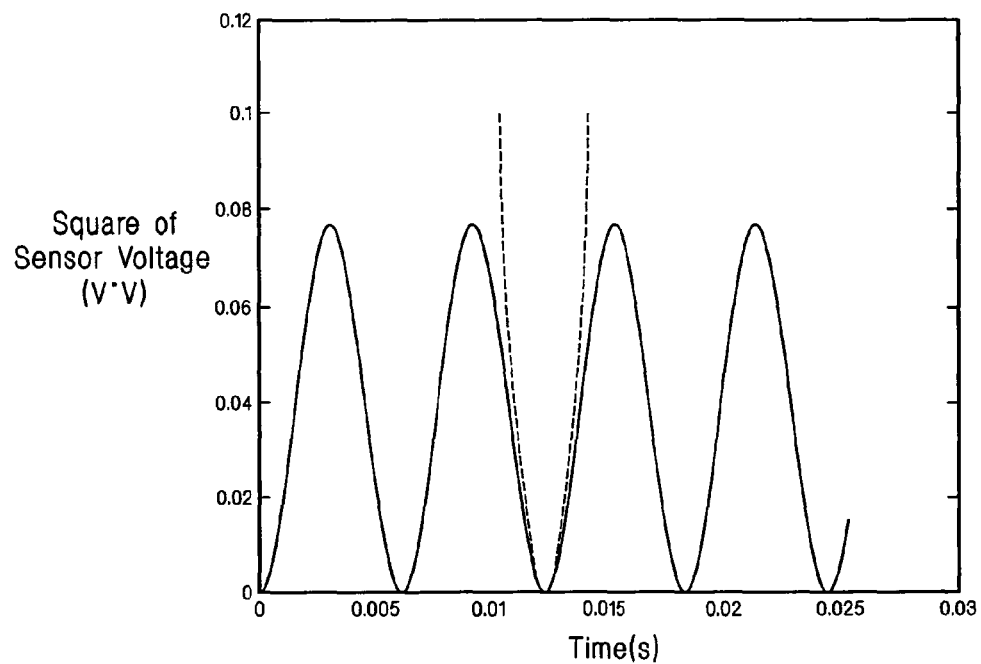
FIGS. 8A and 8B are graphs of sensor voltage relative to time.
Figure 8B:
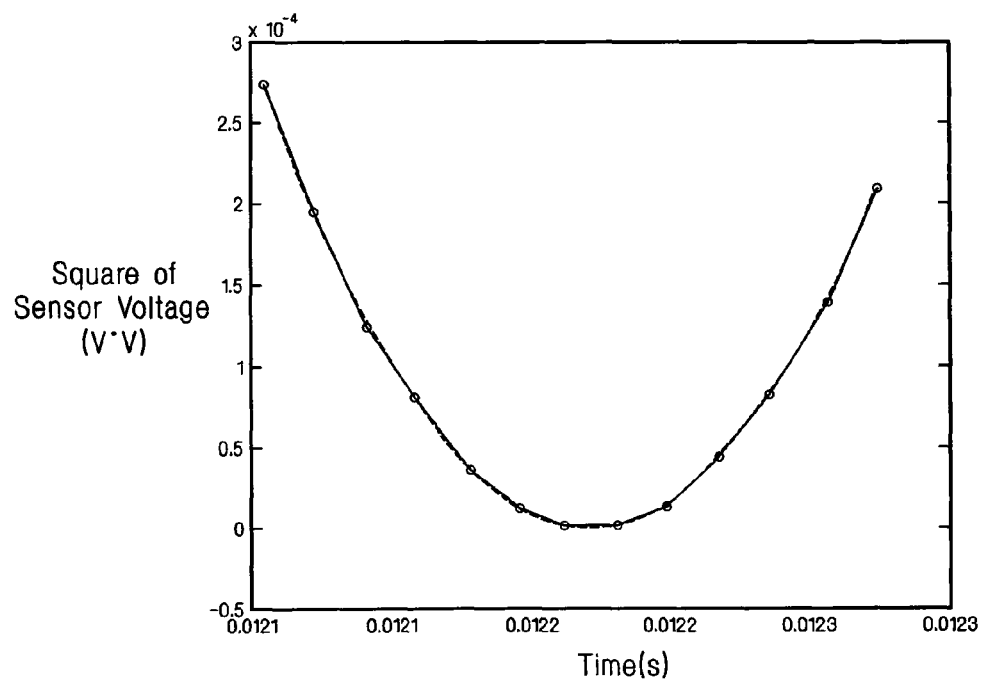

As illustrated in FIGS. 8A and 8B, a more refined method of frequency determination uses quadratic interpolation of the square of the sine wave. With this method, the square of the sine wave is calculated, a quadratic function is fitted to match the minimum point of the squared sine wave, and the zeros of the quadratic function are used to determine the frequency. If $$sv_t = A \sin x_t + \delta + \sigma \epsilon_t,$$

where $sv_t$ is the sensor voltage at time t, A is the amplitude of oscillation, $x_t$ is the radian angle at time t (i.e., $x_t=2\pi ft$), $\delta$ is the zero offset, $\epsilon_t$ is a random variable with distribution N(0, 1), and $\sigma$ is the variance of the noise, then the squared function is given by:

$$sv_t^2 = A^2 \sin^2 x_t + 2A(\delta + \sigma\epsilon_t)\sin x_t + 2\delta\sigma\epsilon_t + \delta^2 + \sigma^2\epsilon_t^2.$$

When $x_t$ is close to $2\pi$, $\sin x_t$ and $\sin^2 x_t$ can be approximated as $x_{0t}=x_t-2\pi$ and $x_{0t}^2$, respectively. Accordingly, for values of $x_t$ close to $2\pi$, $a_t$ can be approximated as:

$$a_t^2 \approx A^2 x_{0t}^2 + 2A(\delta + \sigma\epsilon_t)x_{0t} + 2\delta\sigma\epsilon_t + \delta^2 + \sigma^2\epsilon_t^2 \approx$$
$$(A^2 x_{0t}^2 + 2A\delta x_{0t} + \delta^2) + \sigma\epsilon_t(2Ax_{0t} + 2\delta + \sigma\epsilon_t).$$

This is a pure quadratic (with a non-zero minimum, assuming $\delta \neq 0$) plus noise, with the amplitude of the noise being dependent upon both $\sigma$ and $\delta$. Linear interpolation also could be used.

Error sources associated with this curve fitting technique are random noise, zero offset, and deviation from a true quadratic. Curve fitting is highly sensitive to the level of random noise. Zero offset in the sensor voltage increases the amplitude of noise in the sine-squared function, and illustrates the importance of zero offset elimination (discussed below). Moving away from the minimum, the square of even a pure sine wave is not entirely quadratic. The most significant extra term is of fourth order. By contrast, the most significant extra term for linear interpolation is of third order.

Degrees of freedom associated with this curve fitting technique are related to how many, and which, data points are used. The minimum is three, but more may be used (at greater computational expense) by using least-squares fitting. Such a fit is less susceptible to random noise. FIG. 8A illustrates that a quadratic approximation is good up to some 20° away from the minimum point. Using data points further away from the minimum will reduce the influence of random noise, but will increase the errors due to the non-quadratic terms (i.e., fourth order and higher) in the sine-squared function.

Figure 9:
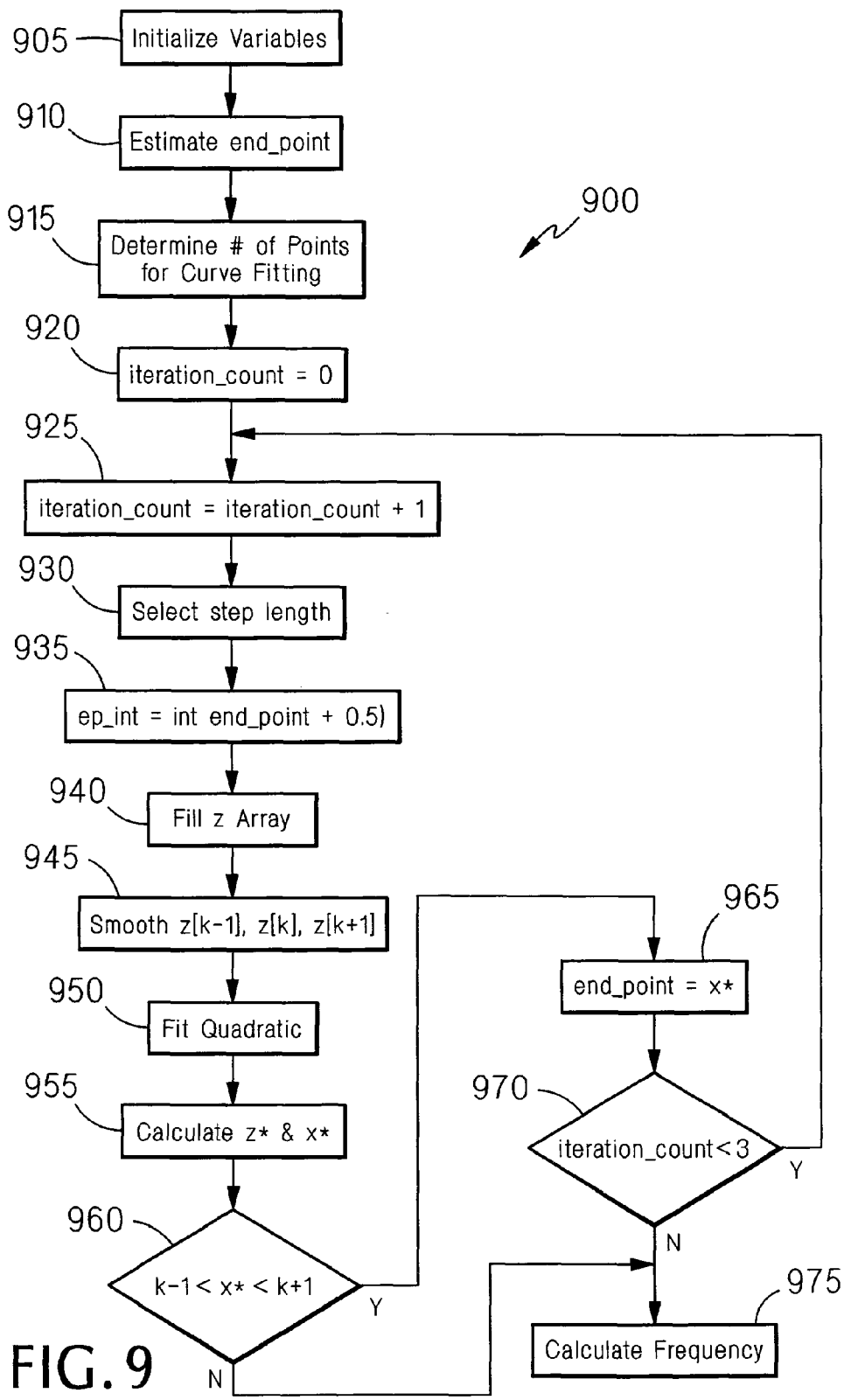
FIG. 9 is a flow chart of a curve fitting procedure.

FIG. 9 illustrates a procedure 900 for performing the curve fitting technique. As a first step, the controller initializes variables (step 905). These variables include end_point, the best estimate of the zero crossing point; ep_int, the integer value nearest to end_point; s[0 . . . i], the set of all sample points; z[k], the square of the sample point closest to end_point; z[0 . . . n−1], a set of squared sample points used to calculate end_point; n, the number of sample points used to calculate end_point (n=2k+1); step_length, the number of samples in s between consecutive values in z; and iteration_count, a count of the iterations that the controller has performed.

The controller then generates a first estimate of end_point (step 910). The controller generates this estimate by calculating an estimated zero-crossing point based on the estimated frequency from the previous cycle and searching around the estimated crossing point (forwards and backwards) to find the nearest true crossing point (i.e., the occurrence of consecutive samples with different signs). The controller then sets end_point equal to the sample point having the smaller magnitude of the samples surrounding the true crossing point.

Next, the controller sets n, the number of points for curve fitting (step 915). The controller sets n equal to 5 for a sample rate of 11 kHz, and to 21 for a sample rate of 44 kHz. The controller then sets iteration_count to 0 (step 920) and increments iteration_count (step 925) to begin the iterative portion of the procedure.

As a first step in the iterative portion of the procedure, the controller selects step_length (step 930) based on the value of iteration_count. The controller sets step_length equal to 6, 3, or 1 depending on whether iteration_count equals, respectively, 1, 2 or 3.

Next, the controller determines ep_int as the integer portion of the sum of end_point and 0.5 (step 935) and fills the z array (step 940). For example, when n equals 5, $z[0]=s[ep\_int-2*step\_length]^2$, $z[1]=s[ep\_int-step\_length]^2$, $z[2]=s[ep\_int]^2$, $z[3]=s[ep\_int+step\_length]^2$, and $z[4]=s[ep\_int+2*step\_length]^2$.

Next, the controller uses a filter, such as a Savitzky-Golay filter, to calculate smoothed values of z[k−1], z[k] and z[k+1] (step 945). Savitzky-Golay smoothing filters are discussed by Press et al. in Numerical Recipes in C, pp. 650-655 (2nd ed., Cambridge University Press, 1995), which is incorporated by reference. The controller then fits a quadratic to z[k−1], z[k] and z[k+1] (step 950), and calculates the minimum value of the quadratic (z*) and the corresponding position (x*) (step 955).

If x* is between the points corresponding to k−1 and k+1 (step 960), then the controller sets end_point equal to x* (step 965). Thereafter, if iteration_count is less than 3 (step 970), the controller increments iteration_count (step 925) and repeats the iterative portion of the procedure.

If x* is not between the points corresponding to k−1 and k+1 (step 960), or if iteration_count equals 3 (step 970), the controller exits the iterative portion of the procedure. The controller then calculates the frequency based on the difference between end_point and the starting point for the cycle, which is known (step 975).

In essence, the procedure 900 causes the controller to make three attempts to home in on end_point, using smaller step_lengths in each attempt. If the resulting minimum for any attempt falls outside of the points used to fit the curve (i.e., there has been extrapolation rather than interpolation), this indicates that either the previous or new estimate is poor, and that a reduction in step size is unwarranted.

The procedure 900 may be applied to at least three different sine waves produced by the sensors. These include signals $SV_1$ and $SV_2$ and the weighted sum of the two. Moreover, assuming that zero offset is eliminated, the frequency estimates produced for these signals are independent. This is clearly true for signals $SV_1$ and $SV_2$, as the errors on each are independent. It is also true, however, for the weighted sum, as long as the mass flow and the corresponding phase difference between signals $SV_1$ and $SV_2$ are large enough for the calculation of frequency to be based on different samples in each case. When this is true, the random errors in the frequency estimates also should be independent.

The three independent estimates of frequency can be combined to provide an improved estimate. This combined estimate is simply the mean of the three frequency estimates.

c. Zero Offset Compensation

An important error source in a Coriolis transmitter is zero offset in each of the sensor voltages. Zero offset is introduced into a sensor voltage signal by drift in the pre-amplification circuitry and the analog-to-digital converter. The zero offset effect may be worsened by slight differences in the pre-amplification gains for positive and negative voltages due to the use of differential circuitry. Each error source varies between transmitters, and will vary with transmitter temperature and more generally over time with component wear.

An example of the zero offset compensation technique employed by the controller is discussed in detail below. In general, the controller uses the frequency estimate and an integration technique to determine the zero offset in each of the sensor signals. The controller then eliminates the zero offset from those signals. After eliminating zero offset from signals $SV_1$ and $SV_2$, the controller may recalculate the frequency of those signals to provide an improved estimate of the frequency.

d. Amplitude Determination

The amplitude of oscillation has a variety of potential uses. These include regulating conduit oscillation via feedback, balancing contributions of sensor voltages when synthesizing driver waveforms, calculating sums and differences for phase measurement, and calculating an amplitude rate of change for measurement correction purposes.

In one implementation, the controller uses the estimated amplitudes of signals $SV_1$ and $SV_2$ to calculate the sum and difference of signals $SV_1$ and $SV_2$, and the product of the sum and difference. Prior to determining the sum and difference, the controller compensates one of the signals to account for differences between the gains of the two sensors. For example, the controller may compensate the data for signal $SV_2$ based on the ratio of the amplitude of signal $SV_1$ to the amplitude of signal $SV_2$ so that both signals have the same amplitude.

The controller may produce an additional estimate of the frequency based on the calculated sum. This estimate may be averaged with previous frequency estimates to produce a refined estimate of the frequency of the signals, or may replace the previous estimates.

The controller may calculate the amplitude according to a Fourier-based technique to eliminate the effects of higher harmonics. A sensor voltage x(t) over a period T (as identified using zero crossing techniques) can be represented by an offset and a series of harmonic terms as:

$$x(t) = a_0/2 + a_1 \cos(\omega t) + a_2 \cos(2\omega t) + a_3 \cos(3\omega t) + \ldots + b_1 \sin(\omega t) + b_2 \sin(2\omega t) +$$

With this representation, a non-zero offset $a_0$ will result in non-zero cosine terms $a_n$. Though the amplitude of interest is the amplitude of the fundamental component (i.e., the amplitude at frequency $\omega$), monitoring the amplitudes of higher harmonic components (i.e., at frequencies $k\omega$, where k is greater than 1) may be of value for diagnostic purposes. The values of $a_n$ and $b_n$ may be calculated as:

$$a_n = \frac{2}{T} \int_0^T x(t) \cos n\omega t \, dt,$$

and $$b_n = \frac{2}{T} \int_0^T x(t) \sin n\omega t \, dt.$$

The amplitude, $A_n$, of each harmonic is given by:

$$A_n = \sqrt{a_n^2 + b_n^2}.$$

The integrals are calculated using Simpson's method with quadratic correction (described below). The chief computational expense of the method is calculating the pure sine and cosine functions.

e. Phase Determination

The controller may use a number of approaches to calculate the phase difference between signals $SV_1$ and $SV_2$. For example, the controller may determine the phase offset of each harmonic, relative to the starting time at t=0, as:

$$\varphi_n = \tan^{-1} \frac{a_n}{b_n}.$$

The phase offset is interpreted in the context of a single waveform as being the difference between the start of the cycle (i.e., the zero-crossing point) and the point of zero phase for the component of SV(t) of frequency $\omega$. Since the phase offset is an average over the entire waveform, it may be used as the phase offset from the midpoint of the cycle. Ideally, with no zero offset and constant amplitude of oscillation, the phase offset should be zero every cycle. The controller may determine the phase difference by comparing the phase offset of each sensor voltage over the same time period.

The amplitude and phase may be generated using a Fourier method that eliminates the effects of higher harmonics. This method has the advantage that it does not assume that both ends of the conduits are oscillating at the same frequency. As a first step in the method, a frequency estimate is produced using the zero crossings to measure the time between the start and end of the cycle. If linear variation in frequency is assumed, this estimate equals the time-averaged frequency over the period. Using the estimated, and assumed time-invariant, frequency $\omega$ of the cycle, the controller calculates:

$$I_1 = \frac{2\omega}{\pi} \int_0^{\frac{2\pi}{\omega}} SV(t) \sin(\omega t) dt, \text{ and}$$

$$I_2 = \frac{2\omega}{\pi} \int_0^{\frac{2\pi}{\omega}} SV(t) \cos(\omega t) dt,$$

where SV(t) is the sensor voltage waveform (i.e., $SV_1(t)$ or $SV_2(t)$). The controller then determines the estimates of the amplitude and phase:

$$\text{Amp} = \sqrt{I_1^2 + I_2^2}, \text{ and Phase} = \tan^{-1} \frac{I_2}{I_1}.$$

The controller then calculates a phase difference, assuming that the average phase and frequency of each sensor signal is representative of the entire waveform. Since these frequencies are different for $SV_1$ and $SV_2$, the corresponding phases are scaled to the average frequency. In addition, the phases are shifted to the same starting point (i.e., the midpoint of the cycle on $SV_1$). After scaling, they are subtracted to provide the phase difference:

$$\text{scaled\_phase\_SV}_1 = \text{phase\_SV}_1 \frac{\text{av\_freq}}{\text{freq\_SV}_1},$$

$$\text{scaled\_shift\_SV}_2 = \frac{(\text{midpoint\_SV}_2 - \text{midpoint\_SV}_1) h \, \text{freq\_SV}_2}{360}, \text{ and}$$

$$\text{scaled\_phase\_SV}_2 = (\text{phase\_SV}_2 + \text{scale\_shift\_SV}_2) \frac{\text{av\_freq}}{\text{freq\_SV}_2},$$

where h is the sample length and the midpoints are defined in terms of samples:

$$\text{midpoint\_SV}_x = \frac{(\text{starpoint\_SV}_x + \text{endpoint\_SV}_x)}{2}$$

In general, phase and amplitude are not calculated over the same time-frame for the two sensors. When the flow rate is zero, the two cycle mid-points are coincident. However, they diverge at high flow rates so that the calculations are based on sample sets that are not coincident in time. This leads to increased phase noise in conditions of changing mass flow. At full flow rate, a phase shift of 4° (out of) 360° means that only 99% of the samples in the $SV_1$ and $SV_2$ data sets are coincident. Far greater phase shifts may be observed under aerated conditions, which may lead to even lower rates of overlap.

Figure 10:
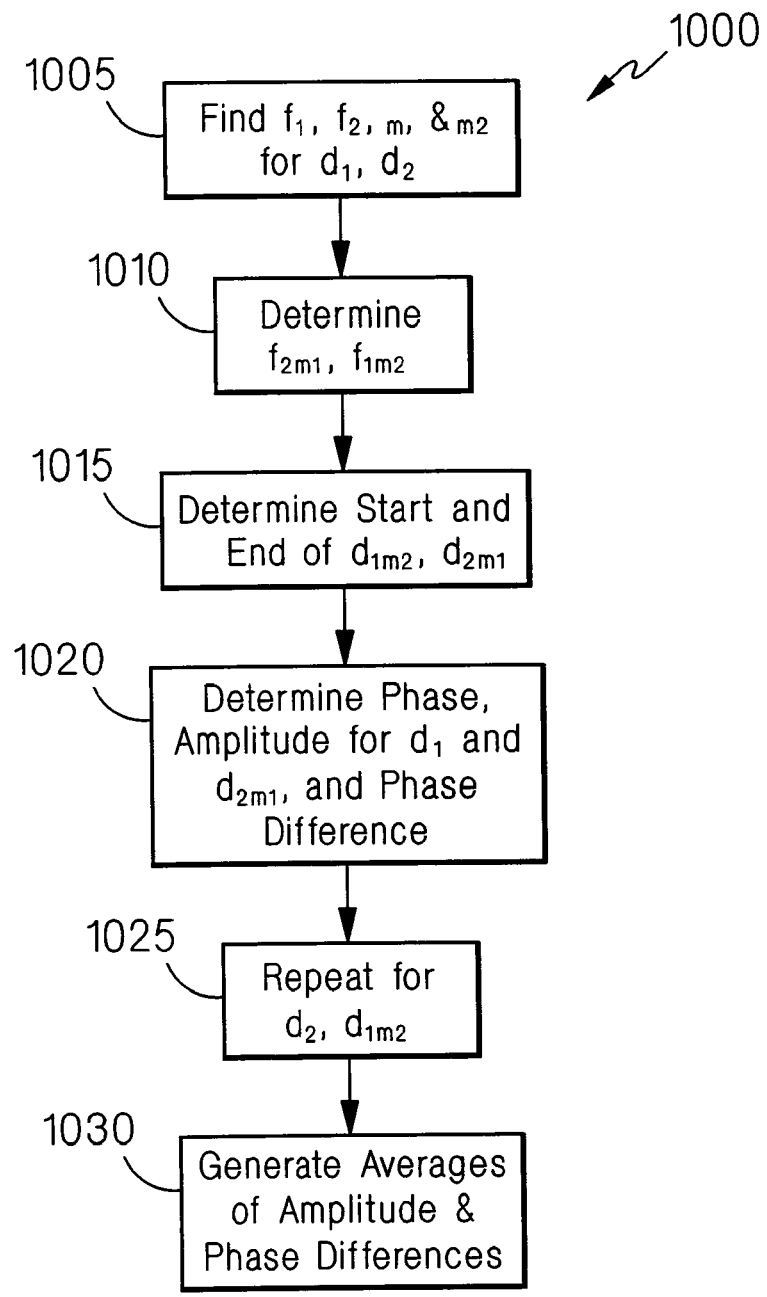
FIG. 10 is a flow chart of a procedure for generating phase differences.
Figure 13A:
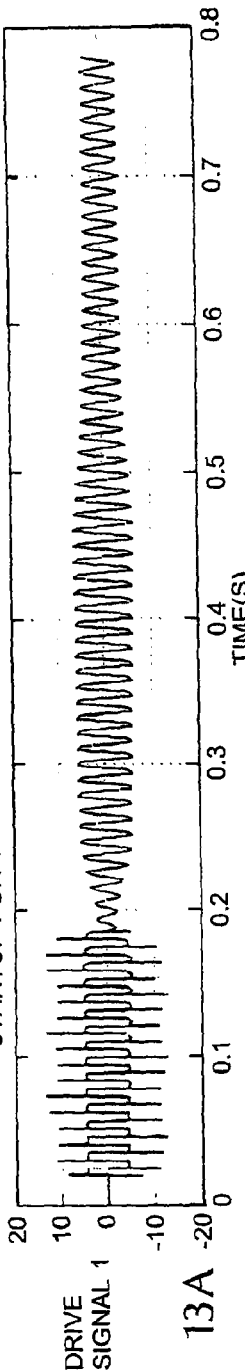
Figure 13B:
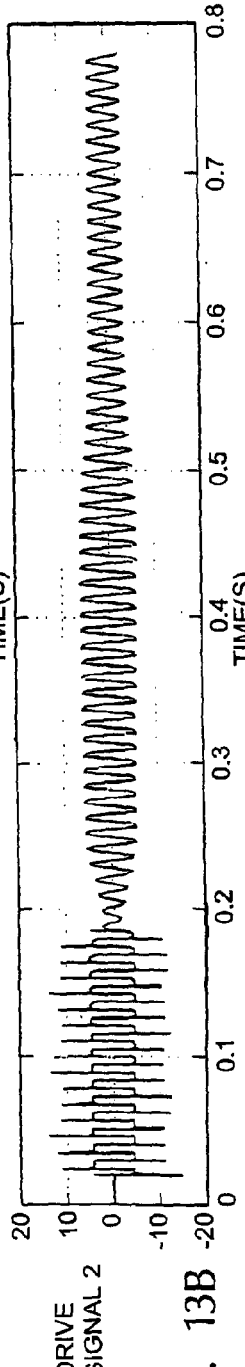
Figure 13C:
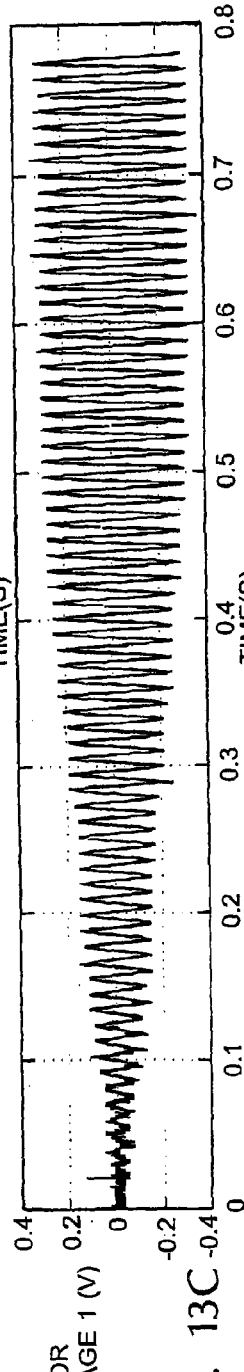
Figure 13D:
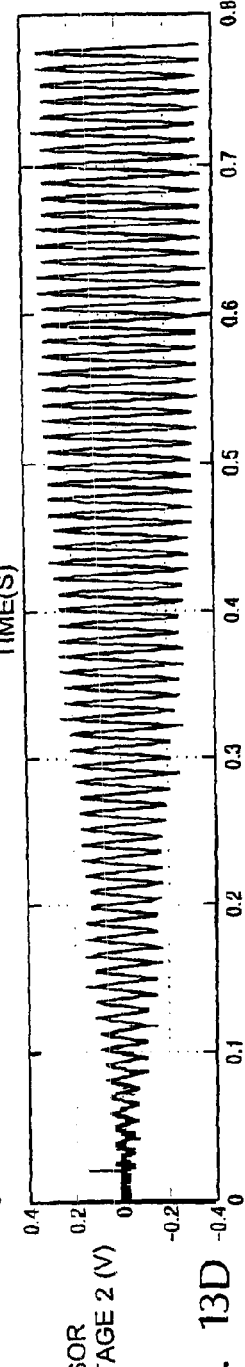

FIG. 10 illustrates a modified approach 1000 that addresses this issue. First, the controller finds the frequencies ($f_1$, $f_2$) and the mid-points ($m_1$, $m_2$) of the $SV_1$ and $SV_2$ data sets ($d_1$, $d_2$) (step 1005). Assuming linear shift in frequency from the last cycle, the controller calculates the frequency of $SV_2$ at the midpoint of $SV_1$ ($f_{2m1}$) and the frequency of $SV_1$ at the midpoint of $SV_2$ ($f_{1m2}$) (step 1010).

The controller then calculates the starting and ending points of new data sets ($d_{1m2}$ and $d_{2m1}$) with mid-points $m_2$ and $m_1$ respectively, and assuming frequencies of $f_{1m2}$ and $f_{2m1}$ (step 1015). These end points do not necessarily coincide with zero crossing points. However, this is not a requirement for Fourier-based calculations.

The controller then carries out the Fourier calculations of phase and amplitude on the sets $d_1$ and $d_{2m1}$, and the phase difference calculations outlined above (step 1020). Since the mid-points of $d_1$ and $d_{2m1}$ are identical, scale-shift_$SV_2$ is always zero and can be ignored. The controller repeats these calculations for the data sets $d_2$ and $d_{1m2}$ (step 1025). The controller then generates averages of the calculated amplitude and phase difference for use in measurement generation (step 1030). When there is sufficient separation between the mid points $m_1$ and $m_2$, the controller also may use the two sets of results to provide local estimates of the rates of change of phase and amplitude.

The controller also may use a difference-amplitude method that involves calculating a difference between $SV_1$ and $SV_2$, squaring the calculated difference, and integrating the result. According to another approach, the controller synthesizes a sine wave, multiplies the sine wave by the difference between signals $SV_1$ and $SV_2$, and integrates the result. The controller also may integrate the product of signals $SV_1$ and $SV_2$, which is a sine wave having a frequency 2f (where f is the average frequency of signals $SV_1$ and $SV_2$), or may square the product and integrate the result. The controller also may synthesize a cosine wave comparable to the product sine wave and multiply the synthesized cosine wave by the product sine wave to produce a sine wave of frequency 4f that the controller then integrates. The controller also may use multiple ones of these approaches to produce separate phase measurements, and then may calculate a mean value of the separate measurements as the final phase measurement.

The difference-amplitude method starts with:

$$SV_1(t) = A_1 \sin\left(2\pi ft + \frac{\varphi}{2}\right) \text{ and } SV_2(t) = A_2 \sin\left(2\pi ft - \frac{\varphi}{2}\right),$$

where $\varphi$ is the phase difference between the sensors. Basic trigonometric identities may be used to define the sum (Sum) and difference (Diff) between the signals as:

$$Sum \equiv SV_1(t) + \frac{A_1}{A_2} SV_2(t) = 2A_1 \cos\frac{\varphi}{2} \cdot \sin 2\pi ft, \text{ and}$$

$$Diff \equiv SV_1(t) - \frac{A_1}{A_2} SV_2(t) = 2A_1 \sin\frac{\varphi}{2} \cdot \cos 2\pi ft.$$

These functions have amplitudes of $2A_1 \cos(\varphi 2)$ and $2A_1 \sin(\varphi 2)$, respectively. The controller calculates data sets for Sum and Diff from the data for $SV_1$ and $SV_2$, and then uses one or more of the methods described above to calculate the amplitude of the signals represented by those data sets. The controller then uses the calculated amplitudes to calculate the phase difference, $\varphi$.

As an alternative, the phase difference may be calculated using the function Prod, defined as:

$$Prod \equiv Sum \times Diff = 4A_1^2 \cos\frac{\varphi}{2} \cdot \sin\frac{\varphi}{2} \cdot \cos 2\pi ft \cdot \sin 2\pi ft$$

$$= A_1^2 \sin\varphi \cdot \sin 4\pi ft,$$

which is a function with amplitude $A^2 \sin \varphi$ and frequency 2f. Prod can be generated sample by sample, and $\varphi$ may be calculated from the amplitude of the resulting sine wave.

The calculation of phase is particularly dependent upon the accuracy of previous calculations (i.e., the calculation of the frequencies and amplitudes of $SV_1$ and $SV_2$). The controller may use multiple methods to provide separate (if not entirely independent) estimates of the phase, which may be combined to give an improved estimate.

f. Drive Signal Generation

The controller generates the drive signal by applying a gain to the difference between signals $SV_1$ and $SV_2$. The controller may apply either a positive gain (resulting in positive feedback) or a negative gain (resulting in negative feedback).

In general, the Q of the conduit is high enough that the conduit will resonate only at certain discrete frequencies. For example, the lowest resonant frequency for some conduits is between 65 Hz and 95 Hz, depending on the density of the process fluid, and irrespective of the drive frequency. As such, it is desirable to drive the conduit at the resonant frequency to minimize cycle-to-cycle energy loss. Feeding back the sensor voltage to the drivers permits the drive frequency to migrate to the resonant frequency.

As an alternative to using feedback to generate the drive signal, pure sine waves having phases and frequencies determined as described above may be synthesized and sent to the drivers. This approach offers the advantage of eliminating undesirable high frequency components, such as harmonics of the resonant frequency. This approach also permits compensation for time delays introduced by the analog-to-digital converters, processing, and digital-to-analog converters to ensure that the phase of the drive signal corresponds to the mid-point of the phases of the sensor signals. This compensation may be provided by determining the time delay of the system components and introducing a phase shift corresponding to the time delay.

Another approach to driving the conduit is to use square wave pulses. This is another synthesis method, with fixed (positive and negative) direct current sources being switched on and off at timed intervals to provide the required energy. The switching is synchronized with the sensor voltage phase. Advantageously, this approach does not require digital-to-analog converters.

In general, the amplitude of vibration of the conduit should rapidly achieve a desired value at startup, so as to quickly provide the measurement function, but should do so without significant overshoot, which may damage the meter. The desired rapid startup may be achieved by setting a very high gain so that the presence of random noise and the high Q of the conduit are sufficient to initiate motion of the conduit. In one implementation, high gain and positive feedback are used to initiate motion of the conduit. Once stable operation is attained, the system switches to a synthesis approach for generating the drive signals.

Referring to FIGS. 11A-13D, synthesis methods also may be used to initiate conduit motion when high gain is unable to do so. For example, if the DC voltage offset of the sensor voltages is significantly larger than random noise, the application of a high gain will not induce oscillatory motion. This condition is shown in FIGS. 11A-11D, in which a high gain is applied at approximately 0.3 seconds. As shown in FIGS. 11A and 11B, application of the high gain causes one of the drive signals to assume a large positive value (FIG. 11A) and the other to assume a large negative value (FIG. 11B). The magnitudes of the drive signals vary with noise in the sensor signals (FIGS. 11C and 11D). However, the amplified noise is insufficient to vary the sign of the drive signals so as to induce oscillation.

FIGS. 12A-12D illustrate that imposition of a square wave over several cycles can reliably cause a rapid startup of oscillation. Oscillation of a conduit having a two inch diameter may be established in approximately two seconds. The establishment of conduit oscillation is indicated by the reduction in the amplitude of the drive signals, as shown in FIGS. 12A and 12B. FIGS. 13A-13D illustrate that oscillation of a one inch conduit may be established in approximately half a second.

A square wave also may be used during operation to correct conduit oscillation problems. For example, in some circumstances, flow meter conduits have been known to begin oscillating at harmonics of the resonant frequency of the conduit, such as frequencies on the order of 1.5 kHz. When such high frequency oscillations are detected, a square wave having a more desirable frequency may be used to return the conduit oscillation to the resonant frequency.

g. Measurement Generation

The controller digitally generates the mass flow measurement in a manner similar to the approach used by the analog controller. The controller also may generate other measurements, such as density.

In one implementation, the controller calculates the mass flow based on the phase difference in degrees between the two sensor signals (phase_diff), the frequency of oscillation of the conduit (freq), and the process temperature (temp):

$T_z = \text{temp} - T_c$, $\text{noneu\_mf} = \tan(\pi * \text{phase\_diff}/180)$, and $\text{massflow} = 16(MF_1 * T_z^2 + MF_2 * T_z + MF_3) * \text{noneu\_mf} / \text{freq}$, where $T_c$ is a calibration temperature, $MF_1$-$MF_3$ are calibration constants calculated during a calibration procedure, and noneu_mf is the mass flow in non-engineering units.

The controller calculates the density based on the frequency of oscillation of the conduit and the process temperature:

$T_z = \text{temp} - T_c$, $c_2 = \text{freq}^2$, and $\text{density} = (D_1 * T_z^2 + D_2 * T_z + D_3)/c_2 + D_4 * T_z^2$, where $D_1$-$D_4$ are calibration constants generated during a calibration procedure.

D. Integration Techniques

Many integration techniques are available, with different techniques requiring different levels of computational effort and providing different levels of accuracy. In the described implementation, variants of Simpson's method are used. The basic technique may be expressed as:

$$\int_{t_n}^{t_{n+2}} y\, dt \approx \frac{h}{3}(y_n + 4y_{n+1} + y_{n+2}),$$

where $t_k$ is the time at sample k, $y_k$ is the corresponding function value, and h is the step length. This rule can be applied repeatedly to any data vector with an odd number of data points (i.e., three or more points), and is equivalent to fitting and integrating a cubic spline to the data points. If the number of data points happens to be even, then the so-called ⅜ths rule can be applied at one end of the interval:

$$\int_{t_n}^{t_{n+3}} y\, dt \approx \frac{3h}{8}(y_n + 3y_{n+1} + 3y_{n+2} + y_{n+3}).$$

As stated earlier, each cycle begins and ends at some offset (e.g., start_offset_SV1) from a sampling point. The accuracy of the integration techniques are improved considerably by taking these offsets into account. For example, in an integration of a half cycle sine wave, the areas corresponding to partial samples must be included in the calculations to avoid a consistent underestimate in the result.

Two types of function are integrated in the described calculations: either sine or sine-squared functions. Both are easily approximated close to zero where the end points occur. At the end points, the sine wave is approximately linear and the sine-squared function is approximately quadratic.

In view of these two types of functions, three different integration methods have been evaluated. These are Simpson's method with no end correction, Simpson's method with linear end correction, and Simpson's method with quadratic correction.

The integration methods were tested by generating and sampling pure sine and sine-squared functions, without simulating any analog-to-digital truncation error. Integrals were calculated and the results were compared to the true amplitudes of the signals. The only source of error in these calculations was due to the integration techniques. The results obtained are illustrated in tables A and B.

TABLE A

Integration of a sine function

| | % error (based on 1000 simulations) | | |
|---|---|---|---|
| | Av. Errors (%) | S.D. Error (%) | Max. Error (%) |
| Simpson Only | −3.73e−3 | 1.33e−3 | 6.17e−3 |
| Simpson + linear correction | 3.16e−8 | 4.89e−8 | 1.56e−7 |
| Simpson + quadratic correction | 2.00e−4 | 2.19e−2 | 5.18e−1 |

TABLE B

Integration of a sine-squared function

| | % error (based on 1000 simulations | | |
|---|---|---|---|
| | Av. Errors (%) | S.D. Error (%) | Max. Error (%) |
| Simpson Only | −2.21e−6 | 1.10e−6 | 4.39e−3 |
| Simpson + linear correction | 2.21e−6 | 6.93e−7 | 2.52e−6 |
| Simpson + quadratic correction | 2.15e−11 | 6.83e−11 | 1.88e−10 |

For sine functions, Simpson's method with linear correction was unbiased with the smallest standard deviation, while Simpson's method without correction was biased to a negative error and Simpson's method with quadratic correction had a relatively high standard deviation. For sine-squared functions, the errors were generally reduced, with the quadratic correction providing the best result. Based on these evaluations, linear correction is used when integrating sine functions and quadratic correction is used when integrating sine-squared functions.

E. Synchronous Modulation Technique

Figure 14:
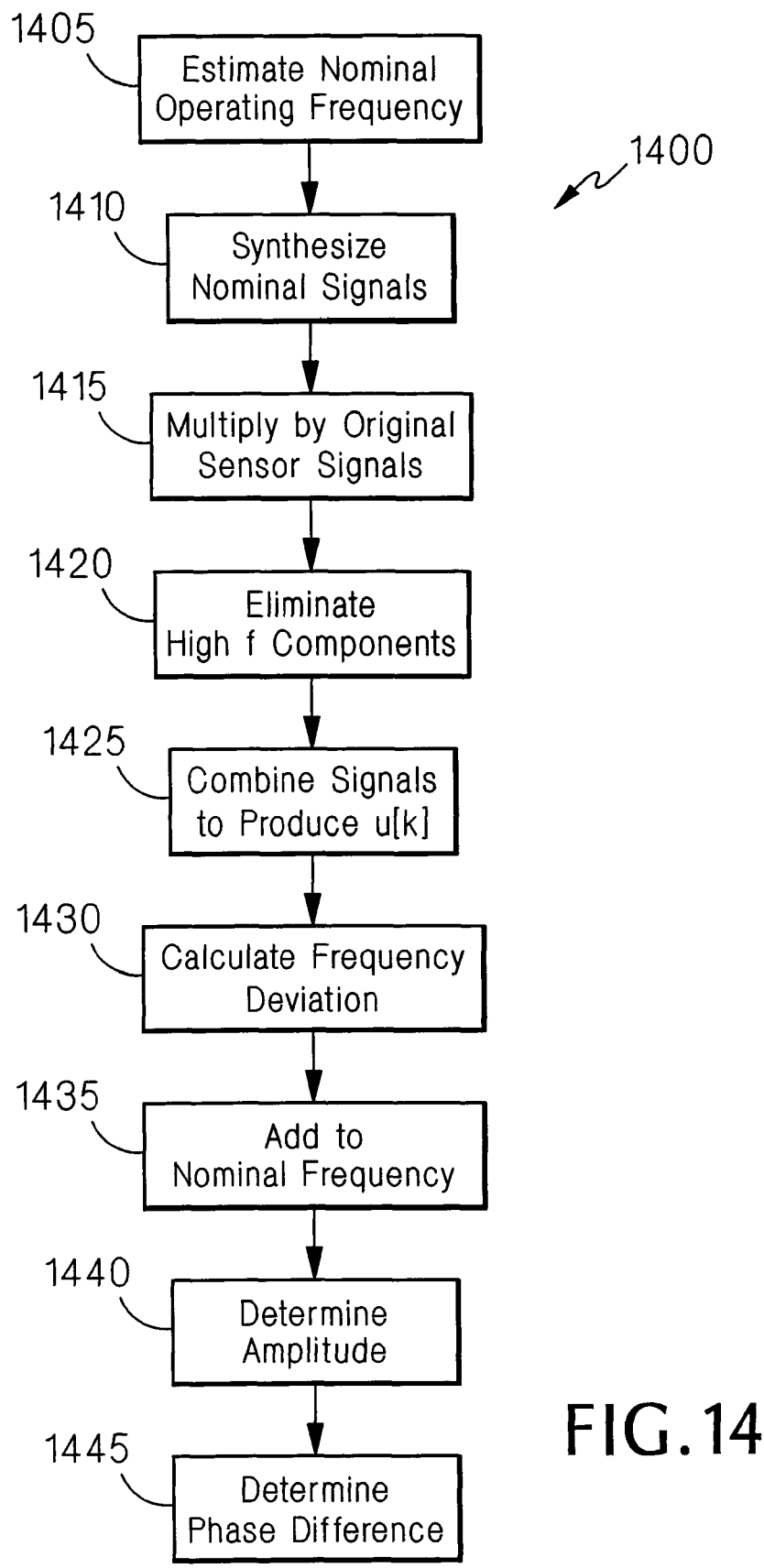
FIG. 14 is a flow chart of a procedure for measuring frequency, amplitude, and phase of sensor data using a synchronous modulation technique.

FIG. 14 illustrates an alternative procedure 1400 for processing the sensor signals. Procedure 1400 is based on synchronous modulation, such as is described by Denys et al., in "Measurement of Voltage Phase for the French Future Defence Plan Against Losses of Synchronism", IEEE Transactions on Power Delivery, 7(1), 62-69, 1992 and by Begovic et al. in "Frequency Tracking in Power Networks in the Presence of Harmonics", IEEE Transactions on Power Delivery, 8(2), 480-486, 1993, both of which are incorporated by reference.

First, the controller generates an initial estimate of the nominal operating frequency of the system (step 1405). The controller then attempts to measure the deviation of the frequency of a signal $x[k]$ (e.g., $SV_1$) from this nominal frequency:

$$x[k] = A\sin[(\omega_0 \Delta \omega)kh + \Phi] + \epsilon(k),$$

where $A$ is the amplitude of the sine wave portion of the signal, $\omega_0$ is the nominal frequency (e.g., 88 Hz), $\Delta\omega$ is the deviation from the nominal frequency, $h$ is the sampling interval, $\Phi$ is the phase shift, and $\epsilon(k)$ corresponds to the added noise and harmonics.

To generate this measurement, the controller synthesizes two signals that oscillate at the nominal frequency (step 1410). The signals are phase shifted by 0 and $\pi/2$ and have amplitude of unity. The controller multiplies each of these signals by the original signal to produce signals $y_1$ and $y_2$ (step 1415):

$$y_1 = x[k]\cos(\omega_0 kh) = \frac{A}{2}\sin[(2\omega_0 + \Delta\omega)kh + \Phi] + \frac{A}{2}\sin(\Delta\omega kh + \Phi),\text{ and}$$

$$y_2 = x[k]\sin(\omega_0 kh) = \frac{A}{2}\cos[(2\omega_0 + \Delta\omega)kh + \Phi] + \frac{A}{2}\cos(\Delta\omega kh + \Phi),$$

where the first terms of $y_1$ and $y_2$ are high frequency (e.g., 176 Hz) components and the second terms are low frequency (e.g., 0 Hz) components. The controller then eliminates the high frequency components using a low pass filter (step 1420):

$$y_1' = \frac{A}{2}\sin(\Delta\omega kh + \Phi) + \varepsilon_1[k],\text{ and}$$

$$y_1' = \frac{A}{2}\cos(\Delta\omega kh + \Phi) + \varepsilon_2[k],$$

where $\epsilon_1[k]$ and $\epsilon_2[k]$ represent the filtered noise from the original signals. The controller combines these signals to produce $u[k]$ (step 1425):

$$u[k] = (y_1'[k] + jy_2'[k])(y_1'[k-1] + jy_2'[k-1])$$

$$= u_1[k] + ju_2[k]$$

$$= \frac{A^2}{4}\cos(\Delta\omega h) + j\frac{A^2}{4}\sin(\Delta\omega h),$$

which carries the essential information about the frequency deviation. As shown, $u_1[k]$ represents the real component of $u[k]$, while $u_2[k]$ represents the imaginary component.

The controller uses the real and imaginary components of $u[k]$ to calculate the frequency deviation, $\Delta f$ (step 1430):

$$\Delta f = \frac{1}{h}\arctan\frac{u_2[k]}{u_1[k]}.$$

The controller then adds the frequency deviation to the nominal frequency (step 1435) to give the actual frequency:

$$f = \Delta f + f_0.$$

The controller also uses the real and imaginary components of $u[k]$ to determine the amplitude of the original signal. In particular, the controller determines the amplitude as (step 1440):

$$A^2 = 4\sqrt{u_1^2[k] + u_2^2[k]}.$$

Next, the controller determines the phase difference between the two sensor signals (step 1445). Assuming that any noise ($\epsilon_1[k]$ and $\epsilon_2[k]$) remaining after application of the low pass filter described below will be negligible, noise free versions of $y_1'[k]$ and $y_2'[k]$ ($y_1^*[k]$ and $y_2^*[k]$) may be expressed as:

$$y_1^*[k] = \frac{A}{2}\sin(\Delta\omega kh + \Phi),\text{ and}$$

$$y_2^*[k] = \frac{A}{2}\cos(\Delta\omega kh - \Phi).$$

Multiplying these signals together gives:

$$v = y_1^* y_2^* = \frac{A^2}{8}[\sin(2\Phi) + \sin(2\Delta\omega kh)].$$

Filtering this signal by a low pass filter having a cutoff frequency near 0 Hz removes the unwanted component and leaves:

$$v' = \frac{A^2}{8}\sin(2\Phi),$$

from which the phase difference can be calculated as:

$$\Phi = \frac{1}{2}\arcsin\frac{8v'}{A^2}.$$

This procedure relies on the accuracy with which the operating frequency is initially estimated, as the procedure measures only the deviation from this frequency. If a good estimate is given, a very narrow filter can be used, which makes the procedure very accurate. For typical flowmeters, the operating frequencies are around 95 Hz (empty) and 82 Hz (full). A first approximation of half range (88 Hz) is used, which allows a low-pass filter cut-off of 13 Hz. Care must be taken in selecting the cut-off frequency as a very small cut-off frequency can attenuate the amplitude of the sine wave.

The accuracy of measurement also depends on the filtering characteristics employed. The attenuation of the filter in the dead-band determines the amount of harmonics rejection, while a smaller cutoff frequency improves the noise rejection.

F. Meter with PI Control

Figure 15A:
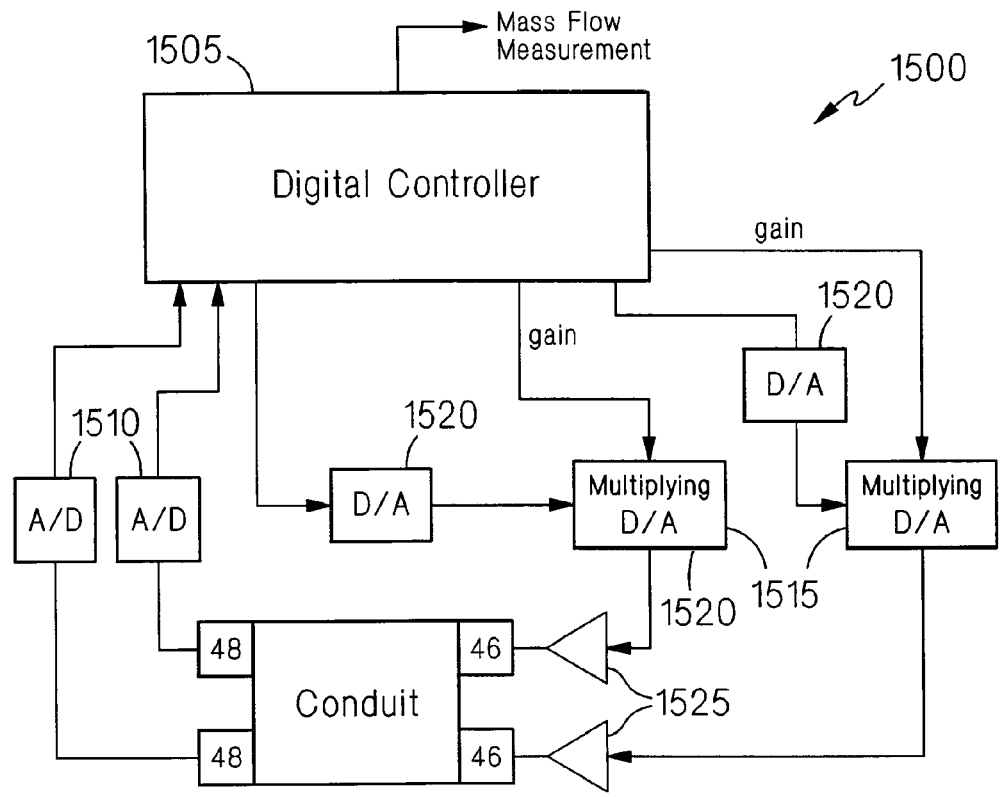
FIGS. 15A and 15B are block diagrams of a mass flowmeter.
Figure 15B:
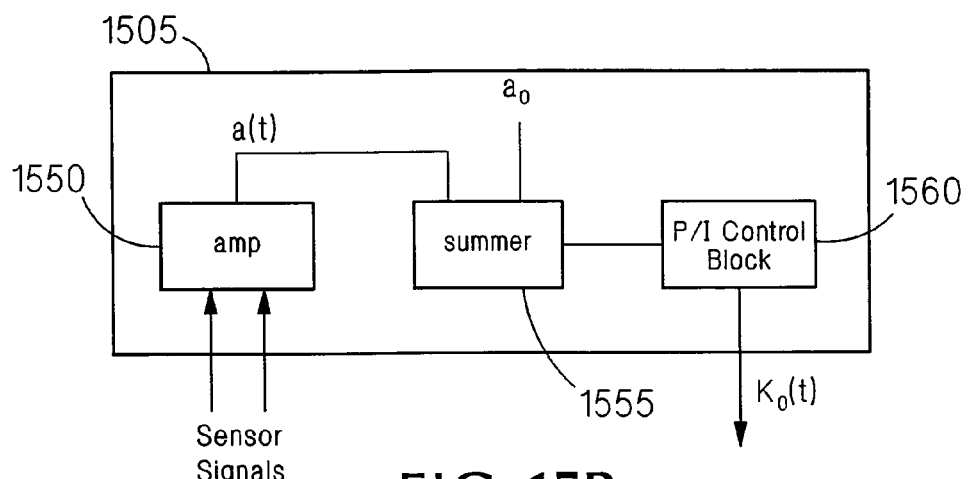

FIGS. 15A and 15B illustrate a meter 1500 having a controller 1505 that uses another technique to generate the signals supplied to the drivers. Analog-to-digital converters 1510 digitize signals from the sensors 48 and provide the digitized signals to the controller 1505. The controller 1505 uses the digitized signals to calculate gains for each driver, with the gains being suitable for generating desired oscillations in the conduit. The gains may be either positive or negative. The controller 1505 then supplies the gains to multiplying digital-to-analog converters 1515. In other implementations, two or more multiplying digital-to-analog converters arranged in series may be used to implement a single, more sensitive multiplying digital-to-analog converter.

The controller 1505 also generates drive signals using the digitized sensor signals. The controller 1505 provides these drive signals to digital-to-analog converters 1520 that convert the signals to analog signals that are supplied to the multiplying digital-to-analog converters 1515.

The multiplying digital-to-analog converters 1515 multiply the analog signals by the gains from the controller 1505 to produce signals for driving the conduit. Amplifiers 1525 then amplify these signals and supply them to the drivers 46. Similar results could be obtained by having the controller 1505 perform the multiplication performed by the multiplying digital-to-analog converter, at which point the multiplying digital-to-analog converter could be replaced by a standard digital-to-analog converter.

FIG. 15B illustrates the control approach in more detail. Within the controller 1505, the digitized sensor signals are provided to an amplitude detector 1550, which determines a measure, a(t), of the amplitude of motion of the conduit using, for example, the technique described above. A summer 1555 then uses the amplitude a(t) and a desired amplitude $a_0$ to calculate an error e(t) as:

$$e(t)=a_0-a(t).$$

The error e(t) is used by a proportional-integral ("PI") control block 1560 to generate a gain $K_0(t)$. This gain is multiplied by the difference of the sensor signals to generate the drive signal. The PI control block permits high speed response to changing conditions. The amplitude detector 1550, summer 1555, and PI control block 1560 may be implemented as software processed by the controller 1505, or as separate circuitry.

1. Control Procedure

Figure 16:
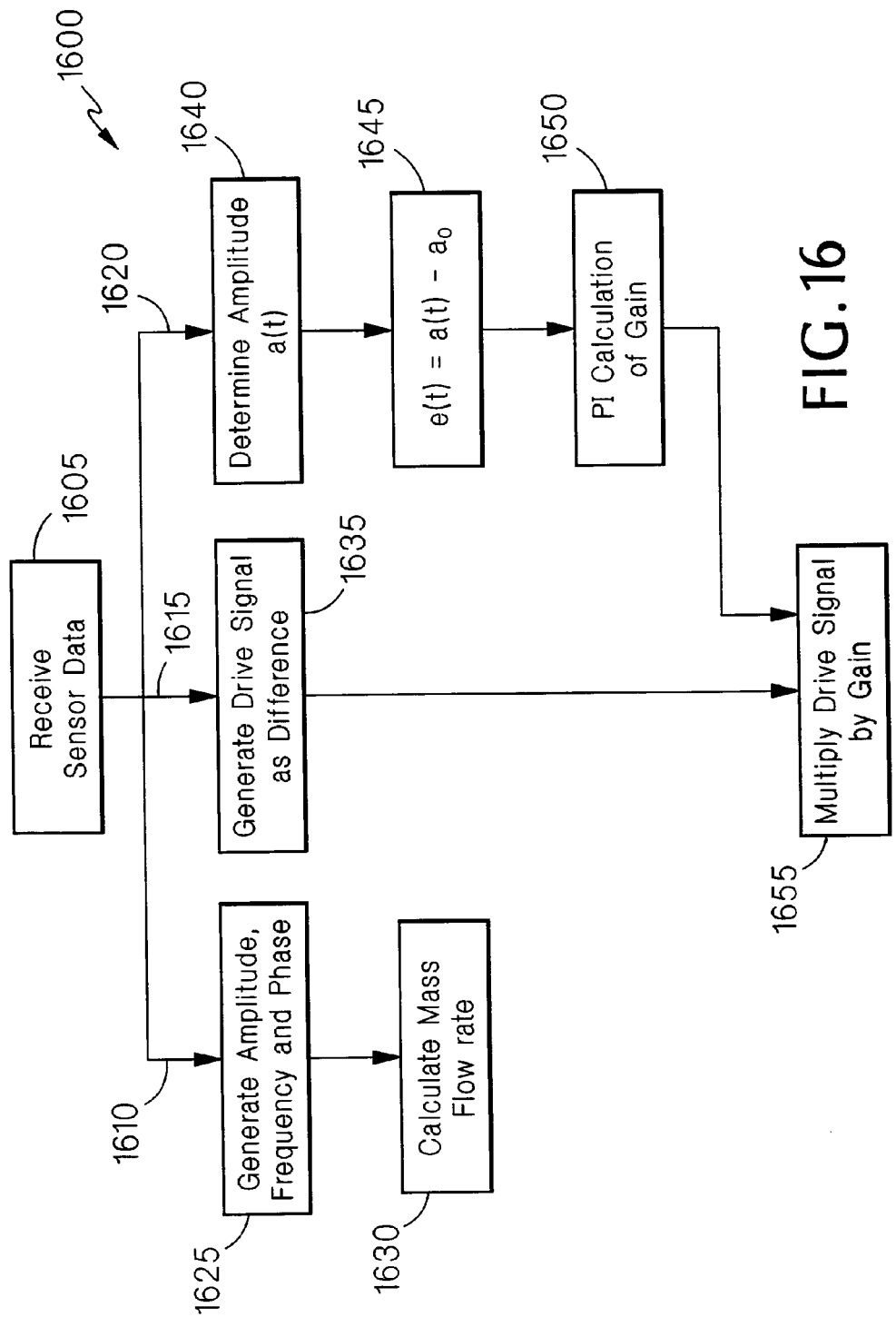
FIG. 16 is a flow chart of a procedure implemented by the meter of FIGS. 15A and 15B.

The meter 1500 operates according to the procedure 1600 illustrated in FIG. 16. Initially, the controller receives digitized data from the sensors (step 1605). Thereafter, the procedure 1600 includes three parallel branches: a measurement branch 1610, a drive signal generation branch 1615, and a gain generation branch 1620.

In the measurement branch 1610, the digitized sensor data is used to generate measurements of amplitude, frequency, and phase, as described above (step 1625). These measurements then are used to calculate the mass flow rate (step 1630) and other process variables. In general, the controller 1505 implements the measurement branch 1610.

In the drive signal generation branch 1615, the digitized signals from the two sensors are differenced to generate the signal (step 1635) that is multiplied by the gain to produce the drive signal. As described above, this differencing operation is performed by the controller 1505. In general, the differencing operation produces a weighted difference that accounts for amplitude differences between the sensor signals.

In the gain generation branch 1620, the gain is calculated using the proportional-integral control block. As noted above, the amplitude, a(t), of motion of the conduit is determined (step 1640) and subtracted from the desired amplitude $a_0$ (step 1645) to calculate the error e(t). Though illustrated as a separate step, generation of the amplitude, a(t), may correspond to generation of the amplitude in the measurement generation step 1625. Finally, the PI control block uses the error e(t) to calculate the gain (step 1650).

The calculated gain is multiplied by the difference signal to generate the drive signal supplied to the drivers (step 1655). As described above, this multiplication operation is performed by the multiplying D/A converter or may be performed by the controller.

2. PI Control Block

The objective of the PI control block is to sustain in the conduit pure sinusoidal oscillations having an amplitude $a_0$. The behavior of the conduit may be modeled as a simple mass-spring system that may be expressed as:

$$\ddot{x}+2\zeta\omega_n\dot{x}+\omega_n^2 x=0,$$

where x is a function of time and the displacement of the mass from equilibrium, $\omega_n$ is the natural frequency, and $\zeta$ is a damping factor, which is assumed to be small (e.g., 0.001). The solution to this force equation as a function of an output y(t) and an input i(t) is analogous to an electrical network in which the transfer function between a supplied current, i(s), and a sensed output voltage, y(s), is:

$$\frac{y(s)}{i(s)} = \frac{ks}{s^2 + 2\zeta\omega_n s + \omega_n^2}.$$

To achieve the desired oscillation in the conduit, a positive-feedback loop having the gain $K_0(t)$ is automatically adjusted by a 'slow' outer loop to give:

$$\ddot{x}+(2\zeta\omega_n-kK_0(t))\dot{x}+\omega_n^2 x=0.$$

The system is assumed to have a "two-time-scales" property, which means that variations in $K_0(t)$ are slow enough that solutions to the equation for x provided above can be obtained by assuming constant damping.

A two-term PI control block that gives zero steady-state error may be expressed as:

$$K_0(t)=K_p e(t)+K_i\int_0^t e(t)dt,$$

where the error, e(t) (i.e., $a_0$-a(t)), is the input to the PI control block, and $K_p$ and $K_i$ are constants. In one implementation, with $a_0$=10, controller constants of $K_p$=0.02 and $K_i$=0.0005 provide a response in which oscillations build up quickly. However, this PI control block is nonlinear, which may result in design and operational difficulties.

A linear model of the behavior of the oscillation amplitude may be derived by assuming that x(t) equals $Ae^{j\omega t}$, which results in:

$$\dot{x} = \dot{A}e^{j\omega t} + j\omega e^{j\omega t}, \text{ and}$$

$$\ddot{x} = [\ddot{A} - \omega^2 A]e^{j\omega t} + 2j\omega\dot{A}e^{j\omega t}.$$

Substituting these expressions into the expression for oscillation of the loop, and separating into real and imaginary terms, gives:

$$j\omega\{2\dot{A}+(2\zeta\omega_n-kK_0)A\}=0, \text{ and}$$

$$\ddot{A}+(2\zeta\omega_n-kK_0)\dot{A}+(\omega_n^2-\omega^2)A=0.$$

A(t) also may be expressed as:

$$\frac{\dot{A}}{A} = -\zeta\omega_n + \frac{kK_0}{2}t.$$

A solution of this equation is:

$$\log A(t) = \left(-\zeta\omega_n + \frac{kK_0}{2}\right)t.$$

Figure 17:
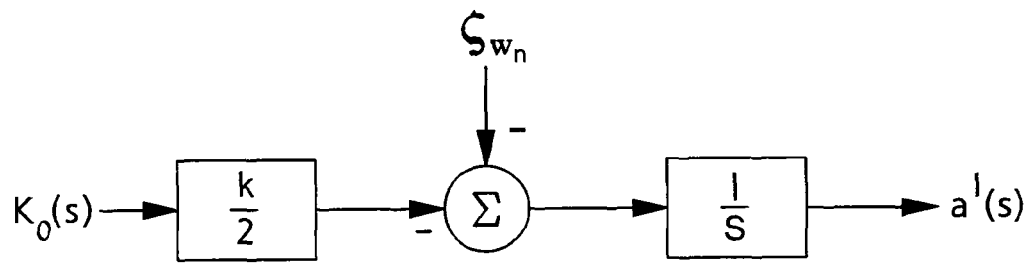
FIG. 17 illustrates log-amplitude control of a transfer function.

Transforming variables by defining a(t) as being equal to log A(t), the equation for A(t) can be written as:

$$\frac{da}{dt} = -\zeta\omega_n + \frac{kK_0(t)}{2},$$

where $K_o$ is now explicitly dependent on time. Taking Laplace transforms results in:

$$a(s) = \frac{-\zeta\omega_n - kK_0(s)/2}{s},$$

which can be interpreted in terms of transfer-functions as in FIG. 17. This figure is of particular significance for the design of controllers, as it is linear for all $K_o$ and a, with the only assumption being the two-time-scales property. The performance of the closed-loop is robust with respect to this assumption so that fast responses which are attainable in practice can be readily designed.

From FIG. 17, the term $\zeta\omega_n$ is a "load disturbance" that needs to be eliminated by the controller (i.e., $kK_o/2$ must equal $\zeta\omega_n$ for a(t) to be constant). For zero steady-state error this implies that the outer-loop controller must have an integrator (or very large gain). As such, an appropriate PI controller, C(s), may be assumed to be $K_p(1+1/sT_i)$, where $T_i$ is a constant. The proportional term is required for stability. The term $\zeta\omega_n$, however, does not affect stability or controller design, which is based instead on the open-loop transfer function:

$$C(s)G(s) = \frac{a(s)}{e(s)} = \frac{kK_p(1+sT_i)}{2s^2 T_i} = \frac{kK_p/2(s+1/T_i)}{s^2}.$$

Figure 18:
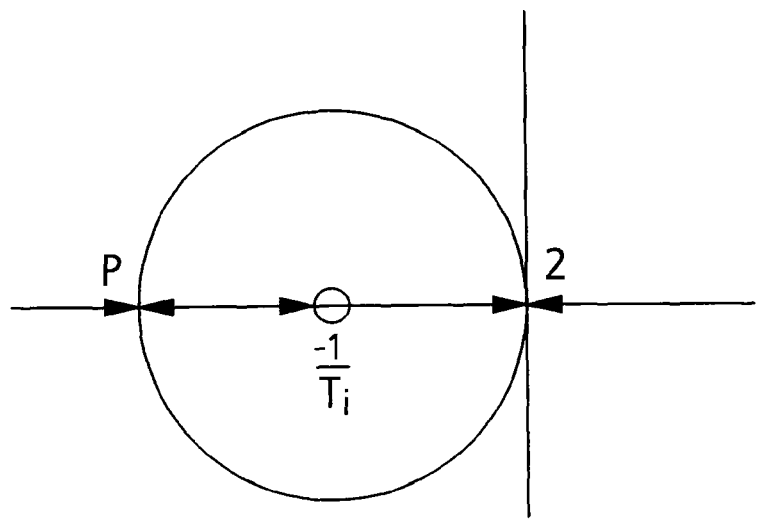
FIG. 18 is a root locus diagram.
Figure 19A:
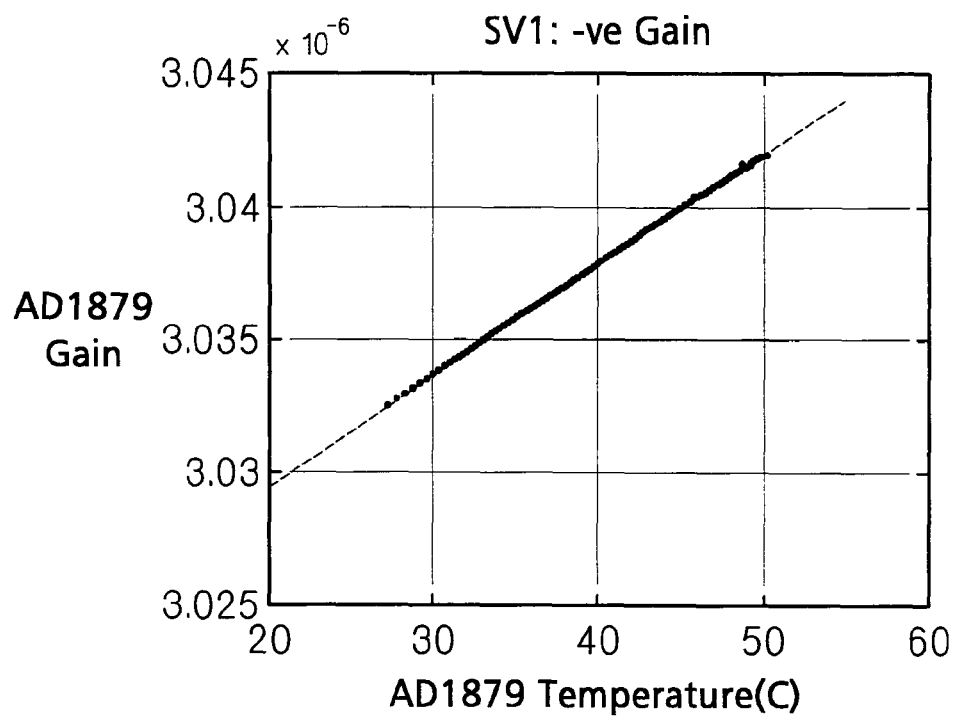
FIGS. 19A-19D are graphs of analog-to-digital converter performance relative to temperature.
Figure 19B:
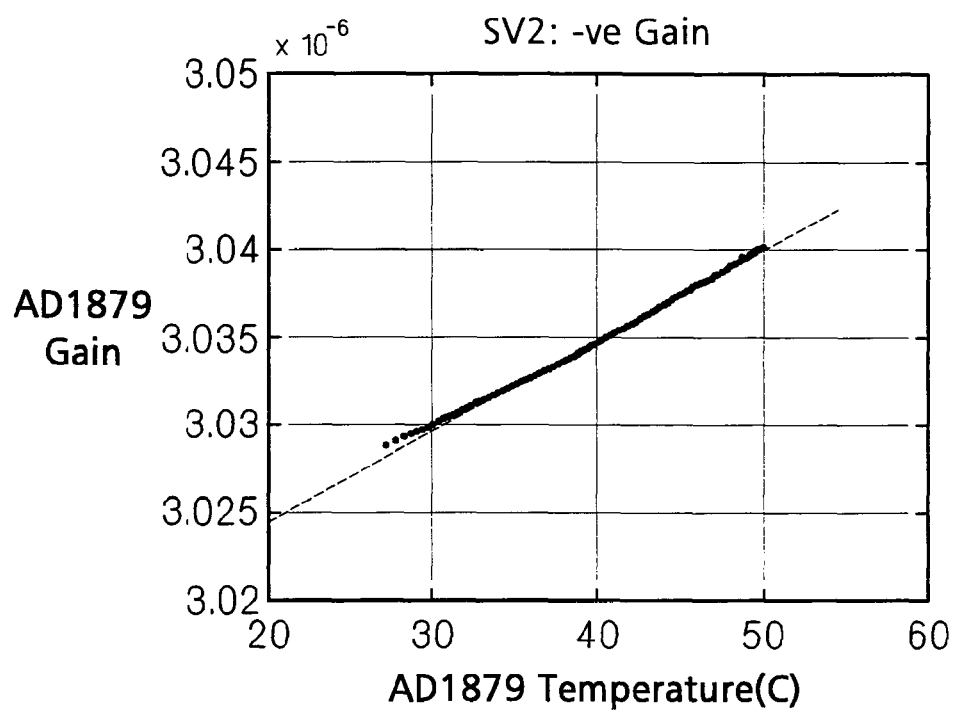
Figure 19C:
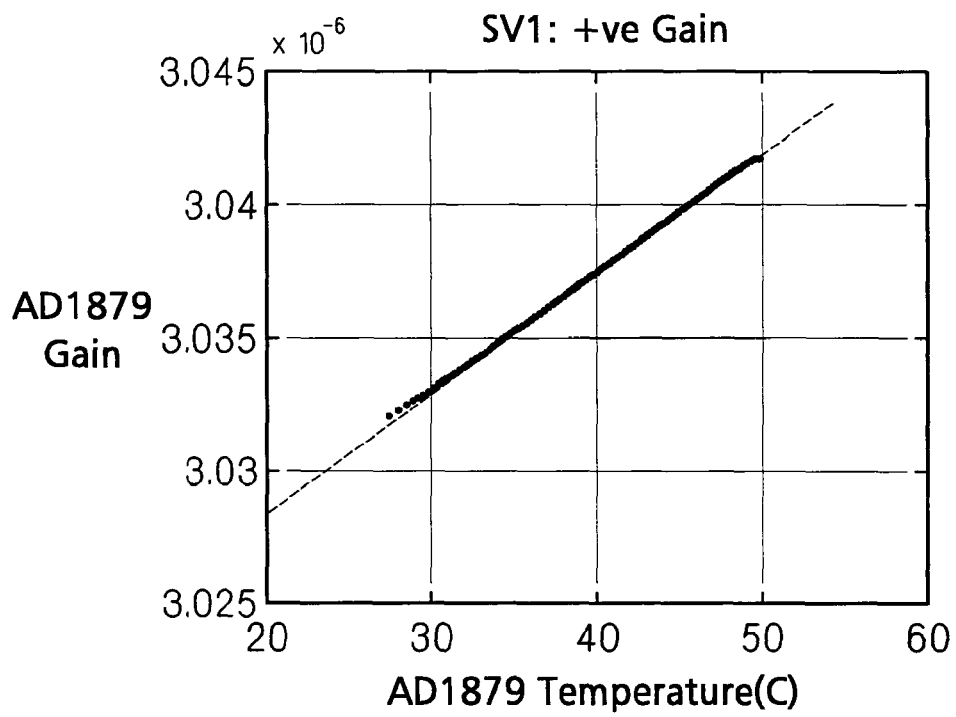
Figure 19D:
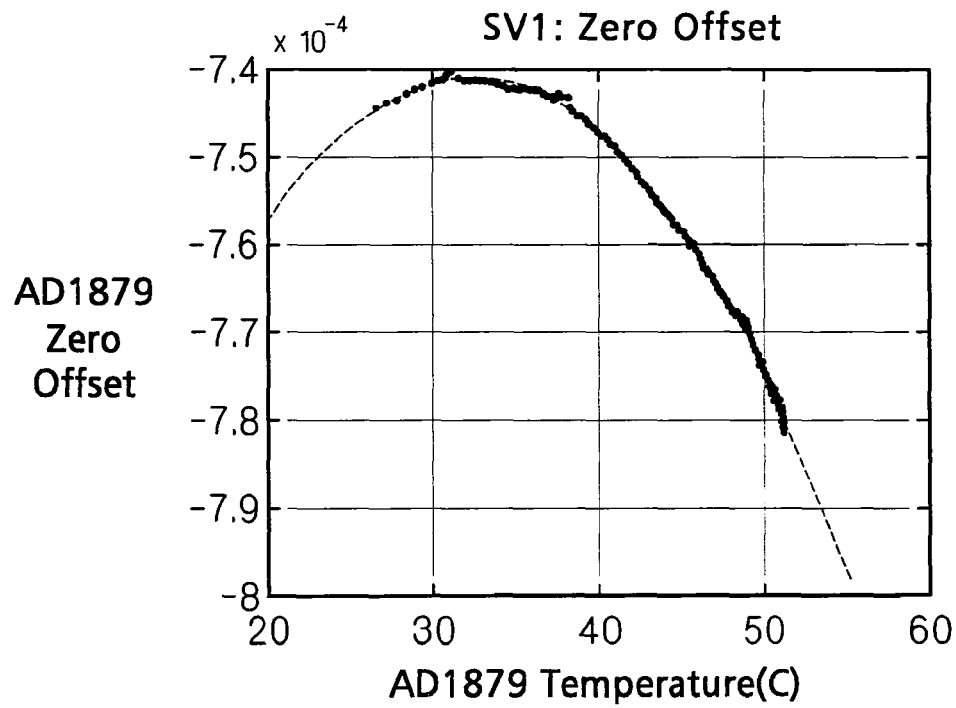

The root locus for varying $K_p$ is shown in FIG. 18. For small $K_p$, there are slow underdamped roots. As $K_p$ increases, the roots become real at the point P for which the controller gain is $K_p=8/(kT_i)$. Note in particular that the theory does not place any restriction upon the choice of $T_i$. Hence the response can, in principle, be made critically damped and as fast as desired by appropriate choices of $K_p$ and $T_i$.

Although the poles are purely real at point P, this does not mean there is no overshoot in the closed-loop step response. This is most easily seen by inspecting the transfer function between the desired value, $a_0$, and the error e:

$$\frac{e(s)}{a_0(s)} = \frac{s^2}{s^2 + 0.5kK_p(s+1/T_i)} = \frac{s^2}{p_2(s)},$$

where $p_2$ is a second-order polynomial. With a step input, $a_o(s)=\alpha/s$, the response can be written as $\alpha p'(t)$, where p(t) is the inverse transform of $1/p_2(s)$ and equals $a_1\exp(-\lambda_1 t)+a_2\exp(-\lambda_2 t)$. The signal p(t) increases and then decays to zero so that e(t), which is proportional to p', must change sign, implying overshoot in a(t). The set-point $a_o$ may be prefiltered to give a pseudo set-point $a_o^*$:

$$a_0^*(s) = \frac{1}{1+sT_i}a_0(s),$$

where $T_i$ is the known controller parameter. With this prefilter, real controller poles should provide overshoot-free step responses. This feature is useful as there may be physical constraints on overshoot (e.g., mechanical interference or overstressing of components).

The root locus of FIG. 18 assumes that the only dynamics are from the inner-loop's gain/log-amplitude transfer function (FIG. 16) and the outer-loop's PI controller C(s) (i.e., that the log-amplitude a=log A is measured instantaneously). However, A is the amplitude of an oscillation which might be growing or decaying and hence cannot in general be measured without taking into account the underlying sinusoid. There are several possible methods for measuring A, in addition to those discussed above. Some are more suitable for use in quasi-steady conditions. For example, a phase-locked loop in which a sinusoidal signal $s(t)=\sin(\omega_n t+\Phi_0)$ locks onto the measured waveform $y(t)=A(t)\sin(\omega_n t-\Phi_1)$ may be employed. Thus, a measure of the amplitude a=log A is given by dividing these signals (with appropriate safeguards and filters). This method is perhaps satisfactory near the steady-state but not for start-up conditions before there is a lock.

Another approach uses a peak-follower that includes a zero-crossing detector together with a peak-following algorithm implemented in the controller. Zero-crossing methods, however, can be susceptible to noise. In addition, results from a peak-follower are available only every half-cycle and thereby dictate the sample interval for controller updates.

Finally, an AM detector may be employed. Given a sine wave $y(t)=A\sin\omega_n t$, an estimate of A may be obtained from $\hat{A}_1 0.5\pi F\{\text{abs}(y)\}$, where F{ } is a suitable low-pass filter with unity DC gain. The AM detector is the simplest approach. Moreover, it does not presume that there are oscillations of any particular frequency, and hence is usable during startup conditions. It suffers from a disadvantage that there is a leakage of harmonics into the inner loop which will affect the spectrum of the resultant oscillations. In addition, the filter adds extra dynamics into the outer loop such that compromises need to be made between speed of response and spectral purity. In particular, an effect of the filter is to constrain the choice of the best $T_i$.

The Fourier series for abs(y) is known to be:

$$A\text{abs}(\sin\omega_n t) = \frac{2A}{\pi}\left[1 + \frac{2}{3}\cos 2\omega_n t - \frac{2}{15}\cos 4\omega_n t + \frac{2}{35}\cos 6\omega_n t + \ldots\right].$$

As such, the output has to be scaled by $\pi/2$ to give the correct DC output A, and the (even) harmonic terms $a_k\cos 2k\omega_n t$ have to be filtered out. As all the filter needs to do is to pass the DC component through and reduce all other frequencies, a "brick-wall" filter with a cut-off below $2\omega_n$ is sufficient. However, the dynamics of the filter will affect the behavior of the closed-loop. A common choice of filter is in the Butterworth form. For example, the third-order low-pass filter with a design break-point frequency $\omega_b$ is:

$$F(s) = \frac{1}{1 + 2s/\omega_b + 2s^2/\omega_b^2 + s^3/\omega_b^3}.$$

At the design frequency the response is 3 dB down; at $2\omega_b$ it is −18 dB (0.12), and at $4\omega_b$ it is −36 dB (0.015) down. Higher-order Butterworth filters have a steeper roll-off, but most of their poles are complex and may affect negatively the control-loop's root locus.

G. Zero Offset Compensation

As noted above, zero offset may be introduced into a sensor voltage signal by drift in the pre-amplification circuitry and by the analog-to-digital converter. Slight differences in the pre-amplification gains for positive and negative voltages due to the use of differential circuitry may worsen the zero offset effect. The errors vary between transmitters, and with transmitter temperature and component wear.

Audio quality (i.e., relatively low cost) analog-to-digital converters may be employed for economic reasons. These devices are not designed with DC offset and amplitude stability as high priorities. FIGS. 19A-19D show how offset and positive and negative gains vary with chip operating temperature for one such converter (the AD1879 converter). The repeatability of the illustrated trends is poor, and even allowing for temperature compensation based on the trends, residual zero offset and positive/negative gain mismatch remain.

Figure 20A:
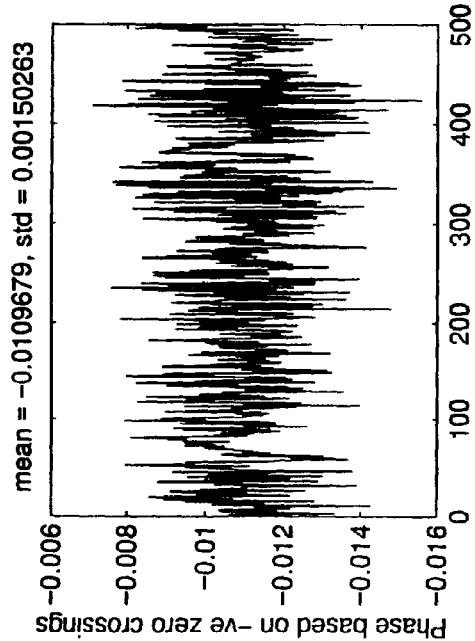
FIGS. 20A-20C are graphs of phase measurements.
Figure 20B:
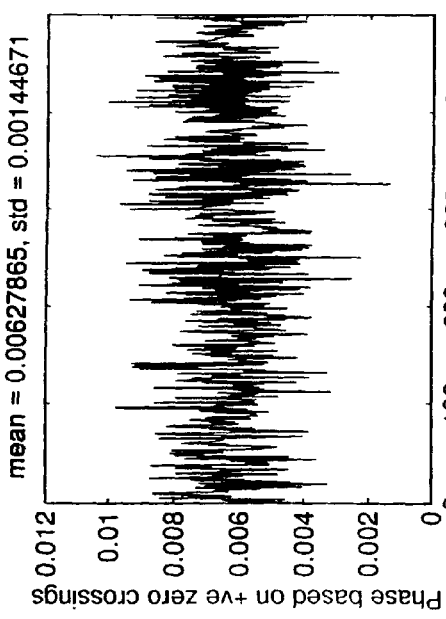
Figure 20C:
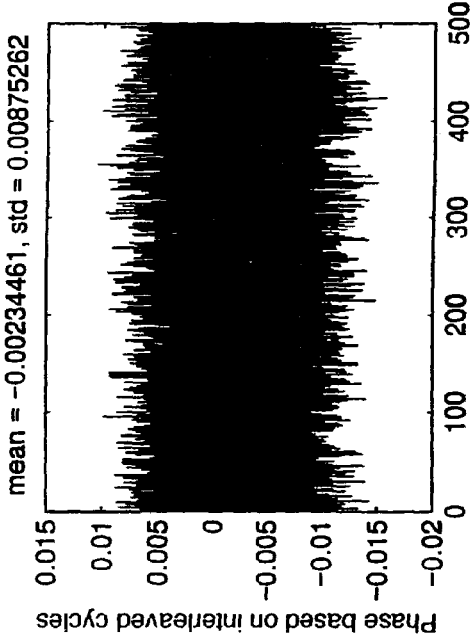

If phase is calculated using the time difference between zero crossing points on the two sensor voltages, DC offset may lead to phase errors. This effect is illustrated by FIGS. 20A-20C. Each graph shows the calculated phase offset as measured by the digital transmitter when the true phase offset is zero (i.e., at zero flow).

FIG. 20A shows phase calculated based on whole cycles starting with positive zero-crossings. The mean value is 0.00627 degrees.

FIG. 20B shows phase calculated starting with negative zero-crossings. The mean value is 0.0109 degrees.

FIG. 20C shows phase calculated every half-cycle. FIG. 20C interleaves the data from FIGS. 20A and 20B. The average phase (−0.00234) is closer to zero than in FIGS. 20A and 20B, but the standard deviation of the signal is about six times higher.

More sophisticated phase measurement techniques, such as those based on Fourier methods, are immune to DC offset. However, it is desirable to eliminate zero offset even when those techniques are used, since data is processed in whole-cycle packets delineated by zero crossing points. This allows simpler analysis of the effects of, for example, amplitude modulation on apparent phase and frequency. In addition, gain mismatch between positive and negative voltages will introduce errors into any measurement technique.

The zero-crossing technique of phase detection may be used to demonstrate the impact of zero offset and gain mismatch error, and their consequent removal. FIGS. 21A and 21B illustrate the long term drift in phase with zero flow. Each point represents an average over one minute of live data. FIG. 21A shows the average phase, and FIG. 21B shows the standard deviation in phase. Over several hours, the drift is significant. Thus, even if the meter were zeroed every day, which in many applications would be considered an excessive maintenance requirement, there would still be considerable phase drift.

1. Compensation Technique

A technique for dealing with voltage offset and gain mismatch uses the computational capabilities of the digital transmitter and does not require a zero flow condition. The technique uses a set of calculations each cycle which, when averaged over a reasonable period (e.g., 10,000 cycles), and excluding regions of major change (e.g., set point change, onset of aeration), converge on the desired zero offset and gain mismatch compensations.

Assuming the presence of up to three higher harmonics, the desired waveform for a sensor voltage SV(t) is of the form:

$$SV(t) = A_1 \sin(\omega t) + A_2 \sin(2\omega t) + A_3 \sin(3\omega t) + A_4 \sin(4\omega t)$$

where $A_1$ designates the amplitude of the fundamental frequency component and $A_2$-$A_4$ designate the amplitudes of the three harmonic components. However, in practice, the actual waveform is adulterated with zero offset $Z_o$ (which has a value close to zero) and mismatch between the negative and positive gains $G_n$ and $G_p$. Without any loss of generality, it can be assumed that $G_p$ equals one and that $G_n$ is given by:

$$G_n = 1 + \epsilon_G,$$

where $\epsilon_G$ represents the gain mismatch.

The technique assumes that the amplitudes $A_i$ and the frequency $\omega$ are constant. This is justified because estimates of $Z_o$ and $\epsilon_G$ are based on averages taken over many cycles (e.g., 10,000 interleaved cycles occurring in about 1 minute of operation). When implementing the technique, the controller tests for the presence of significant changes in frequency and amplitude to ensure the validity of the analysis. The presence of the higher harmonics leads to the use of Fourier techniques for extracting phase and amplitude information for specific harmonics. This entails integrating SV(t) and multiplying by a modulating sine or cosine function.

The zero offset impacts the integral limits, as well as the functional form. Because there is a zero offset, the starting point for calculation of amplitude and phase will not be at the zero phase point of the periodic waveform SV(t). For zero offset $Z_o$, the corresponding phase offset is, approximately, $$\varphi_{Z_0} = -\sin\left(\frac{Z_0}{A_1}\right)$$

For small phase, $$\varphi_{Z_o} = -\frac{Z_o}{A_1},$$

with corresponding time delay $$t_{Z_o} = \frac{\varphi_{Z_o}}{\omega}.$$

The integrals are scaled so that the limiting value (i.e., as $Z_o$ and $\omega_G$ approach zero) equals the amplitude of the relevant harmonic. The first two integrals of interest are:

$$I_{1Ps} = \frac{2\omega}{\pi} \int_{t_{Z_0}}^{\frac{\pi}{\omega}+t_{Z_0}} (SV(t) + Z_0) \cdot \sin[\omega(t - t_{Z_0})]dt, \text{ and}$$

$$I_{1Ns} = \frac{2\omega}{\pi}(1 + \varepsilon_G) \int_{\frac{\pi}{\omega}+t_{Z_0}}^{2\frac{\pi}{\omega}+t_{Z_0}} (SV(t) + Z_0) \cdot \sin[\omega(t - t_{Z_0})]dt.$$

These integrals represent what in practice is calculated during a normal Fourier analysis of the sensor voltage data. The subscript 1 indicates the first harmonic, N and P indicate, respectively, the negative or positive half cycle, and s and c indicate, respectively, whether a sine or a cosine modulating function has been used.

Strictly speaking, the mid-zero crossing point, and hence the corresponding integral limits, should be given by $\pi/\omega - t_{Z_o}$, rather than $\pi/\omega + t_{Z_o}$. However, the use of the exact mid-point rather than the exact zero crossing point leads to an easier analysis, and better numerical behavior (due principally to errors in the location of the zero crossing point). The only error introduced by using the exact mid-point is that a small section of each of the above integrals is multiplied by the wrong gain (1 instead of $1+\epsilon_G$ and vice versa). However, these errors are of order $Z_o^2 \epsilon_G$ and are considered negligible.

Using computer algebra and assuming small $Z_o$ and $\epsilon_G$, first order estimates for the integrals may be derived as:

$$I_{1Ps\_est} = A_1 + \frac{4}{\pi}Z_0\left[1 + \frac{2}{3}\frac{A_2}{A_1} + \frac{4}{15}\frac{A_4}{A_1}\right], \text{ and}$$

$$I_{1Ns\_est} = (1 + \varepsilon_G)\left[A_1 - \frac{4}{\pi}Z_0\left[1 + \frac{2}{3}\frac{A_2}{A_1} + \frac{4}{15}\frac{A_4}{A_1}\right]\right].$$

Useful related functions including the sum, difference, and ratio of the integrals and their estimates may be determined. The sum of the integrals may be expressed as:

$$\text{Sum}_{1s} = (I_{1Ps} + I_{1Ns}),$$

while the sum of the estimates equals:

$$\text{Sum}_{1s\_est} = A_1(2 + \varepsilon_G) - \frac{4}{\pi}Z_0\varepsilon_G\left[1 + \frac{2}{3}\frac{A_2}{A_1} + \frac{4}{15}\frac{A_4}{A_1}\right].$$

Similarly, the difference of the integrals may be expressed as:

$$\text{Diff}_{1s} = I_{1Ps} - I_{1Ns},$$

while the difference of the estimates is:

$$\text{Diff}_{1s\_est} = A_1\varepsilon_G + \frac{4}{\pi}Z_0(2 + \varepsilon_G)\left[1 + \frac{2}{3}\frac{A_2}{A_1} + \frac{4}{15}\frac{A_4}{A_1}\right].$$

Finally, the ratio of the integrals is:

$$\text{Ratio}_{1s} = \frac{I_{1Ps}}{I_{1Ns}},$$

while the ratio of the estimates is:

$$\text{Ratio}_{1s\_est} = \frac{1}{1+\varepsilon_G}\left[1 + Z_0\left[\frac{8}{15}\frac{15A_1 + 10A_2 + 4A_4}{\pi A_1^2}\right]\right].$$

Corresponding cosine integrals are defined as:

$$I_{1Pc} = \frac{2\omega}{\pi} \int_{t_{Z_0}}^{\frac{\pi}{\omega}+t_{Z_0}} (SV(t) + Z_0)\cos[\omega(t - t_{Z_0})]dt, \text{ and}$$

$$I_{1Nc} = \frac{2\omega}{\pi}(1 + \varepsilon_G)\int_{\frac{\pi}{\omega}+t_{Z_0}}^{\frac{2\pi}{\omega}+t_{Z_0}} (SV(t) + Z_0)\cos[\omega(t - t_{Z_0})]dt,$$

with estimates:

$$I_{1Pc\_est} = -Z_0 + \frac{40A_2 + 16A_4}{15\pi}, \text{ and}$$

$$I_{1Nc\_est} = (1 + \varepsilon_G)\left[Z_0 + \frac{40A_2 + 16A_4}{15\pi}\right],$$

and sums:

$$\text{Sum}_{1C} = I_{1Pc} + I_{1Nc}, \text{ and}$$

$$\text{Sum}_{1C\_est} = \varepsilon_G\left[Z_0 + \frac{40A_2 + 16A_4}{15\pi}\right].$$

Second harmonic integrals are:

$$I_{2Ps} = \frac{2\omega}{\pi} \int_{t_{Z_0}}^{\frac{\pi}{\omega}+t_{Z_0}} (SV(t) + Z_0)\sin[2\omega(t - t_{Z_0})]dt, \text{ and}$$

$$I_{2Ns} = \frac{2\omega}{\pi}(1 + \varepsilon_G)\int_{\frac{\pi}{\omega}+t_{Z_0}}^{\frac{2\pi}{\omega}+t_{Z_0}} (SV(t) + Z_o\sin[2\omega(t - t_{Z_0})]dt,$$

with estimates:

$$I_{2Ps\_est} = A_2 + \frac{8}{15\pi}Z_0\left[-5 + 9\frac{A_3}{A_1}\right], \text{ and}$$

$$I_{2Ps\_est} = (1 + \varepsilon_G)\left[A_2 - \frac{8}{15\pi}Z_0\left[-5 + 9\frac{A_3}{A_1}\right]\right],$$

and sums:

$$Sum_{2s} = I_{2Ps} + I_{2Ns}, \text{ and}$$

$$Sum_{2Ps\_est} = A_2(2 + \varepsilon_G) - \frac{8}{15\pi}\varepsilon_G Z_0\left[-5 + 9\frac{A_3}{A_1}\right].$$

The integrals can be calculated numerically every cycle. As discussed below, the equations estimating the values of the integrals in terms of various amplitudes and the zero offset and gain values are rearranged to give estimates of the zero offset and gain terms based on the calculated integrals.

2. Example

The accuracy of the estimation equations may be illustrated with an example. For each basic integral, three values are provided: the "true" value of the integral (calculated within Mathcad using Romberg integration), the value using the estimation equation, and the value calculated by the digital transmitter operating in simulation mode, using Simpson's method with end correction.

Thus, for example, the value for $I_{1Ps}$ calculated according to:

$$I_{1Ps} = \frac{2\omega}{\pi} \int_{t_{z_0}}^{\frac{\pi}{\omega}+t_{z_0}} (SV(t) + Z_0)\sin[\omega(t - t_{z_0})] dt$$

is 0.101353, while the estimated value ($I_{1Ps\_est}$) calculated as:

$$I_{1Ps\_est} = A_1 + \frac{4}{\pi} Z_0 \left[1 + \frac{2}{3}\frac{A_2}{A_1} + \frac{4}{15}\frac{A_4}{A_1}\right]$$

is 0.101358. The value calculated using the digital transmitter in simulation mode is 0.101340. These calculations use the parameter values illustrated in Table C.

TABLE C

| Parameter | Value | Comment |
|---|---|---|
| $\omega$ | $160\pi$ | This corresponds to frequency = 80 Hz, a typical value. |
| $A_1$ | 0.1 | This more typically is 0.3, but it could be smaller with aeration. |
| $A_2$ | 0.01 | This more typically is 0.005, but it could be larger with aeration. |
| $A_3$ and $A_4$ | 0.0 | The digital Coriolis simulation mode only offers two harmonics, so these higher harmonics are ignored. However, they are small (<0.002). |
| $Z_o$ | 0.001 | Experience suggests that this is a large value for zero offset. |
| $\epsilon_G$ | 0.001 | Experience suggests this is a large value for gain mismatch. |

The exact, estimate and simulation results from using these parameter values are illustrated in Table D.

TABLE D

| Integral | 'Exact' Value | Estimate | Digital Coriolis Simulation |
|---|---|---|---|
| $I_{1Ps}$ | 0.101353 | 0.101358 | 0.101340 |
| $I_{1Ns}$ | 0.098735 | 0.098740 | 0.098751 |
| $I_{1Pc}$ | 0.007487 | 0.007488 | 0.007500 |
| $I_{1Nc}$ | −0.009496 | −0.009498 | −0.009531 |
| $I_{2Ps}$ | 0.009149 | 0.009151 | 0.009118 |
| $I_{2Ns}$ | 0.010857 | 0.010859 | 0.010885 |

Thus, at least for the particular values selected, the estimates given by the first order equations are extremely accurate. As $Z_o$ and $\epsilon_G$ approach zero, the errors in both the estimate and the simulation approach zero.

3. Implementation

The first order estimates for the integrals define a series of non-linear equations in terms of the amplitudes of the harmonics, the zero offset, and the gain mismatch. As the equations are non-linear, an exact solution is not readily available. However, an approximation followed by corrective iterations provides reasonable convergence with limited computational overhead.

Conduit-specific ratios may be assumed for $A_1$-$A_4$. As such, no attempt is made to calculate all of the amplitudes $A_1$-$A_4$. Instead, only $A_1$ and $A_2$ are estimated using the integral equations defined above. Based on experience of the relative amplitudes, $A_3$ may be approximated as $A_2/2$, and $A_4$ may be approximated as $A_2/10$.

Figure 22:
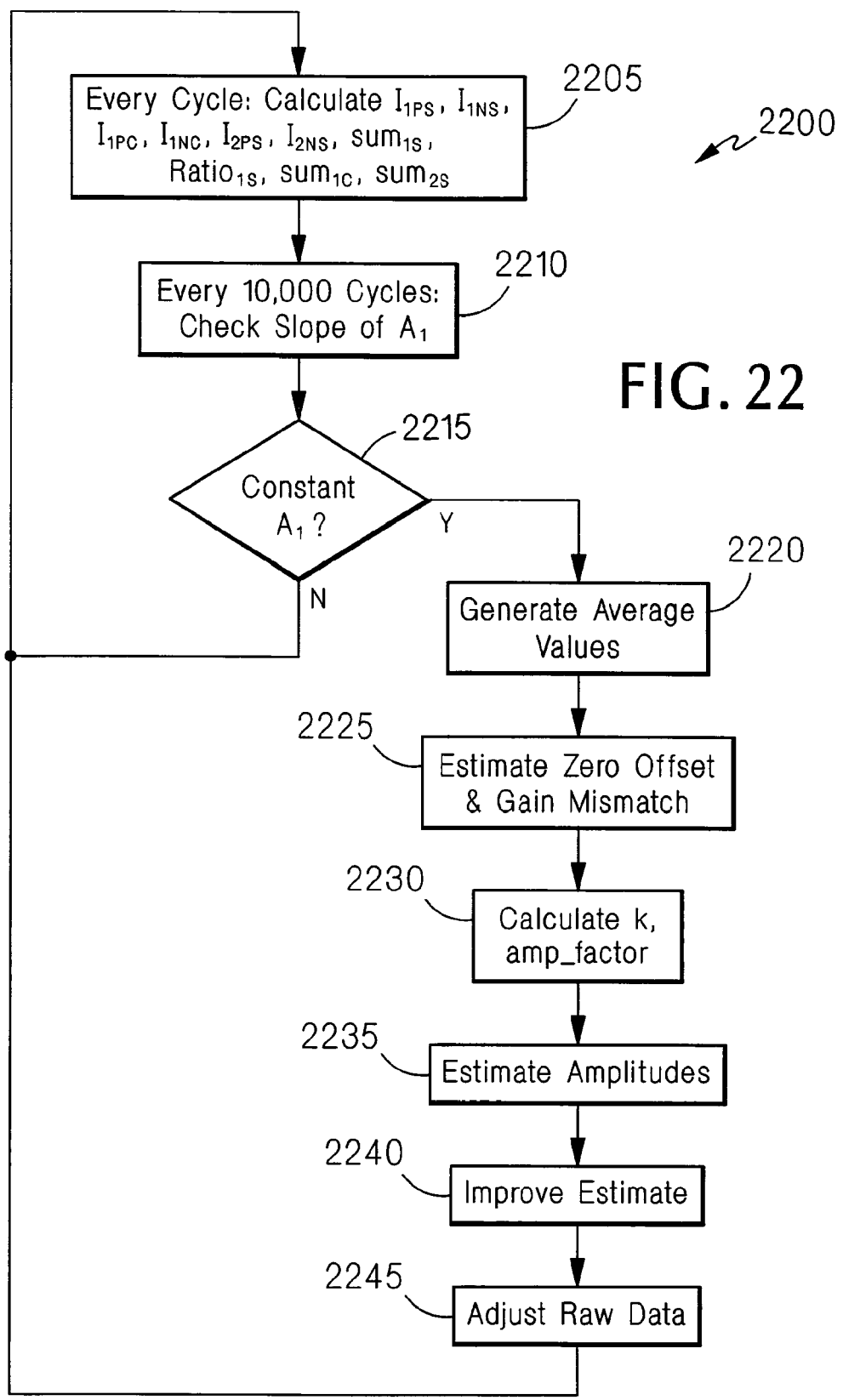
FIG. 22 is a flow chart of a zero offset compensation procedure.

The zero offset compensation technique may be implemented according to the procedure 2200 illustrated in FIG. 22. During each cycle, the controller calculates the integrals $I_{1Ps}$, $I_{1Ns}$, $I_{1Pc}$, $I_{1Nc}$, $I_{2Ps}$, $I_{2Ns}$ and related functions $sum_{1s}$, $ratio_{1s}$, $sum_{1c}$ and $sum_{2s}$ (step 2205). This requires minimal additional calculation beyond the conventional Fourier calculations used to determine frequency, amplitude and phase.

Every 10,000 cycles, the controller checks on the slope of the sensor voltage amplitude $A_1$, using a conventional rate-of-change estimation technique (step 2210). If the amplitude is constant (step 2215), then the controller proceeds with calculations for zero offset and gain mismatch. This check may be extended to test for frequency stability.

To perform the calculations, the controller generates average values for the functions (e.g., $sum_{1s}$) over the last 10,000 cycles. The controller then makes a first estimation of zero offset and gain mismatch (step 2225):

$$Z_0 = -Sum_{1c}/2, \text{ and}$$

$$\epsilon_G = 1/Ratio_{1s} - 1$$

Using these values, the controller calculates an inverse gain factor (k) and amplitude factor (amp_factor) (step 2230):

$$k = 1.0/(1.0 + 0.5 * \epsilon_G), \text{ and}$$

$$amp\_factor = 1 + 50/75 * Sum_{2s}/Sum_{1s}$$

The controller uses the inverse gain factor and amplitude factor to make a first estimation of the amplitudes (step 2235):

$$A_1 = k*[Sum_{1s}/2 + 2/\pi * Z_o * \epsilon_G * amp\_factor], \text{ and}$$

$$A_2 = k*[Sum_{2s}/2 - 4/(3*\pi)*Z_o*\epsilon_G]$$

The controller then improves the estimate by the following calculations, iterating as required (step 2240):

$$x_1 = Z_o,$$

$$x_2 = \epsilon_G,$$

$$\epsilon_G = [1 + 8/\pi * x_1/A_1 * amp\_factor]/Ratio_{1s} - 1.0,$$

$$Z_o = -Sum_{1c}/2 + x_2*(x_1 + 2.773/\pi * A_2)/2,$$

$$A_1 = k*[Sum_{1s}/2 + 2/\pi * x_1 * x_2 * amp\_factor],$$

$$A_2 = k*[Sum_{2s}/2 - 4/(15*\pi)*x_1*x_2*(5 - 4.5*A_2)].$$

The controller uses standard techniques to test for convergence of the values of $Z_o$ and $\epsilon_G$. In practice the corrections are small after the first iteration, and experience suggests that three iterations are adequate.

Finally, the controller adjusts the raw data to eliminate $Z_o$ and $\epsilon_G$ (step 2245). The controller then repeats the procedure. Once zero offset and gain mismatch have been eliminated from the raw data, the functions (i.e., $sum_{1s}$) used in generating subsequent values for $Z_o$ and $\epsilon_G$ are based on corrected data. Accordingly, these subsequent values for $Z_o$ and $\epsilon_G$ reflect residual zero offset and gain mismatch, and are summed with previously generated values to produce the actual zero offset and gain mismatch. In one approach to adjusting the raw data, the controller generates adjustment parameters (e.g., S1_off and S2_off) that are used in converting the analog signals from the sensors to digital data.

Figure 23A:
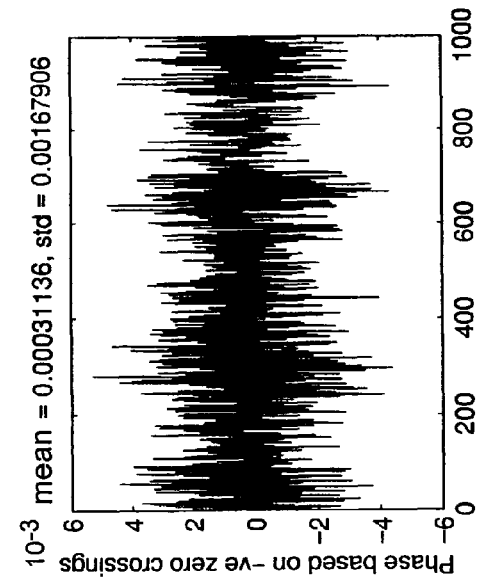
FIGS. 23A-23C, 24A, and 24B are graphs of phase measurements.
Figure 23B:
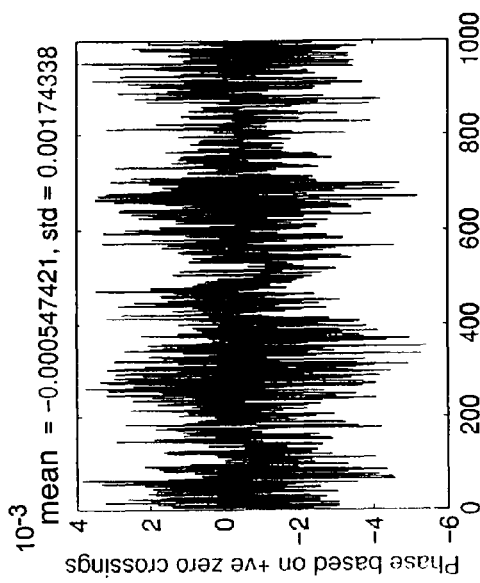
Figure 23C:
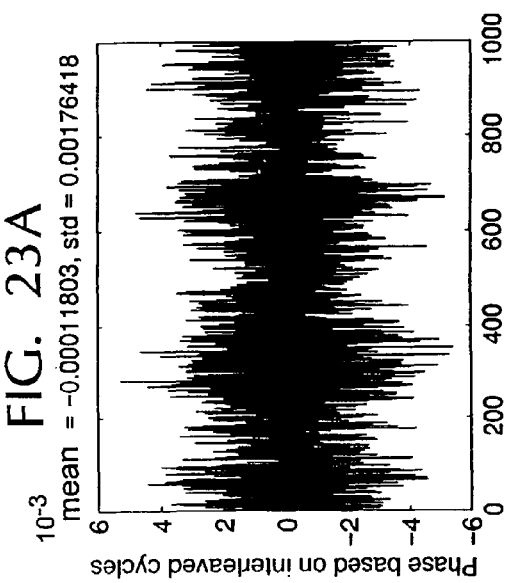

FIGS. 23A-23C, 24A and 24B show results obtained using the procedure 2200. The short-term behavior is illustrated in FIGS. 23A-23C. This shows consecutive phase estimates obtained five minutes after startup to allow time for the procedure to begin affecting the output. Phase is shown based on positive zero-crossings, negative zero-crossings, and both.

The difference between the positive and negative mean values has been reduced by a factor of 20, with a corresponding reduction in mean zero offset in the interleaved data set. The corresponding standard deviation has been reduced by a factor of approximately 6.

Figure 24A:
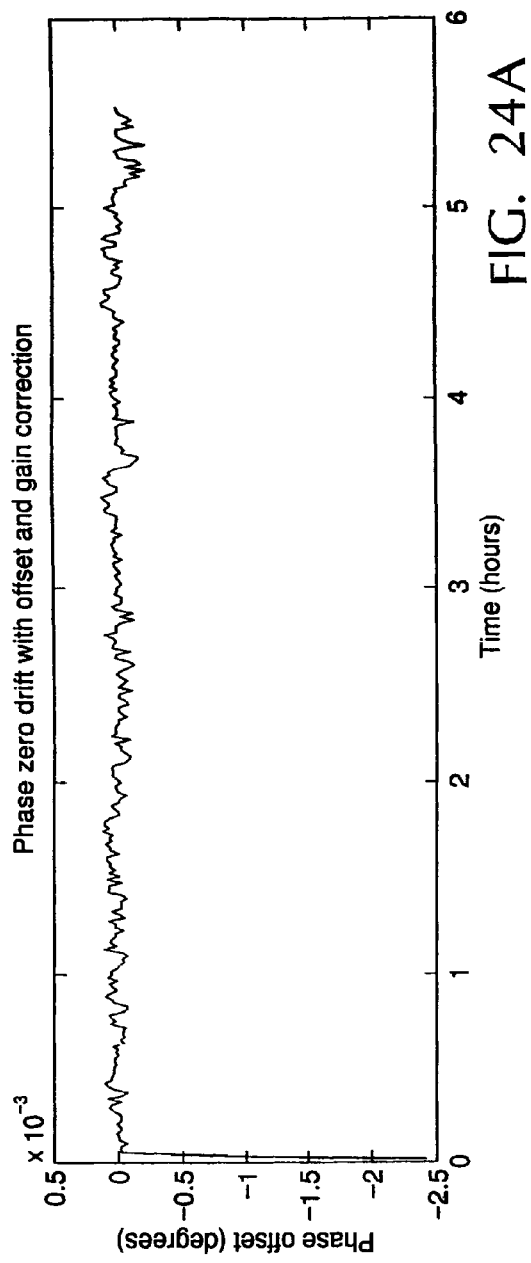
Figure 24B:
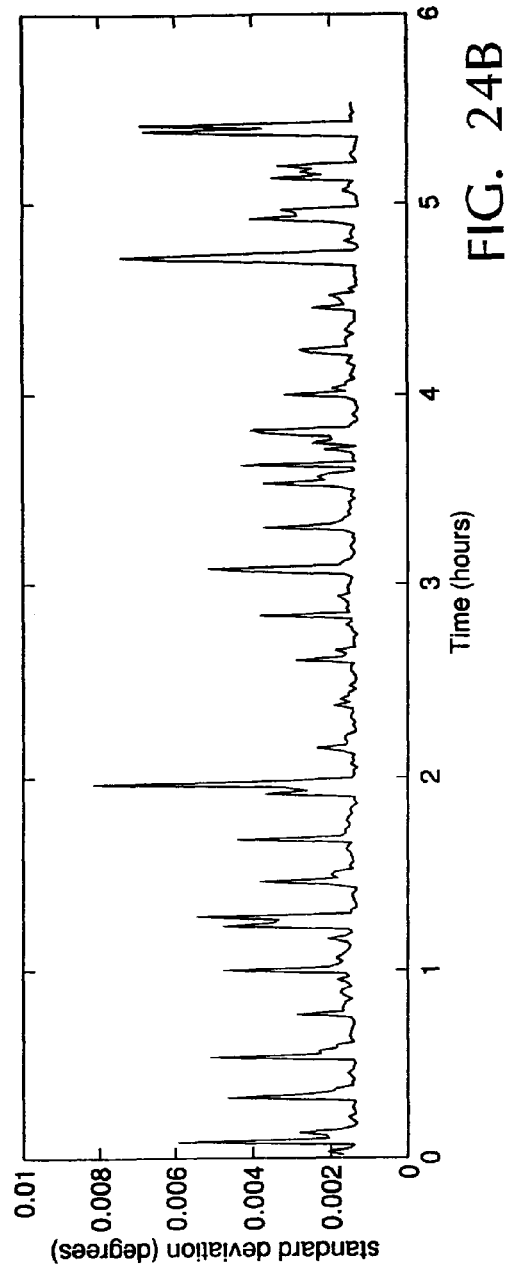

Longer term behavior is shown in FIGS. 24A and 24B. The initial large zero offset is rapidly corrected, and then the phase offset is kept close to zero over many hours. The average phase offset, excluding the first few values, is $6.14e^{-6}$, which strongly suggests that the procedure is successful in compensating for changes in voltage offset and gain imbalance.

Typical values for $Z_o$ and $\epsilon_G$ for the digital Coriolis meter are $Z_o=-7.923e^{-4}$ and $\epsilon_G=-1.754e^{-5}$ for signal $SV_1$, and $Z_o=-8.038e^{-4}$ and $\epsilon_G=+6.93e^{-4}$ for signal $SV_2$.

H. Dynamic Analysis

In general, conventional measurement calculations for Coriolis meters assume that the frequency and amplitude of oscillation on each side of the conduit are constant, and that the frequency on each side of the conduit is identical and equal to the so-called resonant frequency. Phases generally are not measured separately for each side of the conduit, and the phase difference between the two sides is assumed to be constant for the duration of the measurement process. Precise measurements of frequency, phase and amplitude every half-cycle using the digital meter demonstrate that these assumptions are only valid when parameter values are averaged over a time period on the order of seconds. Viewed at 100 Hz or higher frequencies, these parameters exhibit considerable variation. For example, during normal operation, the frequency and amplitude values of $SV_1$ may exhibit strong negative correlation with the corresponding $SV_2$ values. Accordingly, conventional measurement algorithms are subject to noise attributable to these dynamic variations. The noise becomes more significant as the measurement calculation rate increases. Other noise terms may be introduced by physical factors, such as flowtube dynamics, dynamic non-linearities (e.g., flowtube stiffness varying with amplitude), or the dynamic consequences of the sensor voltages providing velocity data rather than absolute position data.

The described techniques exploit the high precision of the digital meter to monitor and compensate for dynamic conduit behavior to reduce noise so as to provide more precise measurements of process variables such as mass flow and density. This is achieved by monitoring and compensating for such effects as the rates of change of frequency, phase and amplitude, flowtube dynamics, and dynamic physical non-idealities. A phase difference calculation which does not assume the same frequency on each side has already been described above. Other compensation techniques are described below.

Monitoring and compensation for dynamic effects may take place at the individual sensor level to provide corrected estimates of phase, frequency, amplitude or other parameters. Further compensation may also take place at the conduit level, where data from both sensors are combined, for example in the calculation of phase difference and average frequency. These two levels may be used together to provide comprehensive compensation.

Thus, instantaneous mass flow and density measurements by the flowmeter may be improved by modeling and accounting for dynamic effects of flowmeter operation. In general, 80% or more of phase noise in a Coriolis flowmeter may be attributed to flowtube dynamics (sometimes referred to as "ringing"), rather than to process conditions being measured. The application of a dynamic model can reduce phase noise by a factor of 4 to 10, leading to significantly improved flow measurement performance. A single model is effective for all flow rates and amplitudes of oscillation. Generally, computational requirements are negligible.

The dynamic analysis may be performed on each of the sensor signals in isolation from the other. This avoids, or at least delays, modeling the dynamic interaction between the two sides of the conduit, which is likely to be far more complex than the dynamics at each sensor. Also, analyzing the individual sensor signals is more likely to be successful in circumstances such as batch startup and aeration where the two sides of the conduit are subject to different forces from the process fluid.

In general, the dynamic analysis considers the impact of time-varying amplitude, frequency and phase on the calculated values for these parameters. While the frequency and amplitude are easily defined for the individual sensor voltages, phase is conventionally defined in terms of the difference between the sensor voltages. However, when a Fourier analysis is used, phase for the individual sensor may be defined in terms of the difference between the midpoint of the cycle and the average 180° phase point.

Three types of dynamic effects are measurement error and the so-called "feedback" and "velocity" effects. Measurement error results because the algorithms for calculating amplitude and phase assume that frequency, amplitude, and phase are constant over the time interval of interest. Performance of the measurement algorithms may be improved by correcting for variations in these parameters.

The feedback effect results from supplying energy to the conduit to make up for energy loss from the conduit so as to maintain a constant amplitude of oscillation. The need to add energy to the conduit is only recognized after the amplitude of oscillation begins to deviate from a desired setpoint. As a result, the damping term in the equation of motion for the oscillating conduit is not zero, and, instead, constantly dithers around zero. Although the natural frequency of the conduit does not change, it is obscured by shifts in the zero-crossings (i.e., phase variations) associated with these small changes in amplitude.

The velocity effect results because the sensor voltages observe conduit velocity, but are analyzed as being representative of conduit position. A consequence of this is that the rate of change of amplitude has an impact on the apparent frequency and phase, even if the true values of these parameters are constant.

1. Sensor-Level Compensation for Amplitude Modulation

Figure 25:
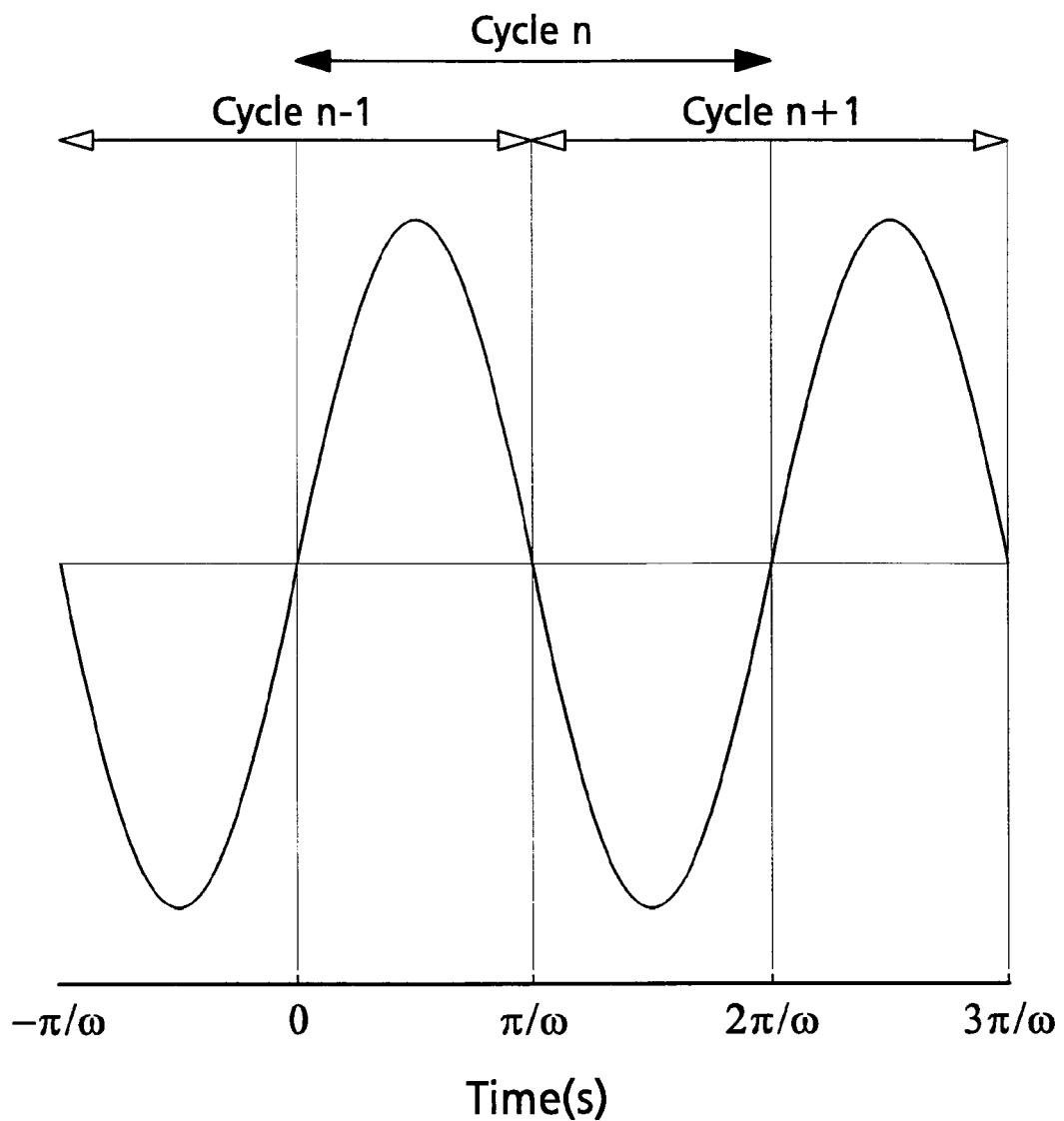
FIG. 25 is a graph of sensor voltage.

One approach to correcting for dynamic effects monitors the amplitudes of the sensor signals and makes adjustments based on variations in the amplitudes. For purposes of analyzing dynamic effects, it is assumed that estimates of phase, frequency and amplitude may be determined for each sensor voltage during each cycle. As shown in FIG. 25, calculations are based on complete but overlapping cycles. Each cycle starts at a zero crossing point, halfway through the previous cycle. Positive cycles begin with positive voltages immediately after the initial zero-crossing, while negative cycles begin with negative voltages. Thus cycle n is positive, while cycles n−1 and n+1 are negative. It is assumed that zero offset correction has been performed so that zero offset is negligible. It also is assumed that higher harmonics may be present.

Linear variation in amplitude, frequency, and phase are assumed. Under this assumption, the average value of each parameter during a cycle equals the instantaneous value of the parameter at the mid-point of the cycle. Since the cycles overlap by 180 degrees, the average value for a cycle equals the starting value for the next cycle.

For example, cycle n is from time 0 to $2\pi/\omega$. The average values of amplitude, frequency and phase equal the instantaneous values at the mid-point, $\pi/\omega$, which is also the starting point for cycle n+1, which is from time $\pi/\omega$ to $3\pi/\omega$. Of course, these timings are approximate, since $\omega$ also varies with time.

a. Dynamic Effect Compensation Procedure

Figure 26:
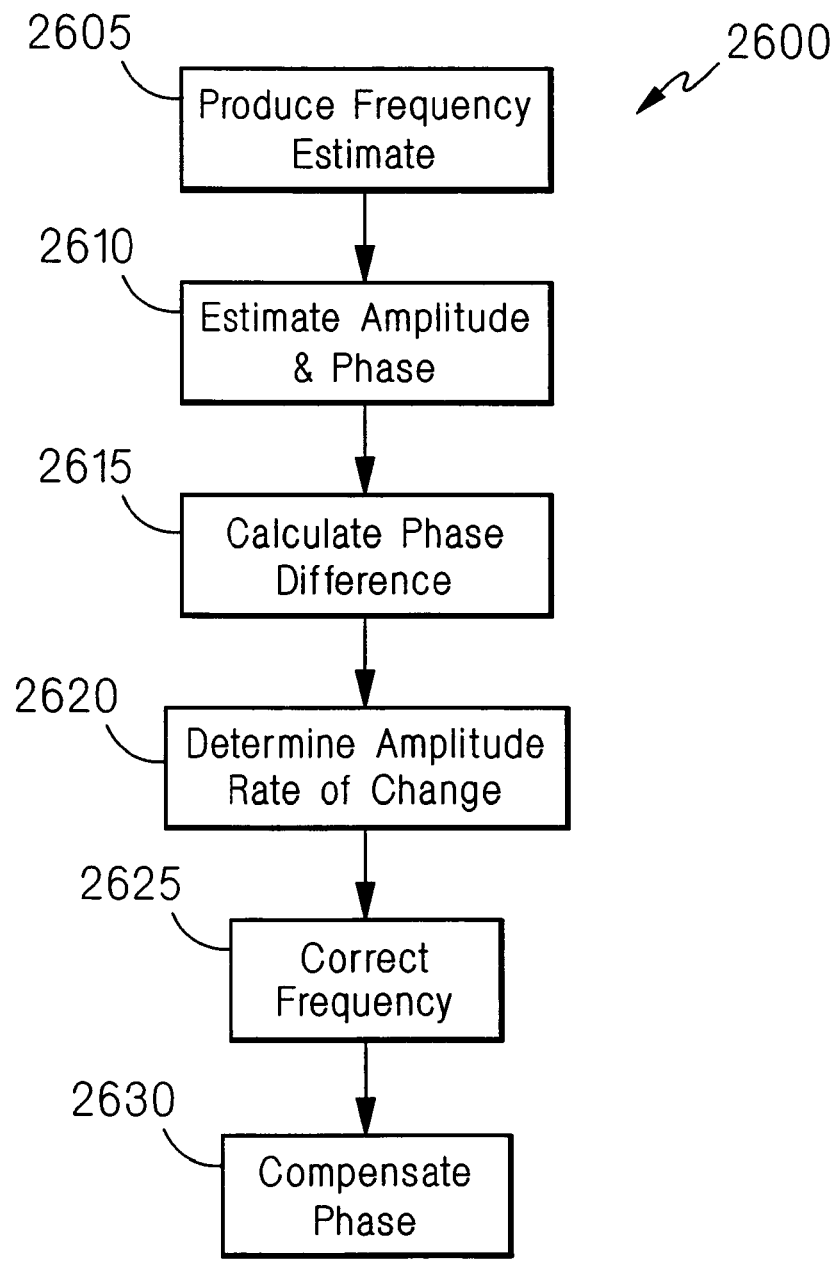
FIG. 26 is a flow chart of a procedure for compensating for dynamic effects.

The controller accounts for dynamic effects according to the procedure 2600 illustrated in FIG. 26. First, the controller produces a frequency estimate (step 2605) by using the zero crossings to measure the time between the start and end of the cycle, as described above. Assuming that frequency varies linearly, this estimate equals the time-averaged frequency over the period.

The controller then uses the estimated frequency to generate a first estimate of amplitude and phase using the Fourier method described above (step 2610). As noted above, this method eliminates the effects of higher harmonics.

Phase is interpreted in the context of a single waveform as being the difference between the start of the cycle (i.e., the zero-crossing point) and the point of zero phase for the component of SV(t) of frequency $\omega$, expressed as a phase offset. Since the phase offset is an average over the entire waveform, it may be used as the phase offset from the midpoint of the cycle. Ideally, with no zero offset and constant amplitude of oscillation, the phase offset should be zero every cycle. In practice, however, it shows a high level of variation and provides an excellent basis for correcting mass flow to account for dynamic changes in amplitude.

The controller then calculates a phase difference (step 2615). Though a number of definitions of phase difference are possible, the analysis assumes that the average phase and frequency of each sensor signal is representative of the entire waveform. Since these frequencies are different for $SV_1$ and $SV_2$, the corresponding phases are scaled to the average frequency. In addition, the phases are shifted to the same starting point (i.e., the midpoint of the cycle on $SV_1$). After scaling, they are subtracted to provide the phase difference.

The controller next determines the rate of change of the amplitude for the cycle n (step 2620):

$$\text{roc\_amp}_n \approx \frac{amp(\text{end of cycle}) - amp(\text{start of cycle})}{\text{period of cycle}} =$$

$$(amp_{n+1} - amp_{n-1})freq_n.$$

This calculation assumes that the amplitude from cycle n+1 is available when calculating the rate of change of cycle n. This is possible if the corrections are made one cycle after the raw amplitude calculations have been made. The advantage of having an accurate estimate of the rate of change, and hence good measurement correction, outweighs the delay in the provision of the corrected measurements, which, in one implementation, is on the order of 5 milliseconds. The most recently generated information is always used for control of the conduit (i.e., for generation of the drive signal).

If desired, a revised estimate of the rate of change can be calculated after amplitude correction has been applied (as described below). This results in iteration to convergence for the best values of amplitude and rate of change.

b. Frequency Compensation for Feedback and Velocity Effects

As noted above, the dynamic aspects of the feedback loop introduce time varying shifts in the phase due to the small deviations in amplitude about the set-point. This results in the measured frequency, which is based on zero-crossings, differing from the natural frequency of the conduit. If velocity sensors are used, an additional shift in phase occurs. This additional shift is also associated with changes in the positional amplitude of the conduit. A dynamic analysis can monitor and compensate for these effects. Accordingly, the controller uses the calculated rate of amplitude change to correct the frequency estimate (step 2625).

The position of an oscillating conduit in a feedback loop that is employed to maintain the amplitude of oscillation of the conduit constant may be expressed as:

$$X = A(t)\sin(\omega_0 t - \theta(t)),$$

where $\theta(t)$ is the phase delay caused by the feedback effect. The mechanical Q of the oscillating conduit is typically on the order of 1000, which implies small deviations in amplitude and phase. Under these conditions, $\theta(t)$ is given by:

$$\theta(t) \approx -\frac{\dot{A}(t)}{2\omega_0 A(t)}.$$

Since each sensor measures velocity:

$$SV(t) = \dot{X}(t) = \dot{A}(t)\sin[\omega_0 t - \theta(t)] + [\omega_0 - \dot{\theta}(t)]A(t)\cos[\omega_0 t - \theta(t)]$$

$$= \omega_0 A(t)\left[\left(1 - \frac{\dot{\theta}}{\omega_0}\right)^2 + \left(\frac{\dot{A}(t)}{\omega_0 A(t)}\right)^2\right]^{\frac{1}{2}} \cos(\omega_0 t - \theta(t) - \gamma(t)),$$

where $\gamma(t)$ is the phase delay caused by the velocity effect:

$$\gamma(t) = \tan^{-1}\left(\frac{\dot{A}(t)}{\omega_0 A(t)\left(1 - \frac{\dot{\theta}}{\omega_0}\right)}\right).$$

Since the mechanical Q of the conduit is typically on the order of 1000, and, hence, variations in amplitude and phase are small, it is reasonable to assume:

$$\frac{\dot{\theta}}{\omega_0} << 1 \text{ and } \frac{\dot{A}(t)}{\omega_0 A(t)} << 1.$$

This means that the expression for SV(t) may be simplified to:

$$SV(t) \approx \omega_0 A(t)\cos(\omega_0 t - \theta(t) - \gamma(t)),$$

and for the same reasons, the expression for the velocity offset phase delay may be simplified to:

$$\gamma(t) \approx \frac{\dot{A}(t)}{\omega_0 A(t)}.$$

Summing the feedback and velocity effect phase delays gives the total phase delay:

$$\varphi(t) = \theta(t) + \gamma(t) \approx -\frac{\dot{A}(t)}{2\omega_0 A(t)} + \frac{\dot{A}(t)}{\omega_0 A(t)} = \frac{\dot{A}(t)}{2\omega_0 A(t)},$$

and the following expression for SV(t):

$$SV(t) \approx \omega_0 A(t) \cos[\omega_0 t - \phi(t)].$$

From this, the actual frequency of oscillation may be distinguished from the natural frequency of oscillation. Though the former is observed, the latter is useful for density calculations. Over any reasonable length of time, and assuming adequate amplitude control, the averages of these two frequencies are the same (because the average rate of change of amplitude must be zero). However, for improved instantaneous density measurement, it is desirable to compensate the actual frequency of oscillation for dynamic effects to obtain the natural frequency. This is particularly useful in dealing with aerated fluids for which the instantaneous density can vary rapidly with time.

The apparent frequency observed for cycle n is delineated by zero crossings occurring at the midpoints of cycles n−1 and n+1. The phase delay due to velocity change will have an impact on the apparent start and end of the cycle:

$$\begin{aligned}
\text{obs\_freq}_n &= \text{obs\_freq}_{n-1} + \frac{\text{true\_freq}_n}{2\pi}(\varphi_{n+1} - \varphi_{n-1}) \\
&= \text{obs\_freq}_{n-1} + \frac{\text{true\_freq}_{n-1}}{2\pi}\left(\frac{\frac{\dot{A}_{n+1}}{4\pi \text{true\_freq}_n A_{n+1}}}{-\frac{\dot{A}_{n-1}}{4\pi \text{true\_freq}_n A_{n-1}}}\right) \\
&= \text{obs\_freq}_{n-1} + \frac{1}{8\pi^2}\left(\frac{\dot{A}_{n+1}}{A_{n+1}} - \frac{\dot{A}_{n-1}}{A_{n-1}}\right).
\end{aligned}$$

Based on this analysis, a correction can be applied using an integrated error term:

$$\text{error\_sum}_n = \text{error\_sum}_{n-1} - \frac{1}{8\pi^2}\left(\frac{\dot{A}_{n+1}}{A_{n+1}} - \frac{\dot{A}_{n-1}}{A_{n-1}}\right), \text{ and}$$

$$\text{est\_freq}_n = \text{obs\_freq}_n - \text{error\_sum}_n,$$

where the value of error_sum at startup (i.e., the value at cycle zero) is:

$$\text{error\_sum}_0 = -\frac{1}{8\pi^2}\left(\frac{\dot{A}_0}{A_0} + \frac{\dot{A}_1}{A_1}\right).$$

Though these equations include a constant term having a value of $1/8\pi^2$, actual data has indicated that a constant term of $1/8\pi$ is more appropriate. This discrepancy may be due to unmodeled dynamics that may be resolved through further analysis.

The calculations discussed above assume that the true amplitude of oscillation, A, is available. However, in practice, only the sensor voltage SV is observed. This sensor voltage may be expressed as:

$$SV(t) \approx \omega_0 \dot{A}(t) \cos(\omega_0 t - \phi(t))$$

The amplitude, amp_SV(t), of this expression is:

$$\text{amp\_SV}(t) \approx \omega_0 \dot{A}(t).$$

The rate of change of this amplitude is:

$$\text{roc\_amp\_SV}(t) \approx \omega_0 \dot{A}(t)$$

so that the following estimation can be used:

$$\frac{\dot{A}(t)}{A(t)} \approx \frac{\text{roc\_amp\_SV}(t)}{\text{amp\_SV}(t)}.$$

c. Application of Feedback and Velocity Effect Frequency Compensation

FIGS. 27A-32B illustrate how application of the procedure 2600 improves the estimate of the natural frequency, and hence the process density, for real data from a meter having a one inch diameter conduit. Each of the figures shows 10,000 samples, which are collected in just over 1 minute.

Figure 27A:
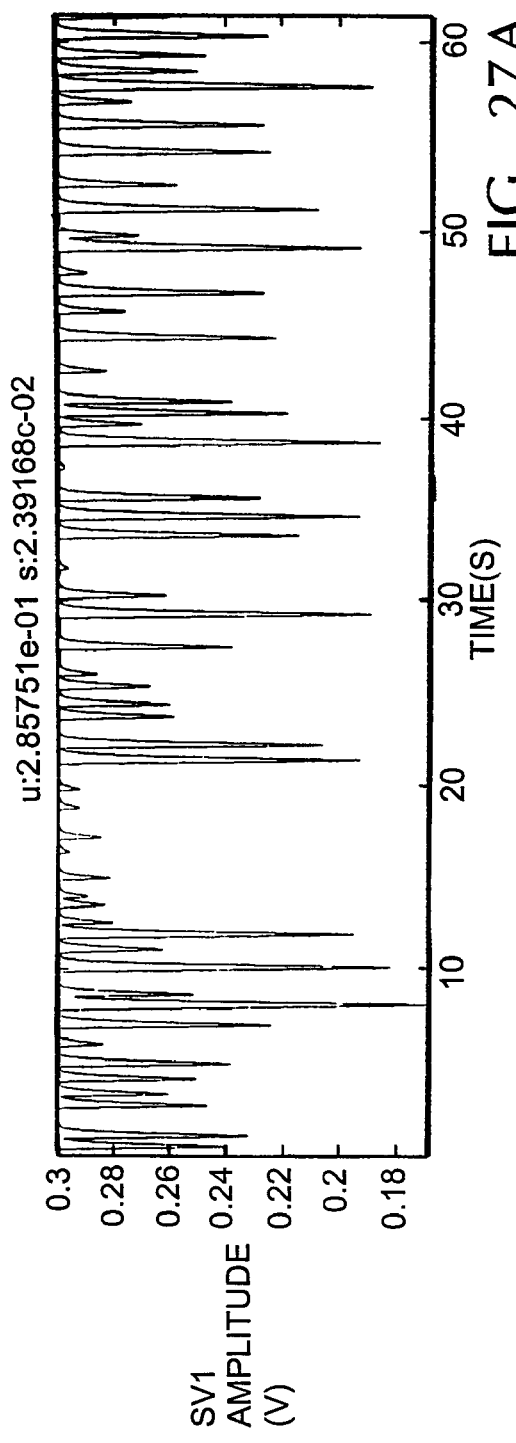
Figure 27B:
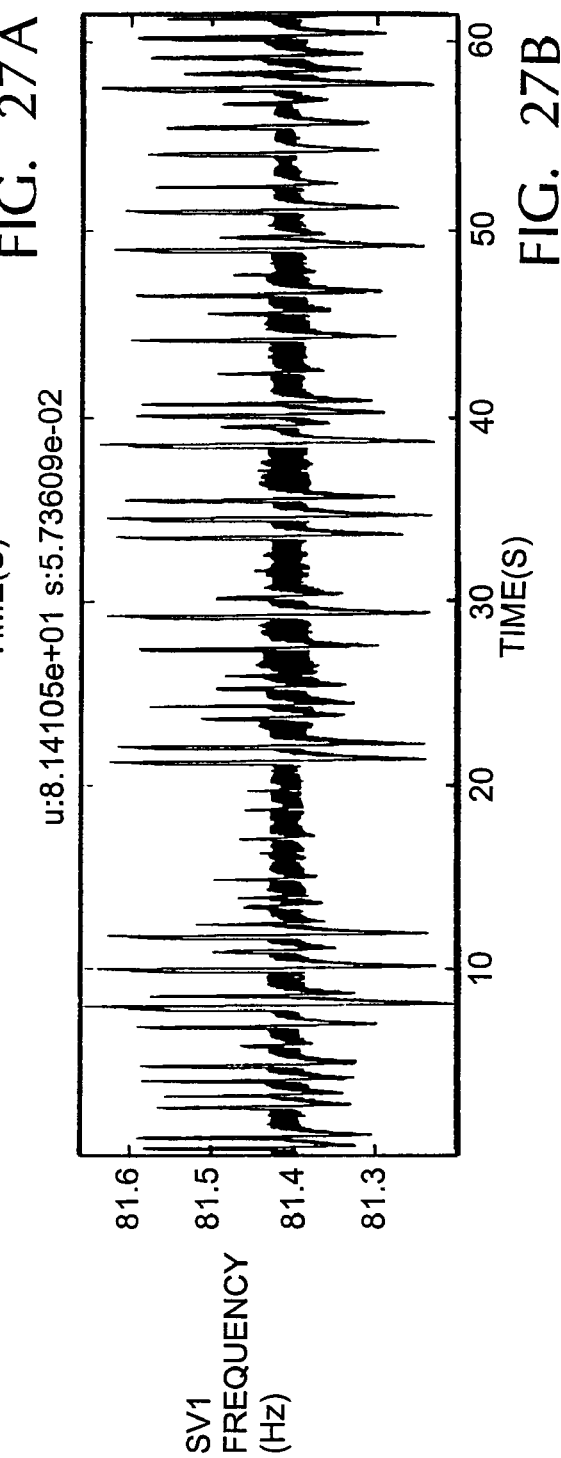

FIGS. 27A and 27B show amplitude and frequency data from $SV_1$, taken when random changes to the amplitude set-point have been applied. Since the conduit is full of water and there is no flow, the natural frequency is constant. However, the observed frequency varies considerably in response to changes in amplitude. The mean frequency value is 81.41 Hz, with a standard deviation of 0.057 Hz.

FIGS. 28A and 28B show, respectively, the variation in frequency from the mean value, and the correction term generated using the procedure 2600. The gross deviations are extremely well matched. However, there is additional variance in frequency which is not attributable to amplitude variation. Another important feature illustrated by FIG. 28B is that the average is close to zero as a result of the proper initialization of the error term, as described above.

FIGS. 29A and 92B compare the raw frequency data (FIG. 29A) with the results of applying the correction function (FIG. 29B). There has been a negligible shift in the mean frequency, while the standard deviation has been reduced by a factor of 4.4. From FIG. 29B, it is apparent that there is residual structure in the corrected frequency data. It is expected that further analysis, based on the change in phase across a cycle and its impact on the observed frequency, will yield further noise reductions.

FIGS. 30A and 30B show the corresponding effect on the average frequency, which is the mean of the instantaneous sensor voltage frequencies. Since the mean frequency is used to calculate the density of the process fluid, the noise reduction (here by a factor of 5.2) will be propagated into the calculation of density.

FIGS. 31A and 31B illustrate the raw and corrected average frequency for a 2" diameter conduit subject to a random amplitude set-point. The 2" flowtube exhibits less frequency variation that the 1", for both raw and corrected data. The noise reduction factor is 4.0.

FIGS. 32A and 32B show more typical results with real flow data for the one inch flowtube. The random setpoint algorithm has been replaced by the normal constant setpoint. As a result, there is less amplitude variation than in the previous examples, which results in a smaller noise reduction factor of 1.5.

d. Compensation of Phase Measurement for Amplitude Modulation

Referring again to FIG. 26, the controller next compensates the phase measurement to account for amplitude modulation assuming the phase calculation provided above (step 2630). The Fourier calculations of phase described above assume that the amplitude of oscillation is constant throughout the cycle of data on which the calculations take place. This section describes a correction which assumes a linear variation in amplitude over the cycle of data.

Ignoring higher harmonics, and assuming that any zero offset has been eliminated, the expression for the sensor voltage is given by:

$$SV(t) \approx A_1(1+\lambda_A t)\sin(\omega t)$$

where $\lambda_A$ is a constant corresponding to the relative change in amplitude with time. As discussed above, the integrals $I_1$ and $I_2$ may be expressed as:

$$I_1 = \frac{2\omega}{\pi}\int_0^{\frac{2\pi}{\omega}} SV(t)\sin(\omega t)dt, \text{ and}$$

$$I_2 = \frac{2\omega}{\pi}\int_0^{\frac{2\pi}{\omega}} SV(t)\cos(\omega t)dt.$$

Evaluating these integrals results in $$I_1 = A_1\left(1+\frac{\pi}{\omega}\lambda_A\right), \text{ and}$$

$$I_2 = A_1\frac{1}{2\omega}\lambda_A.$$

Substituting these expressions into the calculation for amplitude and expanding as a series in $\lambda_A$ results in:

$$\text{Amp} = A_1\left(1+\frac{\pi}{\omega}\lambda_A + \frac{1}{8\omega^2}\lambda_A^2 + \ldots\right).$$

Assuming $\lambda_A$ is small, and ignoring all terms after the first order term, this may be simplified to:

$$\text{Amp} = A_1\left(1+\frac{\pi}{\omega}\lambda_A\right).$$

This equals the amplitude of SV(t) at the midpoint of the cycle (t=π/ω). Accordingly, the amplitude calculation provides the required result without correction.

For the phase calculation, it is assumed that the true phase difference and frequency are constant, and that there is no voltage offset, which means that the phase value should be zero. However, as a result of amplitude modulation, the correction to be applied to the raw phase data to compensate for amplitude modulation is:

$$\text{Phase} = \tan^{-1}\left(\frac{\lambda_A}{2(\pi\lambda_A+\omega)}\right).$$

Assuming that the expression in brackets is small, the inverse tangent function can be ignored.

A more elaborate analysis considers the effects of higher harmonics. Assuming that the sensor voltage may be expressed as:

$$SV(t) = (1+\lambda_A t)[A_1\sin(\omega t)+A_2\sin(2\omega t)+A_3\sin(\omega t)+A_4\sin(4\omega t)]$$

such that all harmonic amplitudes increase at the same relative rate over the cycle, then the resulting integrals may be expressed as:

$$I_1 = A_1\left(1+\frac{\pi}{\omega}\lambda_A\right),$$

and $$I_2 \frac{-1}{60\omega}\lambda_A(30A_1 + 80A_2 + 45A_3 + 32A_4)$$

for positive cycles, and $$I_2 \frac{-1}{60\omega}\lambda_A(30A_1 - 80A_2 + 45A_3 - 32A_4)$$

for negative cycles.

For amplitude, substituting these expressions into the calculations establishes that the amplitude calculation is only affected in the second order and higher terms, so that no correction is necessary to a first order approximation of the amplitude. For phase, the correction term becomes:

$$\frac{-1}{60}\lambda_A\left(\frac{30A_1 + 80A_2 + 45A_3 + 32A_4}{A_1(\pi\lambda_A+\omega)}\right)$$

for positive cycles, and $$\frac{-1}{60}\lambda_A\left(\frac{30A_1 - 80A_2 + 45A_3 - 32A_4}{A_1(\pi\lambda_A+\omega)}\right)$$

for negative cycles. These correction terms assume the availability of the amplitudes of the higher harmonics. While these can be calculated using the usual Fourier technique, it is also possible to approximate some or all them using assumed ratios between the harmonics. For example, for one implementation of a one inch diameter conduit, typical amplitude ratios are $A_1=1.0$, $A_2=0.01$, $A_3=0.005$, and $A_4=0.001$.

e. Application of Amplitude Modulation Compensation to Phase

Simulations have been carried out using the digital transmitter, including the simulation of higher harmonics and amplitude modulation. One example uses f=80 Hz, $A_1(t=0)=0.3$, $A_2=0$, $A_3=0$, $A_4=0$, $\lambda_A=1e^{-5}*48$ KHz (sampling rate)=0.47622, which corresponds to a high rate of change of amplitude, but with no higher harmonics. Theory suggests a phase offset of −0.02706 degrees. In simulation over 1000 cycles, the average offset is −0.02714 degrees, with a standard deviation of only $2.17e^{-6}$. The difference between simulation and theory (approx 0.3% of the simulation error) is attributable to the model's assumption of a linear variation in amplitude over each cycle, while the simulation generates an exponential change in amplitude.

A second example includes a second harmonic, and has the parameters f=80 Hz, $A_1(t=0)=0.3$, $A_2(t=0)=0.003$, $A_3=0$, $A_4=0$, $\lambda_A=-1e^{-6}*$ 48 KHz (sampling rate)=−0.047622. For this example, theory predicts the phase offset to be $+2.706e^{-3}$, +/−2.66% for positive or negative cycles. In simulation, the results are $2.714e^{-3}$+/−2.66%, which again matches well.

Figure 34A:
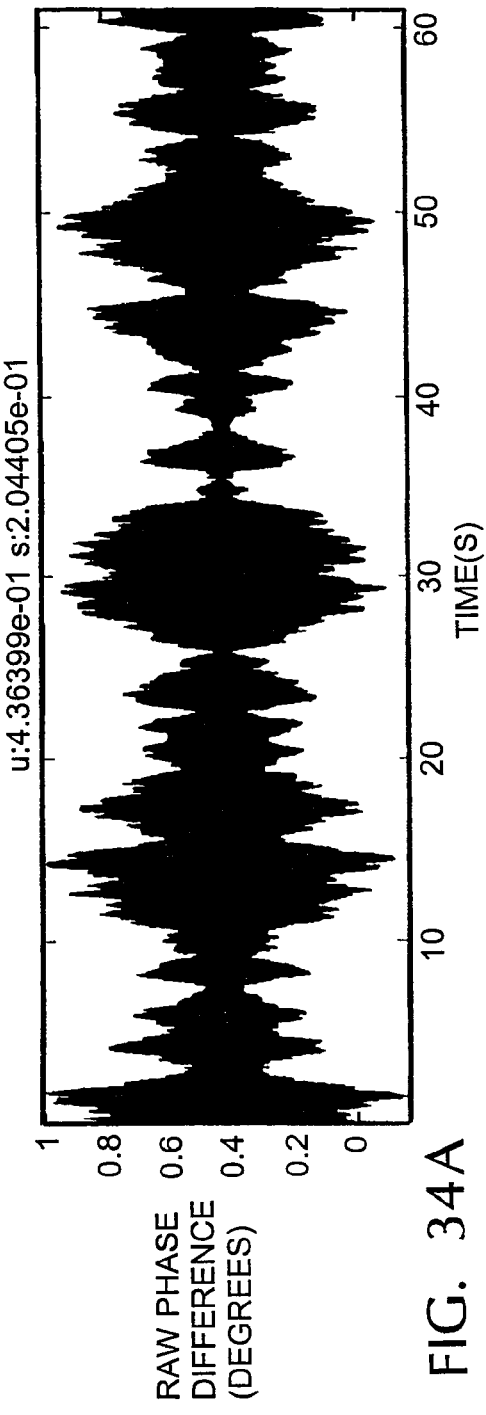
Figure 34B:
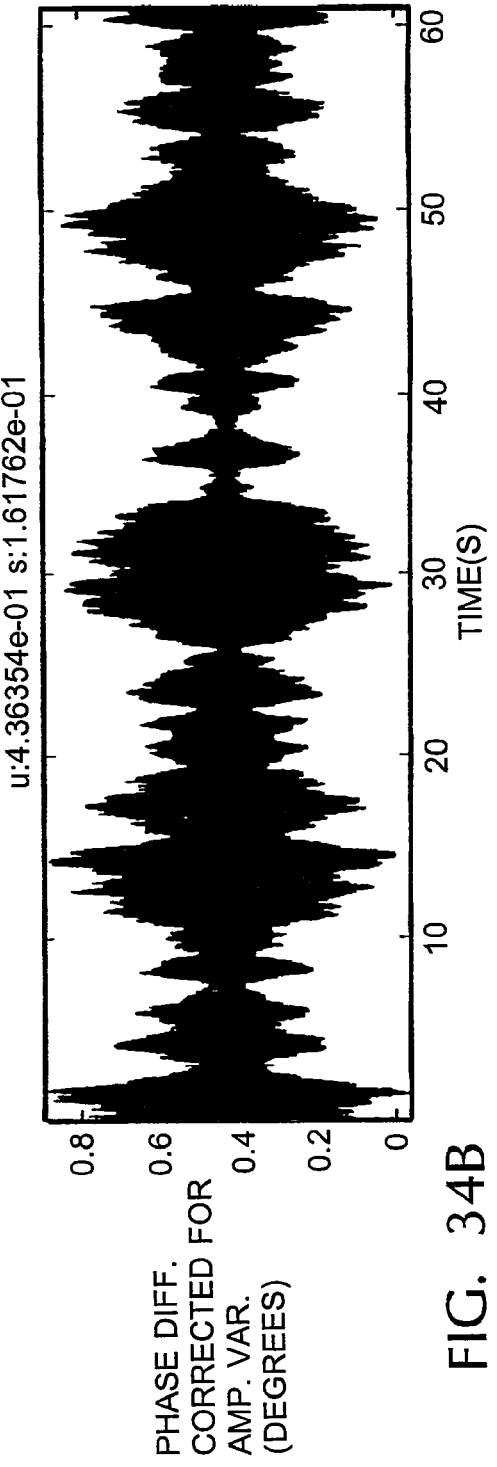

FIGS. 33A-34B give examples of how this correction improves real flowmeter data. FIG. 33A shows raw phase data from $SV_1$, collected from a 1" diameter conduit, with low flow assumed to be reasonably constant. FIG. 33B shows the correction factor calculated using the formula described above, while FIG. 33C shows the resulting corrected phase. The most apparent feature is that the correction has increased the variance of the phase signal, while still producing an overall reduction in the phase difference (i.e., $SV_2-SV_1$) standard deviation by a factor of 1.26, as shown in FIGS. 34A and 34B. The improved performance results because this correction improves the correlation between the two phases, leading to reduced variation in the phase difference. The technique works equally well in other flow conditions and on other conduit sizes.

f. Compensation to Phase Measurement for Velocity Effect

The phase measurement calculation is also affected by the velocity effect. A highly effective and simple correction factor, in radians, is of the form $$c_v(t_k) = \frac{1}{\pi}\Delta SV(t_k),$$

where $\Delta SV(t_k)$ is the relative rate of change of amplitude and may be expressed as:

$$\Delta SV(t_k) = \frac{SV(t_{k+1}) - SV(t_{k-1})}{t_{k+1} - t_{k-1}} \cdot \frac{1}{SV(t_k)},$$

where $t_k$ is the completion time for the cycle for which $\Delta SV(t_k)$ is being determined, $t_{k+1}$ is the completion time for the next cycle, and $t_{k-1}$ is the completion time of the previous cycle. $\Delta SV$ is an estimate of the rate of change of SV, scaled by its absolute value, and is also referred to as the proportional rate of change of SV.

Figure 35D:
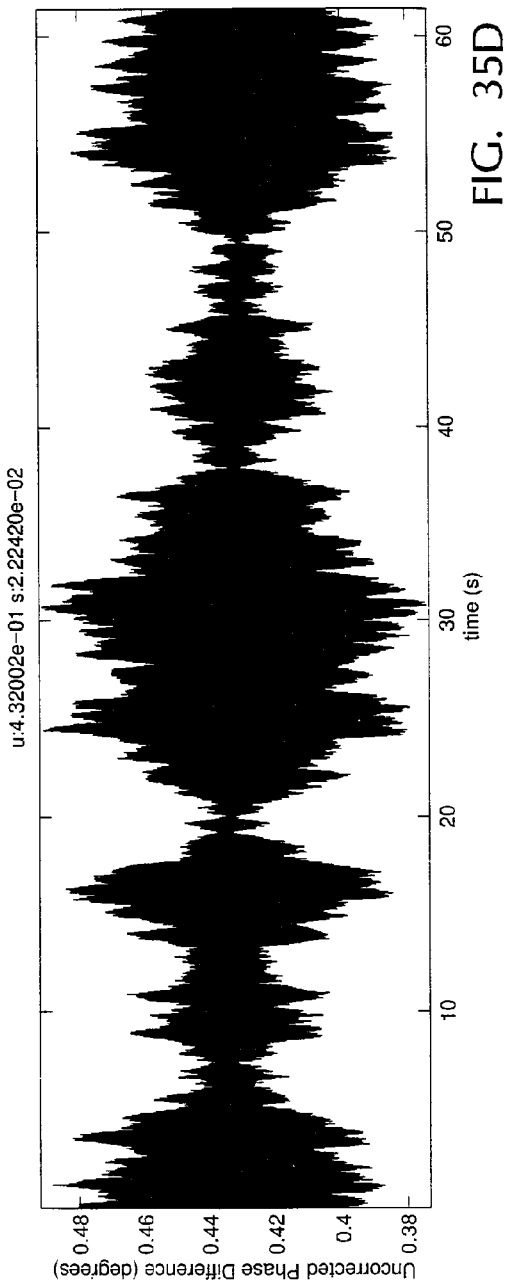
Figure 35E:
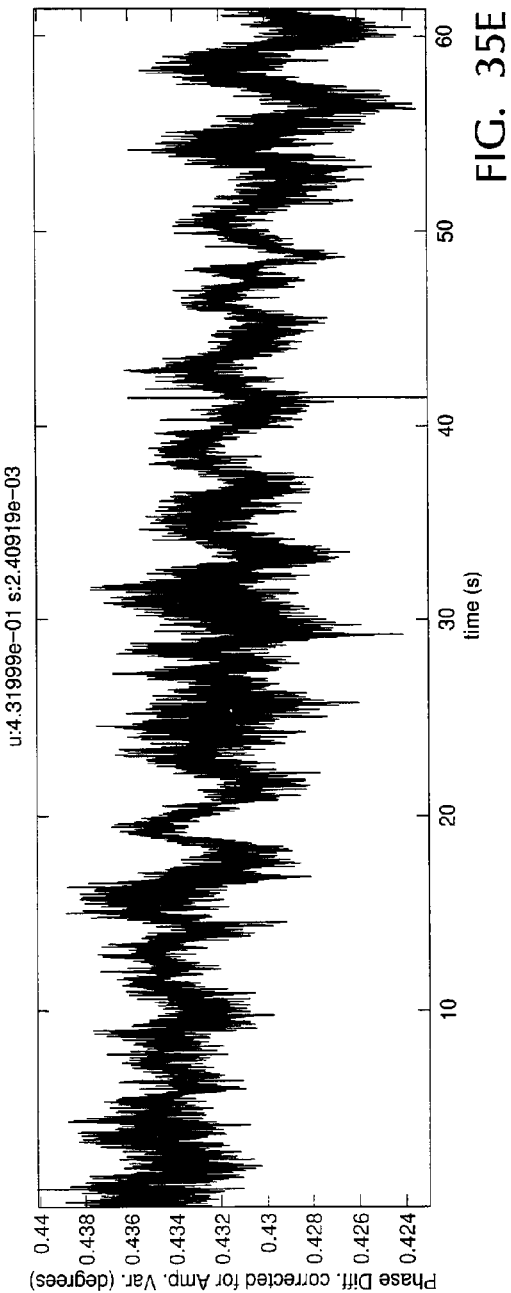

FIGS. 35A-35E illustrate this technique. FIG. 35A shows the raw phase data from a single sensor ($SV_1$), after having applied the amplitude modulation corrections described above. FIG. 35B shows the correction factor in degrees calculated using the equation above, while FIG. 35C shows the resulting corrected phase. It should be noted that the standard deviation of the corrected phase has actually increased relative to the raw data. However, when the corresponding calculations take place on the other sensor ($SV_2$), there is an increase in the negative correlation (from −0.8 to −0.9) between the phases on the two signals. As a consequence, the phase difference calculations based on the raw phase measurements (FIG. 35D) have significantly more noise than the corrected phase measurements (FIG. 35E).

Comparison of FIGS. 35D and 35E shows the benefits of this noise reduction technique. It is immediately apparent from visual inspection of FIG. 35E that the process variable is decreasing, and that there are significant cycles in the measurement, with the cycles being attributable, perhaps, to a poorly conditioned pump. None of this is discernable from the uncorrected phase difference data of FIG. 35D.

g. Application of Sensor Level Noise Reduction

The combination of phase noise reduction techniques described above results in substantial improvements in instantaneous phase difference measurement in a variety of flow conditions, as illustrated in FIGS. 36A-36L. Each graph shows three phase difference measurements calculated simultaneously in real time by the digital Coriolis transmitter operating on a one inch conduit. The middle band 3600 shows phase data calculated using the simple time-difference technique. The outermost band 3605 shows phase data calculated using the Fourier-based technique described above.

It is perhaps surprising that the Fourier technique, which uses far more data, a more sophisticated analysis, and much more computational effort, results in a noisier calculation. This can be attributed to the sensitivity of the Fourier technique to the dynamic effects described above. The innermost band of data 3610 shows the same Fourier data after the application of the sensor-level noise reduction techniques. As can be seen, substantial noise reduction occurs in each case, as indicated by the standard deviation values presented on each graph.

Figure 36A:
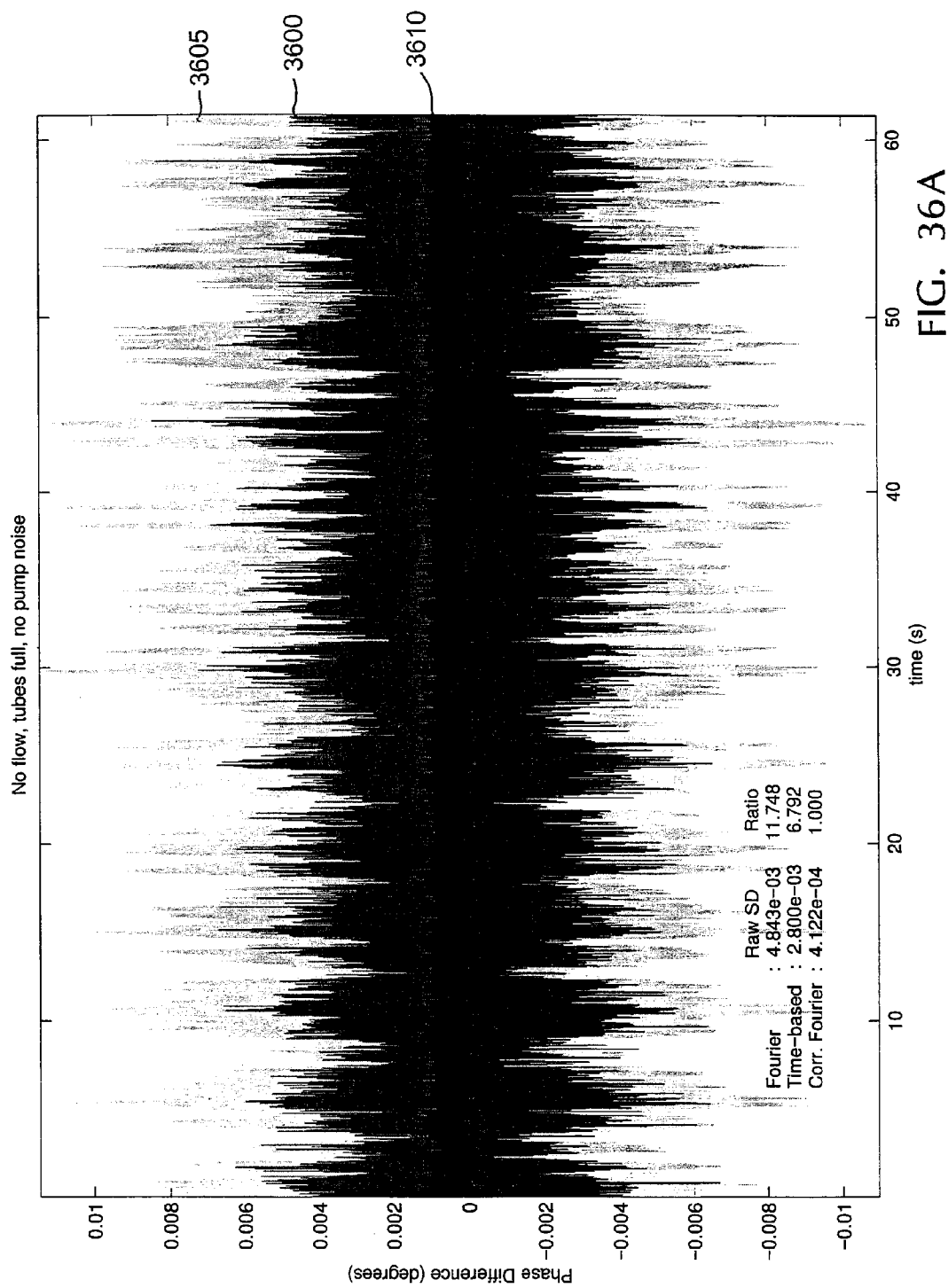
FIGS. 36A-36L are graphs illustrating phase measurement.
Figure 36B:
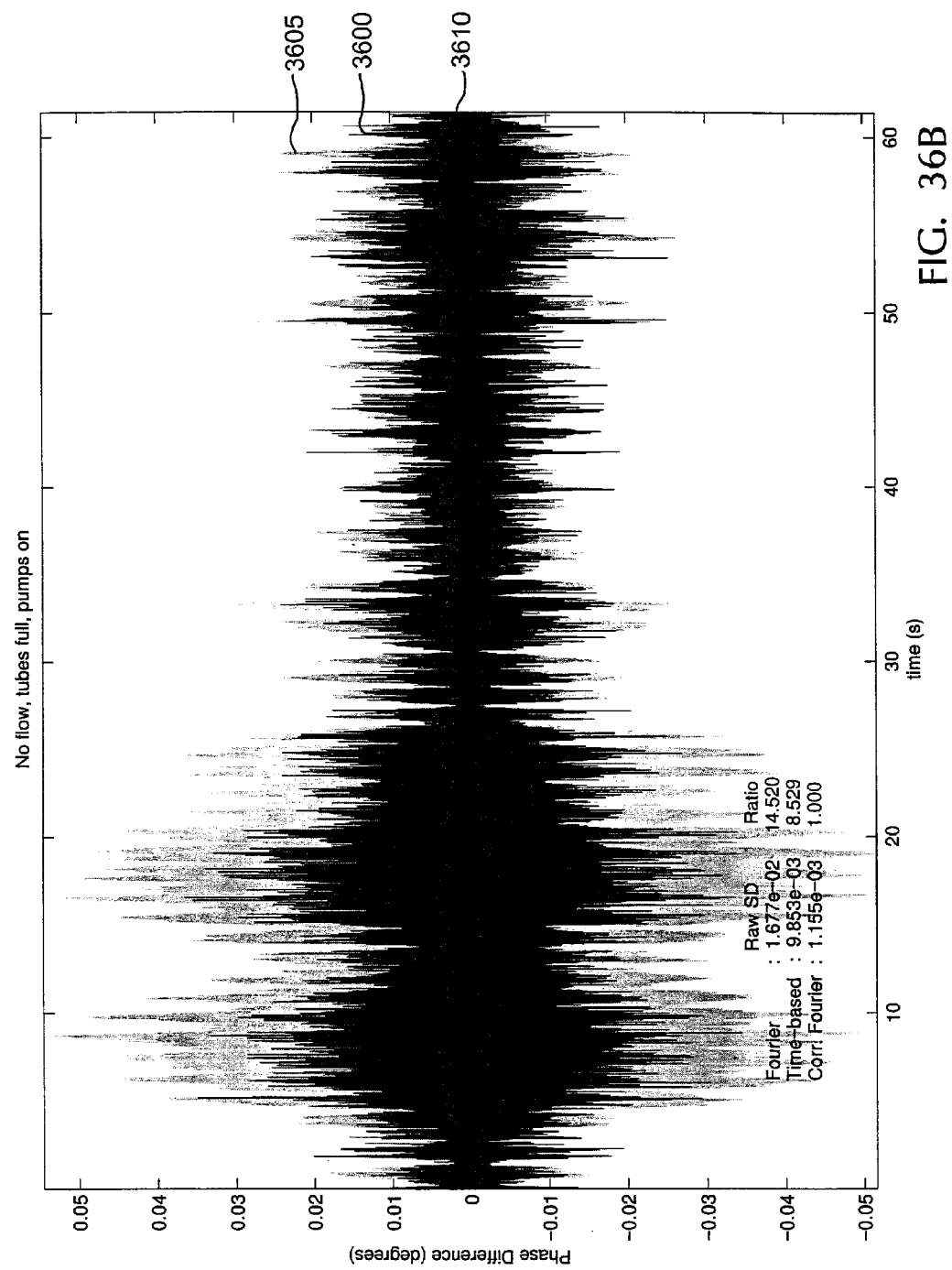
Figure 36C:
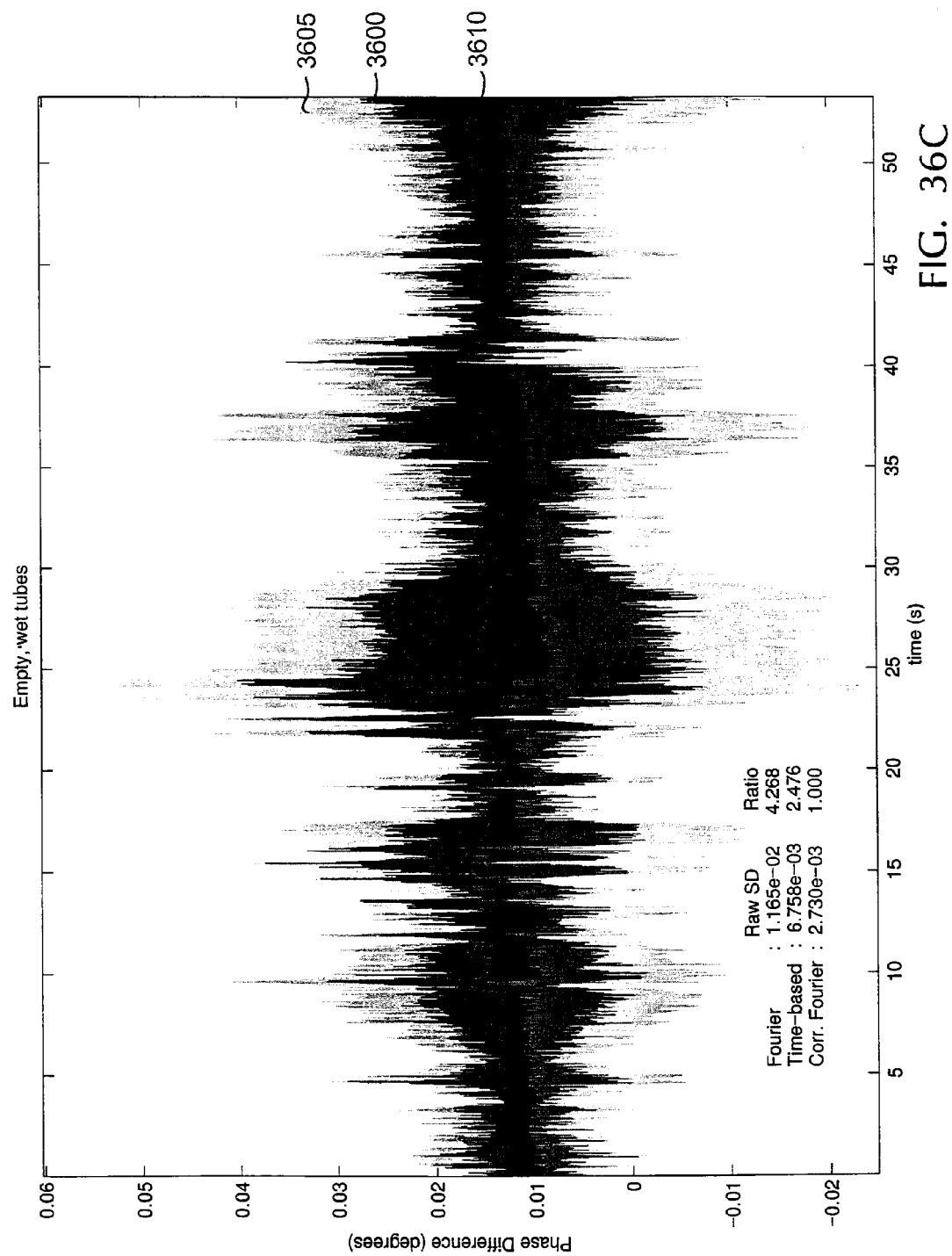
Figure 36D:
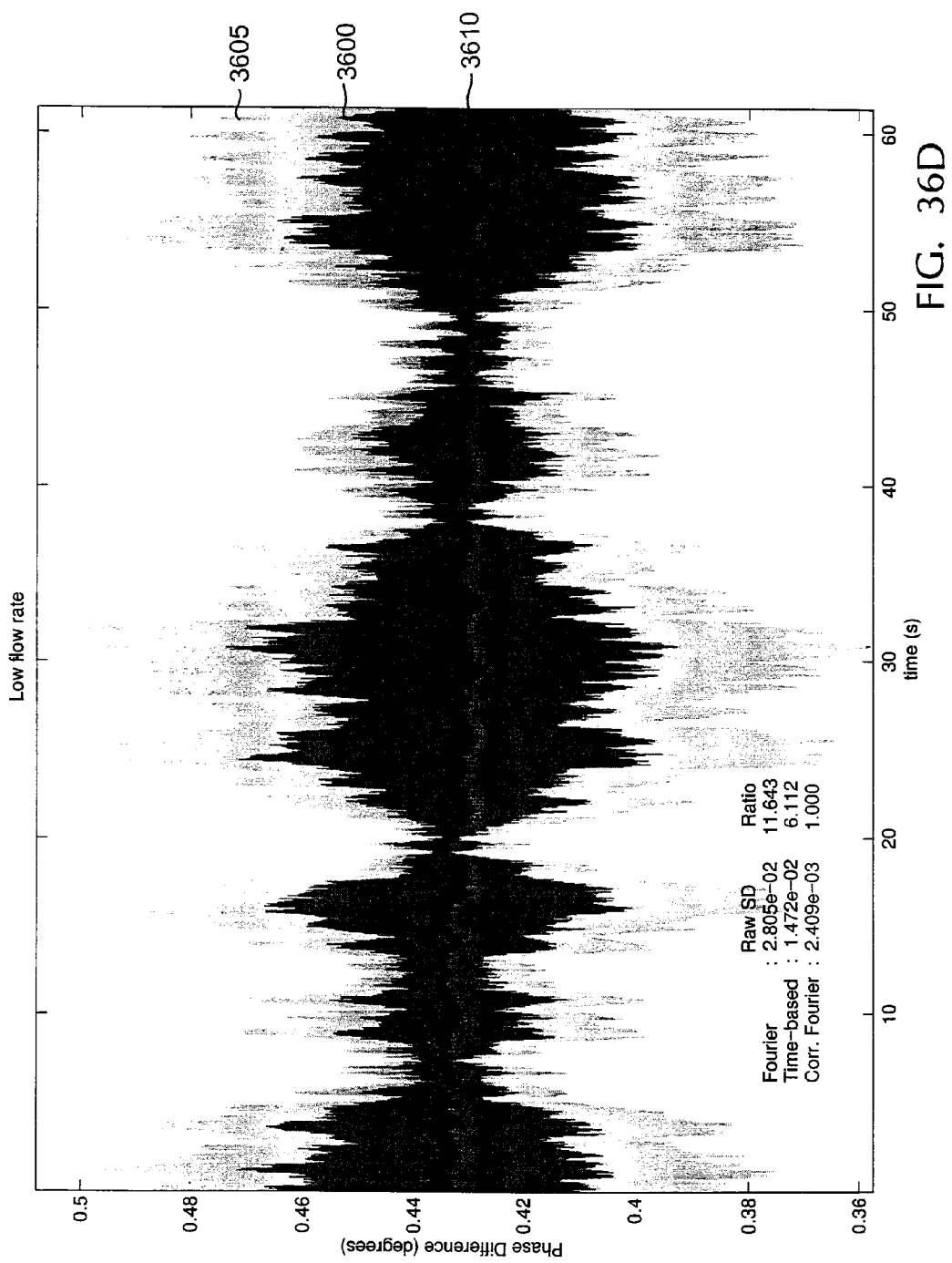
Figure 36E:
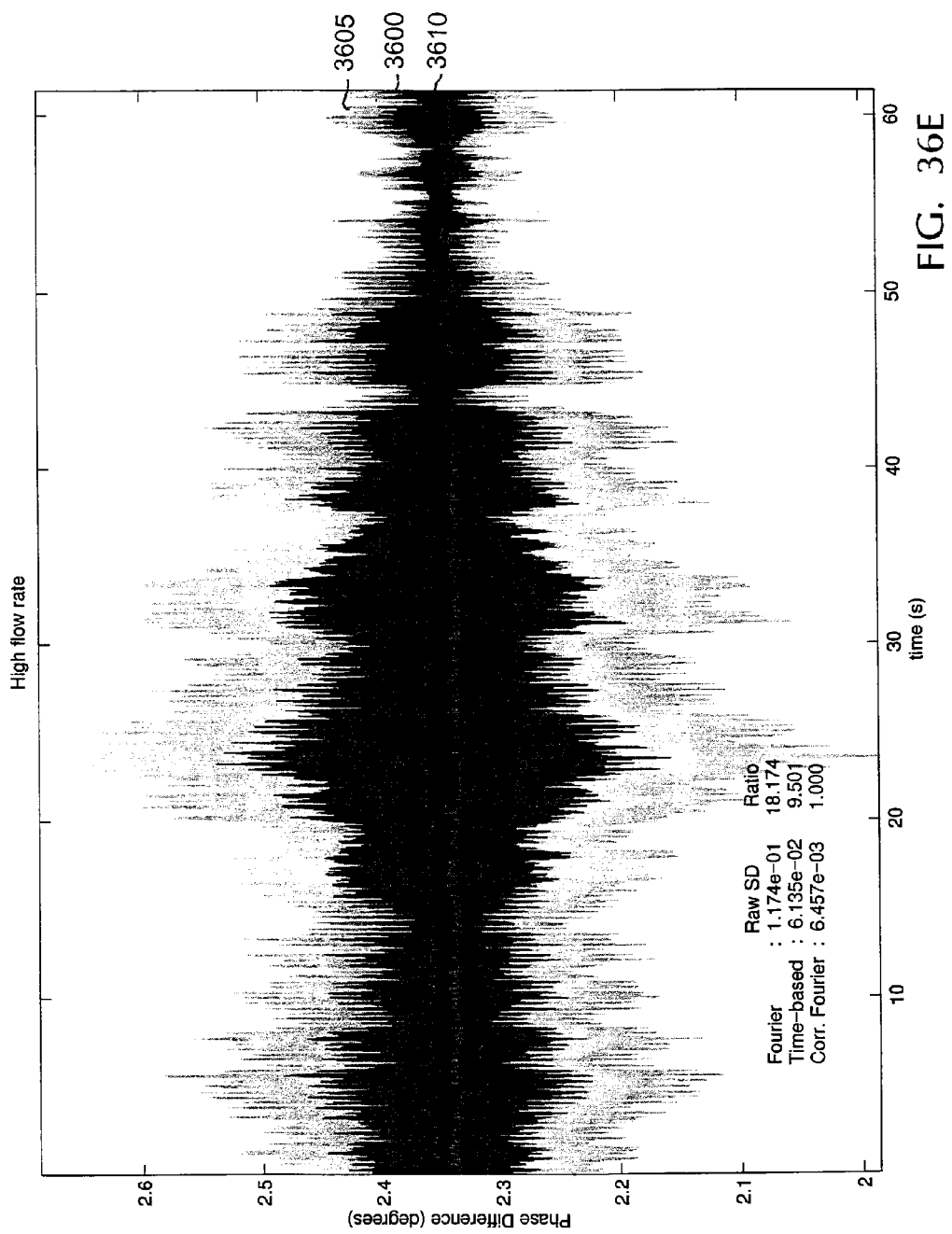
Figure 36F:
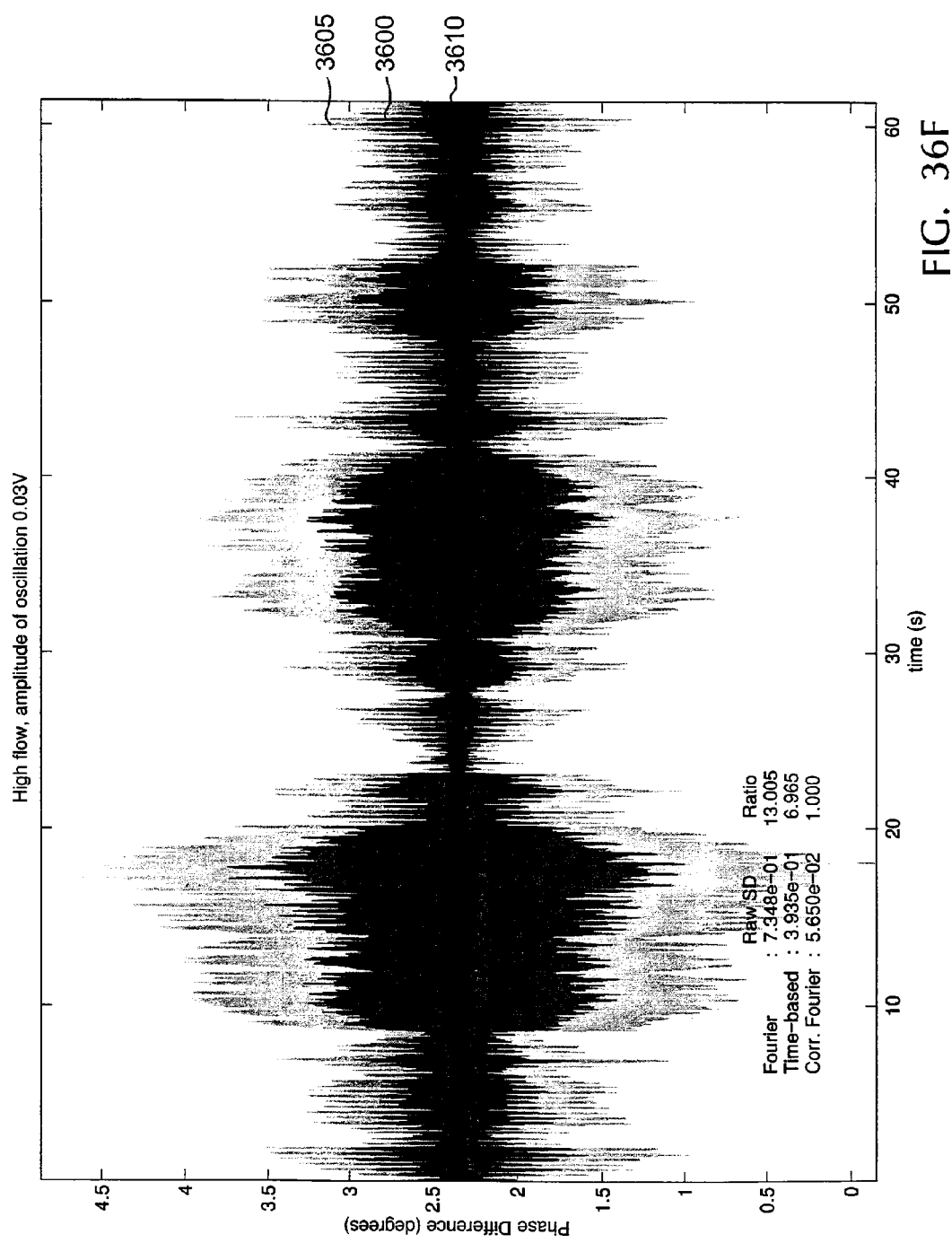
Figure 36G:
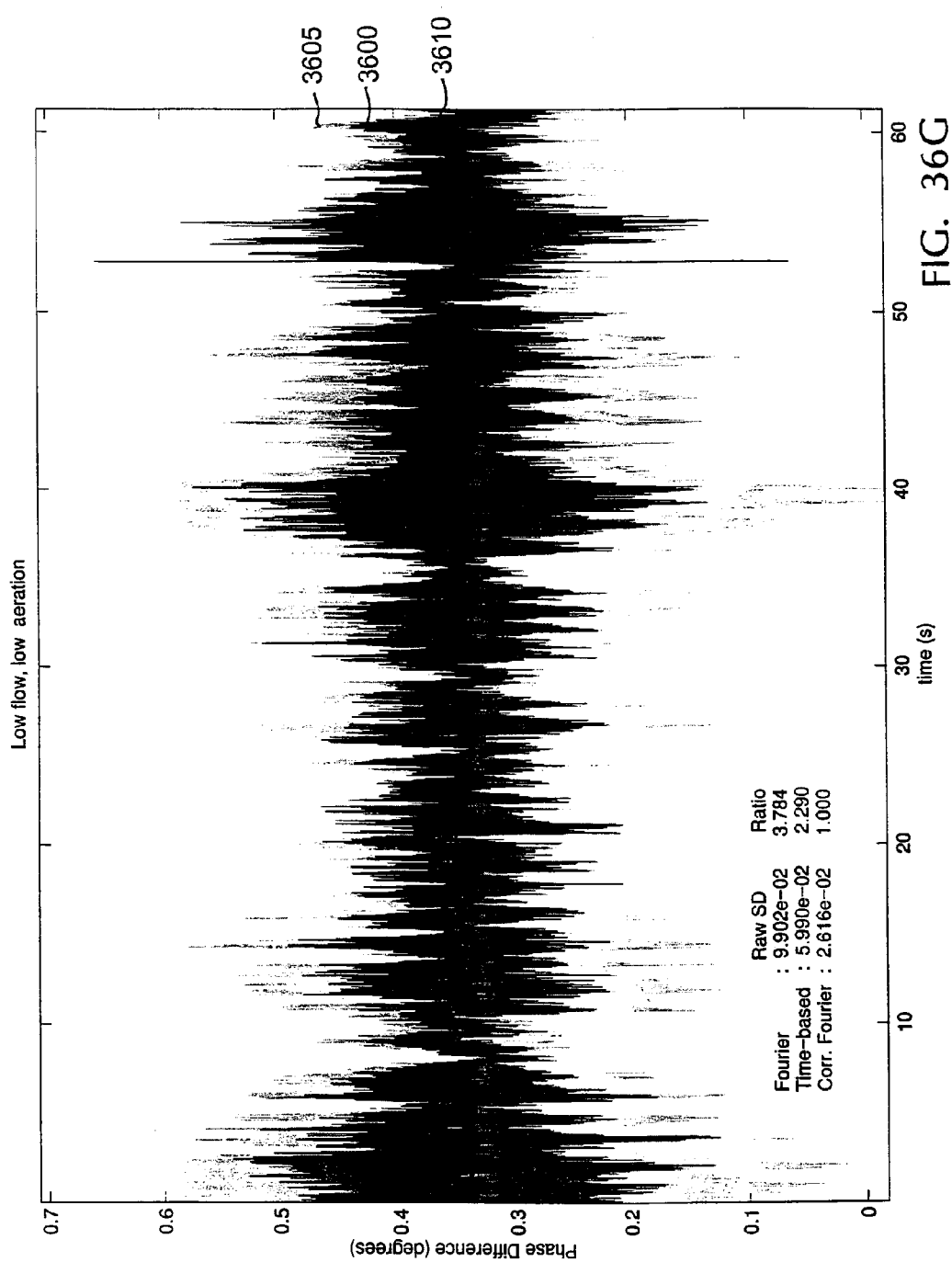
Figure 36H:
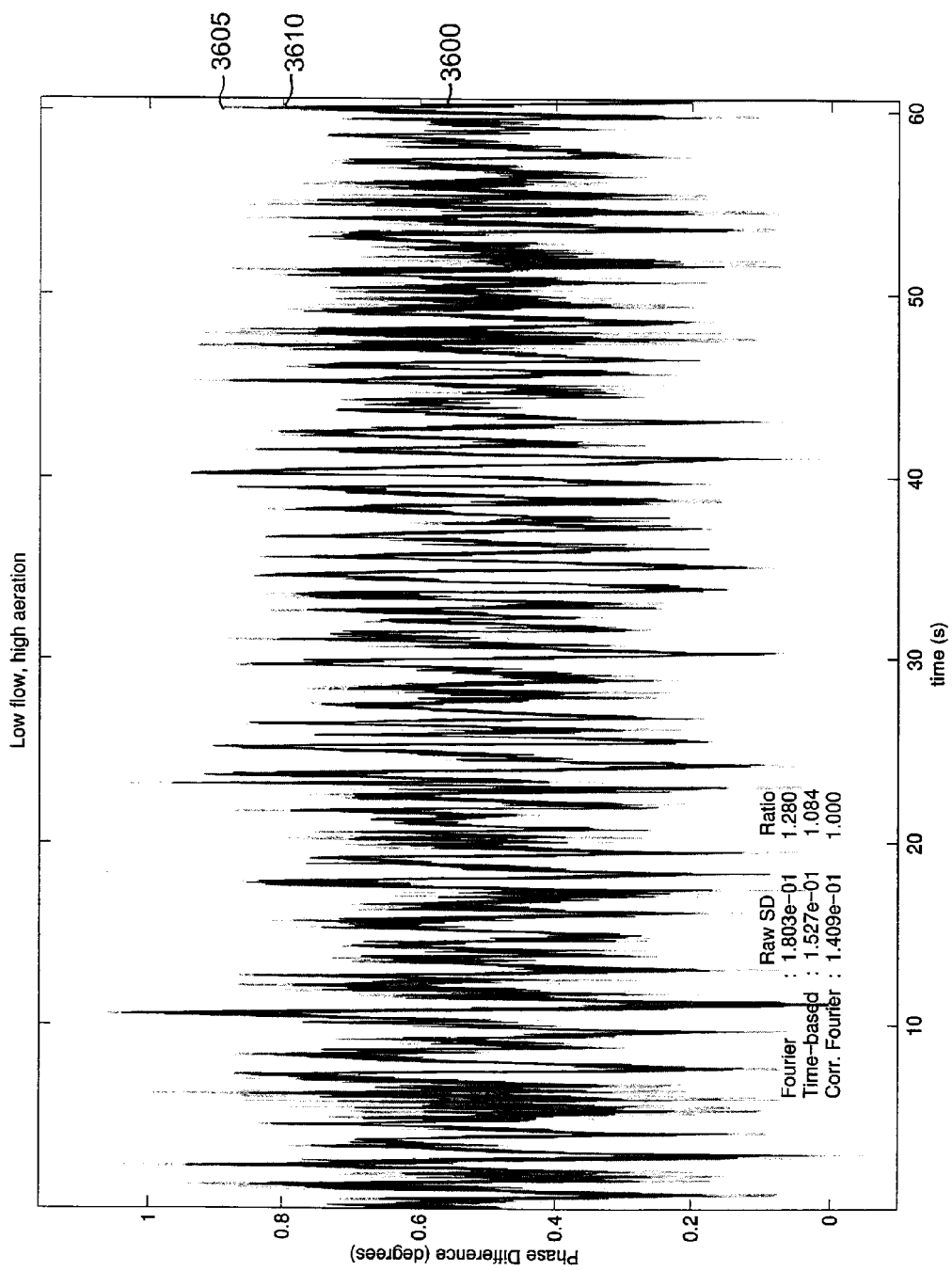
Figure 36I:
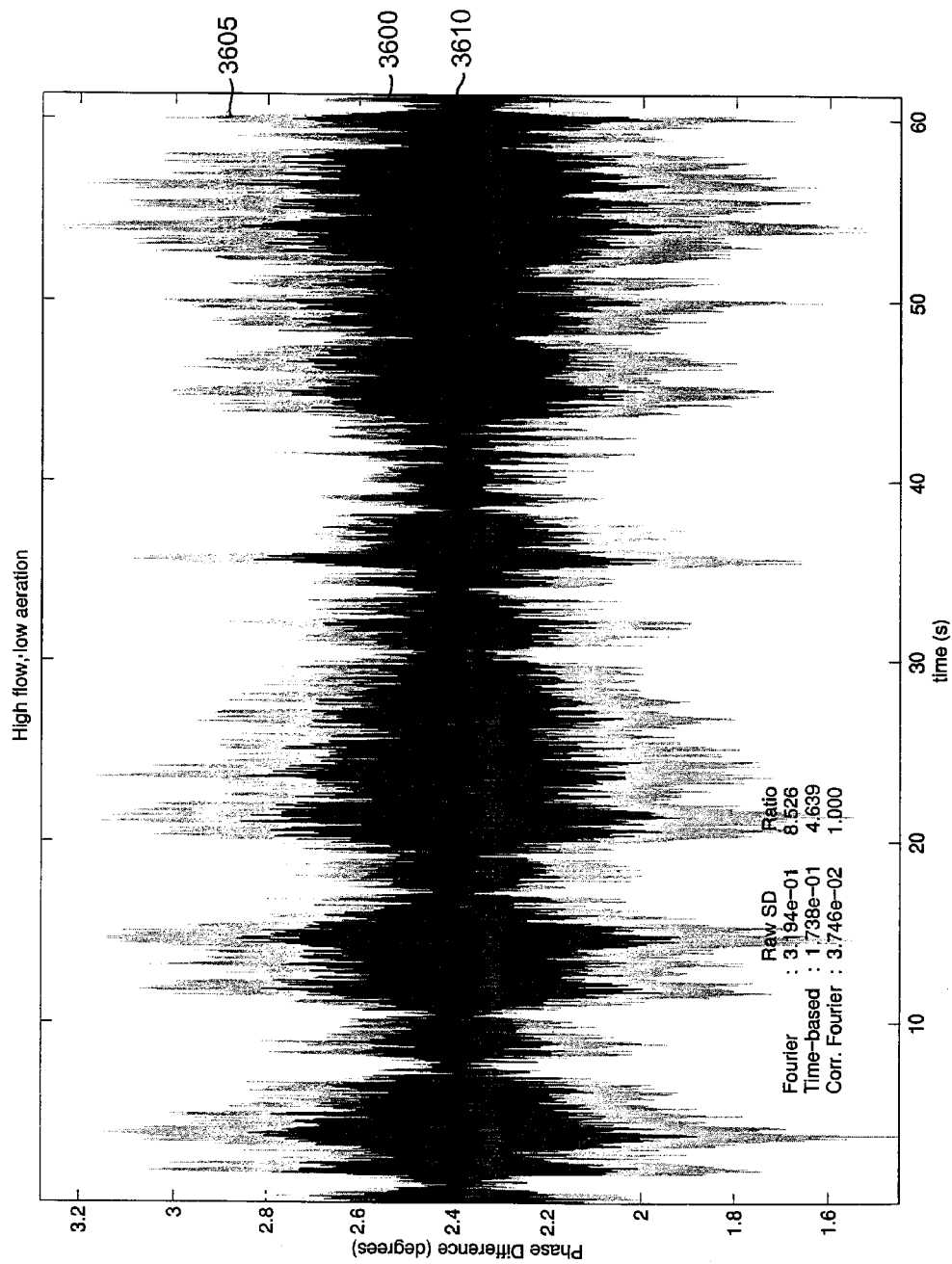
Figure 36J:
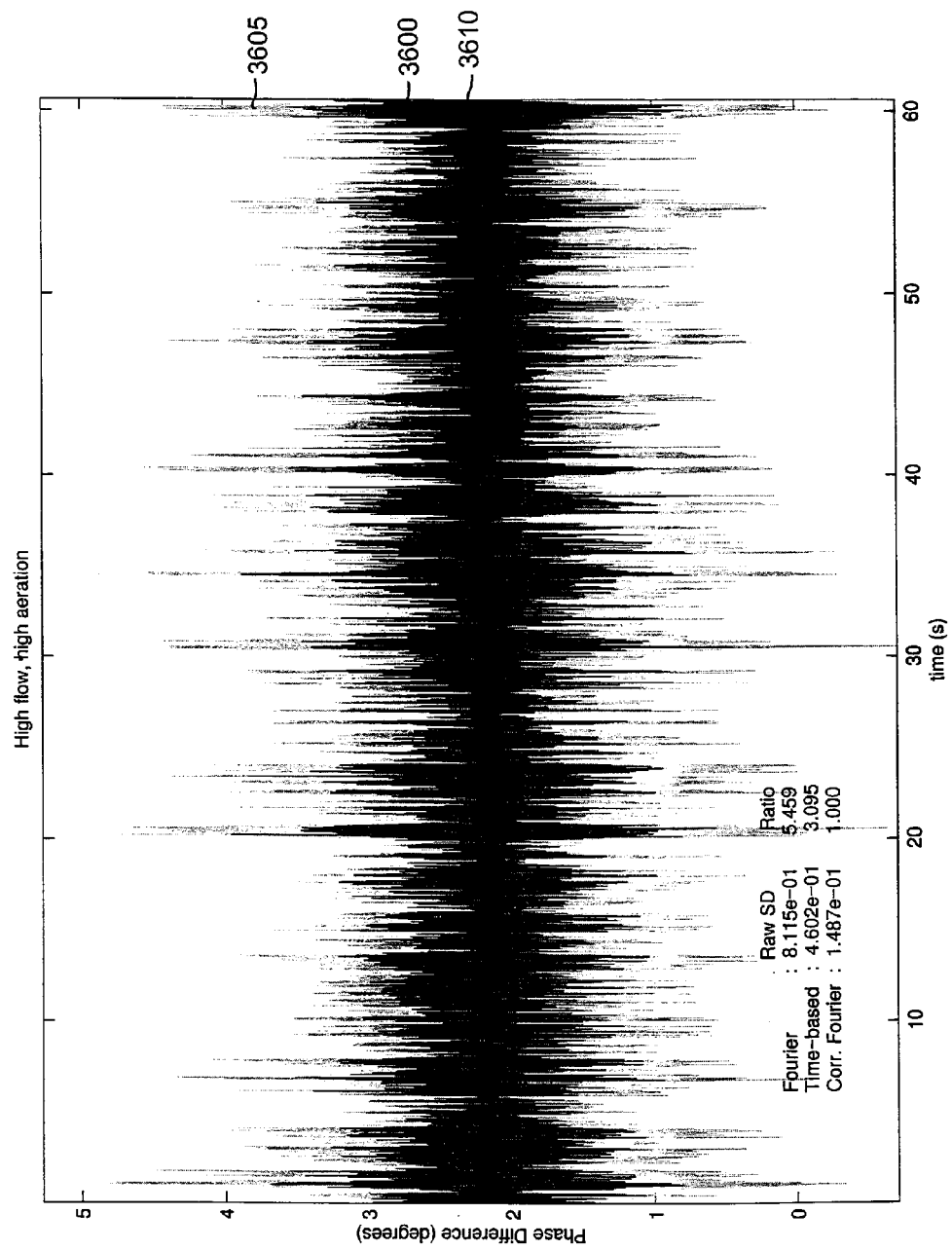
Figure 36K:
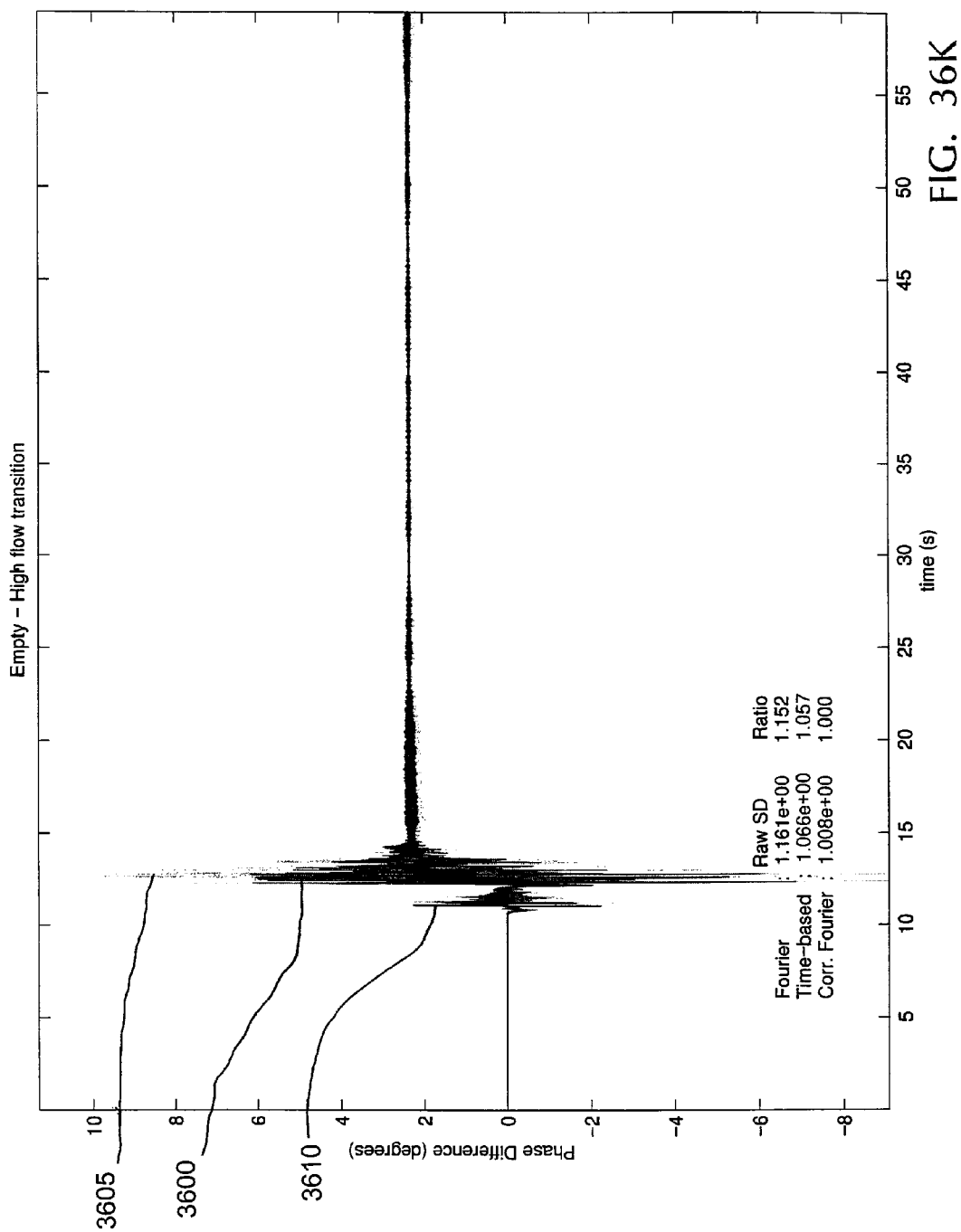
Figure 36L:
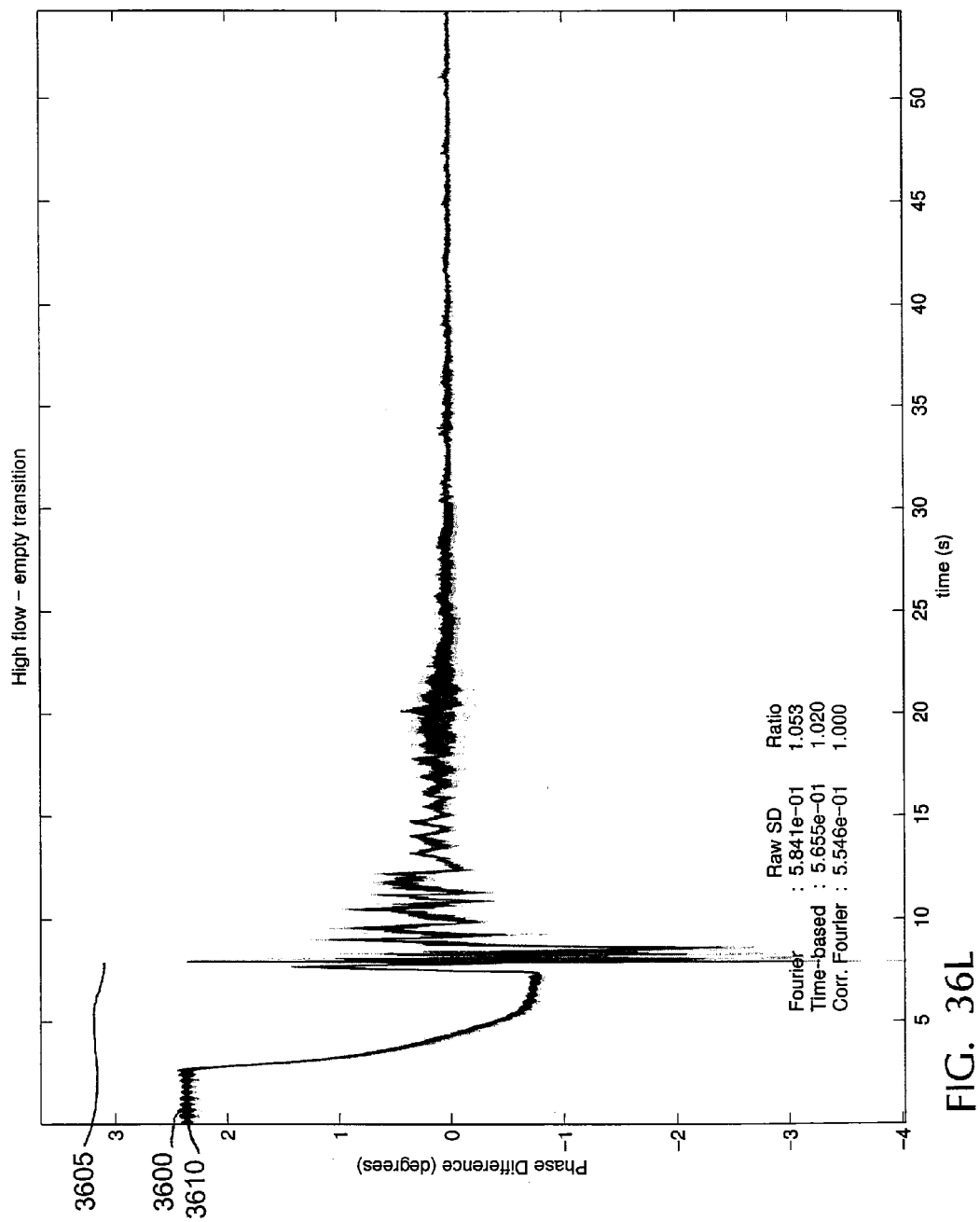

FIG. 36A illustrates measurements with no flow, a full conduit, and no pump noise. FIG. 36B illustrates measurements with no flow, a full conduit, and the pumps on. FIG. 36C illustrates measurements with an empty, wet conduit. FIG. 36D illustrates measurements at a low flow rate. FIG. 36E illustrates measurements at a high flow rate. FIG. 36F illustrates measurements at a high flow rate and an amplitude of oscillation of 0.03V. FIG. 36G illustrates measurements at a low flow rate with low aeration. FIG. 36H illustrates measurements at a low flow rate with high aeration. FIG. 36I illustrates measurements at a high flow rate with low aeration. FIG. 36J illustrates measurements at a high flow rate with high aeration. FIG. 36K illustrates measurements for an empty to high flow rate transition. FIG. 36L illustrates measurements for a high flow rate to empty transition.

2. Flowtube Level Dynamic Modeling

A dynamic model may be incorporated in two basic stages. In the first stage, the model is created using the techniques of system identification. The flowtube is "stimulated" to manifest its dynamics, while the true mass flow and density values are kept constant. The response of the flowtube is measured and used in generating the dynamic model. In the second stage, the model is applied to normal flow data. Predictions of the effects of flowtube dynamics are made for both phase and frequency. The predictions then are subtracted from the observed data to leave the residual phase and frequency, which should be due to the process alone. Each stage is described in more detail below.

a. System Identification

Figure 37A:
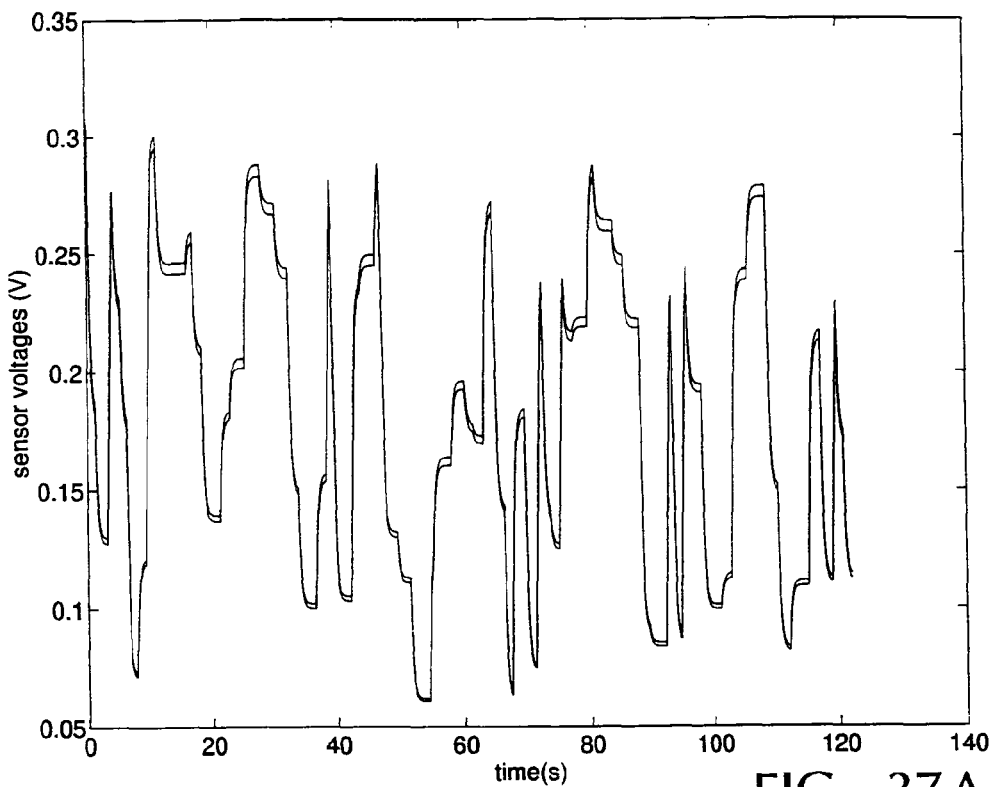
FIG. 37A is a graph of sensor voltages.
Figure 37B:
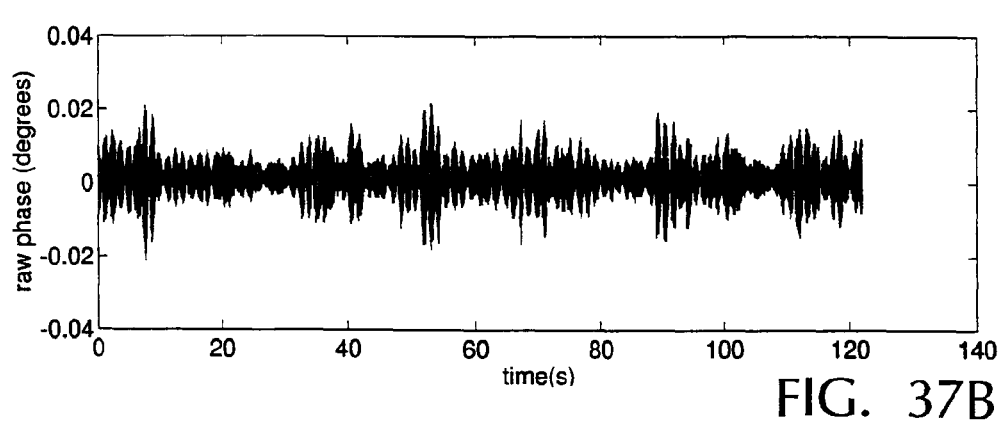
FIGS. 37B and 37C are graphs of phase and frequency measurements corresponding to the sensor voltages of FIG. 37A.
Figure 37C:
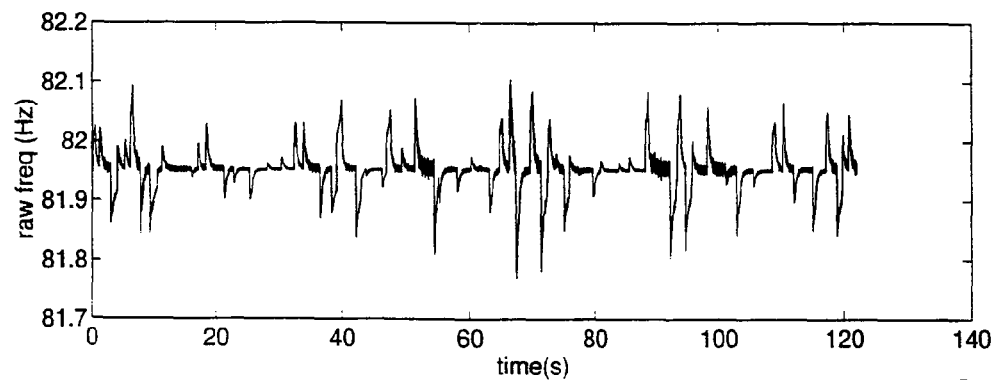

System identification begins with a flowtube full of water, with no flow. The amplitude of oscillation, which normally is kept constant, is allowed to vary by assigning a random setpoint between 0.05 V and 0.3 V, where 0.3 V is the usual value. The resulting sensor voltages are shown in FIG. 37A, while FIGS. 37B and 37C show, respectively, the corresponding calculated phase and frequency values. These values are calculated once per cycle. Both phase and frequency show a high degree of "structure." Since the phase and frequency corresponding to mass flow are constant, this structure is likely to be related to flowtube dynamics. Observable variables that will predict this structure when the true phase and frequency are not known to be constant may be expressed as set forth below.

First, as noted above, $\Delta SV(t_k)$ may be expressed as:

$$\Delta SV(t_k) = \frac{SV(t_{k+1}) - SV(t_{k-1})}{t_{k+1} - t_{k-1}} \cdot \frac{1}{SV(t_k)}.$$

This expression may be used to determine $\Delta SV_1$ and $\Delta SV_2$.

Figure 37D:
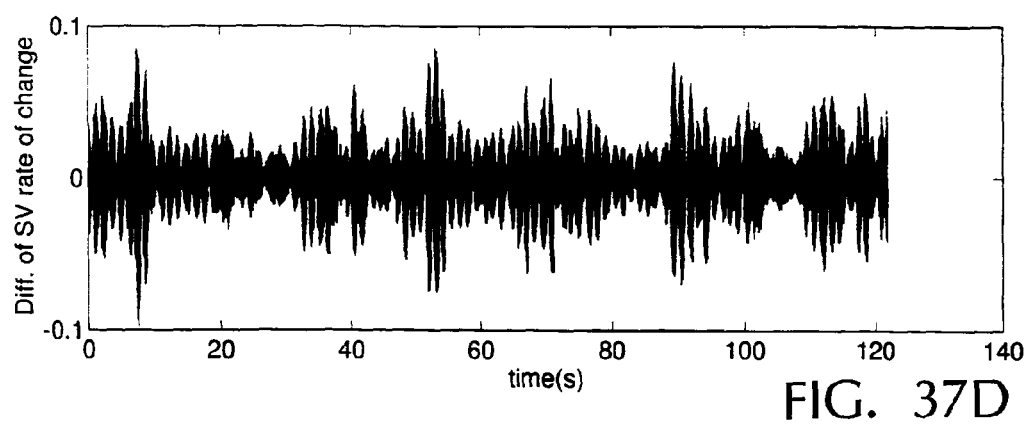
FIGS. 37D and 37E are graphs of correction parameters for the phase and frequency measurements of FIGS. 37B and 37C.
Figure 37E:
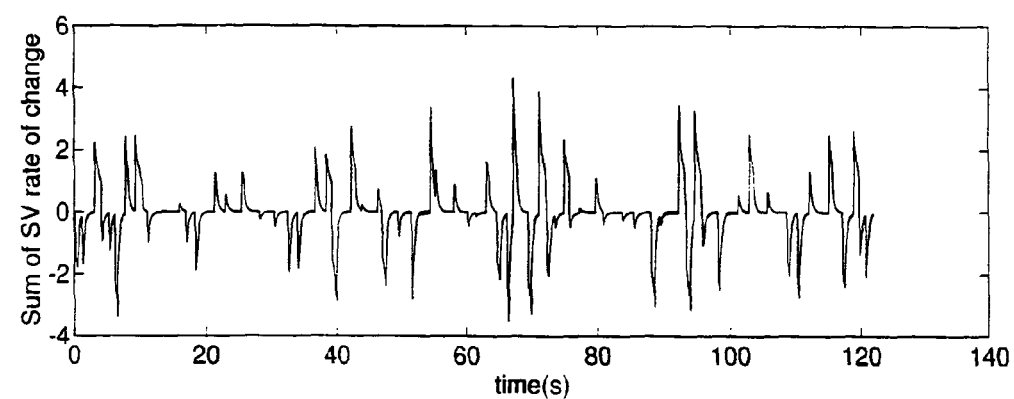

The phase of the flowtube is related to $\Delta^-$, which is defined as $\Delta SV_1 - \Delta SV_2$, while the frequency is related to $\Delta^+$, which is defined as $\Delta SV_1 + \Delta SV_2$. These parameters are illustrated in FIGS. 37D and 37E. Comparing FIG. 37B to FIG. 37D and FIG. 37C to FIG. 37E shows the striking relationship between $\Delta^-$ and phase and between $\Delta^+$ and frequency.

Some correction for flowtube dynamics may be obtained by subtracting a multiple of the appropriate prediction function from the phase and/or the frequency. Improved results may be obtained using a model of the form:

$$y(k)+a_1y(k-1)+\ldots+a_ny(k-n)=b_0u(k)+b_1i(k-1)+\ldots+b_mu(k-m),$$

where y(k) is the output (i.e., phase or frequency) and u is the prediction function (i.e., $\Delta^-$ or $\Delta^+$). The technique of system identification suggests values for the orders n and m, and the coefficients $a_i$ and $b_j$, of what are in effect polynomials in time. The value of y(k) can be calculated every cycle and subtracted from the observed phase or frequency to get the residual process value.

It is important to appreciate that, even in the absence of dynamic corrections, the digital flowmeter offers very good precision over a long period of time. For example, when totalizing a batch of 200 kg, the device readily achieves a repeatability of less that 0.03%. The purpose of the dynamic modeling is to improve the dynamic precision. Thus, raw and compensated values should have similar mean values, but reductions in "variance" or "standard deviation."

Figure 38A:
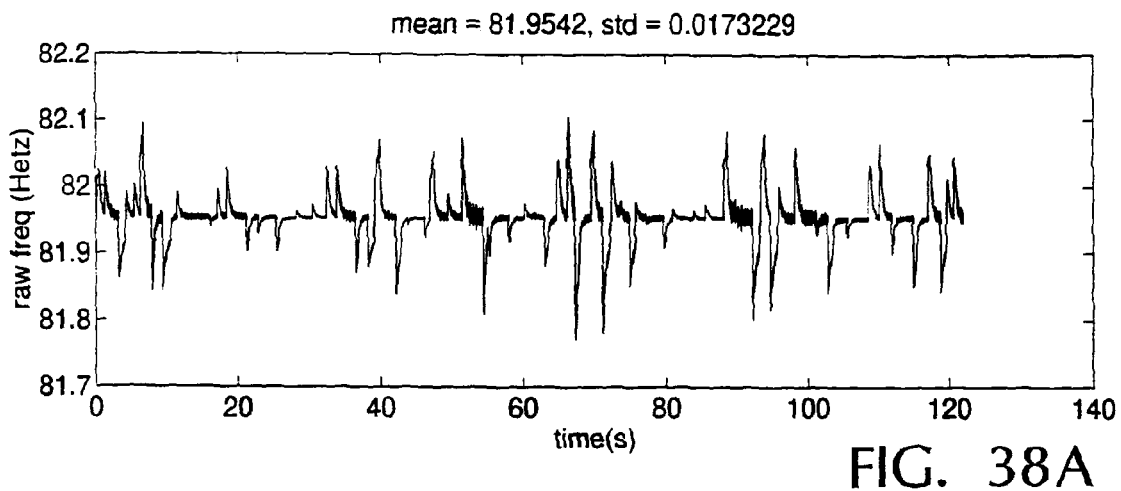
FIGS. 38A-38H are graphs of raw measurements.
Figure 39A:
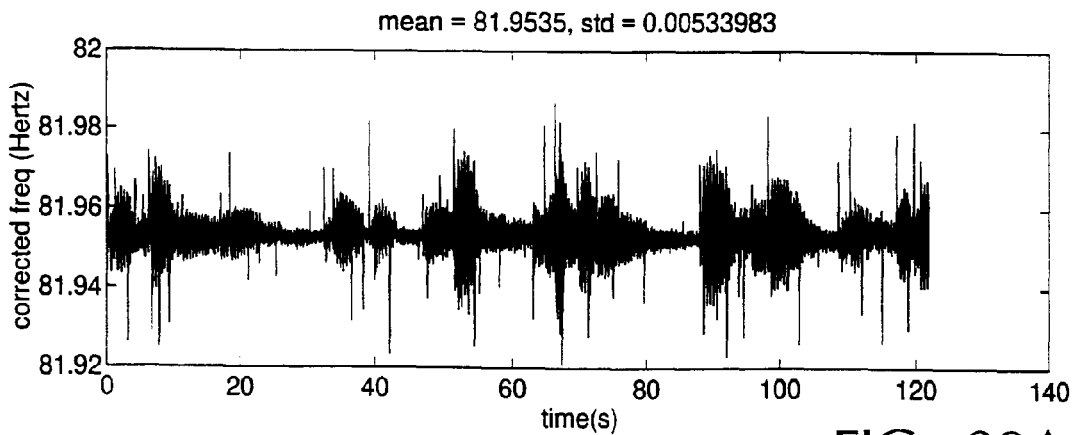
FIGS. 39A-39H are graphs of corrected measurements.

FIGS. 38A and 39A show raw and corrected frequency values. The mean values are similar, but the standard deviation has been reduced by a factor of 3.25. Though the gross deviations in frequency have been eliminated, significant "structure" remains in the residual noise. This structure appears to be unrelated to the $\Delta^+$ function. The model used is a simple first order model, where m=n=1.

Figure 38B:
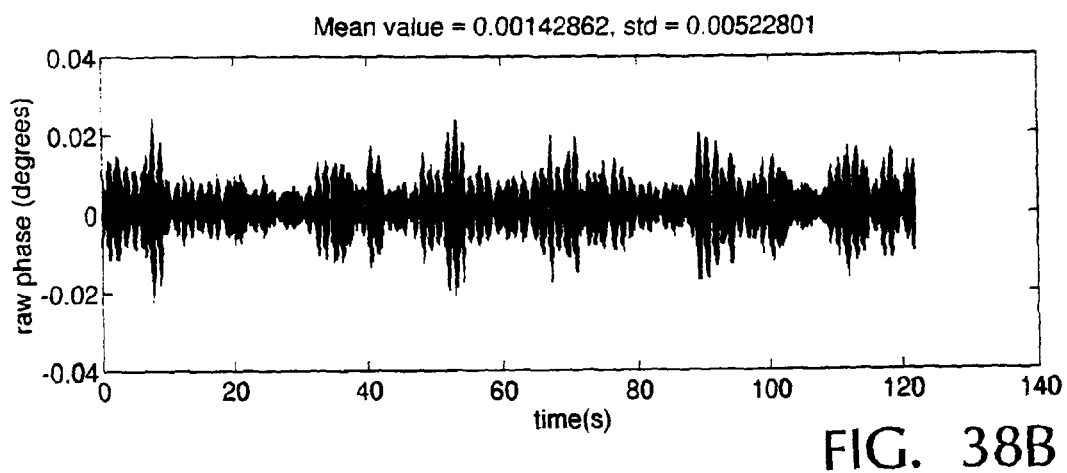
Figure 39B:
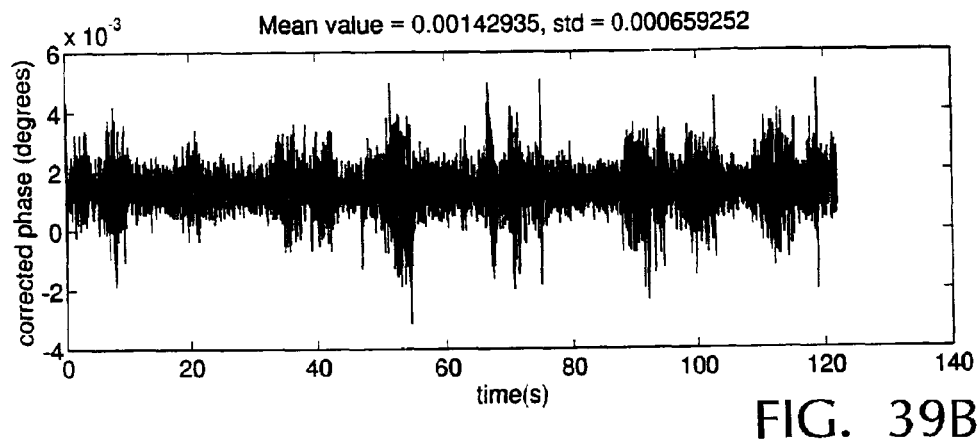

FIGS. 38B and 39B show the corresponding phase correction. The mean value is minimally affected, while the standard deviation is reduced by a factor of 7.9. The model orders are n=2 and m=10. Some structure appears to remain in the residual noise. It is expected that this structure is due to insufficient excitation of the phase dynamics by setpoint changes.

Figure 38C:
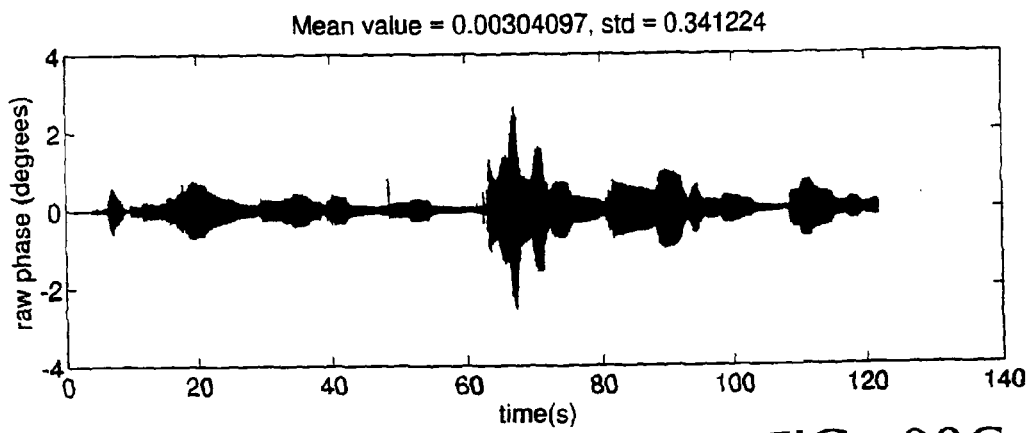
Figure 39C:
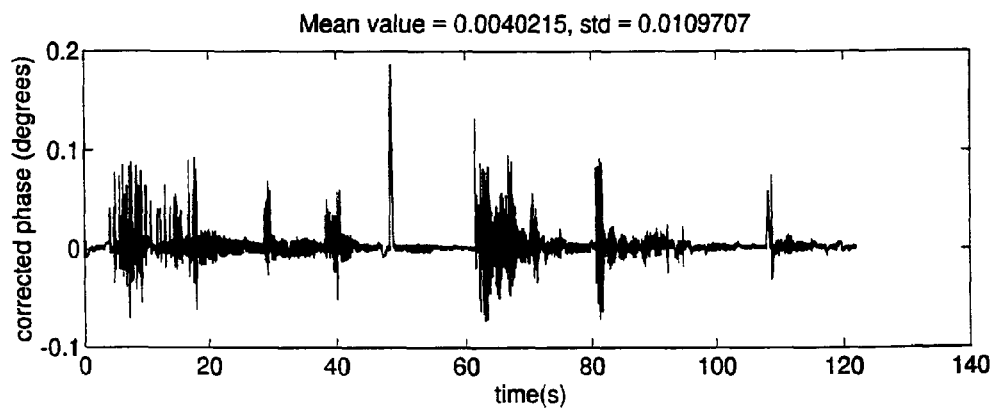

More effective phase identification has been achieved through further simulation of flowtube dynamics by continuous striking of the flowtube during data collection (set point changes are still carried out). FIGS. 38C and 39C show the effects of correction under these conditions. As shown, the standard deviation is reduced by a factor of 31. This more effective model is used in the following discussions.

b. Application to Flow Data

The real test of an identified model is the improvements it provides for new data. At the outset, it is useful to note a number of observations. First, the mean phase, averaged over, for example, ten seconds or more, is already quite precise. In the examples shown, phase values are plotted at 82 Hz or thereabouts. The reported standard deviation would be roughly ⅓ of the values shown when averaged to 10 Hz, and ⅑ when averages to 1 Hz. For reference, on a one inch flow tube, one degree of phase difference corresponds to about 1 kg/s flow rate.

The expected benefit of the technique is that of providing a much better dynamic response to true process changes, rather than improving average precision. Consequently, in the following examples, where the flow is non-zero, small flow step changes are introduced every ten seconds or so, with the expectation that the corrected phase will show up the step changes more clearly.

Figure 38D:
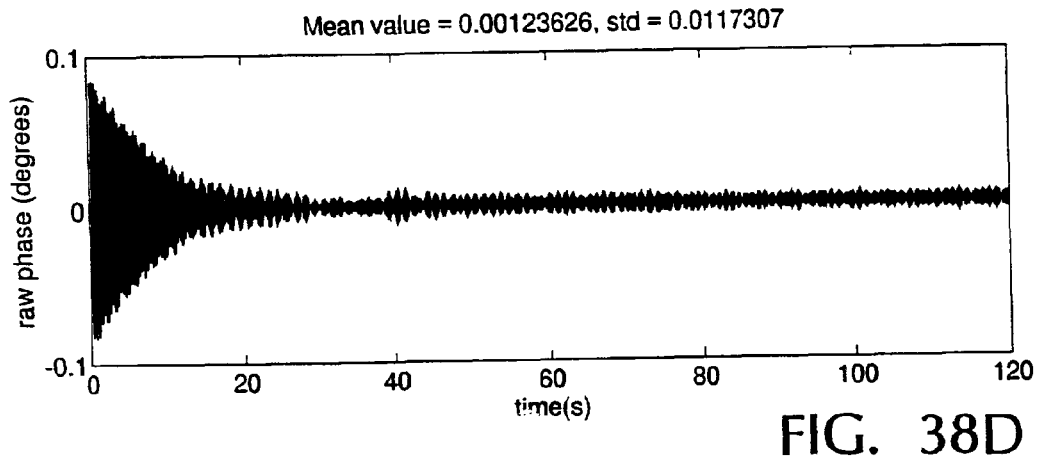
Figure 39D:
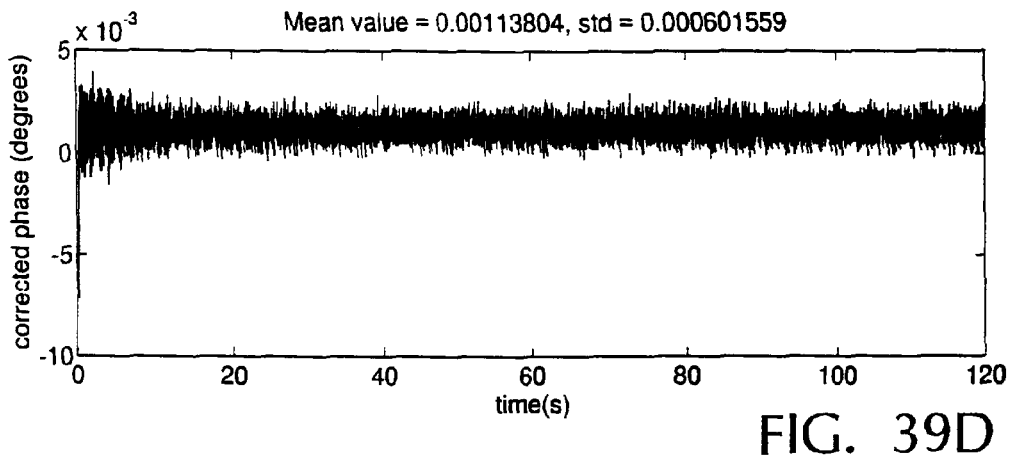

FIGS. 38D and 39D show the correction applied to a full flowtube with zero flow, just after startup. The ring-down effect characteristic of startup is clearly evident in the raw data (FIG. 38D), but this is eliminated by the correction (FIG. 39D), leading to a standard deviation reduction of a factor of 23 over the whole data set. Note that the corrected measurement closely resembles white noise, suggesting most flowtube dynamics have been captured.

Figure 38E:
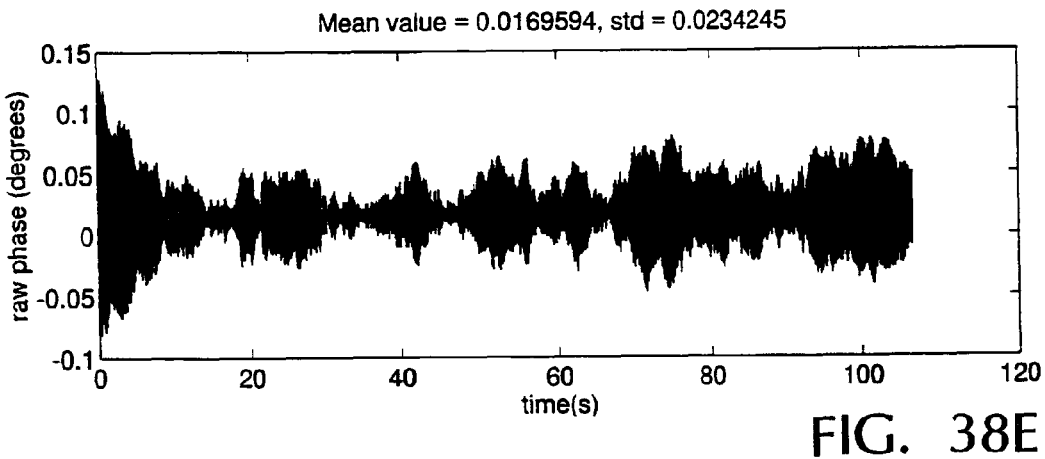
Figure 39E:
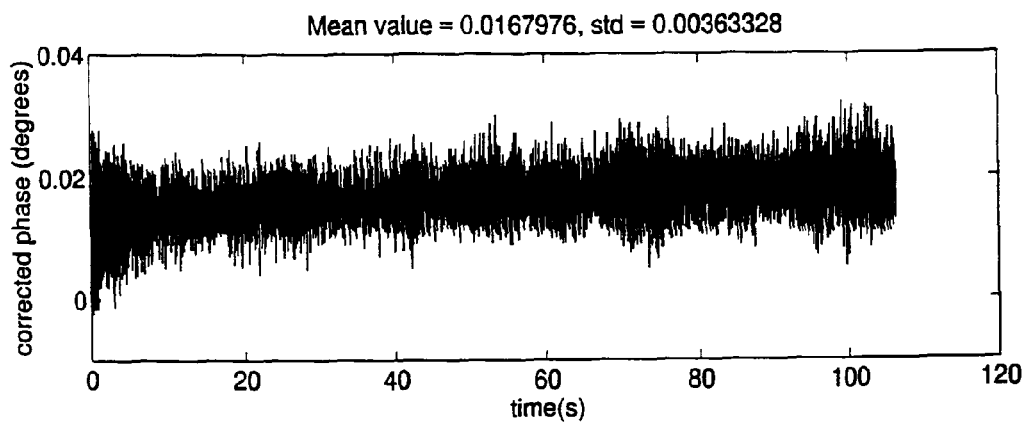

FIGS. 38E and 39E show the resulting correction for a "drained" flowtube. Noise is reduced by a factor of 6.5 or so. Note, however, that there appears to be some residual structure in the noise.

Figure 38F:
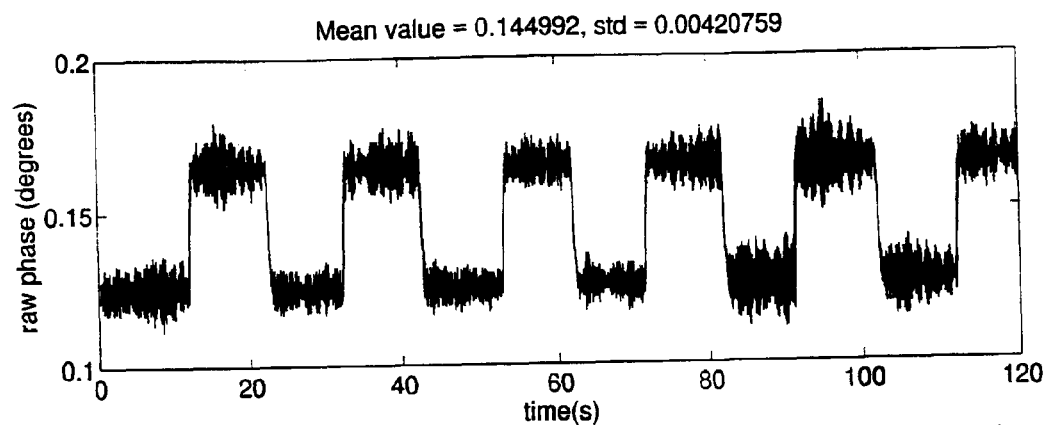
Figure 38G:
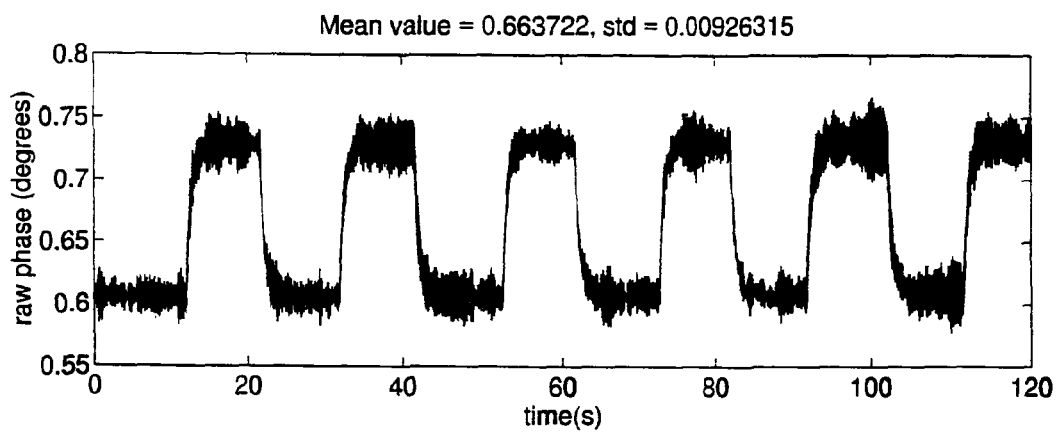
Figure 38H:
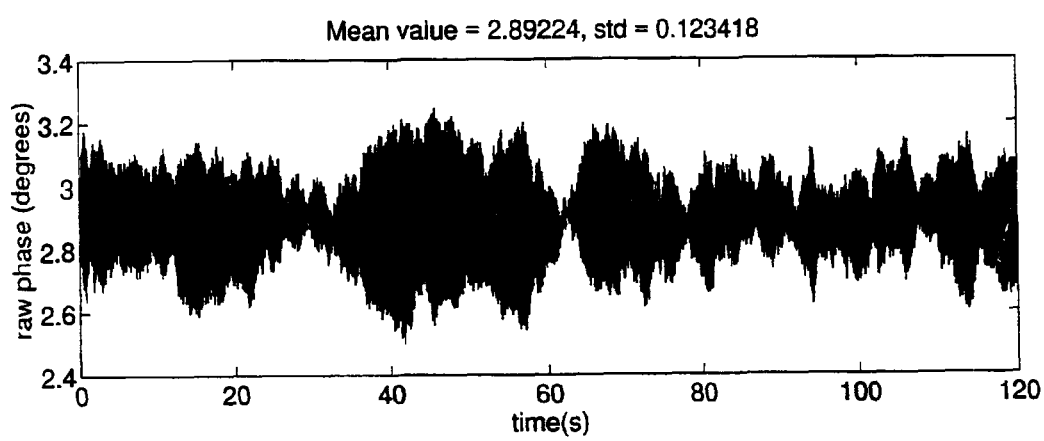
Figure 39F:
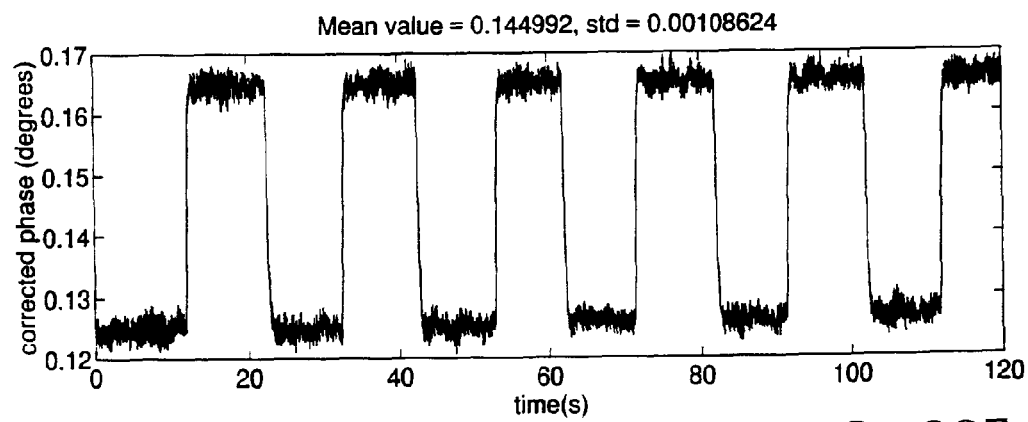
Figure 39G:
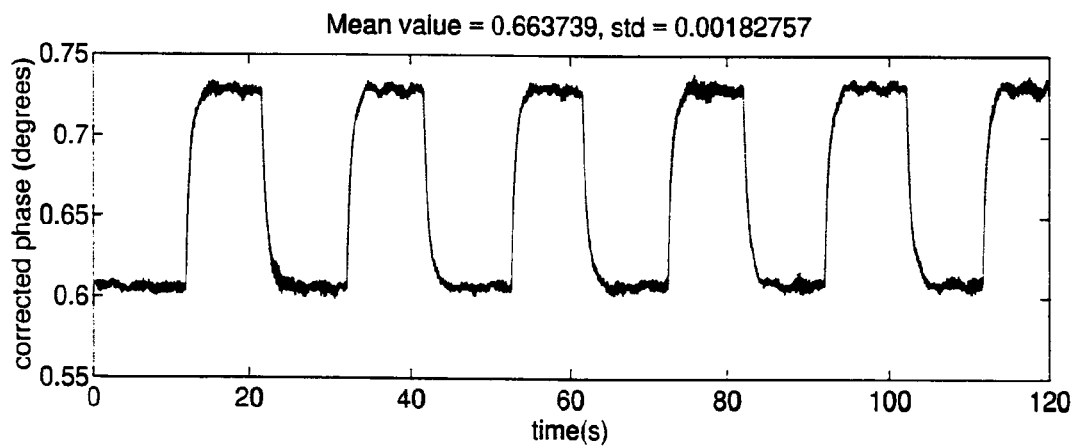
Figure 39H:
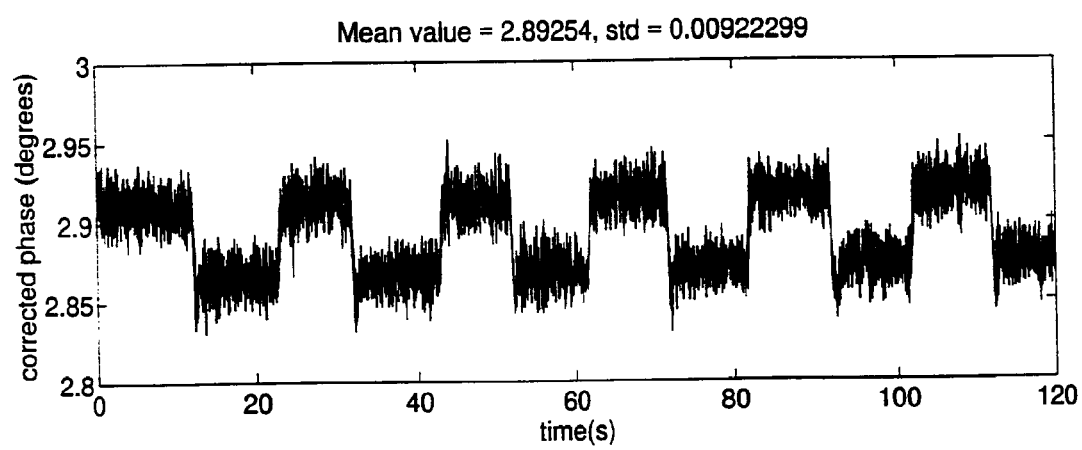

The effects of the technique on low (FIGS. 38F and 39F), medium (FIGS. 38G and 39G), and high (FIGS. 38H and 39H) flow rates are also illustrated, each with step changes in flow every ten seconds. In each case, the pattern is the same: the corrected average flows (FIGS. 39F-39H) are identical to the raw average flows (FIGS. 38F-38H), but the dynamic noise is reduced considerably. In FIG. 39H, this leads to the emergence of the step changes which previously had been submerged in noise (FIG. 38H).

3. Extensions of Dynamic Monitoring and Compensation Techniques

The previous sections have described a variety of techniques (physical modeling, system identification, heuristics) used to monitor and compensate for different aspects of dynamic behavior (frequency and phase noise caused by amplitude modulation, velocity effect, flowtube dynamics at both the sensor and the flowtube level). By natural extension, similar techniques well-known to practitioners of control and/or instrumentation, including those of artificial intelligence, neural networks, fuzzy logic, and genetic algorithms, as well as classical modeling and identification methods, may be applied to these and other aspects of the dynamic performance of the meter. Specifically, these might include monitoring and compensation for frequency, amplitude and/or phase variation at the sensor level, as well as average frequency and phase difference at the flowtube level, as these variations occur within each measurement interval, as well as the time between measurement intervals (where measurement intervals do not overlap).

This technique is unusual in providing both reduced noise and improved dynamic response to process measurement changes. As such, the technique promises to be highly valuable in the context of flow measurement.

I. Aeration

The digital flowmeter provides improved performance in the presence of aeration in the conduit. Aeration causes energy losses in the conduit that can have a substantial negative impact on the measurements produced by a mass flowmeter and can result in stalling of the conduit. Experiments have shown that the digital flowmeter has substantially improved performance in the presence of aeration relative to traditional, analog flowmeters. This performance improvement may stem from the meter's ability to provide a very wide gain range, to employ negative feedback, to calculate measurements precisely at very low amplitude levels, and to compensate for dynamic effects such as rate of change of amplitude and flowtube dynamics, and also may stem from the meter's use of a precise digital amplitude control algorithm.

The digital flowmeter detects the onset of aeration when the required driver gain rises simultaneously with a drop in apparent fluid density. The digital flowmeter then may directly respond to detected aeration. In general, the meter monitors the presence of aeration by comparing the observed density of the material flowing through the conduit (i.e., the density measurement obtained through normal measurement techniques) to the known, nonaerated density of the material. The controller determines the level of aeration based on any difference between the observed and actual densities. The controller then corrects the mass flow measurement accordingly.

The controller determines the non-aerated density of the material by monitoring the density over time periods in which aeration is not present (i.e., periods in which the density has a stable value). Alternatively, a control system to which the controller is connected may provide the non-aerated density as an initialization parameter.

In one implementation, the controller uses three corrections to account for the effects of aeration: bubble effect correction, damping effect correction, and sensor imbalance correction. FIGS. 40A-40H illustrate the effects of the correction procedure.

Figure 40A:
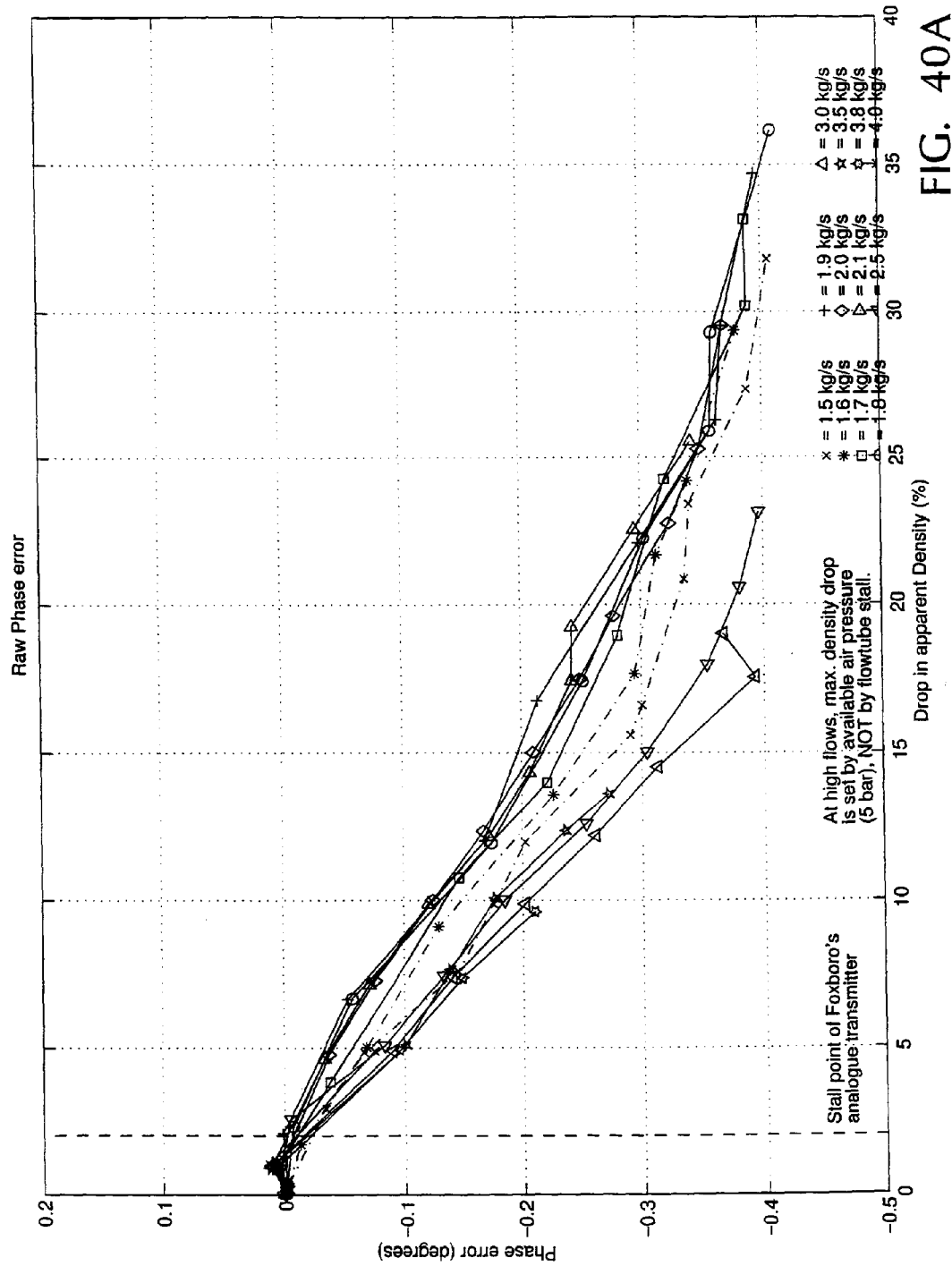
Figure 40B:
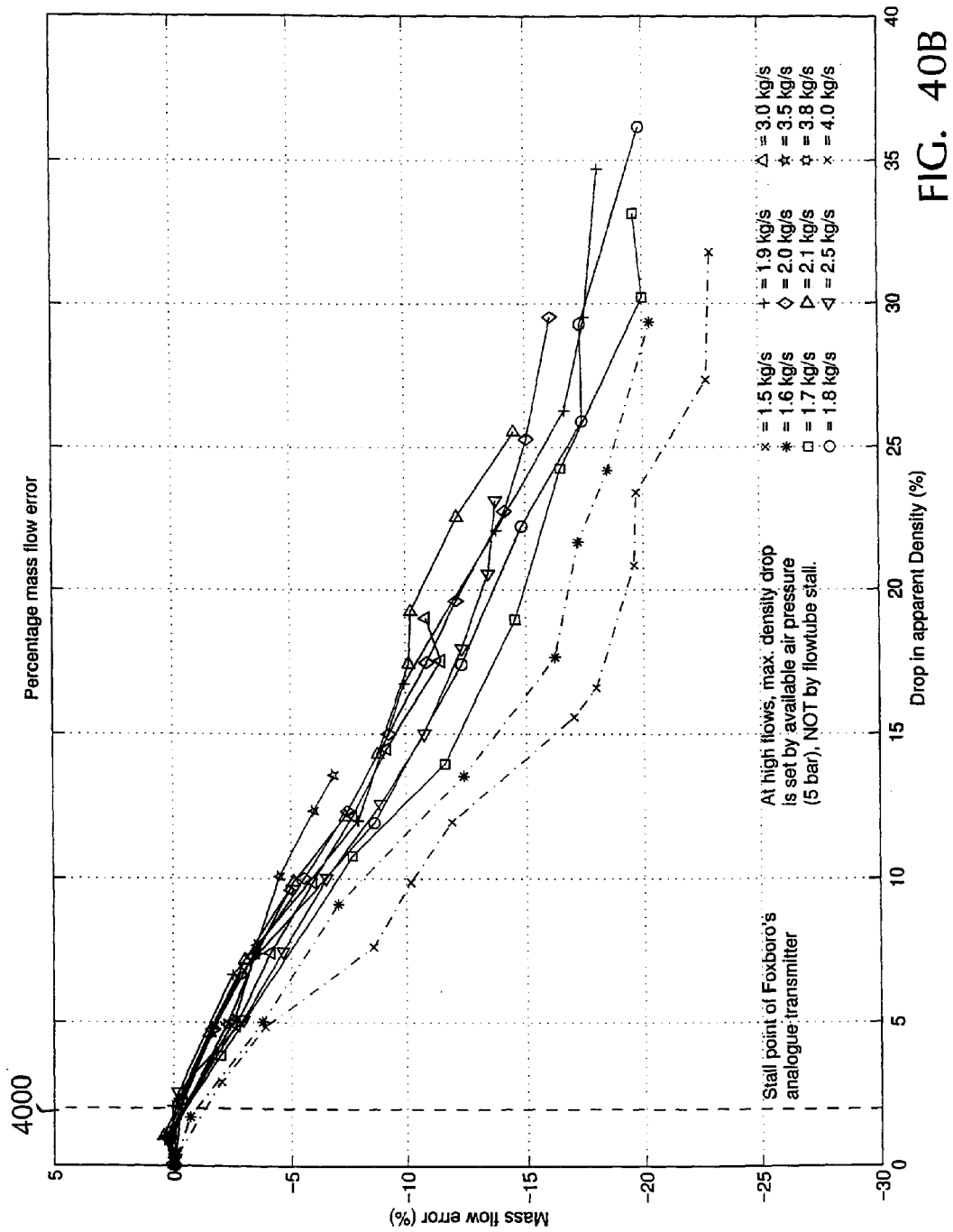

FIG. 40A illustrates the error in the phase measurement as the measured density decreases (i.e., as aeration increases) for different mass flow rates, absent aeration correction. As shown, the phase error is negative and has a magnitude that increases with increasing aeration. FIG. 40B illustrates that the resulting mass flow error is also negative. It also is significant to note that the digital flowmeter operates at high levels of aeration. By contrast, as indicated by the horizontal bar 4000, traditional analog meters tend to stall in the presence of low levels of aeration.

A stall occurs when the flowmeter is unable to provide a sufficiently large driver gain to allow high drive current at low amplitudes of oscillation. If the level of damping requires a higher driver gain than can be delivered by the flowtube in order to maintain oscillation at a certain amplitude, then insufficient drive energy is supplied to the conduit. This results in a drop in amplitude of oscillation, which in turn leads to even less drive energy supplied due to the maximum gain limit. Catastrophic collapse results, and flowtube oscillation is not possible until the damping reduces to a level at which the corresponding driver gain requirement can be supplied by the flowmeter.

Figure 40D:
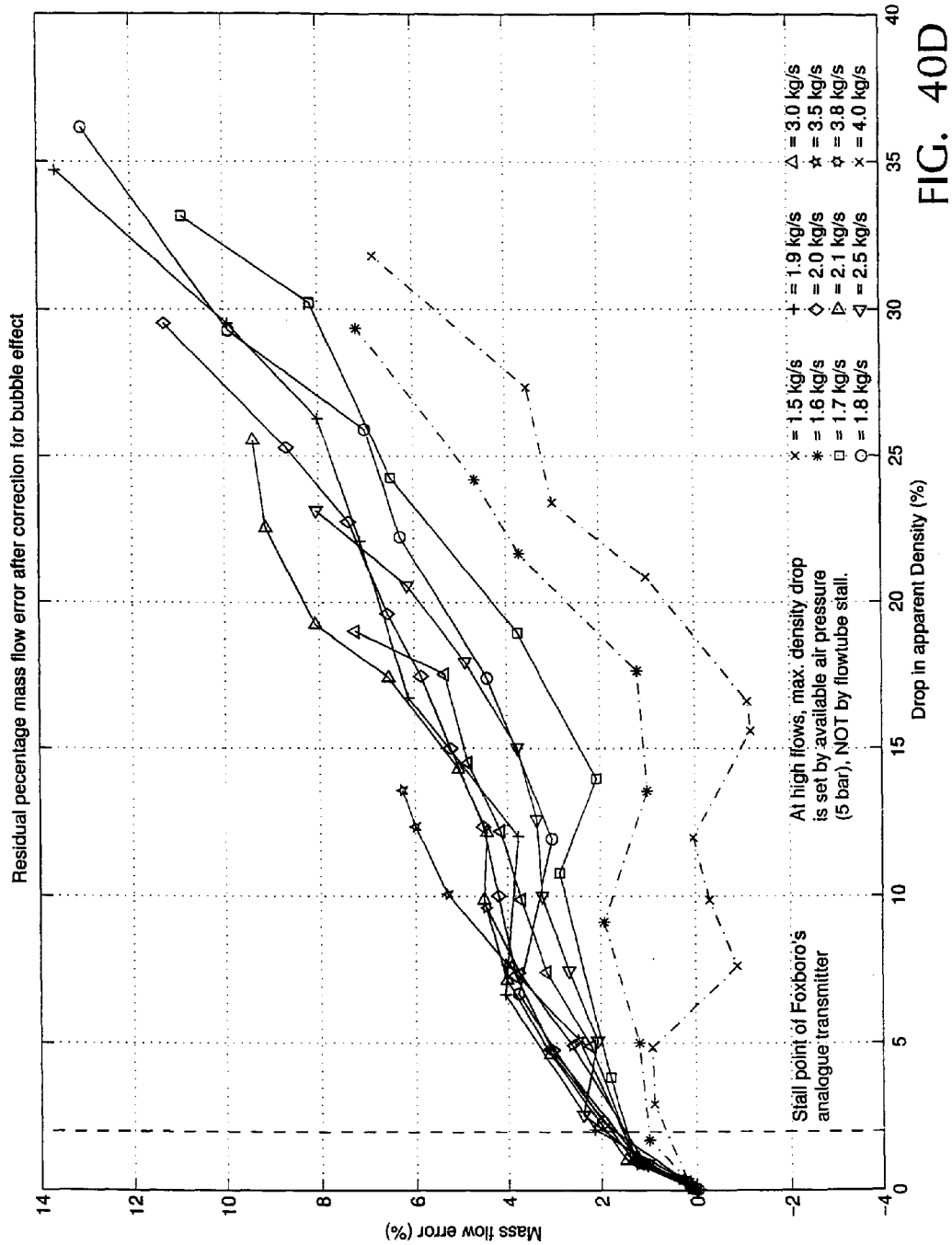

The bubble effect correction is based on the assumption that the mass flow decreases as the level of aeration, also referred to as the void fraction, increases. Without attempting to predict the actual relationship between void fraction and the bubble effect, this correction assumes, with good theoretical justification, that the effect on the observed mass flow will be the same as the effect on the observed density. Since the true fluid density is known, the bubble effect correction corrects the mass flow rate by the same proportion. This correction is a linear adjustment that is the same for all flow rates. FIGS. 40C and 40D illustrate, respectively, the residual phase and mass flow errors after correction for the bubble effect. As shown, the residual errors are now positive and substantially smaller in magnitude than the original errors.

Figure 40E:
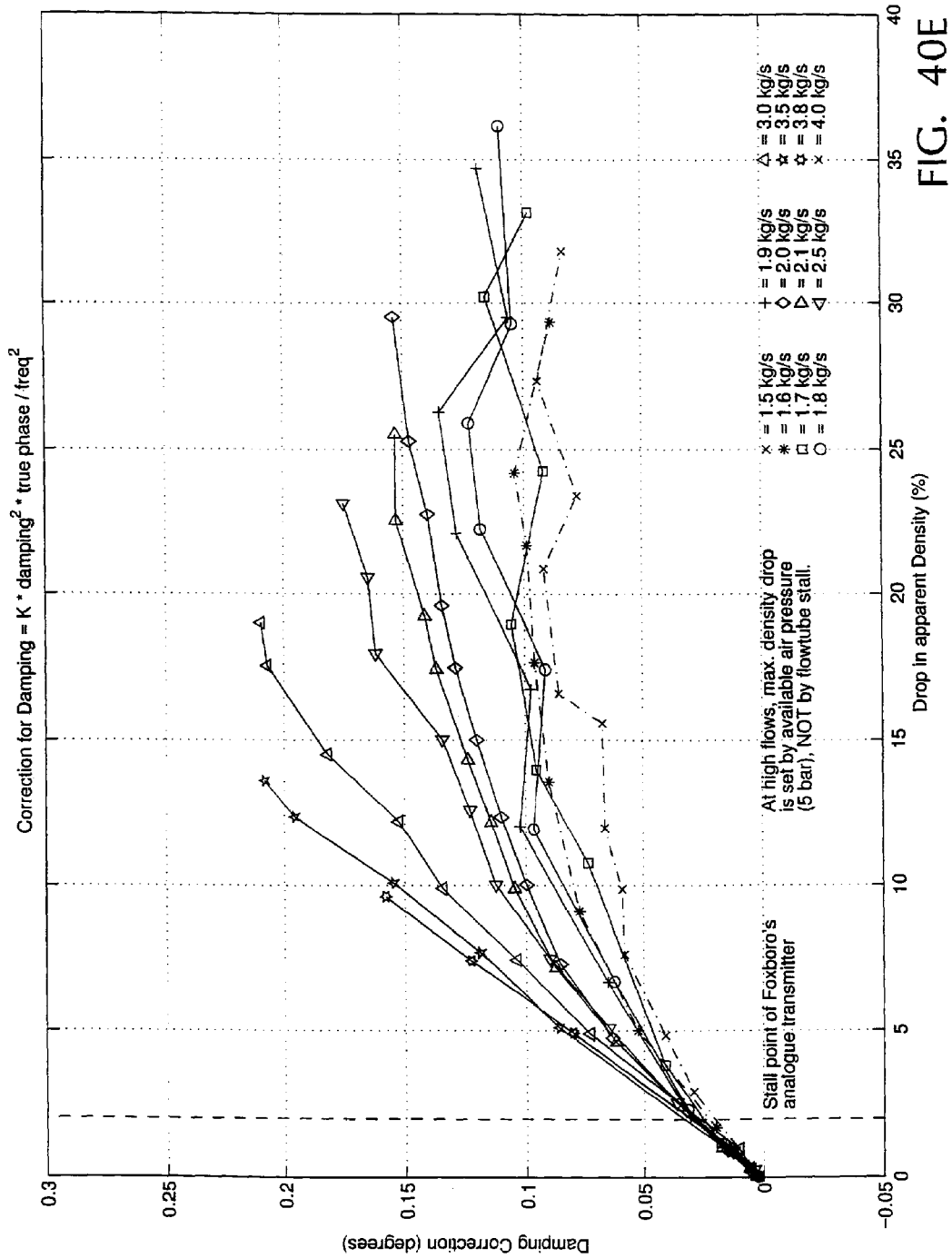

The damping factor correction accounts for damping of the conduit motion due to aeration. In general, the damping factor correction is based on the following relationship between the observed phase, $\phi_{obs}$, and the actual phase, $\phi_{true}$:

$$\varphi_{obs} = \varphi_{true}\left(1 + \frac{k\lambda^2 \varphi_{true}}{f^2}\right),$$

where $\lambda$ is a damping coefficient and k is a constant. FIG. 40E illustrates the damping correction for different mass flow rates and different levels of aeration. FIG. 40F illustrates the residual phase error after correction for damping. As shown, the phase error is reduced substantially relative to the phase error remaining after bubble effect correction.

Figure 41:
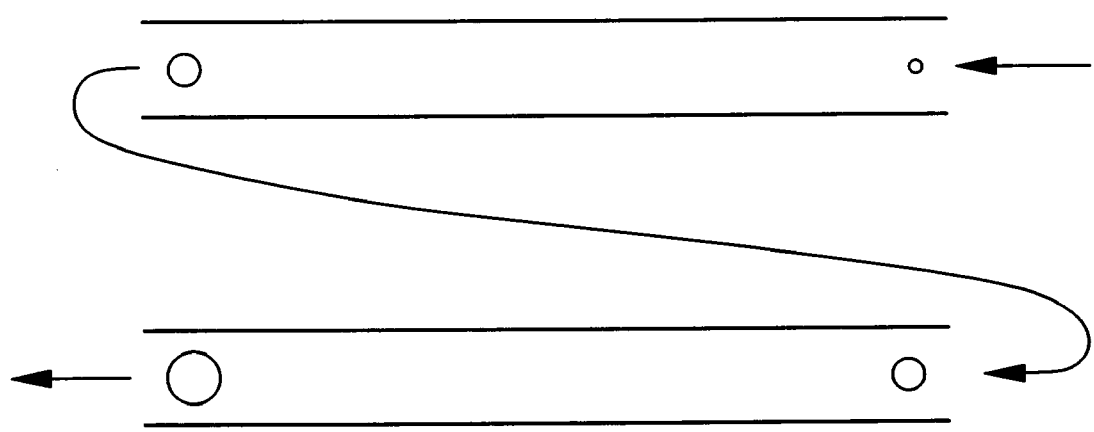
FIG. 41 is a block diagram illustrating the effect of aeration in a conduit.

The sensor balance correction is based on density differences between different ends of the conduit. As shown in FIG. 41, a pressure drop between the inlet and the outlet of the conduit results in increasing bubble sizes from the inlet to the outlet. Since material flows serially through the two loops of the conduit, the bubbles at the inlet side of the conduit (i.e., the side adjacent to the first sensor/driver pair) will be smaller than the bubbles at the outlet side of the conduit (i.e., the side adjacent to the second sensor/driver pair). This difference in bubble size results in a difference in mass and density between the two ends of the conduit. This difference is reflected in the sensor signals ($SV_1$ and $SV_2$). Accordingly, the sensor balance correction is based on a ratio of the two sensor signals.

Figure 40H:
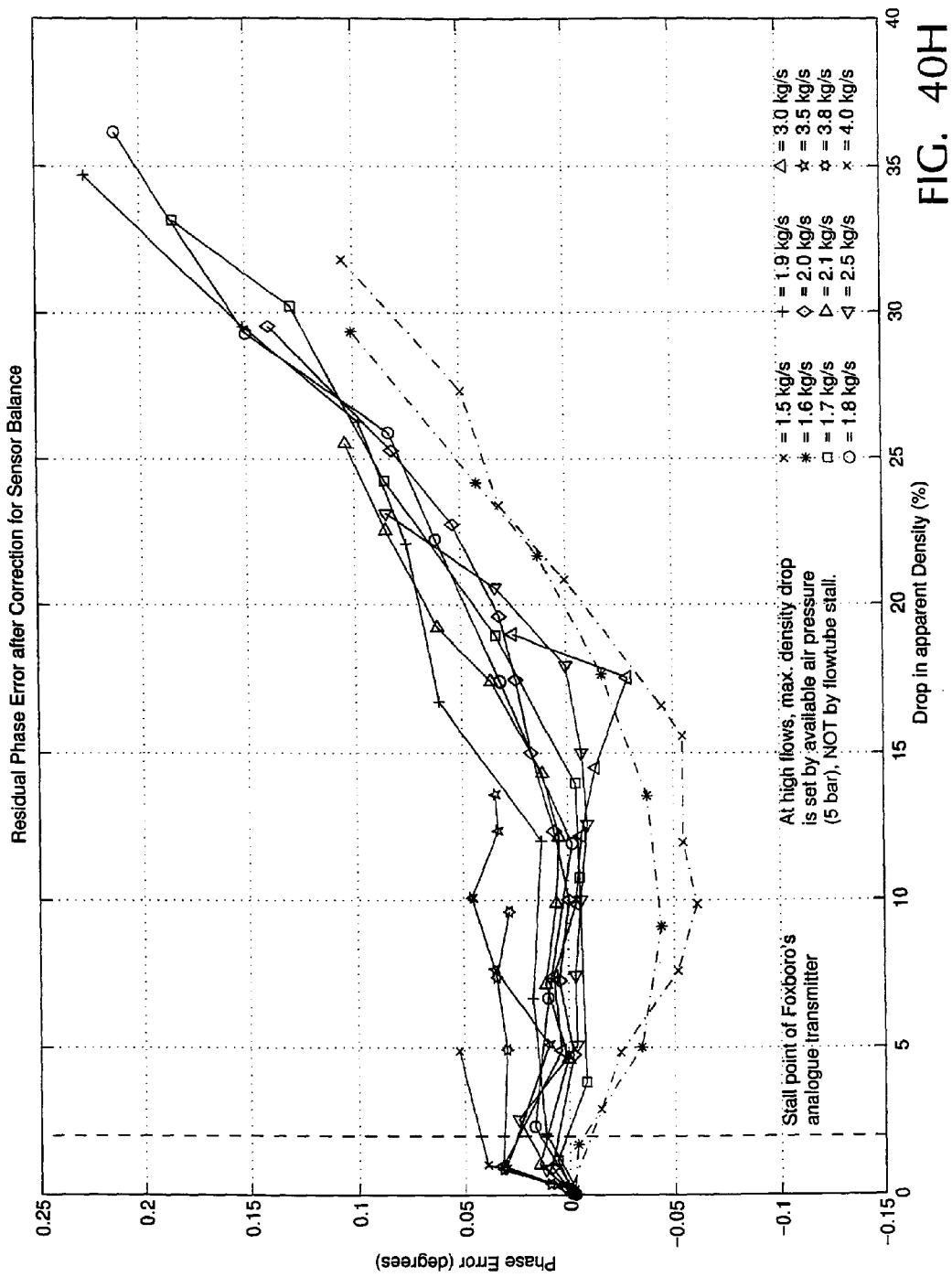

FIG. 40G illustrates the sensor balance correction for different mass flow rates and different levels of aeration. FIG. 40H illustrates the residual phase error after applying the sensor balance correction. At low flow rates and low levels of aeration, the phase error is improved relative to the phase error remaining after damping correction.

Other correction factors also could be used. For example, the phase angle of each sensor signal could be monitored. In general, the average phase angle for a signal should be zero. However, the average phase angle tends to increase with increasing aeration. Accordingly, a correction factor could be generated based on the value of the average phase angle. Another correction factor could be based on the temperature of the conduit.

In general, application of the correction factors tends to keep the mass flow errors at one percent or less. Moreover, these correction factors appear to be applicable over a wide range of flows and aeration levels.

J. Setpoint Adjustment

The digital flowmeter provides improved control of the setpoint for the amplitude of oscillation of the conduit. In an analog meter, feedback control is used to maintain the amplitude of oscillation of the conduit at a fixed level corresponding to a desired peak sensor voltage (e.g., 0.3 V). A stable amplitude of oscillation leads to reduced variance in the frequency and phase measurements.

In general, a large amplitude of oscillation is desirable, since such a large amplitude provides a large Coriolis signal for measurement purposes. A large amplitude of oscillation also results in storage of a higher level of energy in the conduit, which provides greater robustness to external vibrations.

Circumstances may arise in which it is not possible to maintain the large amplitude of oscillation due to limitations in the current that can be supplied to the drivers. For example, in one implementation of an analog transmitter, the current is limited to 100 mA for safety purposes. This is typically 5-10 times the current needed to maintain the desired amplitude of oscillation. However, if the process fluid provides significant additional damping (e.g., via two-phase flow), then the optimal amplitude may no longer be sustainable.

Similarly, a low-power flowmeter, such as the two-wire meter described below, may have much less power available to drive the conduit. In addition, the power level may vary when the conduit is driven by capacitive discharge.

Figure 42:
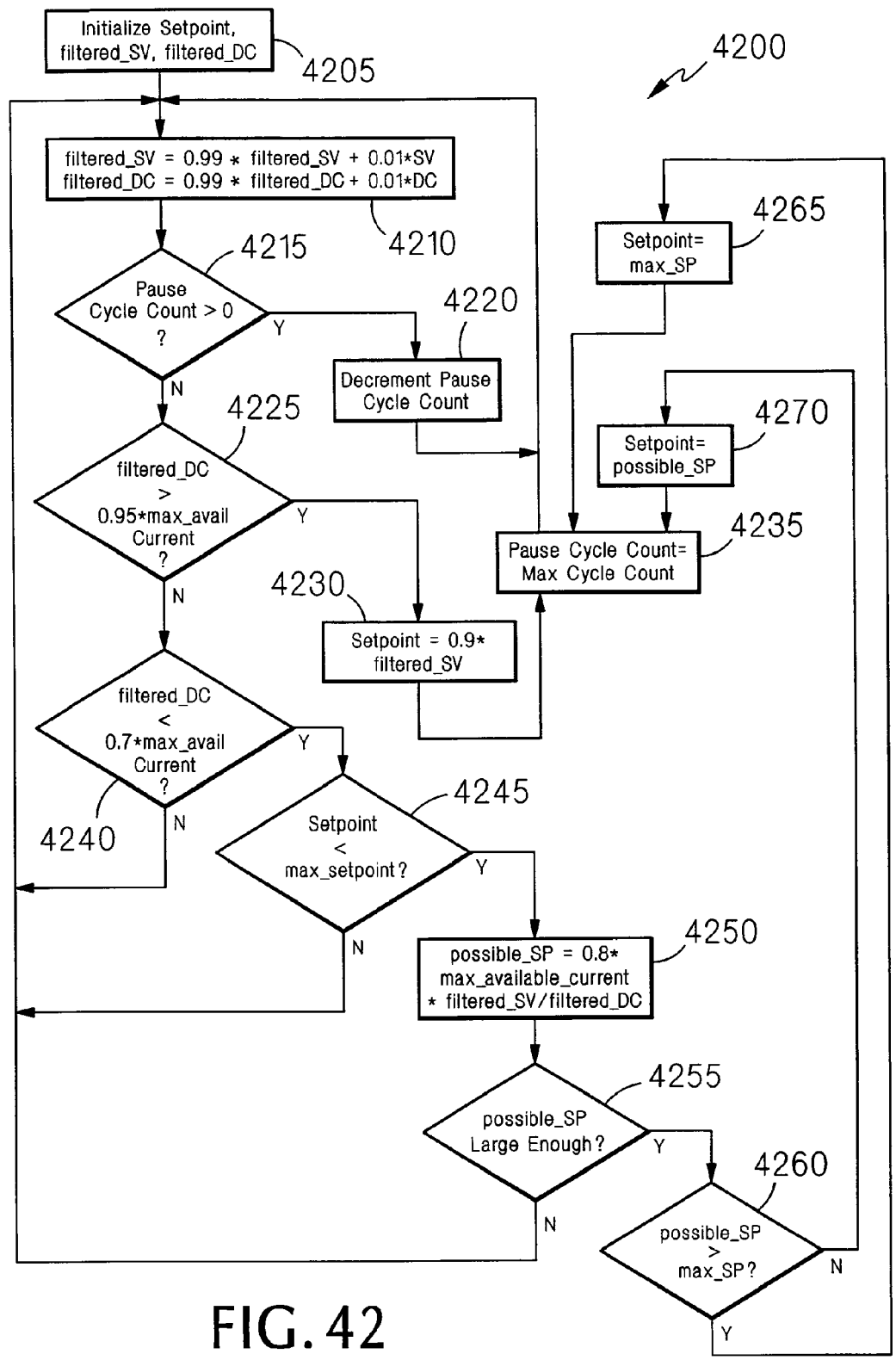
FIG. 42 is a flow chart of a setpoint control procedure.

Referring to FIG. 42, a control procedure 4200 implemented by the controller of the digital flowmeter may be used to select the highest sustainable setpoint given a maximum available current level. In general, the procedure is performed each time that a desired drive current output is selected, which typically is once per cycle, or once every half-cycle if interleaved cycles are used.

The controller starts by setting the setpoint to a default value (e.g., 0.3 V) and initializing filtered representations of the sensor voltage (filtered_SV) and the drive current (filtered_DC) (step 4205). Each time that the procedure is performed, the controller updates the filtered values based on current values for the sensor voltage (SV) and drive current (DC) (step 4210). For example, the controller may generate a new value for filtered_SV as the sum of ninety nine percent of filtered_SV and one percent of SV.

Next, the controller determines whether the procedure has been paused to provide time for prior setpoint adjustments to take effect (step 4215). Pausing of the procedure is indicated by a pause cycle count having a value greater than zero. If the procedure is paused, the controller performs no further actions for the cycle and decrements the pause cycle count (step 4220).

If the procedure has not been paused, the controller determines whether the filtered drive current exceeds a threshold level (step 4225). In one implementation, the threshold level is ninety five percent of the maximum available current. If the current exceeds the threshold, the controller reduces the setpoint (step 4230). To allow time for the meter to settle after the setpoint change, the controller then implements a pause of the procedure by setting the pause cycle count equal to an appropriate value (e.g., 100) (step 4235).

If the procedure has not been paused, the controller determines whether the filtered drive current is less than a threshold level (step 4240) and the setpoint is less than a maximum permitted setpoint (step 4245). In one implementation, the threshold level equals seventy percent of the maximum available current. If both conditions are met, the controller determines a possible new setpoint (step 4250). In one implementation, the controller determines the new setpoint as eighty percent of the maximum available current multiplied by the ratio of filtered_SV to filtered_DC. To avoid small changes in the setpoint (i.e., chattering), the controller then determines whether the possible new setpoint exceeds the current setpoint by a sufficient amount (step 4255). In one implementation, the possible new setpoint must exceed the current setpoint by 0.02 V and by ten percent.

If the possible new setpoint is sufficiently large, the controller determines if it is greater than the maximum permitted setpoint (step 4260). If so, the controller sets the setpoint equal to the maximum permitted setpoint (step 4265). Otherwise, the controller sets the setpoint equal to the possible new setpoint (step 4270). The controller then implements a pause of the procedure by setting the pause cycle count equal to an appropriate value (step 4235).

Figure 43A:
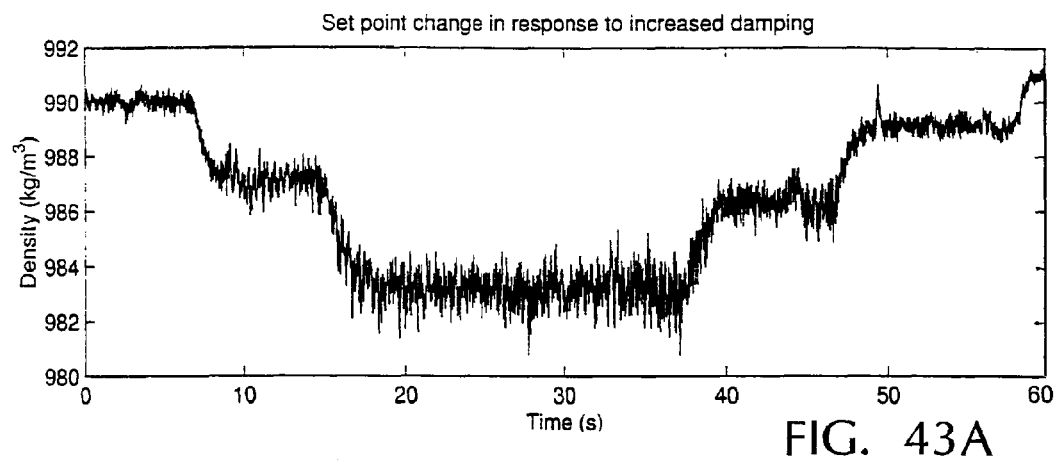
FIGS. 43A-43C are graphs illustrating application of the procedure of FIG. 41.
Figure 43B:
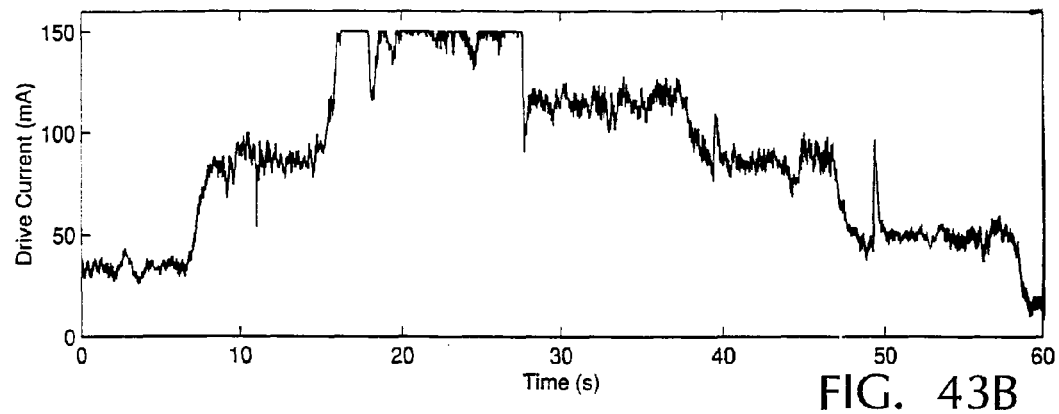
Figure 43C:
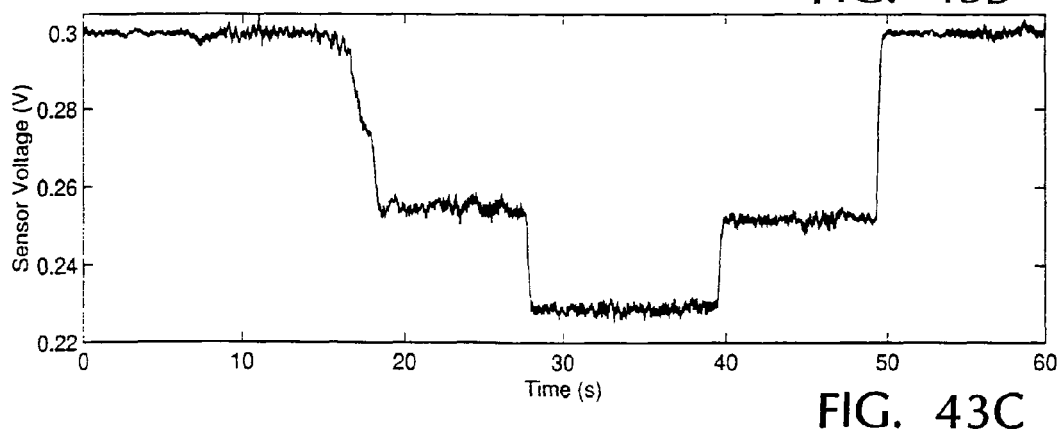

FIGS. 43A-43C illustrate operation of the setpoint adjustment procedure. As shown in FIG. 43C, the system starts with a setpoint of 0.3 V. At about eight seconds of operation, aeration results in a drop in the apparent density of the material in the conduit (FIG. 43A). Increased damping accompanying the aeration results in an increase in the drive current (FIG. 43B) and increased noise in the sensor voltage (FIG. 43C). No changes are made at this time, since the meter is able to maintain the desired setpoint.

At about fifteen seconds of operation, aeration increases and the apparent density decreases further (FIG. 43A). At this level of aeration, the driver current (FIG. 43B) reaches a maximum value that is insufficient to maintain the 0.3 V setpoint. Accordingly, the sensor voltage drops to 0.26 V (FIG. 43C), the voltage level that the maximum driver current is able to maintain. In response to this condition, the controller adjusts the setpoint (at about 28 seconds of operation) to a level (0.23 V) that does not require generation of the maximum driver current.

At about 38 seconds of operation, the level of aeration decreases and the apparent density increases (FIG. 43A). This results in a decrease in the drive current (FIG. 43B). At 40 seconds of operation, the controller responds to this condition by increasing the setpoint (FIG. 43C). The level of aeration decreases and the apparent density increases again at about 48 seconds of operation, and the controller responds by increasing the setpoint to 0.3 V.

K. Performance Results

The digital flowmeter has shown remarkable performance improvements relative to traditional analog flowmeters. In one experiment, the ability of the two types of meters to accurately measure a batch of material was examined. In each case, the batch was fed through the appropriate flowmeter and into a tank, where the batch was then weighed. For 1200 and 2400 pound batches, the analog meter provided an average offset of 500 pounds, with a repeatability of 200 pounds. By contrast, the digital meter provided an average offset of 40 pounds, with a repeatability of two pounds, which clearly is a substantial improvement.

In each case, the conduit and surrounding pipework were empty at the start of the batch. This is important in many batching applications where it is not practical to start the batch with the conduit full. The batches were finished with the flowtube full. Some positive offset is expected because the flowmeter is measuring the material needed to fill the pipe before the weighing tank starts to be filled. Delays in starting up, or offsets caused by aerated flow or low amplitudes of oscillation, are likely to introduce negative offsets. For real batching applications, the most important issue is the repeatability of the measurement.

The results show that with the analog flowmeter there are large negative offsets and repeatability of only 200 pounds. This is attributable to the length of time taken to startup after the onset of flow (during which no flow is metered), and measurement errors until full amplitude of oscillation is achieved. By comparison, the digital flowmeter achieves a positive offset, which is attributable to filling up of the empty pipe, and a repeatability is two pounds.

Figure 44:
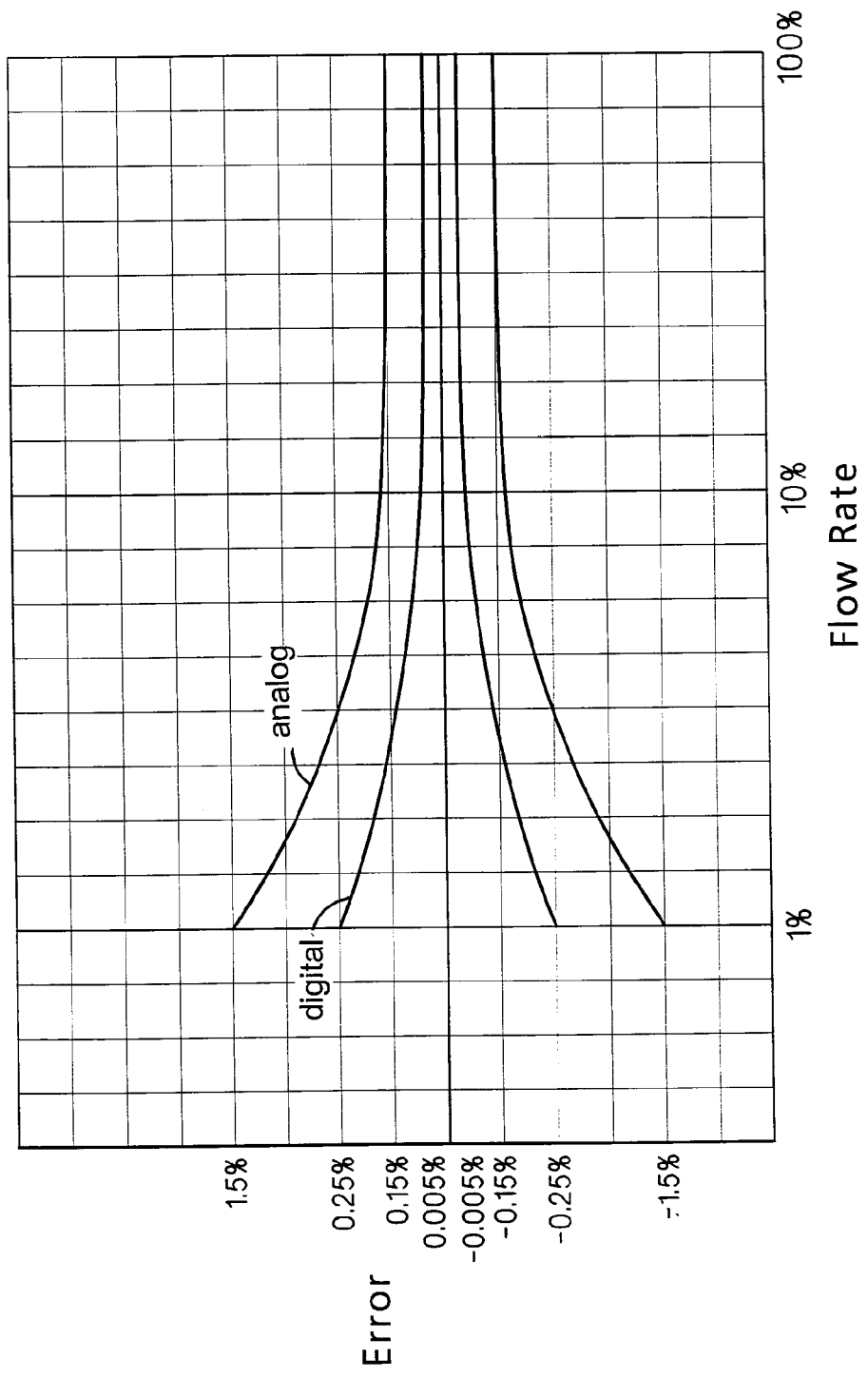
FIG. 44 is a graph comparing the performance of digital and analog flowmeters.

Another experiment compared the general measurement accuracy of the two types of meters. FIG. 44 illustrates the accuracy and corresponding uncertainty of the measurements produced by the two types of meters at different percentages of the meters' maximum recommended flow rate. At high flow rates (i.e., at rates of 25% or more of the maximum rate), the analog meter produces measurements that correspond to actual values to within 0.15% or less, compared to 0.005% or less for the digital meter. At lower rates, the offset of the analog meter is on the order of 1.5%, compared to 0.25% for the digital meter.

L. Self-Validating Meter

The digital flowmeter may used in a control system that includes self-validating sensors. To this end, the digital flowmeter may be implemented as a self-validating meter. Self-validating meters and other sensors are described in U.S. Pat. No. 5,570,300, entitled "SELF-VALIDATING SENSORS", which is incorporated by reference.

In general, a self-validating meter provides, based on all information available to the meter, a best estimate of the value of a parameter (e.g., mass flow) being monitored. Because the best estimate is based, in part, on nonmeasurement data, the best estimate does not always conform to the value indicated by the current, possibly faulty, measurement data. A self-validating meter also provides information about the uncertainty and reliability of the best estimate, as well as information about the operational status of the sensor. Uncertainty information is derived from known uncertainty analyses and is provided even in the absence of faults.

In general, a self-validating meter provides four basic parameters: a validated measurement value (VMV), a validated uncertainty (VU), an indication (MV status) of the status under which the measurement was generated, and a device status. The VMV is the meter's best estimate of the value of a measured parameter. The VU and the MV status are associated with the VMV. The meter produces a separate VMV, VU and MV status for each measurement. The device status indicates the operational status of the meter.

The meter also may provide other information. For example, upon a request from a control system, the meter may provide detailed diagnostic information about the status of the meter. Also, when a measurement has exceeded, or is about to exceed, a predetermined limit, the meter can send an alarm signal to the control system. Different alarm levels can be used to indicate the severity with which the measurement has deviated from the predetermined value.

VMV and VU are numeric values. For example, VMV could be a temperature measurement valued at 200 degrees and VU, the uncertainty of VMV, could be 9 degrees. In this case, there is a high probability (typically 95%) that the actual temperature being measured falls within an envelope around VMV and designated by VU (i.e., from 191 degrees to 209 degrees).

The controller generates VMV based on underlying data from the sensors. First, the controller derives a raw measurement value (RMV) that is based on the signals from the sensors. In general, when the controller detects no abnormalities, the controller has nominal confidence in the RMV and sets the VMV equal to the RMV. When the controller detects an abnormality in the sensor, the controller does not set the VMV equal to the RMV. Instead, the controller sets the VMV equal to a value that the controller considers to be a better estimate than the RMV of the actual parameter.

The controller generates the VU based on a raw uncertainty signal (RU) that is the result of a dynamic uncertainty analysis of the RMV. The controller performs this uncertainty analysis during each sampling period. Uncertainty analysis, originally described in "Describing Uncertainties in Single Sample Experiments," S. J. Kline & F. A. McClintock, Mech. Eng., 75, 3-8 (1953), has been widely applied and has achieved the status of an international standard for calibration. Essentially, an uncertainty analysis provides an indication of the "quality" of a measurement. Every measurement has an associated error, which, of course, is unknown. However, a reasonable limit on that error can often be expressed by a single uncertainty number (ANSI/ASME PTC 19.1-1985 Part 1, Measurement Uncertainty: Instruments and Apparatus).

As described by Kline & McClintock, for any observed measurement M, the uncertainty in M, $w_M$, can be defined as follows:

$$M_{true} \in [M-w_M, M+w_M]$$

where M is true ($M_{true}$) with a certain level of confidence (typically 95%). This uncertainty is readily expressed in a relative form as a proportion of the measurement (i.e. $w_M/M$).

In general, the VU has a non-zero value even under ideal conditions (i.e., a faultless sensor operating in a controlled, laboratory environment). This is because the measurement produced by a sensor is never completely certain and there is always some potential for error. As with the VMV, when the controller detects no abnormalities, the controller sets the VU equal to the RU. When the controller detects a fault that only partially affects the reliability of the RMV, the controller typically performs a new uncertainty analysis that accounts for effects of the fault and sets the VU equal to the results of this analysis. The controller sets the VU to a value based on past performance when the controller determines that the RMV bears no relation to the actual measured value.

To ensure that the control system uses the VMV and the VU properly, the MV status provides information about how they were calculated. The controller produces the VMV and the VU under all conditions—even when the sensors are inoperative. The control system needs to know whether VMV and VU are based on "live" or historical data. For example, if the control system were using VMV and VU in feedback control and the sensors were inoperative, the control system would need to know that VMV and VU were based on past performance.

The MV status is based on the expected persistence of any abnormal condition and on the confidence of the controller in the RMV. The four primary states for MV status are generated according to Table 1.

TABLE 1

| Expected Persistence | Confidence in RMV | MV Status |
|---|---|---|
| not applicable | nominal | CLEAR |
| not applicable | reduced | BLURRED |
| short | zero | DAZZLED |
| long | zero | BLIND |

A CLEAR MV status occurs when RMV is within a normal range for given process conditions. A DAZZLED MV status indicates that RMV is quite abnormal, but the abnormality is expected to be of short duration. Typically, the controller sets the MV status to DAZZLED when there is a sudden change in the signal from one of the sensors and the controller is unable to clearly establish whether this change is due to an as yet undiagnosed sensor fault or to an abrupt change in the variable being measured. A BLURRED MV status indicates that the RMV is abnormal but reasonably related to the parameter being measured. For example, the controller may set the MV status to BLURRED when the RMV is a noisy signal. A BLIND MV status indicates that the RMV is completely unreliable and that the fault is expected to persist.

Two additional states for the MV status are UNVALIDATED and SECURE. The MV status is UNVALIDATED when the controller is not performing validation of VMV. MV status is SECURE when VMV is generated from redundant measurements in which the controller has nominal confidence.

The device status is a generic, discrete value summarizing the health of the meter. It is used primarily by fault detection and maintenance routines of the control system. Typically, the device status 32 is in one of six states, each of which indicates a different operational status for the meter. These states are: GOOD, TESTING, SUSPECT, IMPAIRED, BAD, or CRITICAL. A GOOD device status means that the meter is in nominal condition. A TESTING device status means that the meter is performing a self check, and that this self check may be responsible for any temporary reduction in measurement quality. A SUSPECT device status means that the meter has produced an abnormal response, but the controller has no detailed fault diagnosis. An IMPAIRED device status means that the meter is suffering from a diagnosed fault that has a minor impact on performance. A BAD device status means that the meter has seriously malfunctioned and maintenance is required. Finally, a CRITICAL device status means that the meter has malfunctioned to the extent that the meter may cause (or have caused) a hazard such as a leak, fire, or explosion.

Figure 45:
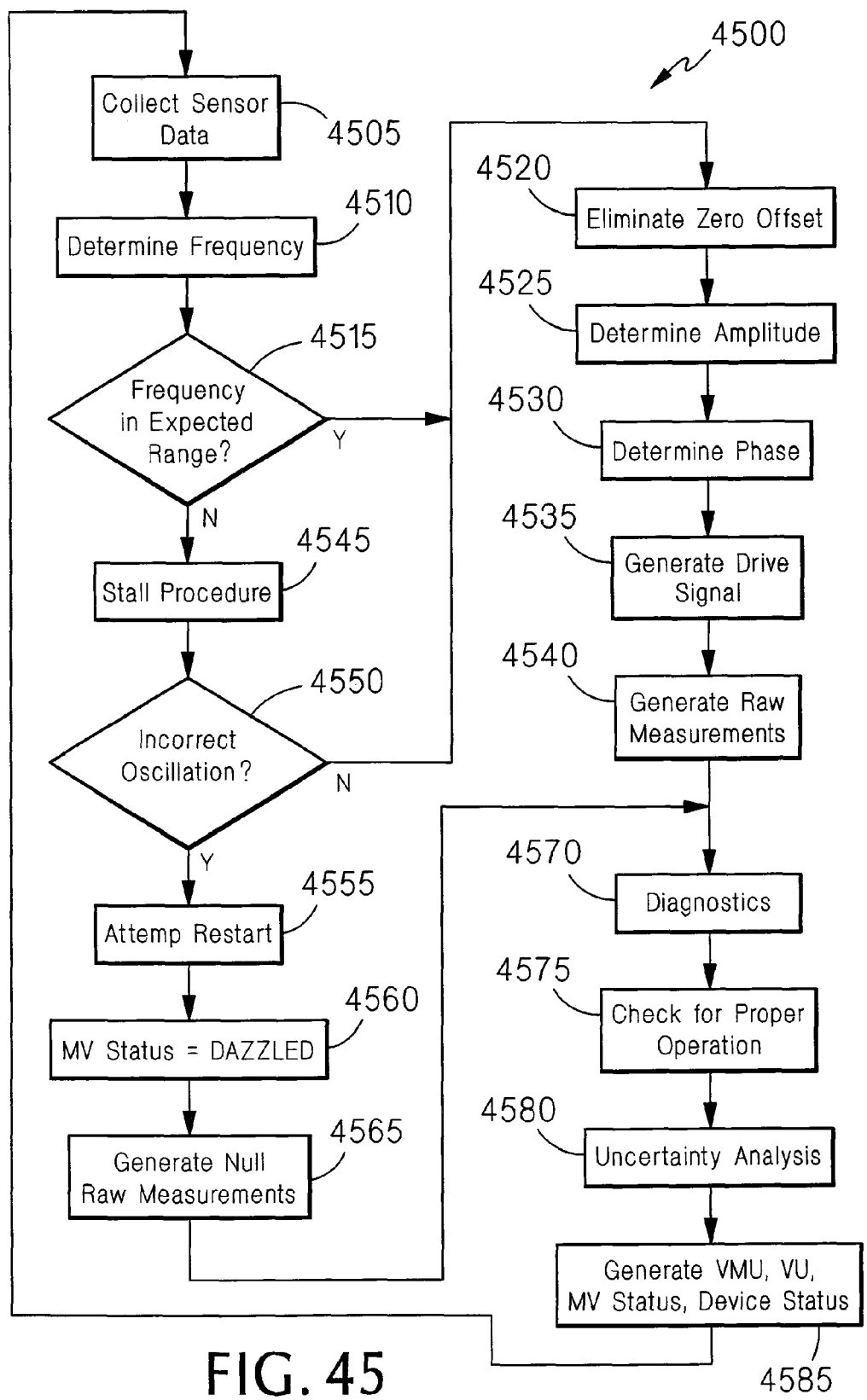
FIG. 45 is a flow chart showing operation of a self-validating meter.

FIG. 45 illustrates a procedure 4500 by which the controller of a self-validating meter processes digitized sensor signals to generate drive signals and a validated mass flow measurement with an accompanying uncertainty and measurement status. Initially, the controller collects data from the sensors (step 4505). Using this data, the controller determines the frequency of the sensor signals (step 4510). If the frequency falls within an expected range (step 4515), the controller eliminates zero offset from the sensor signals (step 4520), and determines the amplitude (step 4525) and phase (step 4530) of the sensor signals. The controller uses these calculated values to generate the drive signal (step 4535) and to generate a raw mass flow measurement and other measurements (step 4540).

If the frequency does not fall within an expected range (step 4515), then the controller implements a stall procedure (step 4545) to determine whether the conduit has stalled and to respond accordingly. In the stall procedure, the controller maximizes the driver gain and performs a broader search for zero crossings to determine whether the conduit is oscillating at all.

If the conduit is not oscillating correctly (i.e., if it is not oscillating, or if it is oscillating at an unacceptably high frequency (e.g., at a high harmonic of the resonant frequency)) (step 4550), the controller attempts to restart normal oscillation (step 4555) of the conduit by, for example, injecting a square wave at the drivers. After attempting to restart oscillation, the controller sets the MV status to DAZZLED (step 4560) and generates null raw measurement values (step 4565). If the conduit is oscillating correctly (step 4550), the controller eliminates zero offset (step 4520) and proceeds as discussed above.

After generating raw measurement values (steps 4540 or 4565), the controller performs diagnostics (step 4570) to determine whether the meter is operating correctly (step 4575). (Note that the controller does not necessarily perform these diagnostics during every cycle.)

Next, the controller performs an uncertainty analysis (step 4580) to generate a raw uncertainty value. Using the raw measurements, the results of the diagnostics, and other information, the controller generates the VMV, the VU, the MV status, and the device status (step 4585). Thereafter, the controller collects a new set of data and repeats the procedure. The steps of the procedure 4500 may be performed serially or in parallel, and may be performed in varying order.

In another example, when aeration is detected, the mass flow corrections are applied as described above, the MV status becomes blurred, and the uncertainty is increased to reflect the probable error of the correction technique. For example, for a flowtube operating at 50% flowrate, under normal operating conditions, the uncertainty might be of the order of 0.1-0.2% of flowrate. If aeration occurs and is corrected for using the techniques described above, the uncertainty might be increased to perhaps 2% of reading. Uncertainty values should decrease as understanding of the effects of aeration improves and the ability to compensate for aeration gets better. In batch situations, where flow rate uncertainty is variable (e.g. high at start/end if batching from/to empty, or during temporary incidents of aeration or cavitation), the uncertainty of the batch total will reflect the weighted significance of the periods of high uncertainty against the rest of the batch with nominal low uncertainty. This is a highly useful quality metric in fiscal and other metering applications.

M. Two Wire Flowmeter

Figure 46:
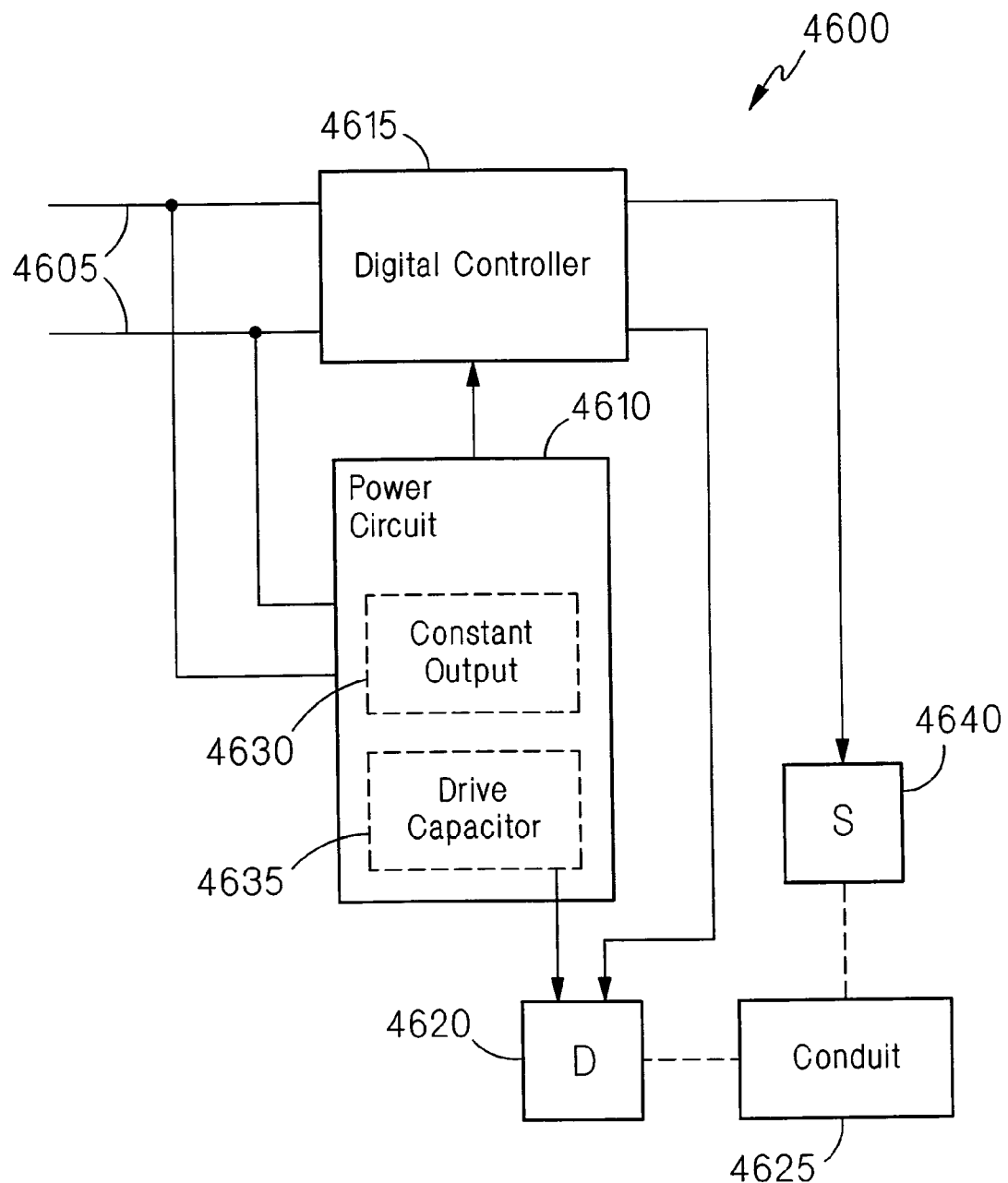
FIG. 46 is a block diagram of a two-wire digital mass flowmeter.

Other embodiments are also contemplated. For example, as shown in FIG. 46, the techniques described above may be used to implement a "two-wire" Coriolis flowmeter 4600 that performs bidirectional communications on a pair of wires 4605. A power circuit 4610 receives power for operating a digital controller 4615 and for powering the driver(s) 4620 to vibrate the conduit 4625. For example, the power circuit may include a constant output circuit 4630 that provides operating power to the controller and a drive capacitor 4635 that is charged using excess power. The power circuit may receive power from the wires 4605 or from a second pair of wires. The digital controller receives signals from one or more sensors 4640.

When the drive capacitor is suitably charged, the controller 4615 discharges the capacitor 4635 to drive the conduit 4625. For example, the controller may drive the conduit once during every 10 cycles. The controller 4615 receives and analyzes signals from the sensors 4640 to produce a mass flow measurement that the controller then transmits on the wires 4605.

Figure 47A:
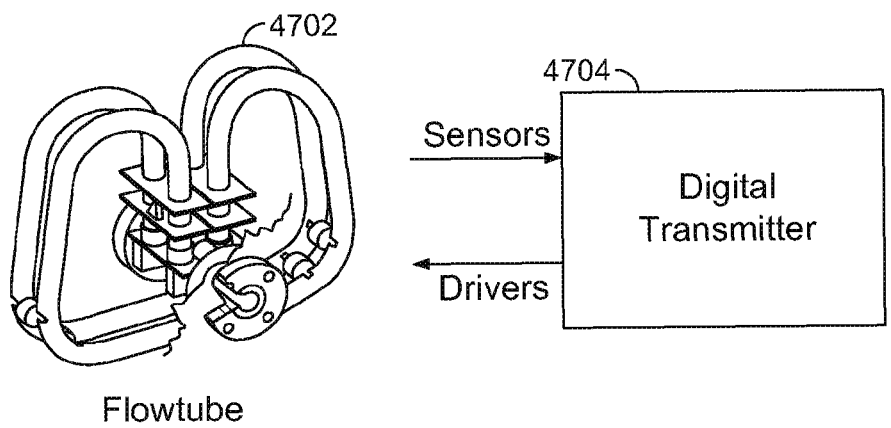
FIG. 47A is an illustration of a digital flowmeter using a bent flowtube.

FIG. 47A is an illustration of a digital flowmeter using a bent flowtube 4702. Specifically, the bent flowtube 4702 may be used to measure one or more physical characteristics of, for example, a (traveling) fluid, as referred to above. A detailed description of a structure and operation(s) of the bent flowtube 4702 is provided in, for example, commonly-assigned U.S. Pat. No. 6,311,136. Flowtubes which are similar in concept to the bent flowtube 4702 are also discussed in, for example, U.S. Pat. No. 6,327,914 B1, which is incorporated by reference in its entirety.

In FIG. 47A, a digital transmitter 4704 exchanges sensor and drive signals with the bent flowtube 4702, so as to both sense an oscillation of the bent flowtube 4702, and to drive the oscillation of the bent flowtube 4702 accordingly. By quickly and accurately determining the sensor and drive signals, the digital transmitter 4704, as referred to above, provides for fast and accurate operation of the bent flowtube 4702.

More specifically, the digital transmitter 4704 serves to select signal characteristics such as a frequency, phase, and amplitude of the drive signals, in order to obtain a desired oscillation of the bent flowtube 4702, e.g., an oscillation which aligns these signal characteristics of the sensor and drive signals with one another, at a natural resonant frequency of the bent flowtube 4702. For example, the digital transmitter 4704 may generate the drive signals by applying the sensor signals (perhaps with suitable adjustments) as the drive signals, as part of a feedback loop. As another example, the digital transmitter 4704 may generate the drive signals by synthesizing a new signal having the desired characteristics.

Figure 47B:
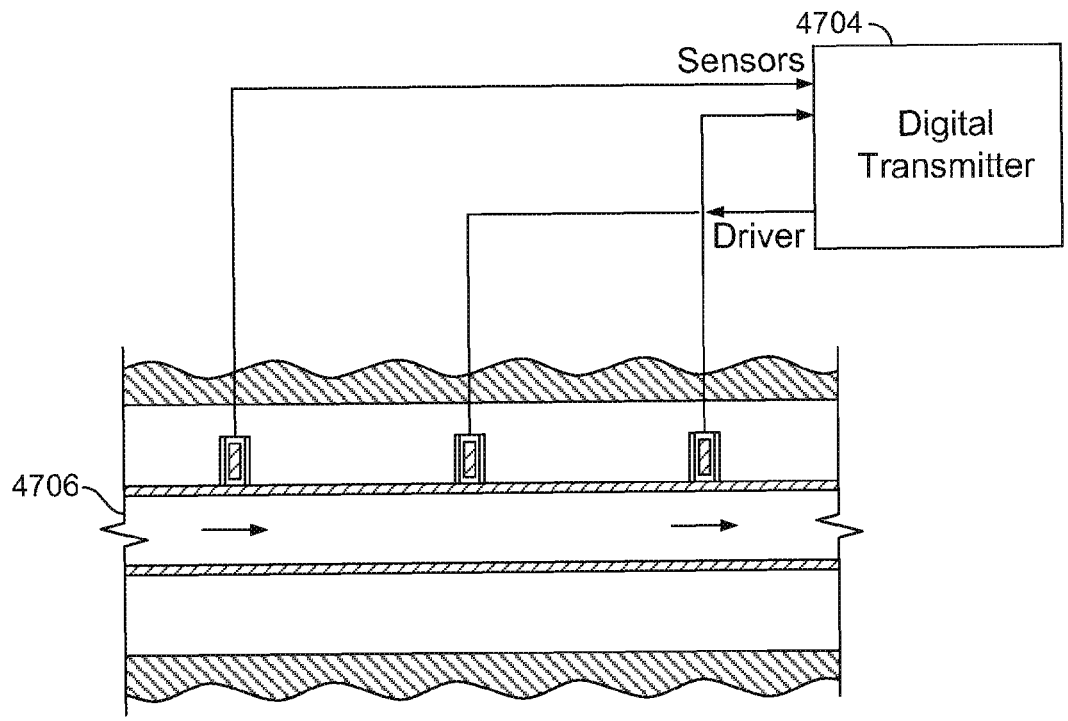
FIG. 47B is an illustration of a digital flowmeter using a straight flowtube.

FIG. 47B is an illustration of a digital flowmeter using a straight flowtube 4706. More specifically, in FIG. 47B, the straight flowtube 4706 interacts with the digital transmitter 4704 to produce, for example, density and/or mass flow measurements. Such a straight flowtube operates similarly to the bent flowtube 4702 on a conceptual level, and has various advantages/disadvantages relative to the bent flowtube 4702. For example, the straight flowtube 4706 may be easier to (completely) fill and empty than the bent flowtube 4702, simply due to the geometry of its construction. In operation, the bent flowtube 4702 may operate at a frequency of, for example, 50-110 Hz, while the straight flowtube 4706 may operate at a frequency of, for example, 300-1,000 Hz.

Various relevant details of the structure and operation(s) of the bent flowtube 4702 and/or the straight flowtube 4706 are discussed below. However, such description is not intended to be an exhaustive description of such flowtubes, of which many conventional examples exist. Rather, the flowtube description(s) provided herein are intended to provide context for the below description of a structure and operation of the digital transmitter 4704.

More specifically, the digital transmitter 4704, as described in more detail below, is capable of initiating and maintaining a flowtube oscillation, such that the drive signals output by the digital transmitter 4704 are compensated for phase delays caused by analog and/or digital elements within or associated with the digital transmitter 4704. In this way, the drive signals have a desired phase relationship with the oscillation of the particular flowtube being used (i.e., with the sensor signals detected at the flowtube). As shown in the examples below, such phase compensation may be implemented in a variety of ways, for a number of uses in different settings. Specifically, for example, digital drive techniques described herein may be applied to a variety of flowtubes and flowtube geometries.

Figure 48:
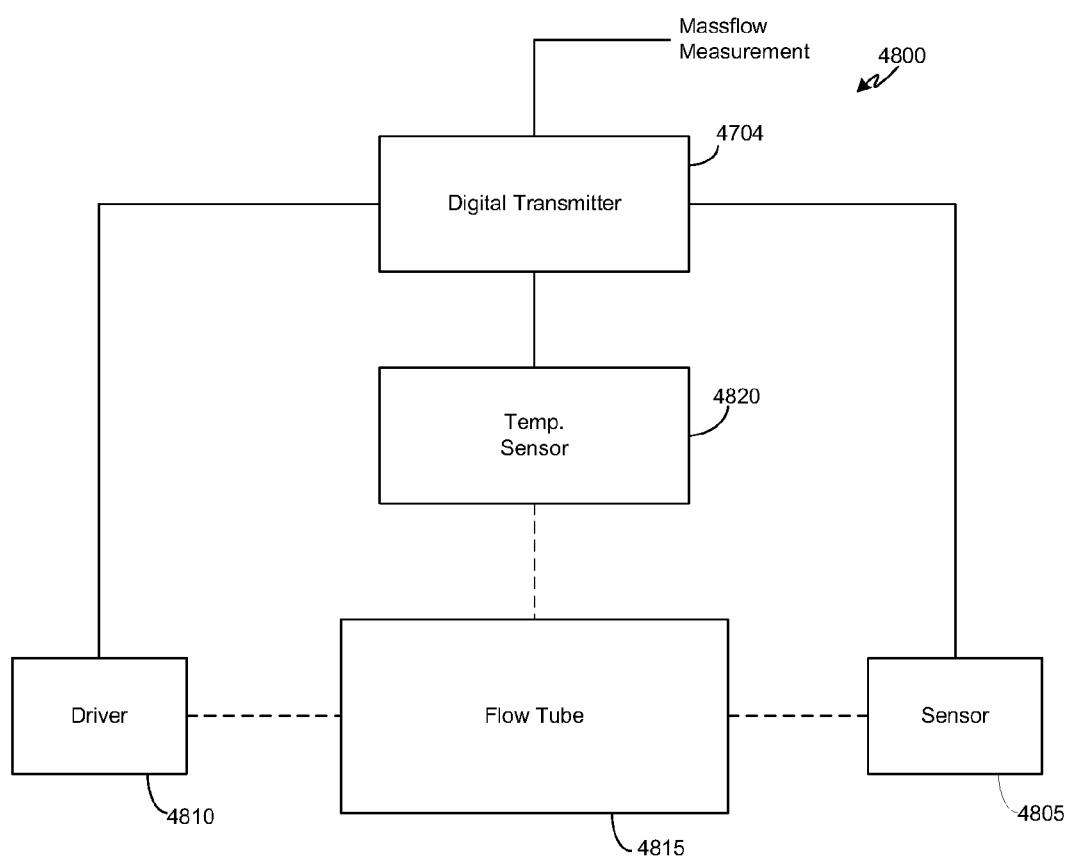
FIG. 48 is a block diagram of an operation of a digital flowmeter.

Referring to FIG. 48, a digital mass flowmeter 4800 includes the digital transmitter 4704, one or more motion sensors 4805, one or more drivers 4810, a flowtube 4815 (which also may be referred to as a conduit, and which may represent either the bent flowtube 4702, the straight flowtube 4706, or some other type of flowtube), and a temperature sensor 4820. The digital transmitter 4704 may be implemented using one or more of, for example, a processor (including a Digital Signal Processor (DSP)), a field-programmable gate array (FPGA), an ASIC, other programmable logic or gate arrays, or programmable logic with a processor core. Examples of implementations of the digital transmitter 4704 are discussed in more detail below.

The digital transmitter 4704 generates a measurement of mass flow through the flowtube 4815, based at least on signals received from the motion sensors 4805. The digital transmitter 4704 also controls the drivers 4810 to induce and sustain motion in the flowtube 4815. This motion is sensed by the motion sensors 4805.

Mass flow through the flowtube 4815 is related to the motion induced in the flowtube in response to a driving force supplied by the drivers 4810. In particular, mass flow is related to the phase and frequency of the motion, as well as to the temperature of the flowtube (as this temperature reflects the temperature of the flowing material, which also may be directly measured). The digital mass flowmeter 4800 also may provide a measurement of the density of material flowing through the flowtube. The density is related to the frequency of the motion and the temperature of the flowtube. Many of the described techniques are applicable to a densitometer that provides a measure of density rather than a measure of mass flow.

The temperature in the flowtube 4815, which is measured using the temperature sensor 4820, affects certain properties of the flowtube, such as its stiffness and dimensions. The digital transmitter 4704 compensates for these temperature effects. The temperature of the digital transmitter 4704 affects, for example, an operating frequency of the digital transmitter 4704, a sampling rate of an analog-to-digital converter, and/or a crystal frequency associated with a reference clock used by the transmitter 4704. In general, the effects of transmitter temperature are sufficiently small to be considered negligible. However, in some instances, the digital transmitter may measure the transmitter temperature using a solid state device, and may compensate for effects of the transmitter temperature. Although not shown in FIG. 48, similar comments and considerations may be applied with respect to a pressure sensor that is operable to sense a pressure of a fluid flowing through the flowtube 4815.

As referred to above, control of the drive signal sent to driver 4810 for inducing vibration of the flowtube 4815 is a factor in starting and operating a digital flowmeter. More specifically, it is desirable to maintain precise control over the frequency, phase and amplitude of the drive signal.

With respect to frequency, it should first be understood that flowtube vibration is generally determined by physical characteristics of the flowtube 4815 itself. In particular, the flowtube 4815 will generally have a high Q factor, thereby ensuring that only a very narrow band of frequencies around the natural frequency of the flowtube generate a low-damped response in the desired mode of vibration and thereby permit the type of system operation desired. Therefore, it is desirable to match the natural frequency of the flowtube as closely as possible in the drive waveform.

Failure to perform this frequency matching will thus generally result in energy being wastefully imparted to the system at other frequencies. Moreover, frequencies which are close (but not equal to) the resonant frequency of the flowtube 4815 may result in an operation of the flowtube 4815 at those frequencies. In such situations, errors may result in calculations of, for example, a massflow and/or density of the fluid traversing the flowtube 4815.

One way that improper frequencies are generated during flowmeter start-up is by generating harmonics of the natural frequency within the drive signal. Generally speaking, flowtubes have several modes of vibration. Usually only two vibration modes are of interest: the "driven mode" which is the main mode of oscillation, and the "coriolis" mode at which the coriolis forces are manifest, leading to phase offset between the sensors observed in the driven mode. In "one-drive" flowtubes, the driven mode is usually the lowest mode of vibration of the flowtube, and the coriolis mode is the next highest mode of vibration. In a "two-driver" design for the bent flowtube 4702, the driven mode may be, for example, the second mode of vibration (e.g., 70-90 Hz), and the coriolis mode may be at the fundamental, lower frequency (e.g., 50-60 Hz). In any case, any other harmonic frequencies generated beyond those desired for a particular mode of vibration may result in inefficient and/or inaccurate operation of the system.

Another way that improper frequencies may be generated is through the presence of a phase offset between the sensor signal and the drive signal. That is, as this phase offset increases, the vibration changes from being at the desired natural frequency to a forced oscillation. As this phase offset is typically a function of frequency (e.g., a constant time delay of 5 ms may correspond to a phase offset of 180 degrees at 100 Hz, but may correspond to 360 degrees (i.e., 0 degrees) at 200 Hz), a phase offset close to 180 degrees for a particular frequency will typically result in stalling of the oscillation at that frequency. Conversely, a phase offset close to a multiple of 360 degrees for a given frequency will often result in oscillation of the flowtube 4815 at that frequency (even if it is not the desired natural frequency).

Also with respect to phase, it should be understood that, as is known, the drive waveform should be at 90 degrees out of phase with the motion of the flowtube in order to affect vibration at the natural resonant frequency. However, if a flowtube design uses velocity sensors, which automatically provide a signal at 90 degrees to the motion of the flowtube, then the optimal drive waveform is one which is in phase with the sensor voltage signals. Thus, it should be understood that the phrases such as "in phase," "having the proper phase," "having the proper phase offset" and similar phrases refer to the condition in which the drive signal has a relationship with the sensor signal such that it affects proper vibration of the flowtube.

Once vibration at the proper frequency has been initiated and maintained, the amplitude of the drive signal must be set so that a proper amount of energy (and thus, amplitude of vibration at the chosen frequency) is actually imparted to the flowtube. Ideally, the amplitude should be frequently updated so as to ensure a constant amplitude of the oscillation of the flowtube.

As referred to above, implementations may use different techniques for obtaining drive signals which have the desired frequency, phase, and amplitude characteristics. One such technique is referred to herein as "positive feedback," in which a sensor signal (having the desired frequency and phase characteristics) is multiplied by a drive gain factor (either by analog or digital control loop techniques) and fed back to the flowtube via the drive signal. A non-linear amplitude control algorithm may be used to provide stable oscillation and selection of a sustainable set-point for an amplitude of oscillation, even during situations such as a highly-damped operation of the flowtube 4815 (e.g. two-phase flow), or beginning/ending operation of the flowtube 4815 in an empty state.

While this approach, by itself, may be adequate in some conventional flowmeter applications, it may not be effective when dealing with difficult situations such as batching to/from empty and two-phase flow. In these cases, flowtube stalling, where oscillation ceases and measurements cannot be calculated, may occur.

A second technique for generating desired drive signals is digital synthesis of the drive signals. That is, rather than simply feeding back the sensor signals as the drive signals, the digital transmitter 4704 may actually synthesize pure sine waves having the desired drive signal characteristics. As in the case of positive feedback above, a non-linear amplitude control algorithm may be used to provide stable oscillation and amplitude set-point selection.

Moreover, the use of digital synthesis of drive signals results in a high precision in producing the drive signals, and prevents the feeding back of unwanted frequency components that may be present in the sensor signals. However, the use of the digital transmitter 4704, as well as other factors, may introduce delays into the highly-precise, synthesized signals (as well as into the fed-back sensor signals used in the positive feedback mode), relative to the originally-detected sensor signals. These delays, if not accounted for, may result in the use of drive signals having undesirable signal characteristics. Examples of sources of these delays, as well as techniques for dealing with the delays in various settings, are discussed in more detail below.

Figure 49:
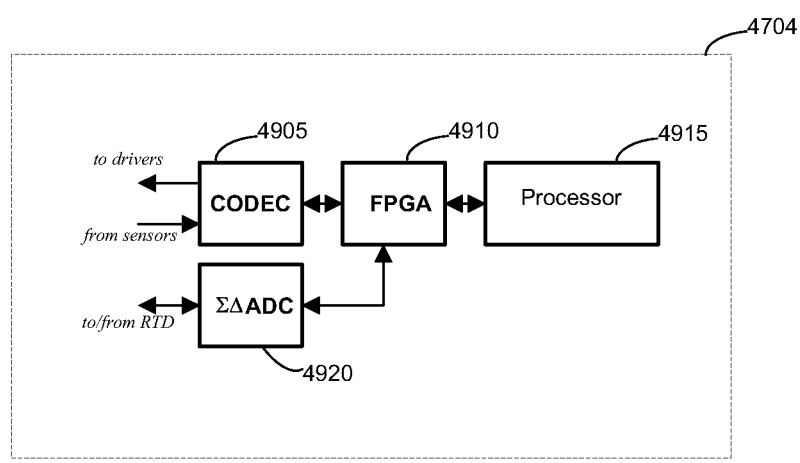
FIG. 49 is a block diagram of the digital transmitter of FIG. 48.

FIG. 49 is a block diagram of the digital transmitter 4704. In FIG. 49, a codec (coder-decoder) block 4905 includes analog-to-digital converters (ADCs) and digital-to-analog converters (DACs) (as shown in more detail in FIG. 50). The codec 4905, in performing its conversion/deconversion operation(s), introduces delays into signals traveling therethrough, which may be hereafter referred to as the group delay of the codec 4905. For a given codec group delay (in samples), a higher phase offset (in degrees/radians) results from a higher frequency of vibration of the flowtube 4815 (since there will be fewer samples per cycle in this case). The CODEC 4905 may be, for example, a dual ADC/DAC device which provides two 24 bit ADC and two 24 bit DAC channels, at a sampling rate Fs of 40 kHz.

A Field Programmable Gate Array (FPGA) 4910 provides gates of programmable logic, which allow the FPGA 4910 to perform critical real-time tasks. These tasks include, for example, the synthesis of the drive signal waveforms and peripheral control, as well as various buffering and filtering techniques performed on the sensor signals. A processor 4915 is used to execute high-precision and computationally-intensive algorithms for measurement and control of variables involved with the flowmeter 4800. For example, the processor 4915 directs the FPGA 4910 in its tasks. The processor may run under an operating system such as, for example, the VxWorks Real-Time Operating System. A block 4920 represents a "sigma-delta" type, analog-to-digital converter that communicates with a resistance temperature device (RTD) to obtain flowtube temperature data.

It should be understood that, as mentioned above, all of the tasks performed by the FPGA 4910 and/or the processor 4915 could be performed by just the processor 4915, and/or by other suitable hardware, such as, for example, an ASIC. The architecture of the digital transmitter 4704 of FIG. 49, however, splits tasks between the FPGA 4910 and the processor 4915 in the manner just described, taking advantage of the fact that the tasks performed by the FPGA 4910 may be more effectively and efficiently executed in true parallel with the processor 4915, on dedicated hardware, rather than by time-slicing on the (single) processor 4915.

In one operation, then, sensor signals from the sensors 4805 are received by two ADC channels in the CODEC 4905, which operates under the control of the FPGA 4910. After processing, buffering, and/or filtering the sensor signals, as described in more detail below, the FPGA 4910 presents the data to the processor 4915 for detailed analysis.

In one implementation, the sensor signals are input through the input channels of the CODEC 4905, buffered within the FPGA 4910, and fed back through the output channels of the CODEC 4905 to the flowtube 4815 as drive signals within a positive feedback loop. In another implementation, the processor 4915 also determines drive signal parameter values for maintaining flowtube oscillation, which are then passed to the FPGA 4910, which synthesizes the required drive output signals and passes them to the output channels of the CODEC 4905. Thus, in these and other implementations discussed below, drive signals are passed to drivers 4810 that generate a stable oscillation of the flowtube 4815 at a desired frequency.

In addition to its processing related to this generation of desirable drive signals, the processor 4915 also determines measurements of various process variables from the sensor signals, such as mass flow and/or density, the determination of which may represent a primary purpose of operation of the digital flowmeter 4800. For purposes of determining these measurements, the sensor signals may be presented to the processor 4915 largely apart from (e.g., in parallel with) the various techniques discussed herein for generating desirable drive signals.

For example, although various buffering techniques are discussed below for the purposes of generating the drive signals, separate (faster) buffering of the sensor signals may be performed for sending the sensor signals to the processor 4915 for measurement purposes. In this way, measurements may be obtained quickly, without having to wait for processing of the sensor signals that is related to drive signal production. For example, the digital flowmeter 4800 may be able to rapidly respond to (e.g., output measurements related to) impulse signals included within the sensor signals.

As referred to above, various sources of delay are associated with the digital transmitter 4704. One possible source of delay is the group delay associated with the CODEC 4905. Another possible source of delay is filtering which may take place within the FPGA 4910, e.g., filtering which is designed to remove unwanted harmonics from the sensor signals detected by the sensor 4805 (particularly during start-up of the flowmeter), and/or filtering designed to improve measurement quality (e.g., reduce noise during two-phase flow or add precision for a pure gas measurement). Other possible sources of delay include the use of barrier circuitry at the drive output, which may be included as a safety precaution, or signal shifts due to temperature effects and/or component aging. Such analog and/or digital delays as those just mentioned, as well as other delays not explicitly discussed, may result in a non-trivial phase offset at the desired (natural) frequency of vibration of the flowtube 4815.

Techniques for compensating for these delays may depend on, for example, the type of delay actually present, and/or a current mode of operation of the digital transmitter 4704. For example, when the digital transmitter 4704 is operating in a positive feedback mode, the group delay of the CODEC 4905 may be calculated based on, for example, the type of CODEC 4905 being used, a number of measurement samples being taken at a given sample rate, and/or a resonant frequency of the particular flowtube being used. A buffer may then be included which delays the sensor signal from being input to the driver 4810, until a phase match between the sensor signal and the drive signal will occur. For example, the output waveform from the sensor 4805 may be buffered within the FPGA 4910, and a value may be selected from the buffered output waveform that corresponds to the current phase point of the sensor signal, but from the previous cycle of that signal.

As another example, when the digital transmitter 4704 is operating in either a positive feedback mode or a synthesis mode, the filtering of the sensor signal may provide delay that is in addition to the group delay of the CODEC 4905. Depending on the type of filter used, this filter delay may be more difficult to predict than the group delay of the CODEC 4905. For example, in an elliptical filter such as the one described below, a delay caused by the filter may be a non-linear function of frequency. Moreover, at a given point in time (for example, at or near a start-up of oscillation of the flowtube 4815) a natural frequency of the flowtube 4815 may not be accurately known, making a determination of filter delay even more problematic.

In one implementation, then, the filter delay is determined by actually measuring an appropriate frequency, determining the associated filter delay using the pre-determined non-linear function associated with the filter being used, and then waiting a pre-determined amount of time after a trigger signal to begin drive signal synthesis. For example, the pre-determined amount of time may be determined from considering both the group delay and the filter delay. The trigger signal may be a positive zero-crossing of a weighted sum of the filtered sensor signal(s) (i.e. a calculated mid-point between two separate signals), or of just one of the filtered sensor signals.

Figure 50:
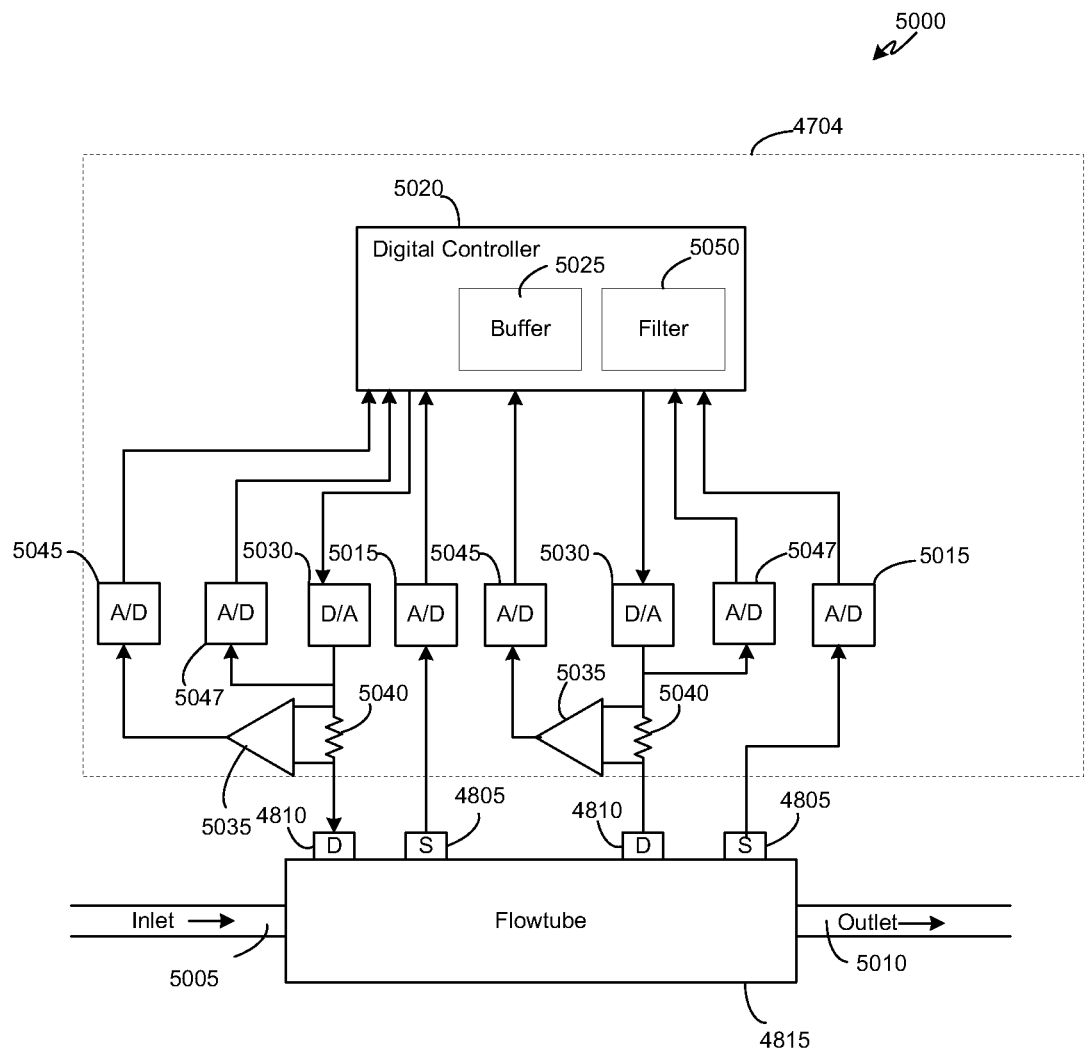
FIG. 50 is a block diagram of a digital flowmeter.

FIG. 50 is a block diagram of a digital flowmeter 5000. In FIG. 50, flowtube 4815 receives fluid flow through inlet 5005 and outputs the fluid through outlet 5010. Sensors and drivers 4805 and 4810, respectively, operate generally as described with respect to FIG. 48. A/D converters (ADCs) 5015 receive the sensor signals and convert the analog signals into digital signals at a sampling rate of, for example, 40-80 kHz or higher, for input into the digital transmitter 4704. ADCs 5015 may be considered to be a part of the CODEC 4905 of FIG. 49.

A digital controller 5020 receives the sampled sensor signal for processing. The digital controller 5020 may include the FPGA 4910 and the processor 4915 of FIG. 49, or may include some other combination of hardware and/or software for processing the sampled sensor signal and outputting an appropriate drive signal.

As referred to above, the digital controller 5020 selects a gain factor for the drivers 4810, based on voltages detected by the sensors 4805, in order to maintain a desired amplitude of flowtube oscillation. In one implementation, such gain factor selection operates at a slow rate relative to the resonant frequency of the flowtube being used (e.g., the driver gain factor may be updated only once per cycle or half-cycle, for example, 80-160 Hz). This is because, for oscillation stability, accurate measurement of amplitude is more important than very rapid updating of the driver gain, and amplitude calculation based on complete cycles of data may thus provide accurate estimates.

In the digital flowmeter 5000, a buffer 5025 may be used during a positive feedback operation. An example of this positive feedback operation is described in more detail below, for example, with respect to FIG. 51. In the positive feedback operation, the buffer 5025 stores samples of the signal received from ADC 5015, and outputs a signal to D/A converters (DACs) 5030, such that the signal output by DAC 5030 and delivered as the drive signal to the driver 4810 is substantially in phase with the signal originally received by ADC 5015. In this way, a positive feedback loop is maintained which permits generation of a drive signal waveform having the desired phase relationship with the sensor signal waveform.

Op amps 5035, resistors 5040 and ADCs 5045 operate to measure the current to the drivers 4810, and return this information in digital form to the digital controller 5020. In this way, a feedback loop is maintained which allows an additional, or alternative, technique for compensating for the sources of delay referred to above. Somewhat similarly, further A/D converters 5047 may be used to measure a voltage at an output of the D/A converters 5030, which may similarly be fed back to the digital controller 5020. Such "closed-loop" techniques are discussed in more detail with respect to FIG. 61.

In the example of FIG. 50, the ADCs 5015 may introduce a delay of 31 samples, while DACs 5030 may introduce a delay of 30 samples, for a total group (CODEC) delay of 61 samples. Assuming a sampling rate of 40 kHz and an input waveform of 95 Hz, a phase offset of approximately 50 degrees may be introduced. This degree of phase offset may be sufficient to cause the flowmeter to oscillate off-resonance. With other sampling/oscillation frequencies, phase offsets approaching 180 degrees can be created, in which case the flowtube will likely not oscillate in the desired mode, but will likely find some higher mode of vibration where the phase offset is close to a multiple of 360 degrees.

The buffer 5025 is large enough to contain at least one full cycle of data, e.g., 2048 entries. Buffer 5025 can be circular, so that the oldest entry is overwritten by the newest entry. If a sample rate of 80 kHz is assumed when the flowtube frequency is 80 Hz, then a full cycle can be held within 1000 samples. Still assuming, for the sake of example, a group delay of 61 samples, then digital transmitter 4704 should select the value from buffer 5025 stored 939 samples ago, in order to reduce or eliminate any phase offset between the sensor and drive signals. In other words, buffer 5025 should select the value corresponding to the actual current phase point, but from the previous cycle. This "phase-matched output" is then multiplied by the desired drive gain to give the drive output. In one implementation, the above-described use of buffer 5025 was sufficient to reduce phase offset to within one CODEC sample; i.e., at 95 and 80 kHz, ±0.4 degrees. A more detailed discussion related to determining a CODEC delay relative to a given sampling rate and flowtube frequency is provided below, with respect to FIGS. 51, 52 and 62-64.

Figure 51:
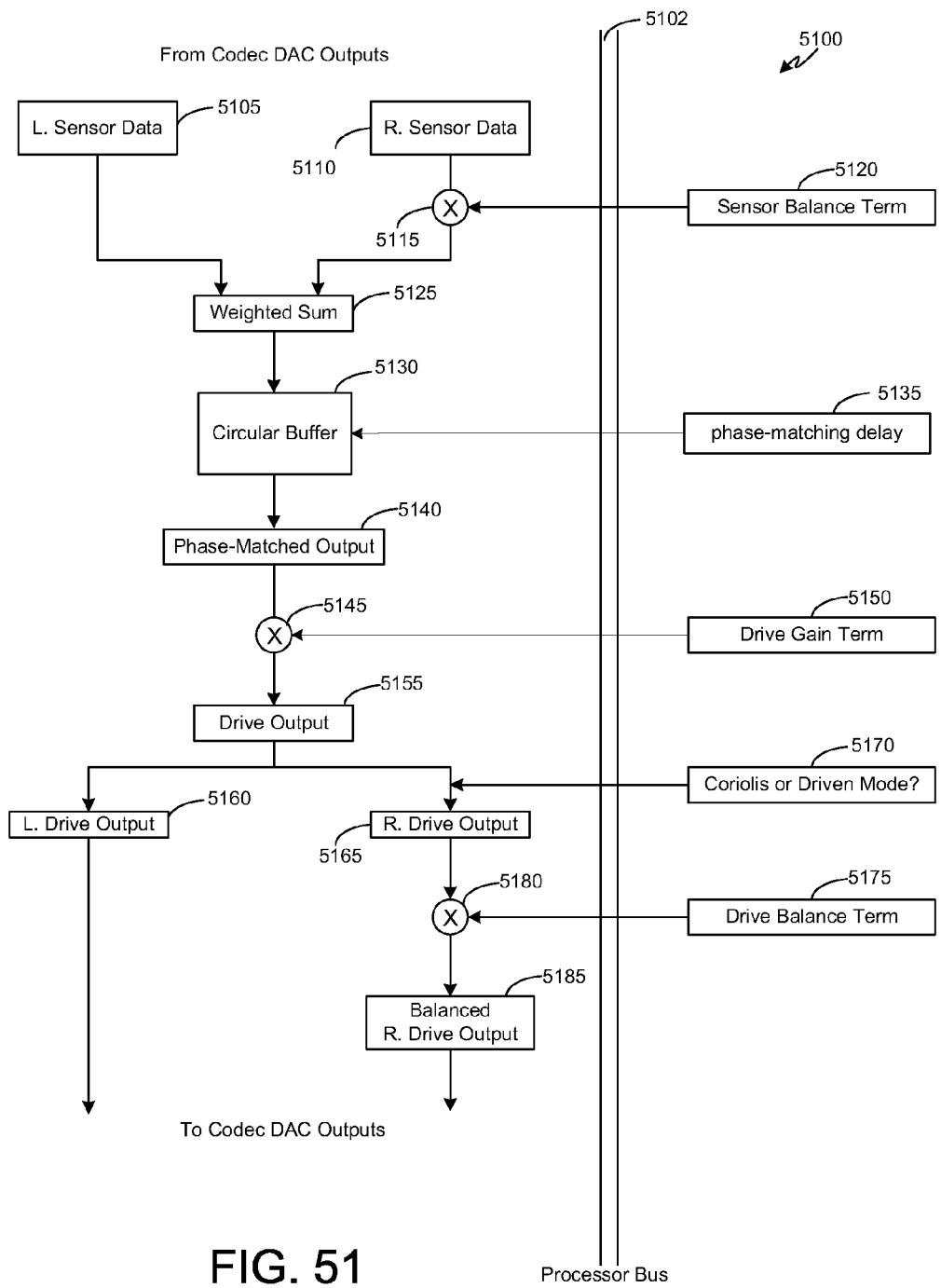
FIG. 51 is a flowchart illustrating a positive feedback mode of operation of the system of FIG. 50.

FIG. 51 is a flowchart 5100 illustrating a positive feedback mode of operation of the system 5000 of FIG. 50. In FIG. 51, a processor bus 5102 relays information between the digital controller 5020 and other components of the digital transmitter 4704. In flowchart 5100, outputs of ADCs 5015 are input by the digital controller 5020 as left sensor data (5105) and right sensor data (5110). The right sensor data is multiplied (5115) by a sensor balance term (5120), which represents a ratio between the amplitudes of the left/right sensor signals. Typically, this ratio is expected to be close to 1.0. Multiplying the right sensor data by the sensor balance term ensures that it has the same amplitude as the left sensor data prior to a weighted summation of the two signals (5125), which in turn prevents the summation from introducing unwanted harmonics.

The weighted sum may be convenient in that it provides a representation of a single sensor signal, i.e., a "virtual" signal representing, for example, a mid-point between the left and right (actual) sensor signals. Such a virtual signal, for example, allows calculations to proceed without consideration of a phase difference that may exist between sensor signals from the right and left sensors. However, as discussed in more detail below, it is not necessary to calculate the virtual weighted sum, as either of the actual sensor signals could be individually used as the basis for further calculations.

Whichever sensor signal type is used is then buffered in a circular buffer (5130), such as the buffer 5025. It should be understood that buffer 5025 may be implemented as a synthetic buffer within the FPGA 4910, or could be a separate circuit element, or could take any other conventional form, such as a memory known to implement a buffering process.

The amount of buffering depends on a maximum number of samples taken over a full cycle of the sensor signal(s) at the selected (operating) frequency. For example, for a sampling rate of 10 kHz and an operating frequency of 100 Hz, each oscillation cycle of the flowtube corresponds to 100 samples to be stored in the buffer 5025. Alternatively, for a sampling rate of 10 kHz and an operating frequency of 50 Hz, each cycle corresponds to 200 samples to be stored in the buffer 5025.

A phase-matching delay term 5135 is used to select an output of the buffer 5025 that corresponds to a current phase point, but from the previous (stored) cycle. In this way, a phase-matched drive signal is generated and output (5140); in other words, a drive signal having a phase that is matched with the sensor signal(s) is output and delivered to the driver 4810 for oscillating the flowtube 4815.

Figure 52:
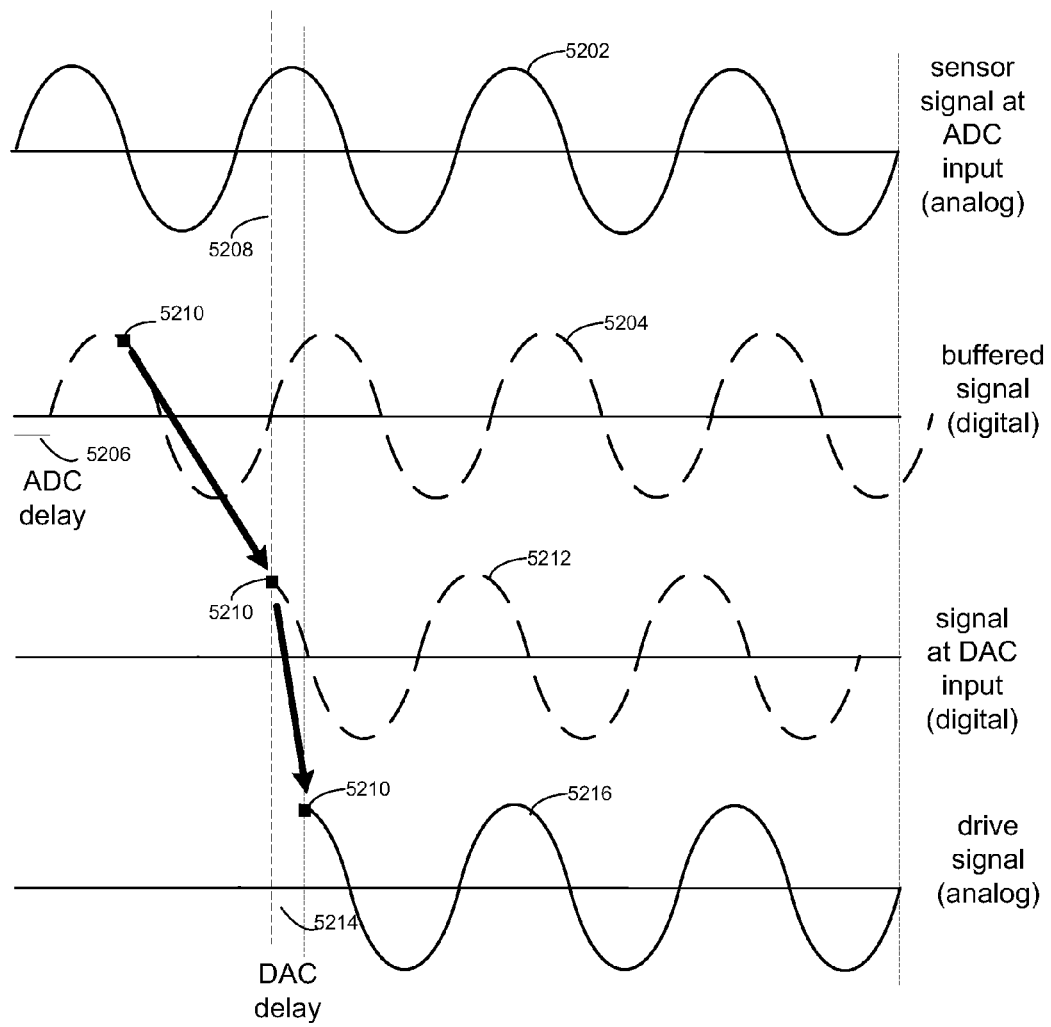
FIG. 52 is a timing diagram illustrating a buffering process implemented during the positive feedback operation of FIG. 51.

As shown in more detail in FIG. 52, this process of phase-matching involves correlating a given CODEC delay to a number of samples stored in the buffer 5025. For example, as discussed above with respect to FIGS. 49 and 50, a CODEC delay may be 61 samples. If the buffer stores 100 samples per cycle (e.g., as in the above example of a 10 kHz sampling rate and 100 Hz flowtube oscillation), then, at a given moment, the sample stored 39 samples ago is the one which, if output, will correspond to a current value of the sensor signal(s). In the example of 200 samples per cycle (e.g., assuming a 10 kHz sampling rate and 50 Hz resonant frequency), then the appropriate buffered value to select would be the one stored 139 samples ago.

Once determined, the phase-matched drive signal may then be multiplied (5145) by a drive gain term (5150), so that a desired drive signal output is produced (5155). Subsequently, the drive signal output can be separated into a left drive output (5160) and a right drive output (5165) (alternatively, in the case of a one-drive system, only one drive output may be produced and/or used as a drive signal). Depending on whether the processor selects coriolis or driven mode (5170), the right drive output is equal to or the negation of, respectively, the left drive output. Finally, a drive balance term (5175) is applied to the right drive output (5180), in order to allow fine tuning of the drive balance and compensate for any analog circuitry variations that may exist, thereby producing a balanced right drive output (5185).

FIG. 52 is a timing diagram illustrating a buffering process implemented during the positive feedback operation of FIG. 51. In FIG. 52, a first signal 5202 represents a sensor signal detected by the sensor(s) 4805. The signal 5202 might represent a (virtual) weighted sum of multiple sensor outputs, as shown in FIG. 51, or might represent some other combination of sensor signals, or a single sensor signal.

A signal 5204 represents the signal 5202, after it has traversed ADC(s) 5015 and been buffered in the buffer 5025. In FIG. 52, the signal 5202 has experienced a delay 5206, corresponding to a CODEC delay imparted on the signal 5204 by the ADC(s) 5015. As described above, the signal(s) 5202/5204, in a positive feedback mode of operation, are to be amplified by an appropriate drive gain factor or factors, and fed back to the driver 4810 as a drive signal. However, as mentioned above and illustrated in FIG. 52, using the signal 5204 as the drive signal would result in an undesirable phase offset between the sensor signal 5202 and the ostensible drive signal 5204. Indeed, this phase offset would be further exacerbated by a delay imparted by the DAC 5030. Such a phase offset would result in sub-optimal flowmeter performance, such as a reduced amplitude, oscillation at undesirable frequencies, or complete stalling of the flowtube 4815.

Therefore, rather than simply feeding the signal 5204 back into the driver 4810, at least one full cycle of the signal 5204 is buffered within the buffer 5025. At a point in time indicated by a line 5208, a full cycle of the signal 5204 has been buffered within the buffer 5025. In this way, a sample 5210 from the stored cycle may be selected, and a signal 5212 is output by the buffer 5025 that starts with the sample 5210 (as should be clear, the signal 5212, shown separately for the sake of illustration, may also be thought of as a time-shifted version of the signal 5204).

It should be noted that the signal 5212 is not in phase with the original sensor signal 5202. This is because, as described above, the sample 5210 is selected in consideration of the total CODEC group delay (e.g., 61 samples in the examples of FIGS. 50 and 51), not just the delay associated with the ADC 5015. In other words, upon being fed into the DAC 5030, the signal 5212 experiences a corresponding delay 5214 that has already been accounted for during selection of the sample 5210.

Thus, after being multiplied by a gain factor, before being output by the DAC 5030, a drive signal 5216 is generated. As shown, the drive signal 5216 is substantially in phase with the original sensor signal, despite the delays associated with, for example, CODEC 4905.

As just described, the selection of an appropriate buffered value as the value 5210 is based on, for example, the sampling rate of the CODEC 4905, a group delay associated with the CODEC 4905, and the operating frequency of the flowtube being driven. However, particularly during a start-up of the flowtube and/or during a system disturbance or perturbation, it is not always the case that the operating frequency is known with certainty. Examples of techniques for dealing with this uncertainty during start-up and operation of flowtube measurements are discussed in more detail with respect to FIGS. 62-64.

One factor that may impact the operating frequency of the flowtube, and thus the selection of an appropriate buffer offset, is the use of a filter 5050, which is illustrated in FIG. 50 as a filter implemented in the digital controller 5020. Such a filter may be used, for example, to remove unwanted frequency components that may be present in the vibration of the flowtube and detected by the sensors 4805. In this way, the drive signal applied to the flowtube will be made more efficient, e.g., will be more likely to excite the resonant mode of the flowtube.

The filter 5050, during its operation, also may impart non-negligible delay to the signal(s) being filtered. This delay should be accounted for, in order to ensure phase matching between the sensor signals and the drive signals.

In short, FIGS. 51 and 52 illustrate techniques for phase-matching a sensor signal with a drive signal during a positive-feedback operation. In practice, in order to implement the techniques of FIGS. 51 and 52, it may be necessary to first determine an actual, current value of an operating frequency of the flowtube (to thereby determine the buffer offset). Also in practice, the filter 5050 may be used, in which case additional or alternative techniques may be used to account for an effect of the filter 5050 on the operating frequency and/or a timing of the sensor/drive signals. These additional or alternative techniques are not illustrated in FIG. 52, for clarity's sake, but examples of the techniques are discussed in detail below, and these examples (with modifications, as needed) are equally applicable in the context of FIGS. 51 and 52.

More specifically, uses and effects of the filter 5050 are discussed in more detail below, in the context of, for example, a digital synthesis operation. One example of such a digital synthesis operation is described with respect to FIGS. 53-55.

Figure 53:
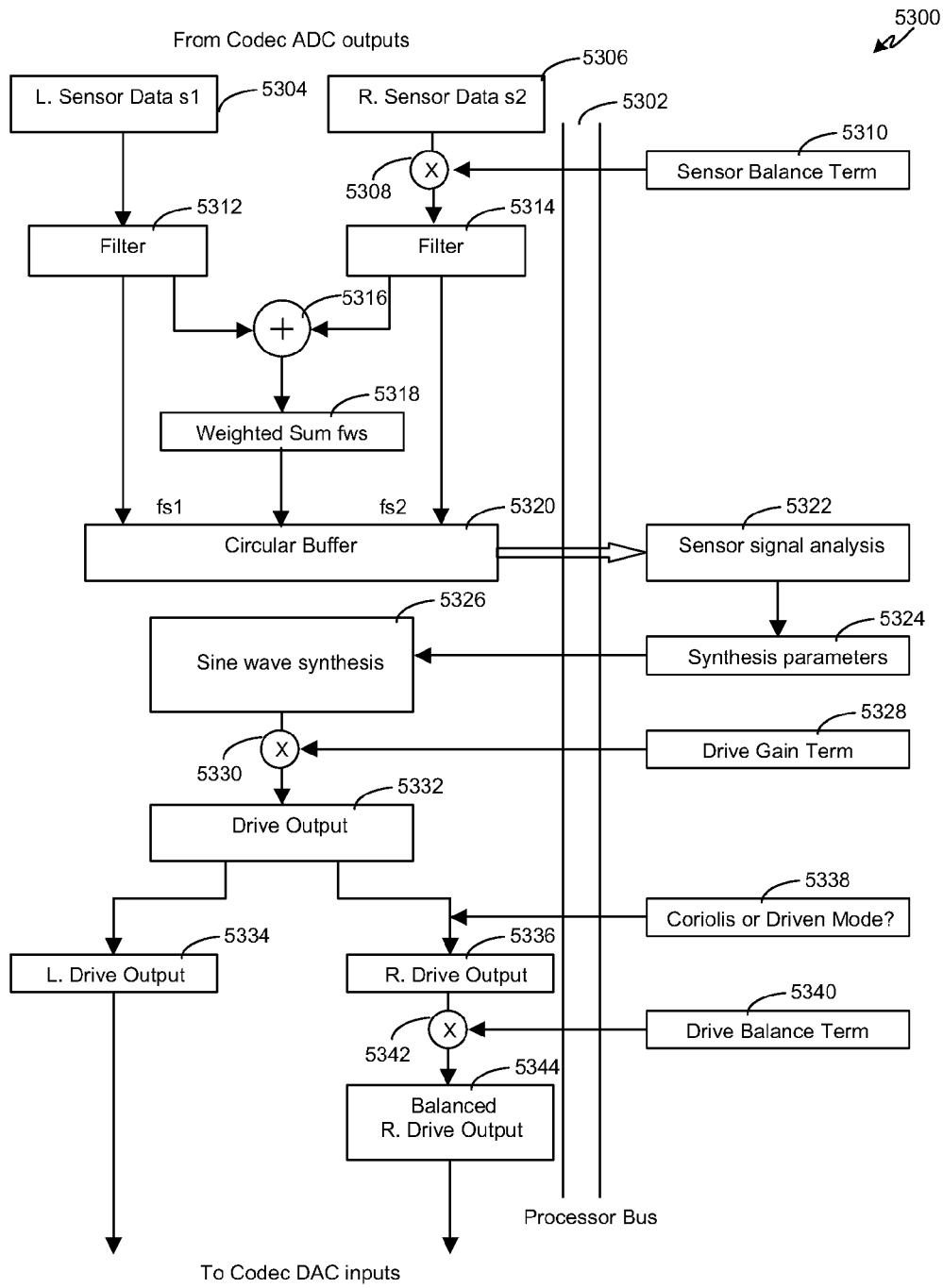
FIG. 53 is a flowchart illustrating a digital synthesis mode of operation of the system of FIG. 50.

FIG. 53 is a flowchart 5300 illustrating a digital synthesis mode of operation of the system 5000 of FIG. 50. In FIG. 53, a processor bus 5302 relays information between the digital controller 5020 and other components of the digital transmitter 4704. In flowchart 5300, outputs of ADCs 5015 are input by the digital controller 5020 as left sensor data (5304) and right sensor data (5306). The right sensor data is multiplied (5308) by a sensor balance term (5310), as in the flowchart 5100.

Subsequently, the left sensor data is filtered by the filter 5050 (5312), and the right sensor data is also filtered by the filter 5050 (5314), and the two filtered signals are summed (5316) to provide a weighted sum (5318). Alternatively, although not shown, the left and right (weighted) sensor data could be summed, and the weighted sum could then be filtered.

The filtered sensor data signals and the weighted sum are then passed to the circular buffer 5025 (5320). The buffer 5025 passes the sensor data for signal analysis (5322).

It should be understood that the buffer 5025 is not necessarily used in the digital synthesis process of FIG. 53 in the same manner described above with respect to the positive feedback process of FIG. 51, i.e., to correct for phase delay by providing a selected value from a previous cycle that corresponds to a value from a current cycle. Rather, the buffer 5025 may serve, for example, to hold signal data until it is required by another system component (such as a signal processor), or to save signal data in case the system 5000 must shift out of the digital synthesis mode and back to the positive feedback mode (due to, for example, a loss or distortion of a current signal).

When the digital controller 5020 is implemented in the manner shown in FIG. 49, i.e., using the FPGA 4910 and the processor 4915, the above-described features of the flowchart 5300 may be performed at the FPGA 4910. Subsequently, the processor 4915 may perform the sensor signal analysis (5322), to thereby determine synthesis parameters for the drive signals (5324). For example, the processor 4915 may analyze the sensor signals to measure a true frequency of the signals, from which it may calculate initial values, phase offset, or other parameters needed to synthesize a desired drive signal. These calculations are discussed in more detail below.

Once the desired drive signal is synthesized (5326), a drive gain term (5328) is multiplied (5330) by the drive signal, to thereby generate the actual drive output (5332). As in flowchart 5100, the drive output can be separated into a left drive output (5334) and a right drive output (5336). Depending on whether the processor selects coriolis or driven mode (5338), the right drive output is equal to or the negation of, respectively, the left drive output. Finally, a drive balance term (5340) is applied to the right drive output (5342), in order to allow fine tuning of the drive balance and compensate for any analog circuitry variations that may exist, thereby producing a balanced right drive output (5344).

Figure 54:
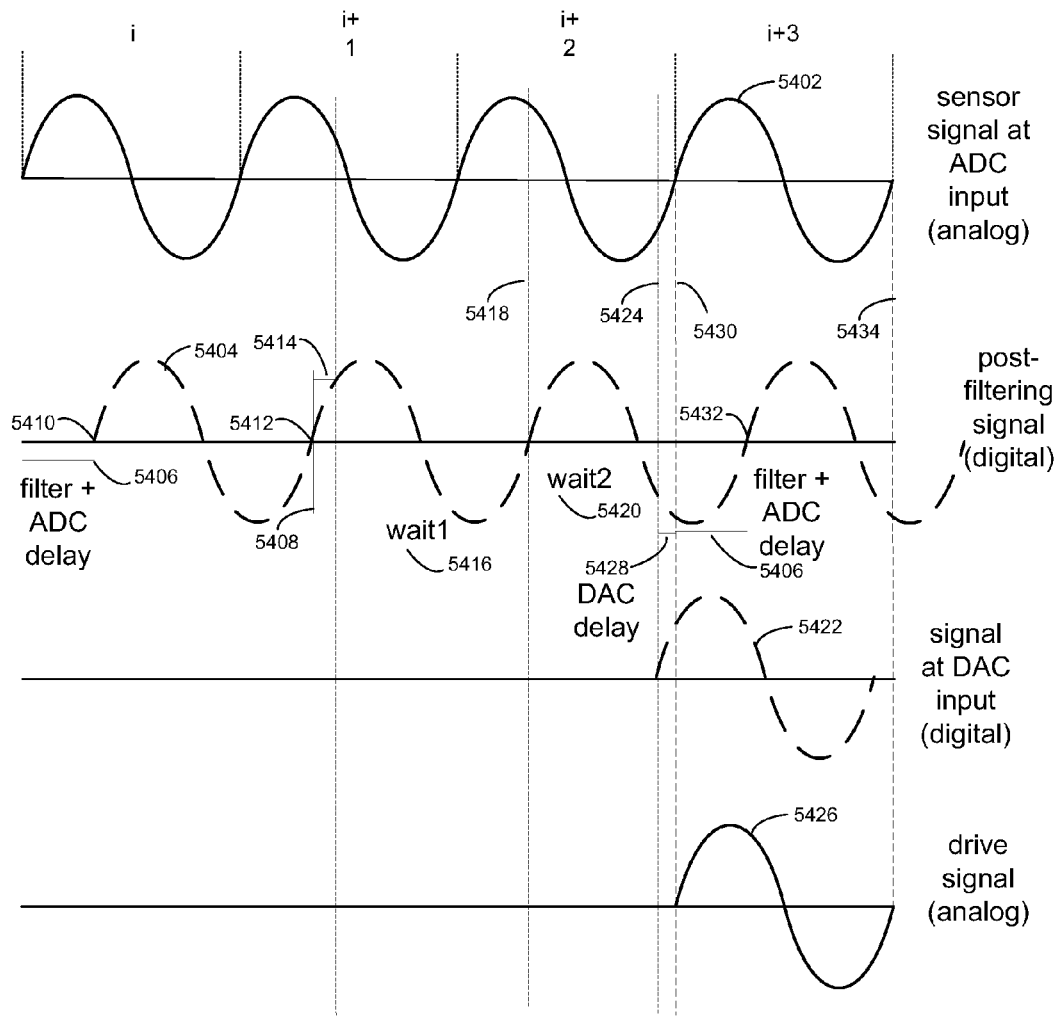
FIG. 54 is a first timing diagram illustrating a timing of a synthesis of a sine wave to be used as part of a drive signal.
Figure 55:
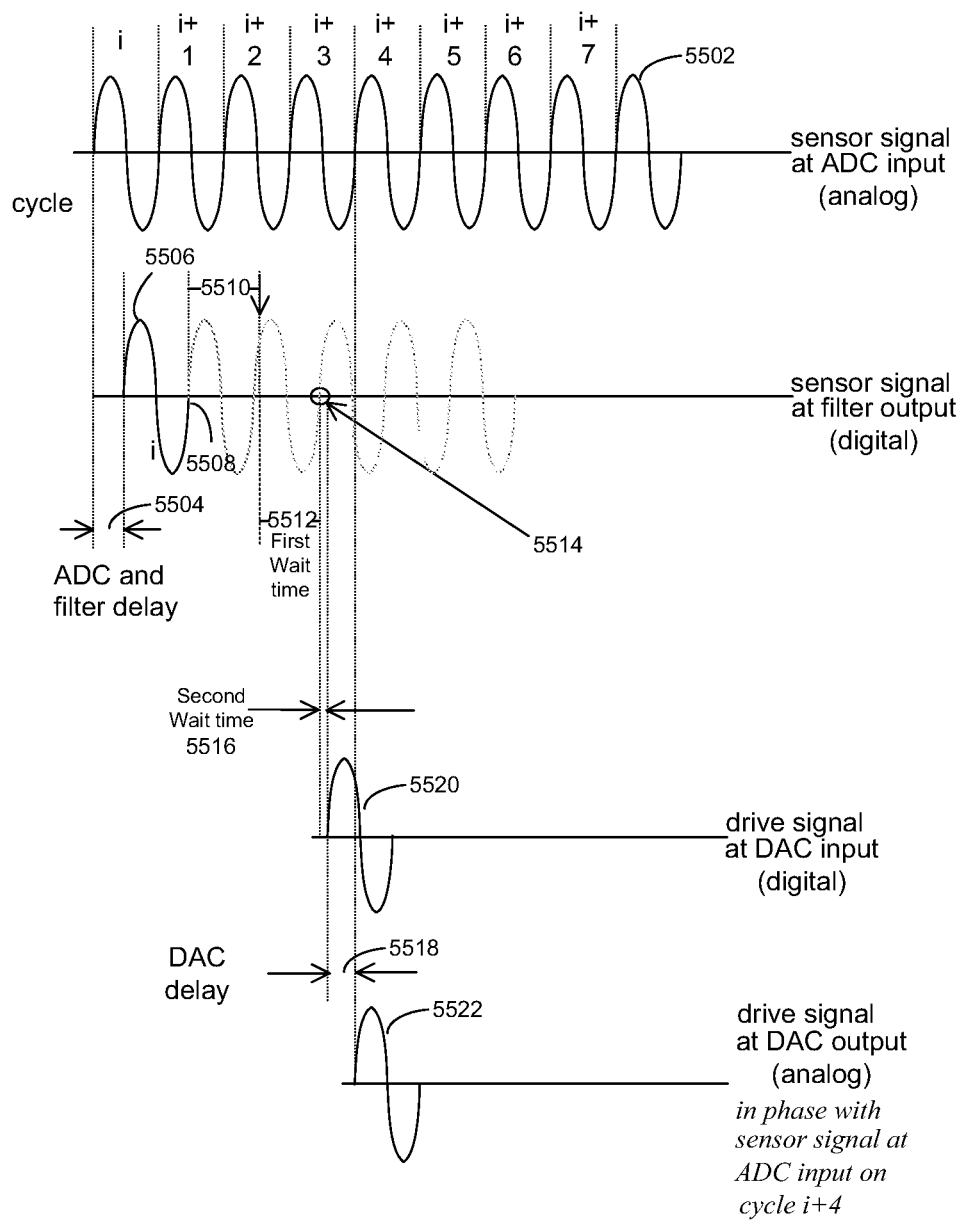
FIG. 55 is a second timing diagram illustrating a timing of a synthesis of a sine wave to be used as part of a drive signal.

FIG. 54 is a first timing diagram illustrating a timing of a synthesis of a sine wave to be used as part of a drive signal. Similarly, FIG. 55 is a second timing diagram illustrating a timing of a synthesis of a sine wave to be used as part of a drive signal. It should be noted that FIGS. 54 and 55 are primarily intended to demonstrate an example timing of a sine wave synthesis process that might be used in the synthesis mode of FIG. 53, and therefore the below discussion of FIGS. 54 and 55 includes only an overview of actual computational techniques that may be used to perform the synthesis. A more detailed explanation of possible computational techniques that may be used during sine wave synthesis, including possible roles played by the FPGA 4910 and the processor 4915 in implementing such techniques, is provided below with respect to FIGS. 56-60.

In FIG. 54, a first signal 5402 represents a sensor signal detected at an input of ADC 5015. A post-filtering signal 5404 represents the sensor signal 5402 having a time delay 5406, where the time delay 5406 represents a delay imparted to the first signal 5402 by the ADC 5015, as well as a delay imparted to the first signal 5402 by the filter 5050.

As mentioned above with respect to FIG. 53, in the implementation of FIG. 49, the FPGA 4910 may perform the filtering of the sensor signal(s), as well as a calculation of a weighted sum (as described above, resulting in the signal 5404) of the filtered sensor signals. In FIG. 54, it should be understood that the signal 5402 represents a virtual weighted sum, i.e., an analog signal that would be created from the analog weighted sum of the sensor signals, as opposed to the calculated weighted sum 5404 calculated by, and existing within, the FPGA 4910 (with a magnitude and frequency similar to that of the signal 5402, but having a phase delay relative to the signal 5402). The FPGA 4910 may then calculate a negative-to-positive zero crossing of the signal 5404, indicated in FIG. 54 by a first line 5408, and send all information about the signal 5404 (including the negative-to-positive zero crossing information) to the processor 4915.

Figure 58:
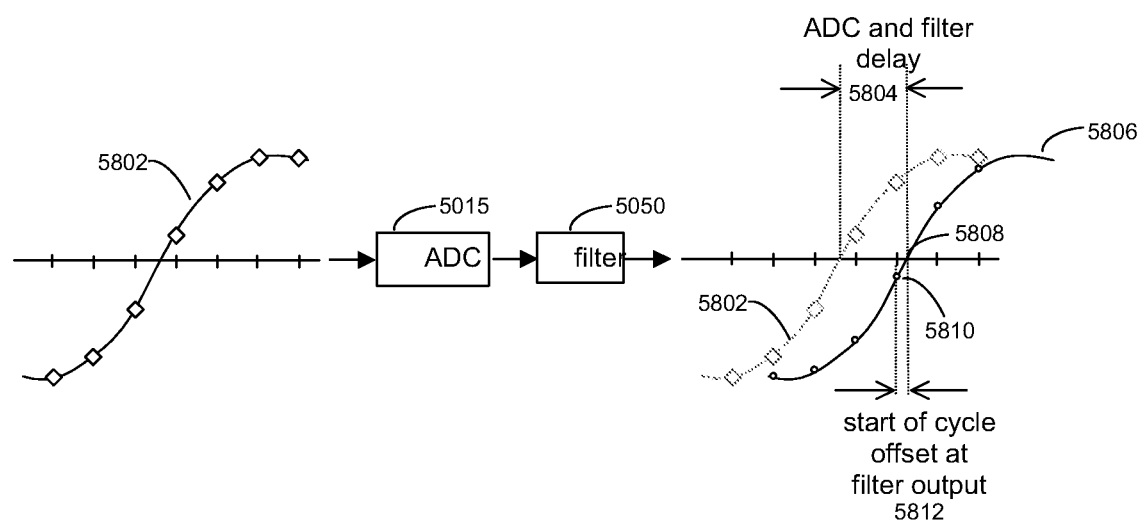
FIG. 58 is an illustration of a zero-crossing of a signal output by a filter used in an operation of a digital flowmeter.
Figure 59:
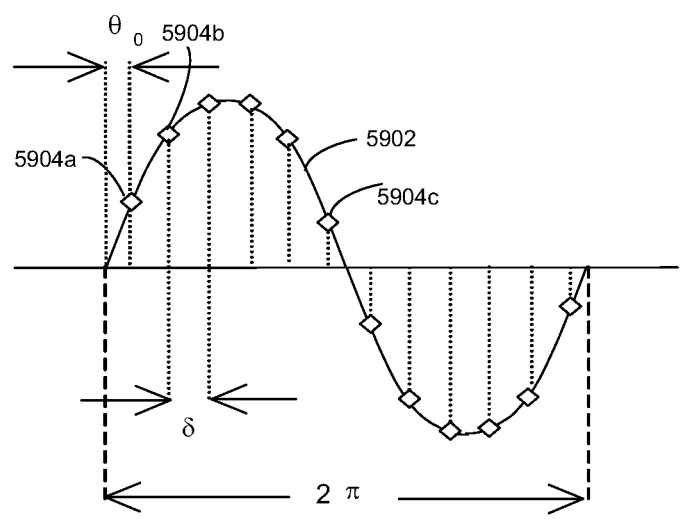
FIG. 59 is an illustration of a sine wave illustrating synthesis parameters for synthesizing a drive signal.

The processor 4915 determines an average frequency ($freq_{ave}$) of the original (two) sensor signals from sensors 4805, as well as a cosine (cos) and sine (sin) of an angle "$\delta$" between samples, where the angle between samples is defined as $\delta = 2\pi freq_{avg}/F_s$, where $F_s$ is the sampling rate (see FIG. 59). The frequencies can be calculated by, for example, an interpolation process, discussed in more detail below (see FIG. 58).

This calculation of frequency takes a finite amount of processing time, so that the processor 4915 has the frequency information after a processing time 5414. By feeding the $freq_{ave}$ value into the non-linear filter function associated with the filter 5050, a corresponding filter delay of filter 5050 may be determined, which together with the (already-known) ADC delay time, provides the filter+ADC delay 5406.

The processor 4915 also may calculate a phase offset $\theta_0$, which reflects the fact that there may be a small time difference between an actual zero crossing and the next sampled value of the wave (see FIG. 59). This offset $\theta_0$ may be used to obtain initial values for the sine and cosine parameters (i.e., $\sin(\theta_0)$ and $\cos(\theta_0)$) for the sine wave to be synthesized. The processor 4915 then sends the calculated parameters to the FPGA 4910, which, in turn, proceeds to wait a first wait time 5416. The first wait time 5416 measures from the end of the processing time 5414 until the next zero-crossing, marked by a line 5418.

The processor 4915 also may calculate a second wait time 5420, after which the FPGA 4910 is to begin synthesis of a sine wave 5422, at a time marked by a line 5424. The second wait time 5420 is selected such that the sine wave 5422 synthesized by the FPGA 4910 will be in phase with the sensor signal 5402, when the sine wave 5422 is applied to the flowtube 4815 as a drive signal 5426. For this condition to occur, the FPGA must synthesize the sine wave 5422 such that the filter+ADC delay 5406 is accounted for, thereby matching the sine wave 5422 to a shifted or corrected version of the post-filtering signal 5404. Furthermore, the sine wave 5422 must be prospectively shifted as well, in order to account for a delay that will occur post-synthesis, e.g., the delay associated with a passing of the sine wave 5422 through the DAC 5030. This delay is represented as a DAC delay 5428, between the line 5424 and a line 5430.

Thus, the second wait time 5420 may be calculated to be a total period (i.e., from the zero-crossing at the line 5418 to a following zero-crossing, at a line 5432), minus a total delay imposed by the digital transmitter 4704, which, in the case of FIG. 54, is equal to the filter+ADC delay 5406 plus the DAC delay 5428. By starting synthesis of the sine wave 5422 at the time marked by the line 5424, then, a phase of the drive signal 5426 (after the DAC delay 5428) exactly matches a phase of the sensor signal 5402, as shown by the line 5430 and a line 5434.

In the example of FIG. 54, it is assumed that the frequency/period of the sensor signal 5402 is such that the processor 4915 may perform its processing routines in less than one period of the signal (e.g., the time 5414 is substantially less than the total period length of the wave(s)). In this case, it should be noted that the drive signal 5426 is actually in phase with the "i+3" cycle of the sensor signal 5402; that is, two full cycles (the "i+1" and "i+2" cycles), as explained above, are used for frequency (and related) calculations and/or as waiting periods which account for the various delays. Alternatively, it may be possible to eliminate the first wait time 5416, and begin counting for the second wait time 5420 immediately after the zero-crossing at time 5408. This approach requires the FPGA 4910 to assume that synthesis parameters will arrive before the end of the second wait time 5420, and so is a more aggressive or time-sensitive approach, but, when successful, reduces the delay from two cycles to only one cycle.

For higher frequencies, it may be the case that the calculation time 5414 is comparable to, or more than, the total period length. Moreover, a processing time of the processor 4915 may not be constant (due to, for example, other loads imposed on the processor 4915), in which case the time 5414 may substantially vary (relative to the total period length).

FIG. 55 is an example of such a situation. In FIG. 55, a sensor signal 5502 experiences an ADC+filter delay 5504 and is output from the filter 5050 as a signal 5506. At a zero-crossing 5508, analysis of a cycle i of signal 5506 commences, but is not completed until after a calculation time 5510, which is longer than a period of the signal 5506. After a first wait time 5512, a zero-crossing 5514 is detected by the FPGA 4910, whereupon the FPGA 4910 obtains the synthesis parameters (or uses synthesis parameters that have already been received from the processor 4915) and waits a second wait time 5516.

In FIG. 55, the ADC+filter delay 5504, plus the (prospective) DAC delay 5518, is cumulatively longer than a cycle of the sensor signals. Therefore, in a first implementation, the second wait time 5516 may be correspondingly longer then the cycle length, as well. In this implementation, a signal 5520 is input to the DAC 5030 after the second wait time 5516, so that, after the DAC delay 5518, a drive signal 5522 is generated that is in phase with the "i+5" cycle of the sensor signal 5502.

Alternatively, in a second implementation, as shown in FIG. 55, the second wait time 5516 may be determined as a non-negative integer remainder of the total delay (expressed as a number of samples), divided by the cycle length (also expressed as a number of samples). In this implementation, the signal 5520 is input to the DAC 5030 after the second wait time 5516, so that, after the DAC delay 5518, the drive signal 5522 is output that is in phase with the "i+4" cycle of the sensor signal 5502.

Figure 56A:
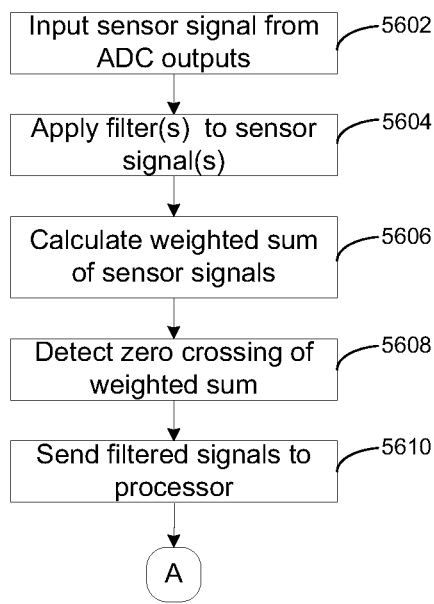
FIGS. 56A and 56B are flowcharts illustrating operations of a digital flowmeter.
Figure 56B:
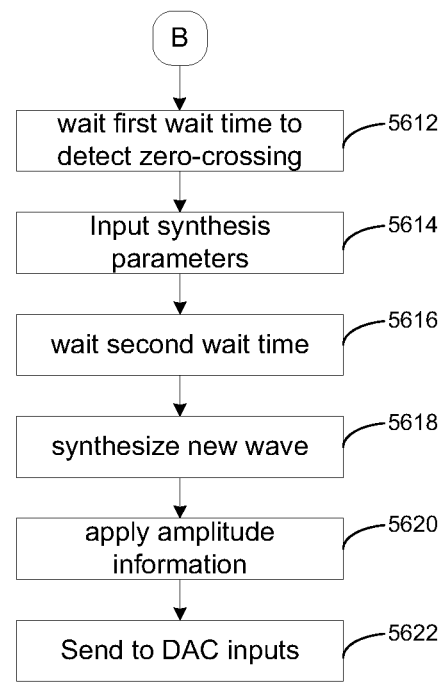
Figure 57:
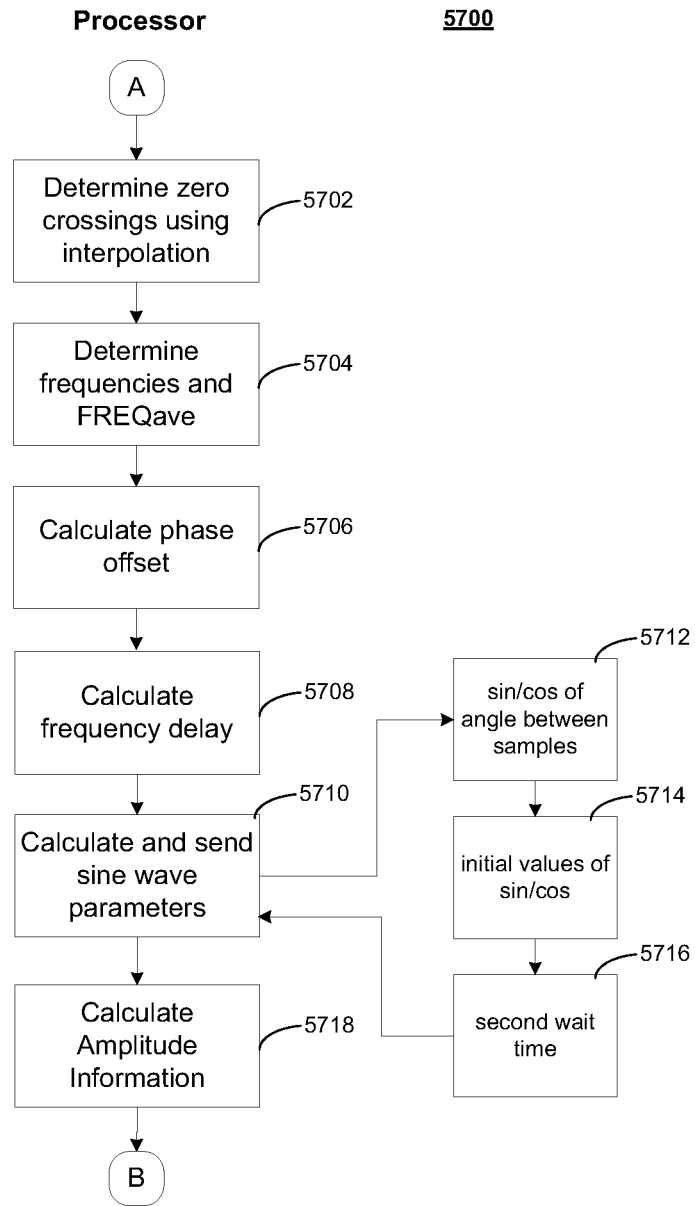
FIG. 57 is a flowchart illustrating further operations of a digital flowmeter.

FIGS. 56A, 56B, and 57 are flowcharts 5600A, 5600B, and 5700, respectively, summarizing operations associated with the timing diagrams of FIGS. 54 and 55. More specifically, the flowcharts 5600A, 5600B, and 5700 illustrate the division of tasks between the FPGA 4910 and the processor 4915, as discussed above. Specific examples of computational techniques for implementing these tasks are discussed below with respect to FIGS. 58-60, as well as with reference back to FIGS. 54 and 55.

In the flowchart 5600A of FIG. 56A, representing a first set of actions taken by the FPGA 4910, the FPGA 4910 begins by inputting sensor signals from the output of ADC 5015 (5602). The filter 5050 is then applied to the sensor signals (5604). The FPGA 4910 then calculates the weighted sum of the sensor signals (5606), detects a zero crossing of the weighted sum (5608), and forwards the filtered signals to the processor 4915 (5610).

In the flowchart 5700 of FIG. 57, representing a set of actions taken by the processor 4915, the processor 4915 determines at least two zero crossings from previous wave cycles, using, for example, interpolation (5702), and uses this information to accurately calculate frequencies of the sensor signals (as well as the average frequency $freq_{ave}$ of the sensor signals) (5704). The processor 4915 then calculates the phase offset $\theta_0$ (5706), and then calculates a filter delay (5708).

Subsequently, using the just-determined frequency and phase offset information (i.e., the (non-zero) phase value assigned to a first sample of each new cycle generated by the drive output (see FIG. 58), and not the phase difference between two sensor signals (which is attributable to the mass flow of fluid moving through the flowtube being used)), the processor 4915 calculates synthesis sine wave parameters (5710). As mentioned above, some of the sine wave parameters calculated may include the sine/cosine of an angle δ between digital samples taken (5712), initial values of the sine/cosine functions (5714), and the second wait time that the FPGA 4910 is to wait before beginning synthesis (5716).

The processor 4915 then calculates amplitude information (5718), including an actual amplitude of the sensor signals and a desired gain factor. A gain sign also may be determined (for example, a negative gain may be selected for, for example, amplitude reduction during set point change or in highly-damped fluids, as referred to above), along with an oscillation mode (e.g., Coriolis or driven), sensor balance factors, and drive balance factors (see FIG. 53).

Returning to FIG. 56B, in the flowchart 5600B, the FPGA 4910 receives the various calculated parameters from the processor 4915 and proceeds to wait the first wait time, until the relevant zero crossing is detected (5612). At this point, the FPGA 4910 inputs and applies the synthesis parameters (5614), and proceeds to wait the second wait time (5616).

Once the second wait time has passed, the FPGA 4910 begins to synthesize the desired sine wave (5618).

Subsequently, the amplitude of the synthesized wave is adjusted as needed (e.g., a drive gain factor is applied to the sine wave) (5620), and the sine wave is forwarded to the DAC 5030 inputs, to be output therefrom as the drive signal (5622).

Example operations of the processor 4915, as just explained above with respect to FIG. 57 and flowchart 5700, are discussed below with respect to FIGS. 58-60.

Specifically, FIG. 58 is an illustration of a zero-crossing of a signal output by the filter 5050 (e.g., signal 5404 or signal 5506 of FIGS. 54 and 55, respectively). FIG. 58 illustrates the need for the determination of zero-crossing(s) using interpolation (5702 of FIG. 57). As already explained above with respect to FIGS. 54 and 55, a signal 5802 is input through the ADC 5015 and the filter 5050, and experiences an associated delay 5804 before being output as a signal 5806.

In the signal 5806, there may be a difference between an actual zero-crossing 5808 and a closest sample 5810, resulting in an offset 5812. In order to determine the zero-crossing 5808, an interpolation process, such as a quadratic or a linear interpolation process, may be used. For example, the processor 4915 may fetch a full cycle of the filtered sensor signal(s) 5806, along with a number of samples from each end of the cycle, and uses these parameters in the interpolation process to determine the zero-crossing 5806.

FIG. 59 is an illustration of a sine wave 5902 illustrating synthesis parameters. In FIG. 59, a full cycle of the sine wave 5902 is illustrated, along with samples 5904 of the sine wave 5902. As illustrated in FIG. 59, then, a phase offset parameter $\theta_0$ is defined as a difference between an actual start (zero-crossing) of the signal 5902 and a first sample 5904a. Meanwhile, the angle $\delta$ is defined as the phase between, for example, a second sample 5904b and a third sample 5904c, so that (as mentioned above) $\delta = 2\pi \text{freq}_{avg}/F_s$.

Using these parameters, the FPGA 4910 may recursively generate (synthesize) a desired sine wave (5618 of FIG. 56B) using the following recurrence formulae (Equations (1) and (2)) from the trigonometry of the sum of two angles:

$$\sin(\theta+\delta) = \sin(\theta)\cos(\delta) + \cos(\theta)\sin(\delta) \quad \text{Eq. (1)}$$

$$\cos(\theta+\delta) = \cos(\theta)\cos(\delta) - \sin(\theta)\sin(\delta) \quad \text{Eq. (2)}$$

Thus, in Equations (1) and (2) and using the parameters of FIG. 59, $\theta = \theta_0 + n\delta$, for $n = 0, 1, 2, \ldots$. Parameter $\delta$ conveys the frequency of the synthesized wave, which is made equal to the sensor average frequency $\text{freq}_{avg}$. In practice, the initial value $\theta_0$ will typically be near zero, since $\theta$ and $\delta$ are updated at zero crossings.

The variables $\sin(\delta)$ and $\cos(\delta)$ are parameters that may be calculated by the processor 4915 in every measurement cycle, and passed onto the FPGA 4910 on a 24-bit format. Typical values of $\delta$ are very small, so that $\sin(\delta) \approx 0$ and $\cos(\delta) \approx 1$. In one implementation, $\cos(\delta)$ is sent to the FPGA 4910 as its difference with 1.0 (i.e., [1−cos(δ)]). Also, the parameters $\sin(\delta)$ and $[1-\cos(\delta)]$ may be scaled such that any of the most significant bits that are known to be zero are discarded, so that only the first 24 values capable of taking non-zero values are sent to the FPGA 4910.

In this case, Equations (1) and (2) can be re-written as Equations (3) and (4), using the parameter [1−cos(δ)]:

$$\sin(\theta_{j+1}) = \sin(\theta_j) + \Delta \sin \quad \text{Eq. (3)}$$

$$\cos(\theta_{j+1}) = \cos(\theta_j) + \Delta \cos \quad \text{Eq. (4)}$$

In Equations (3) and (4), $\theta_j = j\delta + \theta_0$ and the terms $\Delta \sin$ and $\Delta \cos$ can be determined according to Equations (5) and (6):

$$\Delta\sin = \sin(\theta_{j+1}) - \sin(\theta_j) \quad \text{Eq. (5)}$$
$$\Rightarrow \Delta\sin = -\sin(\theta_j) + \sin(\theta_j)\cos(\delta) + \cos(\theta_j)\sin(\delta)$$
$$\Rightarrow \Delta\sin = -\sin(\theta_j)[1-\cos(\delta)] + \cos(\theta_j)\sin(\delta)$$

$$\Delta\cos = \cos(\theta_{j+1}) - \cos(\theta_j) \quad \text{Eq. (6)}$$
$$\Rightarrow \Delta\cos = -\cos(\theta_j) + \cos(\theta_j)\cos(\delta) - \sin(\theta_j)\sin(\delta)$$
$$\Rightarrow \Delta\cos = -\cos(\theta_j)[1-\cos(\delta)] - \sin(\theta_j)\sin(\delta)$$

The parameter $\theta_0$ may be sent by the processor 4915 to the FPGA 4910 by providing initial values $\sin(\theta_0)$ and $\cos(\theta_0)$, with $\sin(\theta_0)$ being the first output value of the synthesized cycle wave. These may be passed in, for example, a 32-bit format, and used to determine the phase offset of the driver signals.

The phase offset $\theta_0$ ideally should match the sensor signals, in order to get an oscillation as close as possible to the resonance frequency. Even for a fixed drive frequency, however, the value of $\theta_0$ may vary from cycle to cycle, because the CODEC sample rate is typically not an exact multiple of the drive frequency. Specifically, the value of $\theta_0$ varies between 0 and $\delta$ according to a beating effect between the drive and the CODEC frequencies. For example, for a CODEC frequency of 40 kHz and a drive frequency of 81.2 Hz, then $\delta = 0.73°$. Assuming a value of $\theta_0$ of zero on cycle 1, Table 2 shows the values of $\theta_0$ on subsequent cycles.

TABLE 2

| cycle index i | sample index k | time t = kT$_s$ (s) | phase offset $\theta_0$ (degrees) |
|---|---|---|---|
| 1 | 1 | 0.0000 | 0.0000 |
| 2 | 494 | 0.0123 | 0.2844 |
| 3 | 987 | 0.0246 | 0.5688 |
| 4 | 1479 | 0.0369 | 0.1224 |
| 5 | 1972 | 0.0493 | 0.4068 |
| 6 | 2465 | 0.0616 | 0.6912 |
| 7 | 2957 | 0.0739 | 0.2448 |

The difference in phase offset between two consecutive cycles may be more significant in higher-frequency flowtubes. For example, using the same CODEC frequency with a 650 Hz drive frequency, $\delta$ is as high as 5.85°, as shown in Table 3:

TABLE 3

| cycle index i | sample index k | time t = kT$_s$ (s) | phase offset $\theta_0$ (degrees) |
|---|---|---|---|
| 1 | 1 | 0.0000 | 0.0000 |
| 2 | 63 | 0.0015 | 2.7002 |
| 3 | 125 | 0.0031 | 5.3994 |
| 4 | 186 | 0.0046 | 2.2506 |
| 5 | 248 | 0.0062 | 4.9491 |
| 6 | 309 | 0.0077 | 1.8008 |
| 7 | 371 | 0.0092 | 4.4990 |

Thus, for a correct value of $\theta_0$, it is important to know for which output cycle the value is being generated. As discussed below, this can prove difficult for high-frequency flowtubes.

From Tables 2 and 3 and the preceding discussion, it should be understood that a potential shortcoming related to the use of the positive feedback mode is that, in this mode, only phase values actually sampled and stored in the buffer 5025 may be generated. As a result, a phase offset between the sensor signal(s) and the drive signal(s) may be as high as one sample (i.e., $\delta$). As just illustrated, this phase offset is potentially problematic, particularly in a high-frequency flowtube environment. In contrast, the digital synthesis mode is capable of outputting virtually any desired phase value, as needed. Thus, in this mode of operation, substantially exact phase matching may be virtually assured.

Another parameter calculated during execution of the flowchart 5700 is the filter delay parameter (5708). As mentioned above, the filter 5050 imparts a delay on a filtered signal that is related to a non-linear function of a frequency of the signal at an input of the filter 5050. Therefore, as also discussed above, the processor 4915 typically determines an actual frequency of the input signal, and feeds this value into the non-linear function to thereby calculate the filter delay (hereafter, $\Psi(f)$).

This delay $\Psi(f)$, usually represented in angle units (either degrees or radians), can be analytically obtained from the filter coefficients. Using the sampling frequency Fs, $\Psi(f)$ is converted into a non-integer number of samples. This delay-in-samples may then be modeled by, for example, a $6^{th}$-order polynomial (discussed in more detail below), in order to speed its calculation up in the processor.

Figure 60A:
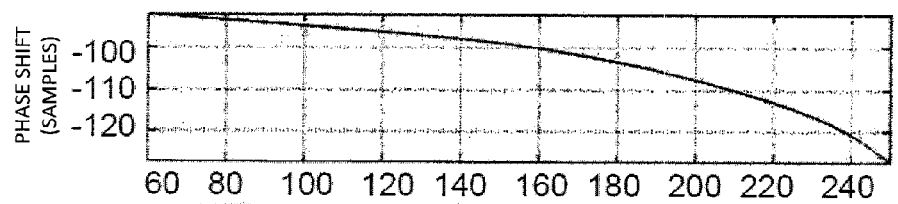
FIGS. 60A, 60B, and 60C are graphs showing filter characteristics of a filter used in an operation of a digital flowmeter.
Figure 60B:
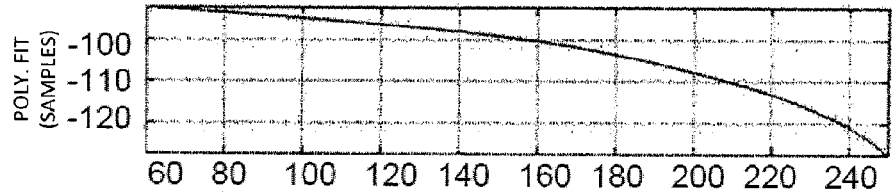
Figure 60C:
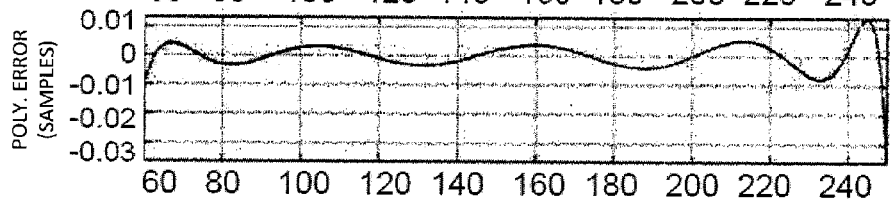

FIGS. 60A, 60B, and 60C are graphs showing filter characteristics. FIGS. 60A-60C are illustrated in samples, rather than in degrees. FIG. 60A illustrates phase delay against frequency for a range of frequencies that might be used with a low-frequency flowtube. FIG. 60B illustrates a polynomial fit for the graph of FIG. 60A, and FIG. 60C shows residuals of the polynomial fit (where the residuals do not exceed the value of ±0.01 samples).

In one implementation, the filter 5050 discussed above may be a $6^{th}$ order elliptical floating-point or fixed point filter (an "infinite impulse response" or "IIR" filter) implemented on the FPGA 4910. Such a filter may be operable to suppress unwanted (high) frequency components, such as higher resonant modes, from the sensor signal(s) (and, during a positive feedback mode, thereby ensuring that such unwanted frequencies are not fed back into the drive signal(s)).

For example, such a filter may be implemented having a cut-off frequency slightly higher than the resonance frequency of the flowtube 4815, and used to filter an output of the driver(s) 4810. Additionally, one or more IIR filters or "Finite Response Filters" ("FIRs") can be implemented on the processor to further improve measurement performance.

An added benefit of using an elliptical filter as the filter 5050 on the FPGA 4910 is that a sawtooth waveform passing through such a filter becomes nearly sinusoidal, which may be useful for forcing start-up of the flowtube 4815 (start-up operations are discussed in more detail below).

In considering the use of a filter as described herein, it should be understood that such a filter is essentially a low-pass or band-pass filter having very stringent specifications. That is, in order to perform its functionality, the filter must have a very sharp filter cutoff at a very low frequency. For example, the bent flowtube 4702 may have a maximum resonant frequency of about 100 Hz, where key higher harmonics and undesired resonant modes of the flowtube 4815 to be suppressed are in the range of 150-1500 Hz, with a typical sampling rate of 40 kHz.

As mentioned above, analog flowmeters typically impart marginal, if any, delay to the drive signal with respect to the sensor signal, and therefore may not require any phase compensation. However, filters such as those described herein cannot effectively be added to such analog flowmeters, since the phase delay introduced by the filters cannot easily be compensated for. Moreover, the use of such filters would be impractical in analog designs for the simple reason that it would be difficult or impossible for the filters to provide the required sharp cutoff in that context (e.g., elliptical filters cannot be implemented in analog designs).

In contrast, the implementations disclosed herein are capable of compensating for these (and other) phase delays, so that an elliptical filter can be effectively and efficiently implemented by simply including its functionality within the FPGA 4910, as described above.

A transfer function for an elliptical filter that may be implemented as the filter 5050 in the FPGA 4910, where the filter 5050 is implemented in second-order-sections, is expressed in Equation (7) for an i-th filter section:

$$H_i = \frac{Y_i(z)}{X_i(z)} = \frac{\sum_{j=0}^{2} b_{ij} z^{-j}}{\sum_{j=0}^{2} a_{ij} z^{-j}} \qquad \text{Eq. (7)}$$

A difference equation for such a filter is expressed in Equation (8):

$$a_{i0} y_i(k) + a_{i1} y_i(k-1) + a_{i2} y_i(k-2) = b_{i0} x_i(k) + b_{i1} x_i(k-1) + b_{i2} x_i(k-2) \qquad \text{Eq. (8)}$$

where Eq. (8) can be solved for $y_i$, as shown in Equation (9):

$$y_i(k) = \frac{\left[ \begin{array}{c} b_{i0} x_i(k) + b_{i1} x_i(k-1) + b_{i2} x_i(k-2) - a_{i0} y_i(k) + \\ a_{i1} y_i(k-1) + a_{i2} y_i(k-2) \end{array} \right]}{(a_{i0})} \qquad \text{Eq. (9)}$$

Thus, for example, a $6^{th}$ order elliptical filter may be implemented using three consecutive $2^{nd}$ order sections. In this case, for a particular flowtube type (e.g., bent or straight) and sampling frequency, the coefficients $a_0$, $a_1$, $a_2$, $b_0$, $b_1$, and $b_2$ (for each of the three sections) may be determined by considering a full range of operating frequencies for the drive signal(s) (i.e., from a maximum frequency, corresponding to an empty flowtube, to a frequency corresponding to the flowtube when full of a fluid with the highest density specified for the flowtube), in conjunction with desired cut-off frequencies for the particular application. Each filtering stage may introduce additional delay/phase offset that may, in turn, be compensated for using, for example, one or more of the above-described techniques. When using the above and/or related filtering techniques, the amplitude of high-frequency components in a signal may be reduced by a factor of, for example, 1000 or more.

More generally regarding filtering processes, it should be understood that there are several types of filtering that can be implemented at various stages of the above-described implementations. Examples of such filtering include: analog filtering of sensor data prior to its reading by the CODEC 4905, fixed-point filtering of measurement data within the FPGA 4910, floating point filtering of measurement data within the processor 4915, fixed-point filtering of the synthesized drive signal within the FPGA 4910, and analog filtering of the drive waveform on its output.

Of these options, the latter three are considered here in more detail. First, floating-point filtering of measurement within the processor 4915 requires that the processor receive raw data, and apply whatever processing is deemed most appropriate (which may change with circumstances). Any pre-filtering of the raw data is fixed and cannot readily be modified. Unwanted harmonics can be suppressed during waveform synthesis using this technique.

Fixed-point filtering of the synthesized drive signal within the FPGA 4910 can be used, for example, during positive feedback, in order to suppress unwanted harmonics in the sensor data from being passed through to the drivers. Since the processor 4915 is not directly involved in waveform synthesis, it will not typically perform this particular filtering function.

Finally, analog filtering of the drive signal post-CODEC may be used to smooth out high-frequency noise introduced by the codec and subsequent circuitry.

As a final point regarding the flowchart 5700, issues regarding the calculation of the second wait time (5716) are discussed in more detail below.

As already mentioned, it takes the processor 4915 some finite amount of time to analyze the filtered sensor signal wave (e.g., time 5414 in FIG. 54 and time 5510 in FIG. 55). As a result, by the time that the calculation of the sine wave synthesis parameters is done, the sensor signal has gone ahead a number of samples, and, as shown in FIG. 55, may possibly advance more than a whole cycle (depending on, for example, the flowtube frequency and the processor computational load, such as an external communication request).

Also, the CODEC DAC 5030 has a delay of, for example, 30 samples between the value sent by the FPGA 4910 to the CODEC DAC 5030 input and the signal appearing at the DAC 5030 output, which has to be taken into consideration. Therefore, as illustrated in FIGS. 54 and 55, a number of cycles between the start of the sensor wave under analysis and the start of the synthesized wave at the CODEC DAC 5030 output should be calculated, in order to adjust an initial value of the synthesized wave.

One way of seeing how far behind "real time" the processor 4915 has fallen is to look at the circular buffer 5025 backlog. This backlog represents a count of how many ADC samples have been received by the FPGA 4910 and are waiting to be sent to the processor 4915. By looking at the data backlog of the circular buffer 5025 and taking the average frequency of the cycle under analysis as the estimated frequency of the next wave(s), it is possible to infer which cycles to target in the calculation of the start of the cycle, as is shown in the example code section below, Code Section 1

---
Code Section 1
---
```
period = 1.0 / avg_freq;
samples_waiting_in_fpga = get_fpga_bufsize( );
num_cycles = (int) (floor(samples_waiting_in_fpga / period)) + 2;
samples_per_cycle = sample_freq / avg_freq;
predict_start_cycle = start_cycle_offset + num_cycles *
samples_per_cycle;
predict_start_cycle_int = floor(predict_start_cycle);
predict_start_cycle_offset = predict_start_cycle −
predict_start_cycle_int;
```

FIGS. 54 and 55 show the timing in the sequence of steps of Code Section 1, starting from cycle i in the sensor signal(s) to the generation of a sine wave at an output of the DAC 5030, using parameters calculated from sensor cycle i.

In FIG. 54, the frequency of oscillation is slow compared to the time that the processor 4915 takes to analyze a sensor wave, so that there is less than a cycle's worth of samples waiting in the buffer 5025 at the time when the processor 4915 finishes the analysis of the previous wave (e.g., determines its frequency and related filter delay). In such a case, the quantity "num_cycles" would be typically zero+2. This is consistent with the above explanation of FIG. 54, in which the FPGA 4910 waits a time equal to the period of the sensor wave i+2 (assuming that this period hasn't change since cycle i), minus the total delay in the path, i.e. ADC+filter delay 5406 and DAC delay 5428, to start the synthesis of a wave that will attempt to match sensor cycle i+3.

More generally, a total "wait" count (i.e., the count for the second wait time 5420 of FIG. 54 or 5516 of FIG. 55) may be sent by the processor 4915 to the FPGA 4910 as another synthesis parameter (5716). This wait count carries the information of the filter delay at sensor signal frequency, and may be determined using, for example, Code Section 2

---
Code Section 2
---
```
filter_delay = get_filter_delay_in_samples (avg_freq);
wait_count = samples_per_cycle − codec_delay + filter_delay;
while (wait_count < 0) {
    wait_count += samples_per_cycle;
}
while (wait_count > samples_per_cycle) {
    wait_count −= samples_per_cycle;
}
```

If the flowtube frequency is high relative to a calculation time of the processor 4915, then more than a cycle could have accumulated before the processor finishes the analysis of one wave. In this case, the total delay is greater than the cycle length, so an entire cycle may be added to the wait count of Code Section 2, as shown in FIG. 55.

In selecting the phase of the (synthesized) drive signals relative to the sensor signal(s), several options exist in the low-frequency flowtube environment. For example, the phase of a driver signal, d1 or d2, can match the phase of one of the following: the weighted sum of filtered sensor signals (wfs), the filtered corresponding sensor signal, or one of the filtered sensor signals.

In the first option of matching weighted sum of filtered sensor signals, both drive outputs are equal and match the phase of the weighted filter sum signal, which, under normal operation, lies between the two sensor signals. The search for the start of the cycle offset and the zero-crossing detection (explained above) are applied to the weighted filter sum signal, rather than to the filtered, individual sensor signals. Another way to find a start of the cycle offset for the weighted filter sum is to calculate the average of the start of the cycle offsets for the individual, filtered sensor signals. In this option, the total wait count (e.g., the second wait time 5420 of FIG. 54) is the same for both drivers.

In the second option, a first drive signal is matched with a first sensor signal, while the second drive signal is matched with the second sensor signal. This option has the same δ parameter, but different $\theta_0$ for each of the two drivers. The start of the cycle is calculated for each sensor wave, and used to calculate the initial values of sine and cosine of each drive signal. The total wait count may be different for each sensor as well. As the synchronization drive-sensor is made with the weighted filtered sum signal, the phase difference between the two sensor signals indicates the expected location of the zero-crossings for each sensor signal. Such a phase difference may be based on cycle i analysis, where it is assumed that there is no significant change in the phase(s) by the time that the drive signals reach the DAC 5030 outputs.

In the third option, both of the drive signals are matched with only one of the two sensor signals. In this option, as in the first option, both drive signals are equal, and match the phase of one sensor signal (i.e., the matched sensor signal, instead of the wfs). However, a start of the cycle offset for only the relevant (i.e., matched) sensor signal is predicted, and the same wait count is used for both drive signals.

Code section 3 shows an example calculation of the wait count parameter for each option:

---
Code Section 3
---

```
phase_diff_in_samples = phase_diff * samples_per_cycle / 360.0;
switch(drive_phase_mode) {
      case 0:        /* driver outputs in phase with wfs */
           // send the same value to driver output 2
           wait_count1 = wait_count2 = wait_count;
           break;
      case 1:        /* driver outputs in phase with s1 */
           // send the same value to driver output 2
           wait_count 1 = wait_count − (phase_diff_in_samples / 2.0);
           wait_count 2 = wait_count 1;
           break;
      case 2:        /* driver outputs in phase with each sensor */
      default:
           wait_count 2 = wait_count + (phase_diff_in_samples / 2.0);
           wait_count 1 = wait_count − (phase_diff_in_samples / 2.0);
           break;
}
```

Parameter $\theta_0$ is calculated from a start of the cycle offset, as shown in Code Section 4

---
Code Section 4
---

```
/* phase offset */
    predict_start_cycle1 = start_cycle_offset1 +
num_cycles*samples_per_cycle;
    predict_start_cycle_int1 = floor( predict_start_cycle1);
    pred_sco1 = predict_start_cycle1 − predict_start_cycle_int1;
    predict_start_cycle2 = start_cycle_offset2 +
num_cycles*samples_per_cycle;
    predict_start_cycle_int2 = floor( predict_start_cycle2);
    pred_sco2 = predict_start_cycle2 − predict_start_cycle_int2;
    switch (drive_phase_mode) {
        case 0:         /* driver outputs in phase with wsum */
            predic_soc = ( predic_soc1 + predic_soc2)/ 2.0;
            theta_0 = (1 − predic_soc) * delta;
            break;
        case 1:       /* driver outputs in phase with sv1 */
        case 2:       /* driver outputs in phase with each sensor */
        default:
            theta_0 = (1 − predic_soc1) * delta;
            break;
}
```

As already mentioned, the above options for selecting a phase of the driver signal(s) with respect to the sensor signals may only be applicable in a low-frequency flowtube environment, such as might be used with the bent flowtube 4702.

In a high-frequency flowtube environment, such as might be seen in conjunction with the straight flowtube 4706, the flowtube can resonate at frequencies ranging from approximately 200 to 1000 Hz. Whereas a sensor cycle in a low-frequency flowtube may be about 500 samples long, it takes less than 100 values to sample a cycle in a high-frequency flowtube (using the same sampling frequency of, for example, 40 kHz). Thus, with a filter delay of, for example, 32 samples and a CODEC delay of, for example, 61 samples, by the time the FPGA 4910 detects a zero-crossing at the wfs signal and obtains the synthesis parameters from the processor, one or more cycles might have already occurred (as discussed above and illustrated in FIG. 55). Moreover, as discussed above with respect to Table 3, it may be important (yet problematic) to know which output cycle corresponds to a particular, correct value of the parameter $O_0$.

Further, as referred to above, an increase in the computational load of the processor 4915, e.g., an external communication request, might cause a longer delay in the frequency/filter delay calculation. Such a delay may lead to inaccuracies in determining which cycle is actually being generated in the flowtube in real time. Also, the FPGA 4910 continues generating cycles of the drive signal while the processor 4915 is busy, even when no new parameters have been sent to the FPGA 4910.

A way to address this issue of maintaining accuracy in tracking cycles of the drive signal is to keep a cycle counter at the output of the digital filter 5050 in the FPGA 4910. By allowing access to this cycle count, the FPGA 4910 tells the processor 4915 how many cycles have passed from the moment the processor 4915 fetched a cycle i for its analysis, until the moment the FPGA 4910 calculates the actual synthesis parameters. To prevent further tracking inaccuracies, the processor 4915 may provide to the FPGA 4910 two or more sets of parameters, corresponding to two or more cycles ahead.

Such a cycle counter as a tracking mechanism may be kept for both types of flowtubes 4702 and 4704. Code Section 5 (which may be applied just after the calculation of $freq_{ave}$) is a modified version of Code Section 4 that includes the cycle counting/tracking functionality.

---
Code Section 5
---

```
input_zero_crossing_counter = get_fpga_zero_crossings_count( );
period = 1.0 / avg_freq;
samples_waiting_in_fpga = get_fpga_bufsize( );
num_cycles_in_buffer = (int) (floor(samples_waiting_in_fpga / period));
/* zero-crossing index of wave under analysis in processor */
cycle_index = input_zero_crossing_counter − num_cycles_in_buffer;
num_cycles = get_fpga_zero_crossings_count( ) − cycle_index;
cycle_index += num_cycles;
``` where the last two lines of Code Section 5 may be applied just before a calculation of the synthesis parameters.

In addition, in a high-frequency flowtube, the processor 4915 may send the quantity "cycle_index" to the FPGA 4910, along with the synthesis parameters for that cycle and the following two cycles. The FPGA 4910 may thus compare this cycle index with its current cycle index, and take the set of synthesis parameters that correspond to the next cycle. For example, if the processor 4915 has just finished calculations for "cycle 20," and sends synthesis parameters for "cycles 25, 26, and 27." Taking into account a processor delay, the FPGA may be ready to begin synthesis of "cycle 26" at the next zero-crossing, and so would use synthesis parameters corresponding to this cycle (received from the processor 4915). If more than 3 cycles have elapsed, then the FPGA 4910 may take the set corresponding to cycle index, as it could have taken any other of the two. In another implementation, a set for a phase offset corresponding to half a sample may be sent to the FPGA 4910, in order to reduce the error in that case.

Code Section 6 illustrates an example for calculating the synthesis parameters for a high-frequency tube. Notice that, as already mentioned, due to its high resonance frequency, only one option is made available for matching the sensor phase, i.e., matching the phase of the weighted sum of filtered sensor signals.

Code Section 6

```
case HI_FREQ_FLOWTUBE:
/* phase offset */
predict_start_cycle1 = start_cycle_offset1;
predict_start_cycle2 = start_cycle_offset2;
    for (i=0; i<NUM_SOC_OFFSET; i++) {
        predic_start_cycle1 += num_cycles * samples_per_cycle1;
        predict_start_cycle_int1 = floor( predict_start_cycle1);
        pred_sco1 = predict_start_cycle1 - predict_start_cycle_int1;
        predic_start_cycle2 += num_cycles * samples_per_cycle2;
        predict_start_cycle_int2 = floor( predict_start_cycle2);
        pred_sco2 = predict_start_cycle2 - predict_start_cycle_int2;
            predic_soc = ( predic_soc1 + predic_soc2)/ 2.0;
            theta_0[ i ] = (1 - predic_soc) * delta;
            num_cycles++;
    }
    break;
}
```

The above discussion has provided techniques for compensating for digital delay in a digital flowmeter, where these techniques apply corrections/adjustments to a (synthesized) drive signal based on a corresponding mathematical model of the characteristics of the flowmeter. The examples of these techniques described above do not include verification of the results of the delay compensation; in other words, the techniques may be thought of as "open-loop" techniques.

A "closed-loop" approach, however, is additionally and/or alternatively possible. Such an approach might include, for example, taking additional readings of the drive signal (e.g., current and/or voltage), and then directly calculating any phase difference between the drive signal and the sensor signal. Thus, adjustments can be made to a phase offset of the drive signal output to ensure that it matches the phase of the sensor signal input.

Figure 61:
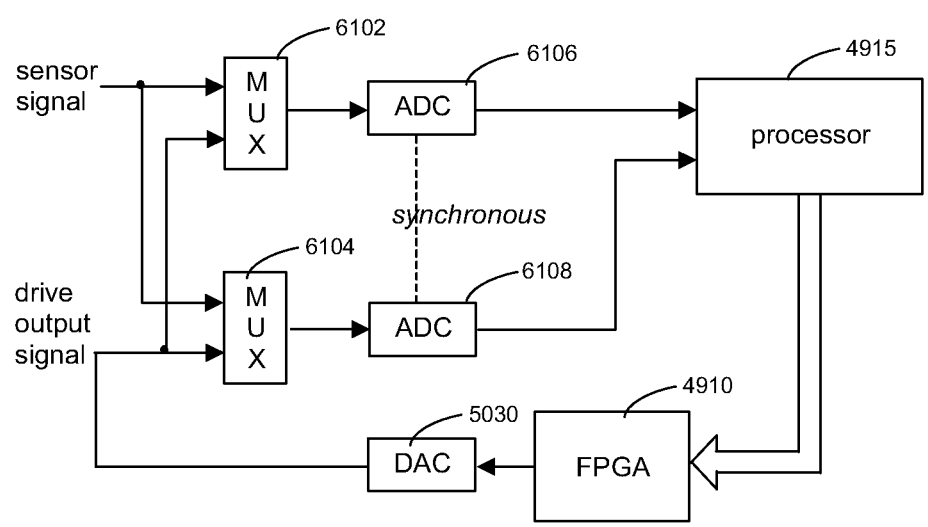
FIG. 61 is a block diagram of a closed-loop system for compensating digital delay in a flowmeter.

FIG. 61 is a block diagram of a closed-loop system for compensating digital delay in a flowmeter. In FIG. 61, a first multiplexer 6102 and a second multiplexer 6104 each input the sensor signal(s) and the driver signal(s) (note that, in FIG. 61, only one sensor and driver signal is shown as being input into each multiplexer 6102 and 6104, however, it should be understood that FIG. 61 might represent either a one-driver or a two-driver system). In this way, any phase difference between the drive output signal(s) and the sensor signal(s) can be obtained (much as the sensor signals are analyzed in the above discussion), and this difference can be used in a self-correcting feedback loop.

Calibration can be made by using the multiplexers 6102 and 6104 to place the same signal(s) at the input of the ADCs 6106 and 6108. In FIG. 61, the ADCs 6106 and 6108 may represent additional ADCs beyond those illustrated in, for example, FIG. 50. Alternatively, functionality of the ADCs 6106 and 6108 may be implemented using the existing ADCs 5015, along with the appropriate additional connections.

Also in FIG. 61, ADCs 6106 and 6108 are assumed to operate synchronously. That is, the multiplexers 6102 and 6104 are assumed to output their respective signals into their respective ADC 6106 or 6108 at a simultaneous point in the cycles of the signals. Should any delays (i.e., loss of synchronicity between the ADCs 6106 and 6108) be present in practical implementations, such delays may be detected during a calibration process (based on a common, selected signal) by calculating the phase difference between the outputs of the ADCs 6106 and 6108, and subsequently corrected when the drive output signal is measured.

The processor 4915 may receive the sensor information in various ways. For example, the ADC 6106 and the ADC 6108 may represent ADC(s) 5045 in FIG. 50, and may thus serve to feed back information based on the drive current imparted to the driver(s) 4810. As another example, the ADC 6106 and the ADC 6108 may represent ADC(s) 5047 in FIG. 50, and may thus serve to feed back information based on the drive voltage imparted to the driver(s) 4810.

In one implementation, the closed-loop technique(s) of FIG. 61 may be used as an alternative to the open-loop techniques described above. For example, the processor 4915 may send the synthesis parameters to the FPGA 4910, based on some estimation of the delay between the sensor signal at the ADC input and the drive signal at the DAC output. Once an entire cycle has been output, the processor 4915 may collect one cycle of each (i.e., sensor and drive output signals), and measure their phase difference ($\phi_{ds}$. This phase difference may be subtracted or added to the delay, to thereby reduce the delay in subsequent cycles. This process may run continuously.

In FIG. 61, it should be understood that, just as in FIGS. 54 and 55, the FPGA 4910 will typically take into account a delay associated with the DAC 5030. That is, the FPGA 4910 will typically anticipate the DAC delay, calculate a phase associated with a cycle one, two, or more cycles ahead of the measured cycle(s), and output its synthesized signal accordingly. In this way, when the synthesized signal is output from the DAC 5030, it will be in phase with the sensor signals, as desired.

In another implementation, the closed-loop technique may be used to supplement or improve the open-loop techniques described above.

The above description has provided techniques for compensating for digital delays that are present in flowmeters having digital components. Different techniques have been described for use in different applications. For example, in the setting of positive feedback, the group delay of the CODEC 4905 was compensated for with the use of a circular buffer, as described with respect to FIGS. 51 and 52. As another example, described with respect to FIGS. 53-60, in the setting of sine wave synthesis, both the group delay and the delay associated with the filter 5050 are compensated for by using measurements performed on sensor data, to thereby accurately time a beginning of the sine wave synthesis. As a final example, described with respect to FIG. 61, the drive signals are directly measured, and subsequently compared to the sensor signals as part of a closed-loop feedback routine that minimizes a phase difference between the signals.

These techniques may be used on their own, or in combination with one another (or other) techniques. For example, the digital flowmeters of FIGS. 47A and/or 47B could be operated purely in a positive feedback mode, or purely in a sine wave synthesis mode. As another example, the positive feedback mode may be used as a precursor to the sine wave synthesis mode. In one implementation, using the positive feedback mode as a precursor to the sine wave synthesis mode allows rapid and reliable start-up (and operation) of a digital flowmeter. Such a rapid and reliable start-up may be further enhanced through the use of a "random excitation mode" as a precursor to the positive feedback mode, as described in more detail below.

Figure 62:
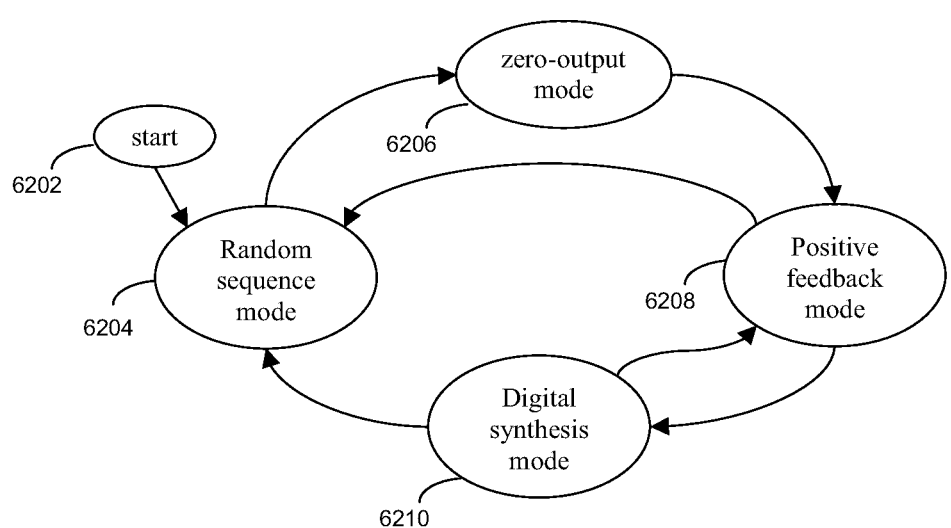
FIG. 62 is a flow diagram illustrating start-up and operational techniques for a digital flowmeter.

FIG. 62 is a flow diagram 6200 illustrating start-up and operational techniques for a digital flowmeter. In the flow diagram 6200, at a starting point 6202, a state of flowmeter system being used is set to a random sequence mode 6204. In this mode, the flowtube 4815 is excited with a wide band of frequencies which are expected to include the (initially unknown) resonant frequency of the flowtube. After a certain number N of samples (as might be taken during a selected time period such as, for example, approximately 1 second, corresponding to a warm-up time of the CODEC 4905), the system is switched to a zero-output mode 6206 for a brief period of time (e.g., an M-samples count, where M<<N), in order to allow the flowtube 4815 to settle at its resonance frequency. The random sequence mode 6204 and the zero-output mode 6206 are described in more detail below with respect to FIG. 63.

Subsequently, the system is switched to a positive feedback mode 6208, which allows the flowtube to quickly reach a stable oscillation, at its resonance frequency and with a high amplitude. The positive feedback mode correlates to the positive feedback mode discussed above with respect to, for example, FIGS. 51 and 52. Further details and examples related to the positive feedback mode 6208, in the context of the flow diagram 6200, are provided below with respect to FIG. 64.

Generally speaking, the random sequence mode 6204 serves to ensure that drive energy is put into the flowtube in the frequency range of interest, and the zero-output mode 6206 allows the flowtube to settle into its resonant frequency. During positive feedback, a pre-selected drive gain is applied to the drive signal, in order to ramp the flowtube 4815 up to a desired amplitude set-point. The drive gain has a default value of, for example, ten, which is large enough to cause a rapid rise in oscillation amplitude.

Subsequently, desired waveforms within the drive signals may be identified, and phase-compensated synthesis may thereafter be begun during the digital synthesis mode 6210, so that measurements of the material(s) flowing through the flowtube 4815 may be processed within the processor 4915. The start-up technique just described may be particularly useful in difficult start-up circumstances, such as, for example, half-full 2-3" tubes.

Although the techniques just described are useful in start-up of the flowtube 4815, it should be clear from the flow diagram 6200 of FIG. 62 that similar techniques may be used during an operation of the flowmeter as well. For example, during a time when the flowmeter is in full operation (i.e., synthesis mode) (6210), some difficulty may arise which causes the flowmeter (measurements) to become unstable.

For example, there may be some external disturbance to the system, or there may be some unanticipated object/material that flows through the flowtube. As another example, conditions such as two-phase flow and/or three-phase flow, particularly if initiated quickly or unexpectedly, might degrade or interrupt an operation of the flowmeter.

In such a case, the flowmeter may return to a positive feedback mode 6208, in order to re-stabilize the system (e.g., re-establish the proper frequency, phase and amplitude of the drive signals). Afterwards, the flowmeter may progress back into the digital synthesis mode 6210. Moreover, in a case of a particularly disruptive event, the flowmeter may return to the random sequence mode 6204, and then re-progress through the zero-output mode 6206 to the positive feedback mode 6208, and from there back to the digital synthesis mode 6210.

Similarly, if the flowmeter is operating in a positive feedback mode 6208, either as a result of regressing from the synthesis mode 6210 in the manner just described, or as part of the start-up process that also is described above, then a disturbance or malfunction may cause the flowmeter to return to the random sequence mode 6204. Again in this case, the flowmeter may re-progress through the zero-output mode 6206 to the positive feedback mode 6208, and from there back to the digital synthesis mode 6210.

In this way, a digital flowmeter may attain and/or retain a desired operational state in a fast, reliable manner.

Figure 63:
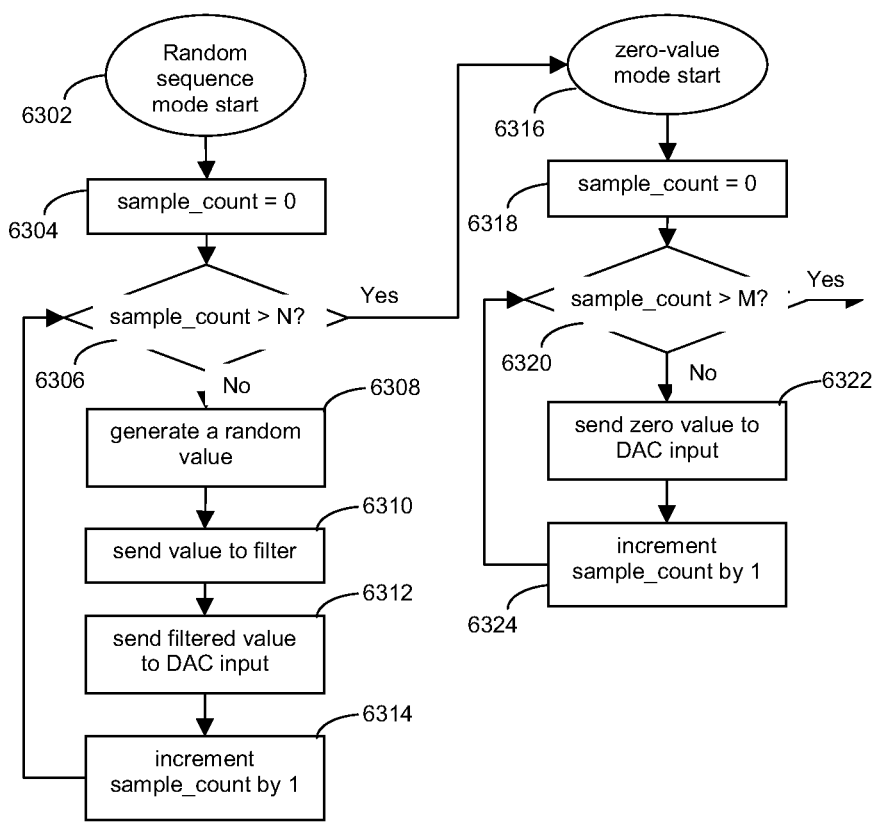
FIG. 63 is a flowchart illustrating the random sequence mode and the zero-output mode of FIG. 62 in more detail.

FIG. 63 is a flowchart 6300 illustrating the random sequence mode 6204 and the zero-output mode 6206 of FIG. 62 in more detail. In FIG. 63, the random sequence mode 6204 starts (6302) with a sample count of zero (6304). Next, the sample count is compared to a value N (6306), where, as mentioned above, a value for N is pre-selected to correspond to a desired duration of the random sequence mode 6204.

If the sample count is less than or equal to the value N, then a random frequency value is generated (6308) and sent to a filter, such as the filter 5050 (6310). Subsequently, a result of the filtering process is forwarded to an input of the DAC 5030 (6312), and the sample count is incremented by 1 (6314).

When the sample count reaches a value greater than N, then the random sequence mode 6204 is exited, and the zero-value mode 6206 is started (6316). In the zero-value 6206, the sample count is set to zero (6318), and is then compared to a pre-selected value M (6320), which is selected to provide the flowtube enough time to settle into vibration at or near its resonance frequency.

If the sample count is less than or equal to M, then a zero value is sent to an input of the DAC 5030 (6322), and the sample count value is incremented by 1 (6324). If the sample count is greater than M, then the positive feedback mode (6208) is started (see FIG. 64).

In short, in generating the random frequency, the implementation of FIG. 63 generates a series of random values, perhaps at a rate corresponding to the sampling rate of the ADC 5015, using a random number generator. Then, frequencies in the permitted range of drive frequencies (e.g., 0-100 Hz) are excited by feeding the generated, random sequence through the filter 5050, which serves to eliminate substantially all frequency components above the relevant range. The resulting signal is a relatively smooth random sequence, containing all frequencies below the pre-determined cut-off frequency.

Figure 64:
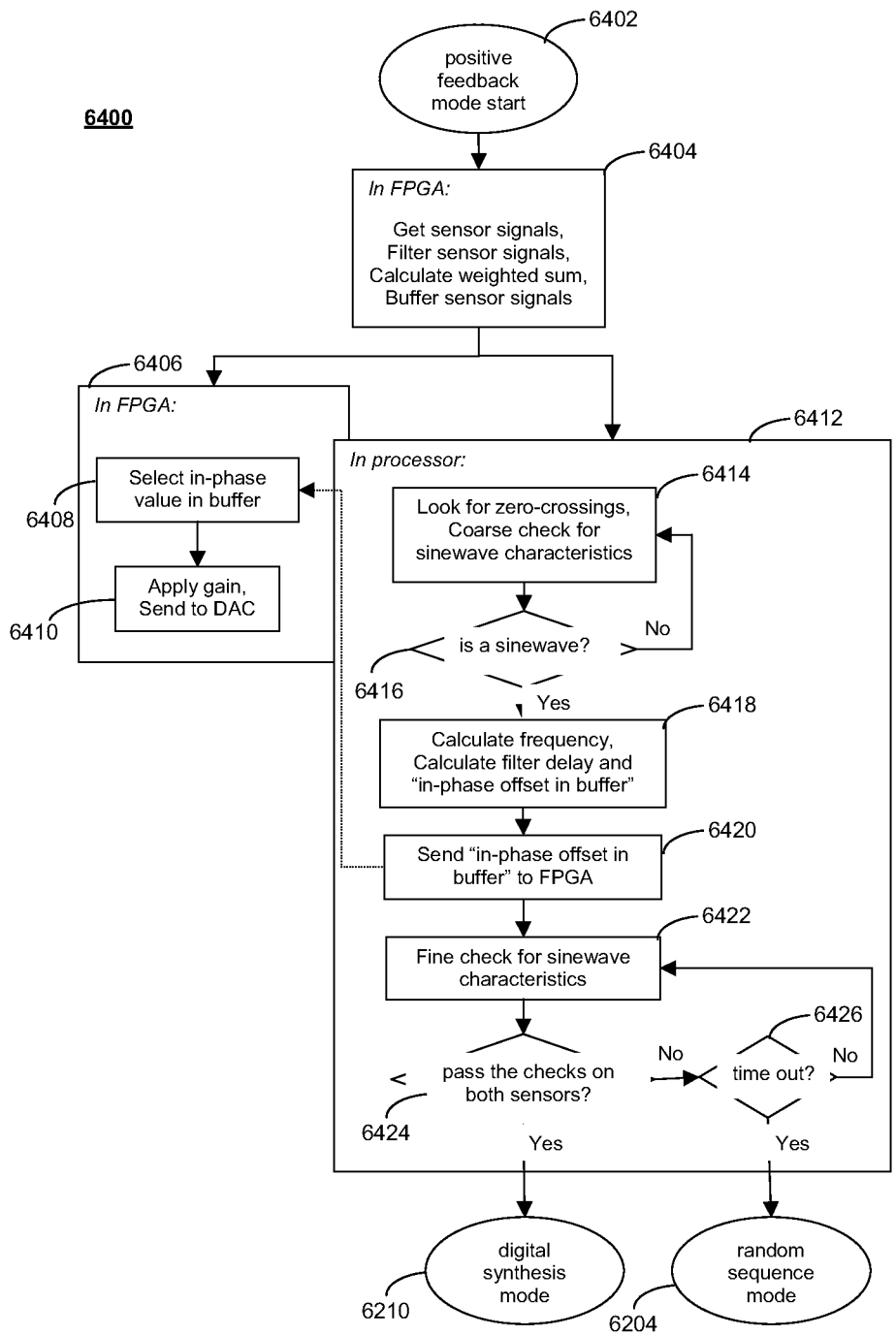
FIG. 64 is a flowchart illustrating the positive feedback mode 1608 of FIG. 62 in more detail.

FIG. 64 is a flowchart 6400 illustrating the positive feedback mode 6208 of FIG. 62 in more detail. At a start of the positive feedback mode 6208 (6402), the FPGA 4910 inputs and filters the sensor signals, and calculates the virtual weighted sum for buffering (6404). Then, in a further subset of actions by the FPGA 4910 (6406), the FPGA 4910 selects a value from the buffer 5025 that will account for the CODEC delay (as discussed with respect to FIG. 52) (6408), and then applies the selected gain factor (e.g., ten) to the buffered signal for forwarding to the DAC 5030 (6410).

Meanwhile, during a subset of actions taken by the processor 4915 (6412), the processor 4915 attempts to identify a sinewave-like wave by, for example, running several checks on segments of signals between two consecutive negative-to-positive zero crossings (6414). If a sinewave is detected (6416), then the processor 4915 calculates a frequency of the wave and a filter delay associated with that frequency, and translates this information into a corresponding, improved buffer offset (6418).

The improved buffer offset is then sent to the FPGA 4910 (6420), where it replaces the previous buffer offset value and allows the drive signal (multiplied by the gain factor) to more closely mimic the phase of the sensor signal. Meanwhile, the processor performs a more detailed analysis of characteristics of the detected sinewave (6422), and checks to see whether the analyzed, detected sinewave is present in both sensor signals (6424) with desired frequency and phase characteristics.

If not, the processor 4915 continues to perform these checks for some pre-determined time (6426), after which the processor 4915 determines that digital synthesis cannot be satisfactorily entered, and reverts to the random sequence mode (6204). If the sinewave(s) are satisfactorily present in both signals, then the processor 4915 forwards the synthesis parameters to the FPGA 4910 and the flowmeter enters the digital synthesis mode (6210). The operation of the digital synthesis mode, including examples of operations and interactions of the FPGA 4910 and the processor 4915, are discussed above with respect to FIGS. 53-59, and particularly with respect to the flowcharts 5600 and 5700 of FIGS. 56 and 57, respectively.

In some implementations, above-describe operations may overlap and/or be duplicated during the various modes of operation. For example, in any or all of the random sequence mode 6204, the zero-output 6206, and the positive feedback mode 6208, the processor 4915 may attempt to identify a sinewave-like wave in the manner described above with respect to the positive feedback mode 6208. These and other operations may be enacted in parallel and/or in series with one another, using the FPGA 4910/processor 4915 architecture described above, or using some other division of labor among selected (e.g., programmed) hardware components.

Also, as explained above, the drive gain during the positive feedback mode 6208 is typically fixed to a high value, so that the amplitude of the oscillation may raise exponentially. In the digital synthesis mode 6210, however, the amplitude may be variable, and may be controlled by a pre-selected algorithm that uses the gain as a controller variable.

FIGS. 65A-65F describe drive signal generation during a start sequence for one implementation of the digital flowmeter as applied to the bent flowtube 4702. FIGS. 66A-66F describe drive signal generation during the start sequence of FIGS. 65A-65F in more detail.

The data shown in FIGS. 65A-65F, as well as in FIGS. 66A-66F, are, respectively for each set of figures, raw sensor data (one sensor only), filtered weighted sum of the sensor data, the drive gain, the waveform synthesis mode (i.e., random filtered start-up sequence, positive feedback or pure sine wave synthesis), a flag indicating when there has been an update to the feedback delay parameter, and the actual drive output.

In FIGS. 65A-65F, up until just before 1 second has passed, the drive output is random while the CODEC 4905 warms up; that is, the flowmeter is operating in the random sequence mode 6204. As sensor data begins to be collected, again just before 1 second has passed, the zero-output mode 6206 can be seen in FIG. 65F.

As raw and filtered sensor data is collected (FIGS. 65A and 65B), a drive gain of 10 is applied at approximately 1.1 seconds (FIG. 65C), whereupon the mode switches from the random sequence mode 6204 to the positive feedback mode 6208 (through the zero output mode 6206, as described above). In the positive feedback mode, as can be seen from approximately 1.02 to 1.04 seconds in FIG. 66F, an amplitude of the drive signal initially degrades. This loss of amplitude occurs despite the fact that the sensor signals (at least approximately) represent an acceptable (resonance) frequency for the flowtube 4815, because phase of the sensor signals (e.g., FIGS. 65A and 66A) and the phase of the drive signals (e.g., FIGS. 65F and 66F) do not match. When the estimated feedback delay term is applied as shown in FIGS. 65E and 66E (and as explained above with respect to FIG. 64), then the phases match more closely, and the amplitude of the drive signal begins to grow.

Once the amplitude reaches the threshold for switching to waveform synthesis, the processes described with respect to FIGS. 54-57 are implemented, in which the frequency, filter delay, and sine wave parameters are determined, whereupon the FPGA 4910 waits for the relevant zero-crossing of the sensor signal, which happens to occur at approximately 1.1 seconds in FIGS. 65A and 66A, during which time the drive output is momentarily suspended (see FIGS. 65F and 66F). At the appropriate zero-crossing, digital synthesis mode 6210 is implemented, and the amplitude is maintained at a stable value.

It should be understood that, during the digital synthesis mode 6210, the drive gain in FIGS. 65C and 66C might be better understood as an attenuation factor controlled by the amplitude control algorithm mentioned above, assuming that an amplitude of the synthesized sinewave is fixed to a maximum value. Also, at approximately 1.8 seconds, the amplitude control algorithm determines that maximum drive current is no longer necessary, so that reduced current levels are generated after this point to achieve and maintain the sensor voltage at the selected set point.

In implementing the above-described techniques, one body of FPGA code may be used for both the bent and straight flowtubes, but various options (e.g., filter coefficients) may be switched on/off for the different flowtubes. In one implementation, within the FPGA code, the drive output amplitude should not exceed 50% in the case of the straight flowtube 4706 (in order to minimize damage thereto). This requirement may not be necessary for the bent flowtube 4702. As a consequence of these differences, a separate FPGA bit file may be produced to drive each flowtube type. Nonetheless, the same, for example, VxWorks program may be used for both flowtubes, simply using different configuration file settings.

Thus, it can be seen that these implementations for generating the drive signal, including the actions of generating a random sequence to excite permitted frequencies while awaiting codec warm-up, implementing positive feedback to create a rapid increase in amplitude while suppressing unwanted higher frequencies, and synthesizing a pure waveform for continuous operation providing fast and precise flowtube control and measurement precision, allows for the advantageous use of a digital flowmeter.

As referred to above, a digital implementation of a flowmeter provides several advantages over analog implementations, in which an op amp is typically employed to provide multiplication of the sensor signal by the drive gain. This is due to the fact that op amps are likely to have an upper gain limit that will be reached if the damping level of the flowtube reaches a certain point (e.g., in the presence of two-phase flow). In these situations, stalling of the system is likely, as the amplitude of the flowtube drops below necessary levels and the feedback loop is not capable of sufficiently increasing the drive gain. Moreover, during the start-up period before fluid may be (completely) flowing, an initial estimate of the drive signal must be selected; selection of a gain that is too high may vary the damping level excessively and/or introduce undesirable higher harmonics, while too low a gain will not start the flowtube.

The digital implementations discussed herein may overcome these and other difficulties of conventional systems. For example, there is no practical limit to the drive gain that may be applied, and therefore stalling due to insufficient gain is extremely unlikely. Additionally, the digital signal processing capabilities of digital flowmeters can temporarily apply negative gain (i.e., intentionally introducing a 180 degree phase offset) for the purpose of aggressive flowtube vibration control.

In implementing these and other features, the digital transmitter 4704 initiates and maintains a flowtube oscillation, such that the drive signals generated by the digital transmitter are compensated for phase delays caused by analog and/or digital elements within, or associated with, the digital transmitter. In this way, the drive signals have a desired phase relationship with the oscillation of the particular flowtube being used (i.e., with the sensor signals detected at the flowtube). As shown in the examples above, such control of drive signal generation, including phase compensation, may be implemented in a variety of ways, for a number of uses in different settings.

Moreover, having described the above techniques as examples of synthesizing pure sinewaves having desired phase characteristics, it should be understood that various other signal modifications also might be implemented, resulting in further control and flexibility in operating a digital flowmeter.

For example, once the sinewave synthesis parameters have been determined as described above, the processor 4915 and/or the FPGA 4910 might include a DC component in the drive signal(s) when actually synthesizing the sine wave. Such a DC component might be useful in, for example, compensating for any observed or calculated offset in the drive signal(s), such as might be caused by component drift.

As another example, a selected amount of hysteresis may be added to the drive signal(s). Such hysteresis may be useful in, for example, compensating for magnetic core hysteresis that may be associated with magnetic coils used for, for example, velocity sensors.

As yet another example, it should be understood that a plurality of sinewaves might be generated, each with their own frequency, phase and amplitude characteristics. These signals might be used to regulate an amplitude of oscillation at the desired resonant mode, while simultaneously suppressing undesirable resonant modes (e.g., by applying negative gain to suppress unwanted Coriolis modes). The plurality of sinewaves also could be used to operate the flowtube in multiple modes at once.

Further, the implementations described above may simplify a structure and operation of a flowmeter in ways not explicitly described above. For example, velocity sensors such as magnetic coils, which often may add size, weight, and/or hysteresis (where the latter factor may result in higher harmonic content in the sensor signals), may be entirely removed during digital synthesis and/or positive feedback modes, and replaced with, for example, accelerometers. Such accelerometers (or other types of position sensors) may have lower size/weight and better hysteresis characteristics than magnetic coil velocity sensors.

Although digital synthesis has primarily been discussed in terms of sinewaves, it also is possible for some implementations to synthesize other waveforms, such as square waves or triangular waves. Such alternative waveforms may be useful in various operational settings, and may be an addition or an alternative to the use of sinewave generation.

A number of implementations have been described. Nevertheless, it will be understood that various modifications may be made. For example, the digital flowmeter may be implemented to handle two-phase flow conditions (e.g., water and gas), and/or three-phase flow conditions (e.g., water, gas, and oil), and may be implemented in various flowtube types other than those disclosed herein. Accordingly, other implementations are within the scope of the following claims.

What is claimed is:
1. A digital flowmeter, comprising:
a vibratable flowtube;
a sensor connected to the flowtube and operable to relay information about a motion of the flowtube by way of a sensor signal;
a driver connected to the flowtube and operable to impart motion to the flowtube by way of a drive signal; and
a digital control and measurement system connected to the driver and the sensor, the digital control and measurement system comprising circuitry to maintain the sensor signal and the drive signal substantially in phase with one another,
wherein the digital control and measurement system is operable to compare the sensor signal and the drive signal, to thereby determine a phase difference therebetween, and is further operable to cause the driver to apply the drive signal with a phase altered by an amount determined by the phase difference, and
wherein the digital control and measurement system further comprises a multiplexer that is operable to input the sensor signal and the drive signal and output a combined signal, and wherein the combined signal is analyzed by the digital control and measurement system to determine the phase difference.
2. The digital flowmeter of claim 1, wherein the sensor signal includes a weighted sum of a first sensor signal and a second sensor signal.
3. The digital flowmeter of claim 1 wherein the digital control and measurement system includes analog-to-digital or digital-to-analog converters.
4. The digital flowmeter of claim 1 wherein the digital control and measurement system includes a filter.
5. The digital flowmeter of claim 1 further comprising a filter operable to filter the sensor signal to obtain a filtered signal, wherein the filtered signal does not include signals having a frequency outside of a pre-determined range from a resonant frequency of the flowtube.
6. The digital flowmeter of claim 5 wherein the digital control and measurement system is further operable to synthesize the drive signal as a sine wave.

\* \* \* \* \*